US012782675B2

(12) United States Patent
Lee et al.

(10) Patent No.: US 12,782,675 B2
(45) Date of Patent: Nov. 3, 2026

(54) ACTUATOR DEVICE AND CAMERA DEVICE

(71) Applicant: LG INNOTEK CO., LTD., Seoul (KR)

(72) Inventors: Sung Guk Lee, Seoul (KR); Hyun Joong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 360 days.

(21) Appl. No.: 18/575,004

(22) PCT Filed: Jun. 28, 2022

(86) PCT No.: PCT/KR2022/009247
§ 371 (c)(1),
(2) Date: Dec. 28, 2023

(87) PCT Pub. No.: WO2023/277540
PCT Pub. Date: Jan. 5, 2023

(65) Prior Publication Data

US 2024/0302625 A1 Sep. 12, 2024

(30) Foreign Application Priority Data

Jun. 28, 2021 (KR) ........................ 10-2021-0084184
Jul. 24, 2021 (KR) ........................ 10-2021-0097430
Aug. 9, 2021 (KR) ........................ 10-2021-0104573

(51) Int. Cl.
*G02B 7/182* (2021.01)
*G02B 27/64* (2006.01)
(Continued)

(52) U.S. Cl.
CPC ......... *G02B 7/1828* (2013.01); *G02B 27/646* (2013.01); *G03B 5/00* (2013.01);
(Continued)

(58) Field of Classification Search
CPC ...... G02B 7/1828; G02B 27/646; G03B 5/00; G03B 2205/0023; G03B 2205/0069;
(Continued)

(56) References Cited

U.S. PATENT DOCUMENTS

2018/0259787 A1* 9/2018 Kim ..................... H04N 23/687
2023/0135247 A1* 5/2023 Park ....................... H04N 23/55
348/340

FOREIGN PATENT DOCUMENTS

KR 10-2018-0052554 A 5/2018
KR 10-2018-0102946 A 9/2018
(Continued)

OTHER PUBLICATIONS

International Search Report dated Oct. 6, 2022 in International Application No. PCT/KR2022/009247.

*Primary Examiner* — Mariam Qureshi
(74) *Attorney, Agent, or Firm* — SALIWANCHIK, LLOYD & EISENSCHENK

(57) ABSTRACT

The present embodiment relates to an actuator device, comprising: a housing; a holder arranged in the housing; a reflection member arranged in the holder; a moving plate arranged between the housing and the holder; a mover rigid coupled to the holder with a first part of the housing placed therebetween; a first magnet arranged in the mover grid; a second magnet arranged in the first part of the housing so that repulsive force is generated between the first magnet and the second magnet; and a buffer member arranged in the first part of the housing, wherein the distance between the mover rigid and the buffer member is shorter than the distance between the first magnet and the second magnet in a first direction in which the first magnet is oriented toward the second magnet.

18 Claims, 85 Drawing Sheets

(51) Int. Cl.
*G03B 5/00* (2021.01)
*H02K 11/215* (2016.01)
*H02K 41/035* (2006.01)

(52) U.S. Cl.
CPC ....... *H02K 11/215* (2016.01); *H02K 41/0354* (2013.01); *G03B 2205/0023* (2013.01); *G03B 2205/0069* (2013.01)

(58) Field of Classification Search
CPC ........ G03B 5/04; G03B 17/02; H02K 11/215; H02K 41/0354; H02K 33/16; H02K 33/18; H01F 7/02
See application file for complete search history.

(56) References Cited

FOREIGN PATENT DOCUMENTS

| | | | |
|---|---|---|---|
| KR | 10-2020-0085579 | A | 7/2020 |
| KR | 10-2020-0118391 | A | 10/2020 |
| KR | 10-2021-0054716 | A | 5/2021 |

* cited by examiner (a)

(b)

ACTUATOR DEVICE AND CAMERA DEVICE

CROSS-REFERENCE TO RELATED APPLICATIONS

This application is the U.S. national stage application of International Patent Application No. PCT/KR2022/009247, filed Jun. 28, 2022, which claims the benefit under 35 U.S.C. § 119 of Korean Application Nos. 10-2021-0084184, filed Jun. 28, 2021; 10-2021-0097430, filed Jul. 24, 2021; and 10-2021-0104573, filed Aug. 9, 2021; the disclosures of each of which are incorporated herein by reference in their entirety.

TECHNICAL FIELD

The present embodiment relates to an actuator device and a camera device.

BACKGROUND ART

A camera device is a device for taking pictures or videos by capturing subjects and is mounted on an optical device such as a smartphone, a drone, a vehicle, and the like.

Recently, a camera device may have an image stabilization (OIS) function for correcting the image shake caused by the movement of a user, an auto focusing (AF) function for aligning a focal length of a lens by automatically adjusting an interval between an image sensor and a lens, and a zooming function for capturing a remote subject by increasing or decreasing the magnification of an image of the remote subject through a zoom lens in order to improve the quality of the image.

DISCLOSURE

Technical Problem

The present embodiment is directed to providing an actuator device in which an OIS function is implemented through a tilting of a reflective member.

Furthermore, the present embodiment is also directed to providing an actuator device in which damage to a mover rigid due to external impacts is inhibited. In addition, the present embodiment is also directed to providing an actuator device in which damage to a housing due to external impacts is inhibited.

In addition, the present embodiment is also directed to providing an actuator device in which overflow of a bonder is inhibited when a board is coupled to a housing.

In addition, the present embodiment is also directed to providing a reflective member driving device in which an OIS function is implemented through a tilting of a reflective member.

Furthermore, the present embodiment is also directed to providing a reflective member driving device with improved linearity of a Hall sensor for detecting a tiling of a reflective member occurring about an x-axis.

In addition, the present invention may provide a camera actuator that is easy to assemble by adjusting positions of a tilting guide unit, a mover, and first and second magnetic parts for a repulsive force.

In addition, the present invention may provide a camera actuator which may be disassembled nondestructively through a position of a first member and a structure of a mover corresponding thereto and of which components are easily re-used when a failure occurs.

In addition, the present invention may provide a camera actuator in which the introduction of foreign substances is suppressed due to a tilting or the like through a structure of a mover.

In addition, the present invention is also directed to providing a camera actuator applicable to ultra-slim, ultra-small, and high-resolution cameras.

The object of embodiments is not limited thereto and may also include objects or effects that may be identified from the configurations or embodiments to be described below.

Technical Solution

An actuator device according to the present embodiment includes a housing, a holder disposed in the housing, a reflective member disposed on the holder, a moving plate disposed between the housing and the holder, a mover rigid coupled to the holder with a first part of the housing interposed therebetween, a first magnet disposed on the mover rigid, a second magnet disposed in the first part of the housing to generate a repulsive force with the first magnet, and a buffer member disposed on the first part of the housing, wherein a distance between the mover rigid and the buffer member is smaller than a distance between the first magnet and the second magnet in a first direction in which the first magnet faces the second magnet.

The mover rigid may come into contact with the buffer member when the mover rigid moves in the first direction.

The distance between the mover rigid and the buffer member may be smaller than a distance between the mover rigid and the first part of the housing in the first direction.

The buffer member may protrude more than the second magnet in a second direction opposite to the first direction.

The buffer member may protrude more than the first part of the housing in a second direction opposite to the first direction.

The buffer member may be spaced apart from the second magnet in a third direction perpendicular to the first direction, and a width of the buffer member may be greater than a width of the second magnet in a fourth direction perpendicular to the first direction and the third direction.

The actuator device may include an additional buffer member disposed in the housing, wherein the mover rigid may come into contact with the additional buffer member when the mover rigid moves in the third direction.

The housing may include a groove formed in the first part of the housing, and at least a portion of the buffer member may be disposed in the groove of the housing.

The first magnet may overlap the buffer member in the first direction.

The buffer member may include a first buffer member disposed above the second magnet and a second buffer member disposed under the second magnet.

The first buffer member does not overlap the moving plate in the first direction, and the second buffer member may overlap the moving plate in the first direction.

The buffer member may be elastic.

The actuator device may include a board disposed in the housing, a driving magnet disposed in the holder, a coil disposed on the board and disposed at a position corresponding to the driving magnet, and an adhesive coupling the board to the housing, wherein the housing may include a first surface to which the board is coupled, and a groove formed in the first surface, and at least a portion of the adhesive may be disposed in the groove of the housing.

The groove of the housing may have a quadrangular ring shape.

The housing may include a hole in which the coil is disposed, the groove of the housing may be formed to be greater than the hole of the housing, and the hole of the housing may be disposed in the groove of the housing.

An actuator device according to the present embodiment includes a housing, a holder disposed in the housing, a reflective member disposed on the holder, a moving plate disposed between the housing and the holder, a mover rigid coupled to the holder with a first part of the housing interposed therebetween, a first magnet disposed on the mover rigid, and a buffer member disposed between the mover rigid and the first part of the housing, wherein the mover rigid comes into contact with the buffer member when the mover rigid moves.

The actuator device may include a second magnet disposed in the first part of the housing to generate a repulsive force with the first magnet.

The buffer member may be disposed in contact with the first part of the housing.

A camera device according to the present embodiment includes a printed circuit board, an image sensor disposed on the printed circuit board, an actuator device, and a lens disposed on an optical path formed by the reflective member of the actuator device and the image sensor.

An optical device according to the present embodiment includes a body, a camera device disposed on the body, and a display disposed on the body and configured to output any one or more of videos and images captured by the camera device.

An actuator device according to the present embodiment includes a housing, a holder disposed in the housing, a reflective member disposed on the holder, a moving plate disposed between the housing and the holder, a mover rigid coupled to the holder with a first part of the housing interposed therebetween, and a buffer member disposed between the first part of the housing and the mover rigid.

In addition, a reflective member driving device according to the present embodiment includes a fixed unit, a holder disposed in the fixed unit, a reflective member disposed on the holder, a first magnet and a first coil configured to tilt the holder about a first axis, and a second magnet and a second coil configured to tilt the holder about a second axis perpendicular to the first axis, wherein each of the first magnet and the second magnet includes an air gap, and a length of the air gap of the first magnet is greater than a length of the air gap of the second magnet in a direction of a third axis perpendicular to both the first axis and the second axis.

The second axis may be an optical axis of light incident on the reflective member, and the third axis may be an optical axis of light emitted from the reflective member.

The reflective member driving device may include a first sensor configured to detect the first magnet, wherein the first magnet may be disposed on a lower surface of the holder, and the second magnet may be disposed each of on both side surfaces of the holder.

A length of the air gap of the first magnet in the direction of the third axis may be greater than a length of the first sensor in a corresponding direction.

The first magnet may include a first part including an N pole and an S pole, and a second part including an S pole and an N pole, the air gap of the first magnet may be disposed between the first part and the second part, and each of the first part and the second part may include a portion overlapping the first sensor in a direction of the second axis.

The length of the air gap of the first magnet in the direction of the third axis may be smaller than a thickness of the second magnet in a direction of the first axis.

The length of the air gap of the first driving magnet in the direction of the third axis may be greater than 0.3 mm and smaller than 0.7 mm.

The reflective member driving device may include a moving plate disposed between the fixed unit and the holder, a mover rigid coupled to the holder, a third magnet disposed on the mover rigid, and a fourth magnet disposed on the fixed unit to generate a repulsive force with the third magnet.

The length of the air gap of the first magnet in the direction of the third axis may be greater than a length of the third magnet in a corresponding direction.

A reflective member driving device according to the present embodiment includes a fixed unit, a holder disposed in the fixed unit, a reflective member disposed on the holder, a magnet disposed in the holder, a coil disposed at a position of the fixed unit corresponding to the magnet, and a sensor disposed on the fixed unit and configured to detect the magnet, wherein the magnet includes a first surface facing the coil, the first surface of the magnet includes a first magnet region and a second magnet region, the first magnet region and the second magnet region are spaced apart from each other, and a separation distance between the first magnet region and the second magnet region is in a range of 1 to 1.5 times a length of the sensor in a corresponding direction.

A reflective member driving device according to the present embodiment includes a fixed unit, a holder disposed in the fixed unit, a reflective member disposed on the holder, a magnet disposed in the holder, a coil disposed at a position of the fixed unit corresponding to the magnet, and a sensor disposed on the fixed unit and configured to detect the magnet, wherein the magnet includes a first magnet including an N pole and an S pole, and a second magnet including an N pole and an S pole, and the holder includes a protruding portion disposed between the first magnet and the second magnet.

In addition, a camera actuator according to an embodiment of the present invention includes a housing, a first member coupled to the housing, a mover disposed to be coupled to an optical member, a first magnetic part disposed on the first member, a second magnetic part disposed on the mover, and a tilting guide unit disposed between the mover and the housing, wherein the mover includes a mover protruding portion passing through the tilting guide unit.

The second magnetic part may be disposed in the mover protruding portion.

The second magnetic part, the first magnetic part, and the optical member may be disposed sequentially in an optical axis direction.

The mover protruding portion may include a member accommodating groove in which at least a portion of the first member is accommodated.

The first magnetic part may be disposed in the member accommodating groove.

The first member may come into contact with an inner surface of the member accommodating groove by the movement of a tilting guide.

An opening direction of the member accommodating groove may be an upward direction.

The member accommodating groove may overlap a first magnetic part and a second magnetic part in the optical axis direction.

The first magnetic part may be disposed to face the inner surface of the member accommodating groove.

The member accommodating groove may include a first inner surface and a second inner surface that face each other in the optical axis direction, and the first inner surface may be disposed closer to the tilting guide unit than the second inner surface is.

The first magnetic part may be disposed to face the first inner surface.

The first magnetic part may be disposed in the first member.

At least a portion of the second magnetic part may overlap the tilting guide unit in a vertical direction.

The first magnetic part and the second magnetic part may have the same polarity.

The first magnetic part and the second magnetic part may have different lengths.

Advantageous Effects

Through the present embodiment, it is possible to inhibit damage to a mover rigid due to external impacts. For example, it is possible to inhibit breakage, cracking, or separation of the mover rigid from a holder in impacts reliability test process. In addition, it is possible to inhibit damage to a housing due to the external impacts.

In addition, it is possible to inhibit a phenomenon in which a bond overflows when a board is coupled to the housing.

In addition, through the present embodiment, it is possible to improve the linearity of a Hall sensor for detecting a tilting of a reflective member occurring about an x-axis. In other words, it is possible to improve the x-axis linearity. It is possible to improve the linearity of a side to which the reflective member is driven by one driving magnet.

Therefore, it is possible to provide an optical image stabilization (OIS) function more precisely.

In addition, it is possible to implement the camera actuator that is easy to assemble by adjusting positions of a tilting guide unit, a mover, and first and second magnetic parts for a repulsive force.

In addition, it is possible to implement the camera actuator which may be disassembled nondestructively through a position of a first member and a structure of a mover corresponding thereto and of which components are easily re-used when a failure occurs.

In addition, it is possible to implement the camera actuator in which the introduction of foreign substances is suppressed due to a tilting or the like through a structure of a mover.

In addition, it is possible to provide the camera actuator applicable to ultra-slim, ultra-small, and high-resolution cameras. In particular, it is possible to effectively arrange an OIS actuator even without increasing the entire size of a camera module.

In addition, it is possible to implement a precise OIS function because an X-axis tilting and a Y-axis tilting are performed with a stable structure without causing magnetic field interference between the X-axis tilting and the Y-axis tilting and magnetic field is not interfered with an auto focusing (AF) actuator or a zooming actuator.

According to the embodiments of the present invention, it is possible to sufficiently secure the amount of light by resolving a size limit of a lens and implement an OIS with low power consumption.

Various and beneficial advantages and effects of the present invention are not limited to the above-described contents and will be more readily understood in a process of describing specific embodiments of the present invention.

MODES OF THE INVENTION

Figure 1:
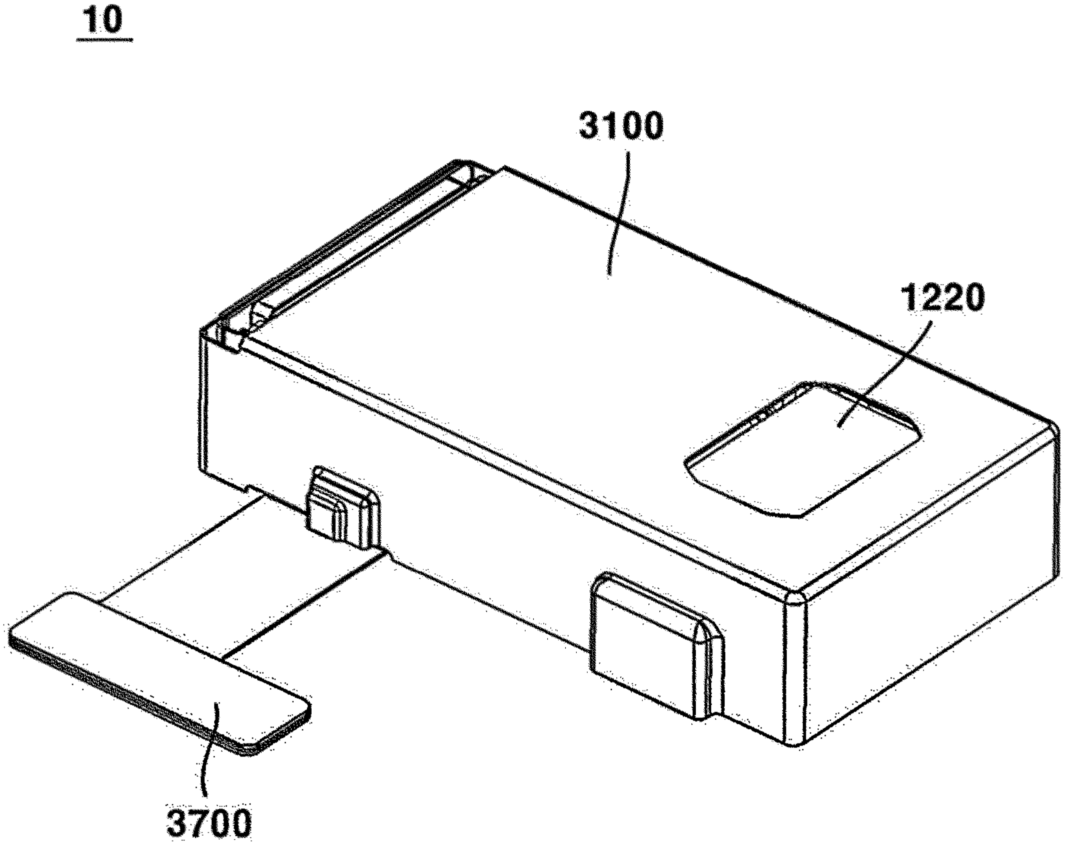
FIG. 1 is a perspective view of a camera device according to the present embodiment.

Hereinafter, exemplary embodiments according to the present invention will be described in detail with reference to the accompanying drawings.

However, the technical spirit of the present invention is not limited to some of the described embodiments, but may be implemented in various different forms, and one or more of the components among the embodiments may be used by being selectively coupled or substituted without departing from the scope of the technical spirit of the present invention.

In addition, the terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

In addition, the terms used in the embodiments of the present invention are for describing the embodiments and are not intended to limit the present invention.

In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present invention. These terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

In addition, when a certain component is described as being formed or disposed on "on (above)" or "below (under)" another component, the terms "on (above)" or "below (under)" may include not only a case in which two components are in direct contact with each other, but also a case in which one or more other components are formed or disposed between the two components. In addition, when described as "on (above)" or "below (under)," it may include the meaning of not only an upward direction but also a downward direction based on one component.

Hereinafter, any one of "first driving magnet 1411," "second driving magnet 1421," "first magnet 1240," and "second magnet 1120" will be referred to as "first magnet," another may be referred to as "second magnet," still another may be referred to as "third magnet," and yet another may be referred to as "fourth magnet."

Hereinafter, a reflective member driving device according to the present embodiment will be described with reference to the drawings.

Figure 7:
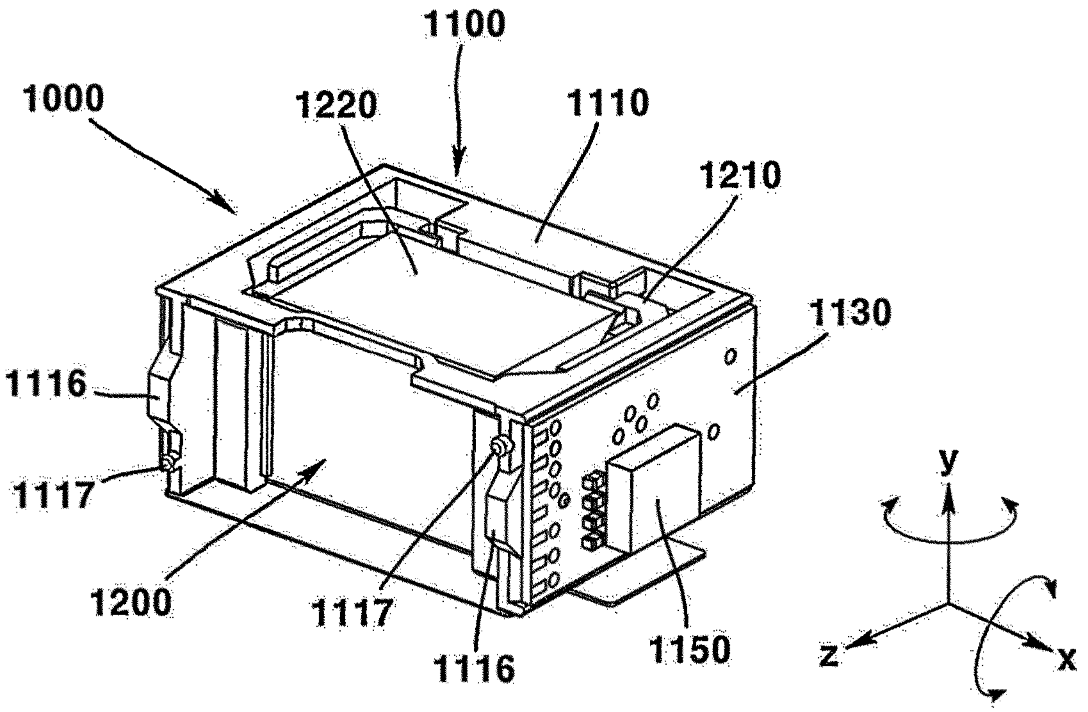
FIG. 7 is a perspective view of a reflective member driving device according to the present embodiment.
Figure 8:
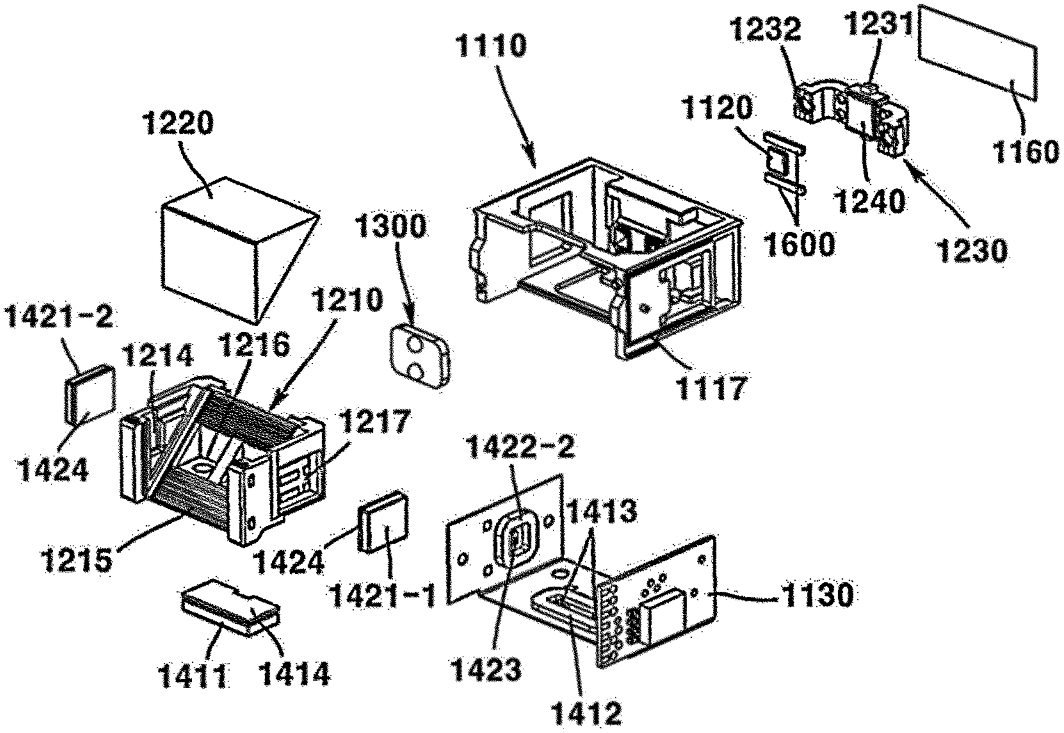
FIG. 8 is an exploded perspective view of the reflective member driving device according to the present embodiment.
Figure 9:
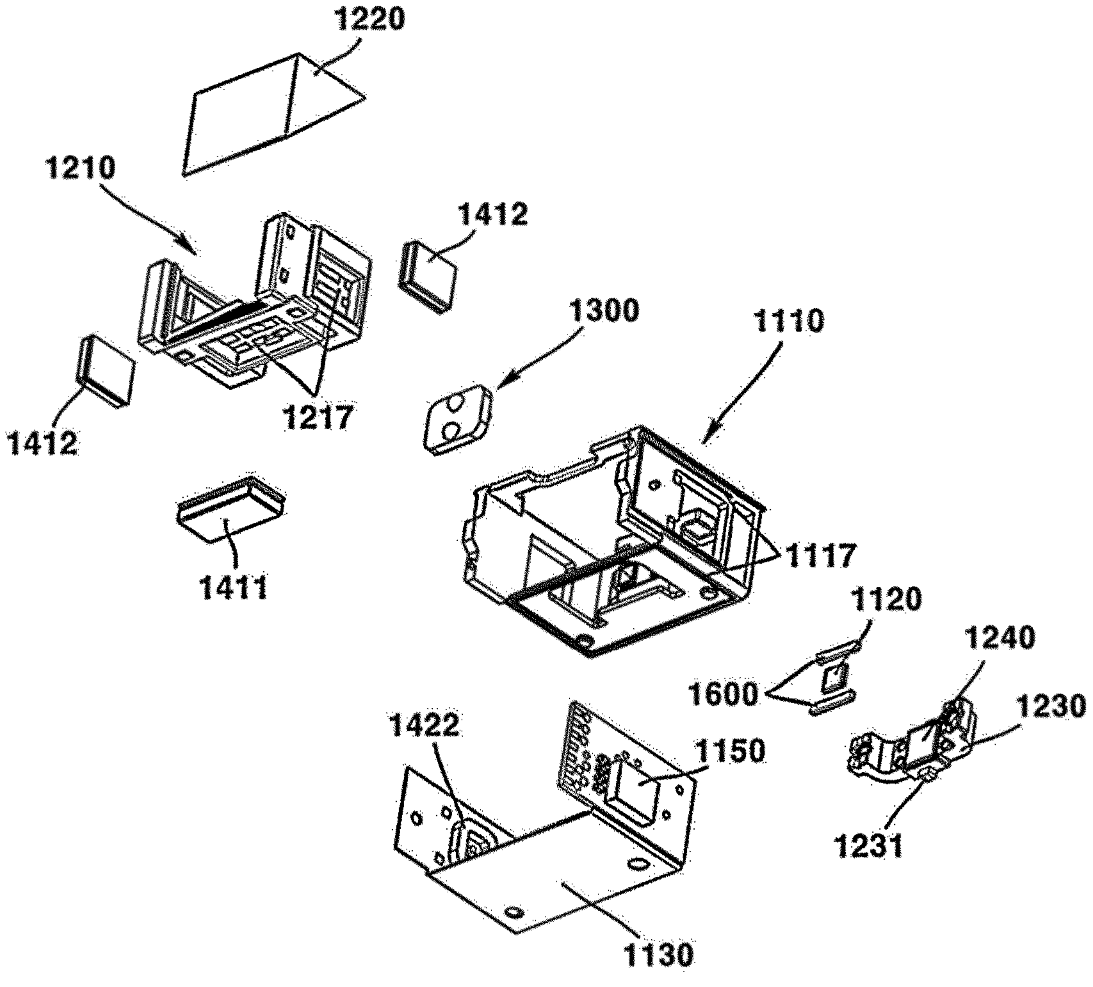
FIG. 9 is a bottom exploded perspective view of the reflective member driving device according to the present embodiment.
Figure 10:
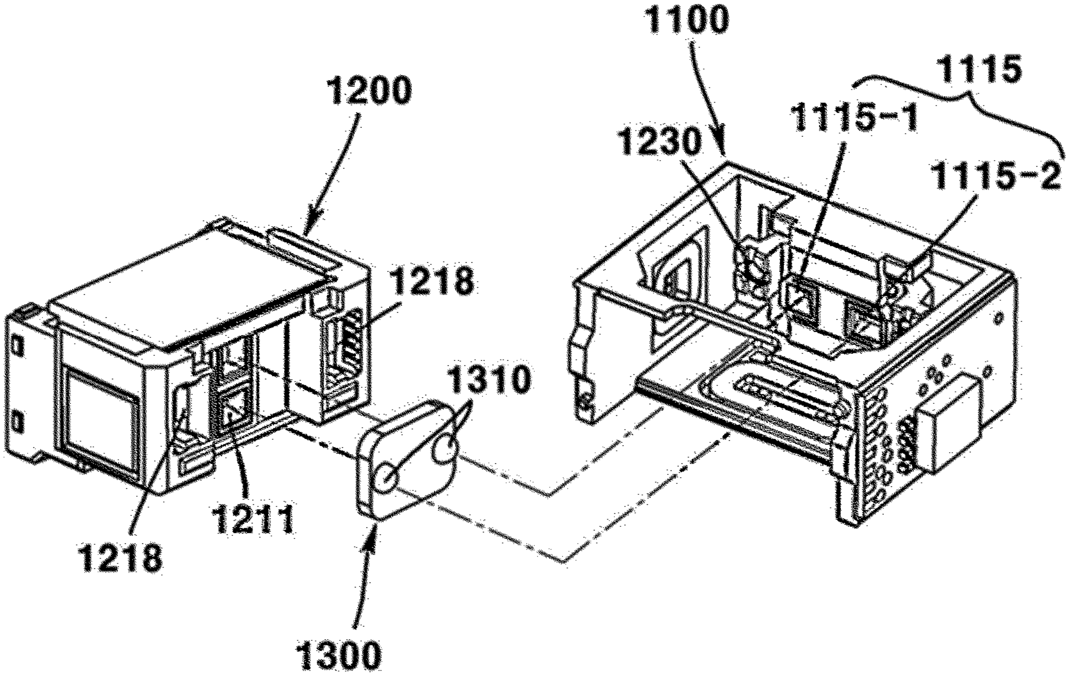
FIGS. 10 and 11 are views for describing a moving plate-related structure of the reflective member driving device according to the present embodiment.
Figure 11:
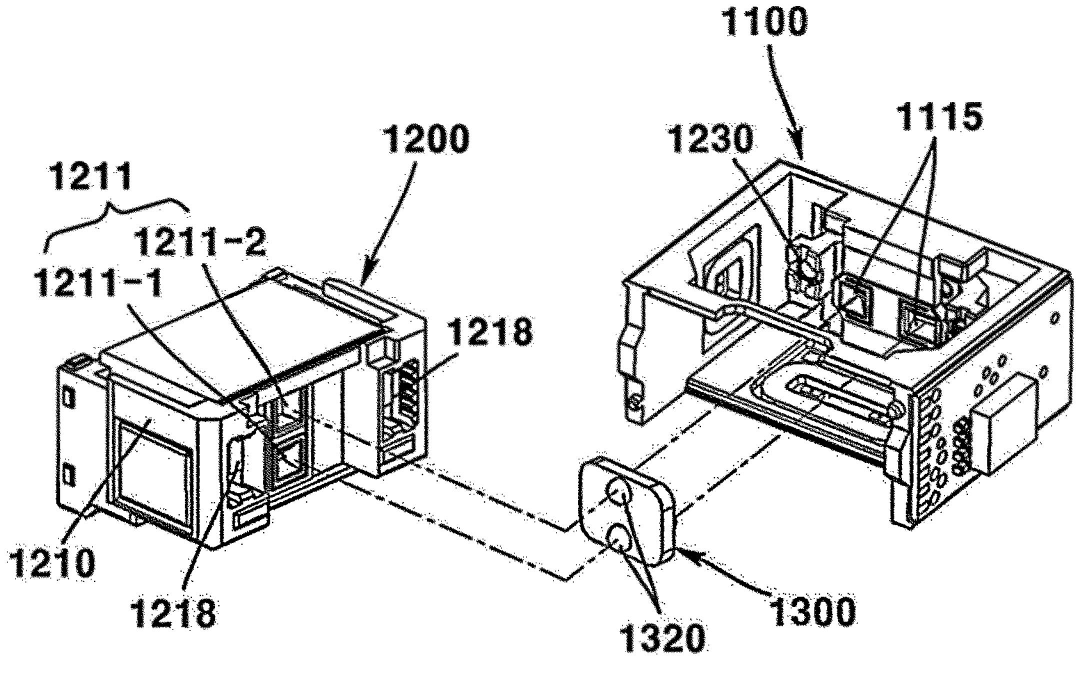
Figure 12:
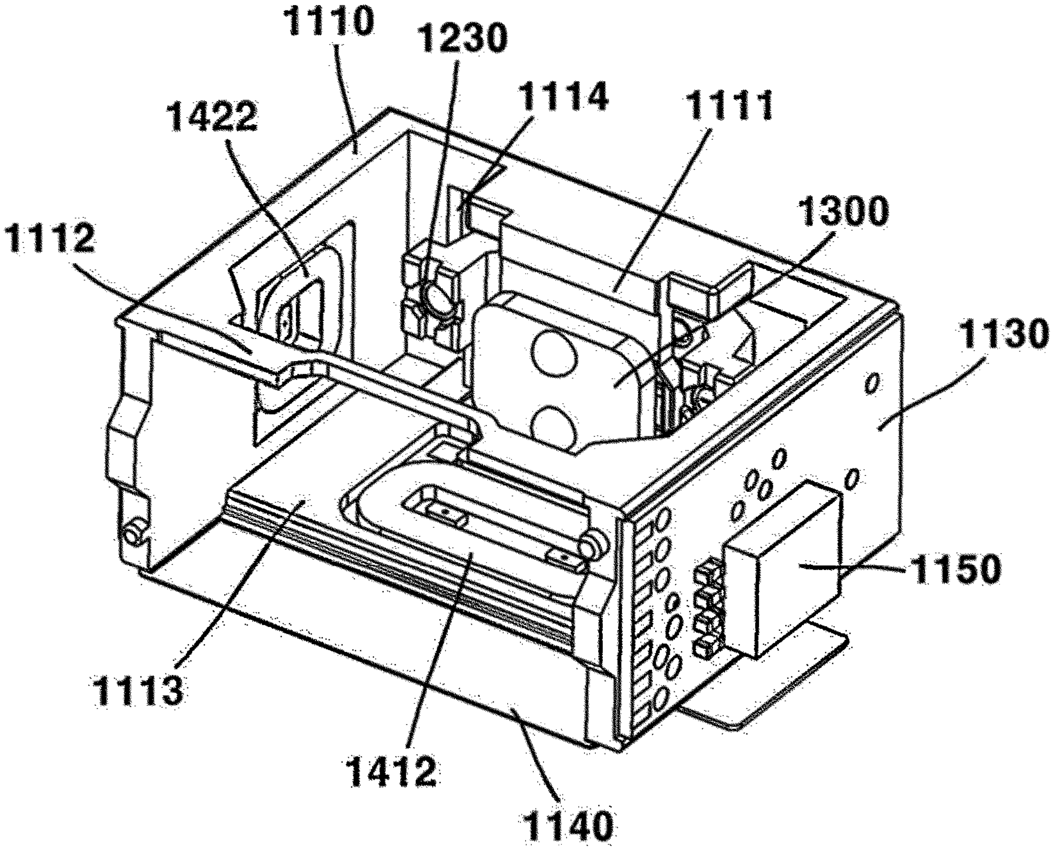
FIG. 12 is a perspective view of a state in which a component, such as a moving unit of the reflective member driving device according to the present embodiment, is omitted.
Figure 13:
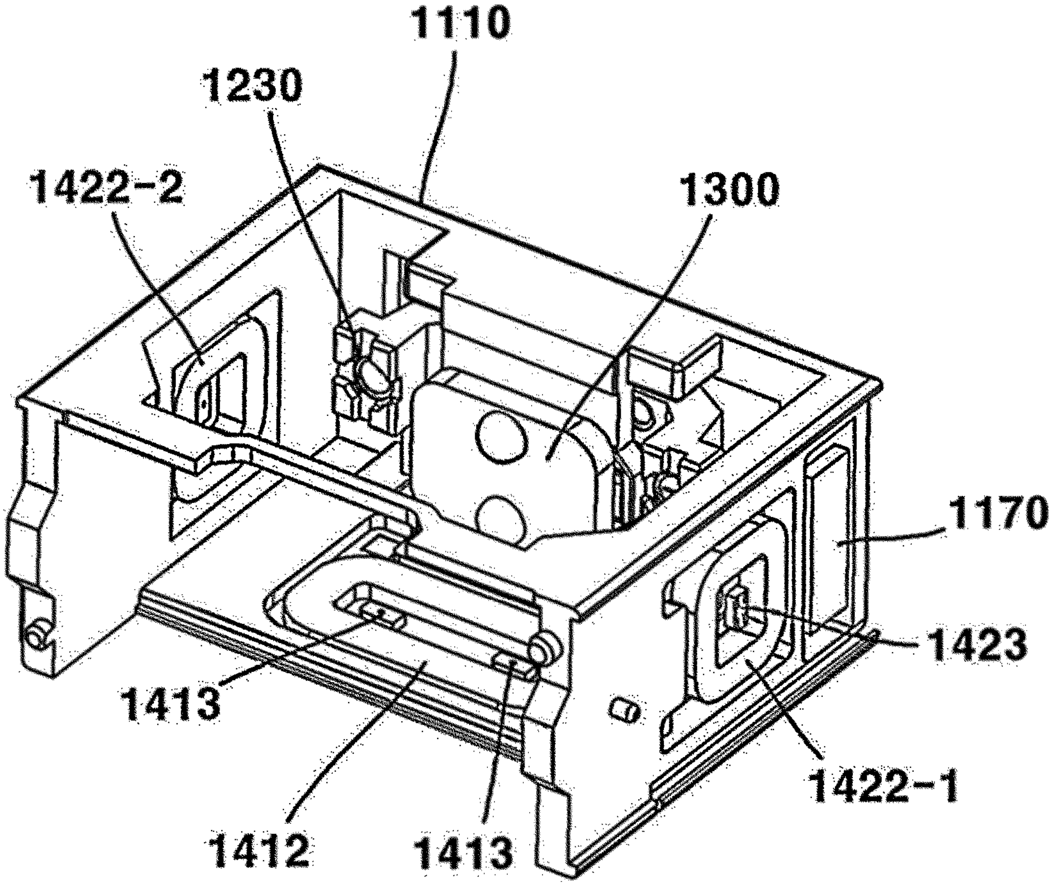
FIG. 13 is a perspective view of a state in which a component, such as a board, is omitted from the reflective member driving device according to the present embodiment.
Figure 14:
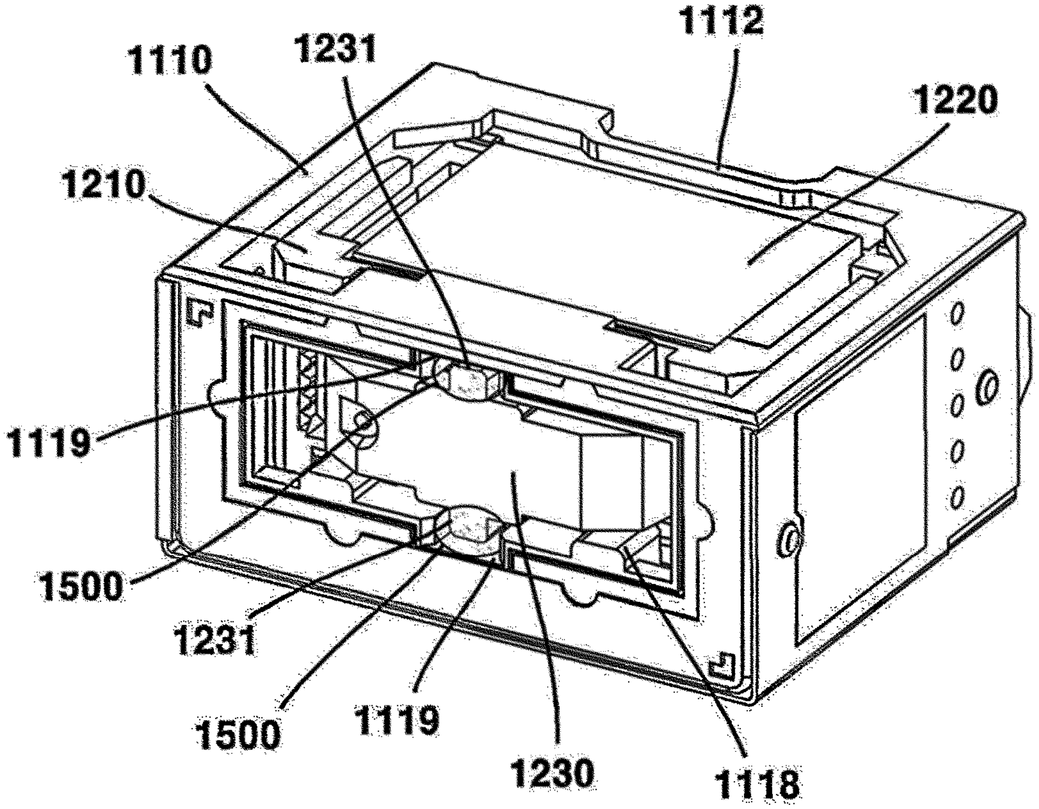
FIG. 14 is a perspective view of a state in which the moving unit is disposed on a fixed unit in the reflective member driving device according to the present embodiment.
Figure 15:
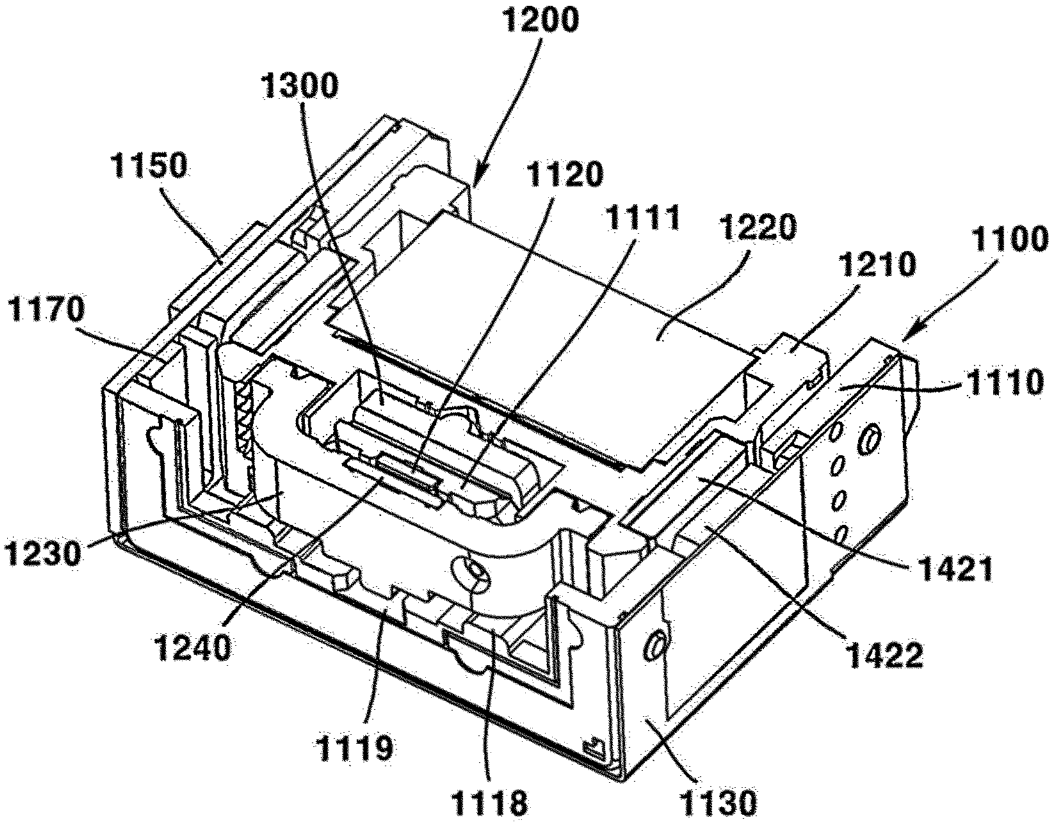
FIG. 15 is a perspective view of a cross section of the reflective member driving device according to the present embodiment.
Figure 16A:
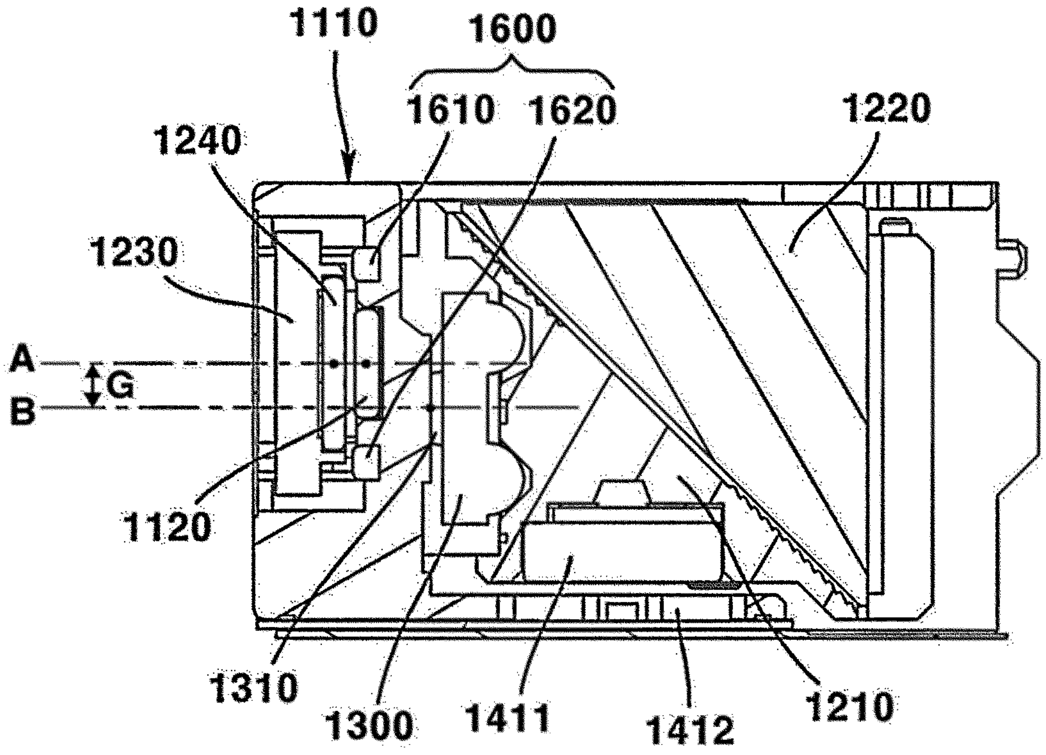
FIG. 16A is a cross-sectional view of the reflective member driving device according to the present embodiment.
Figure 16B:
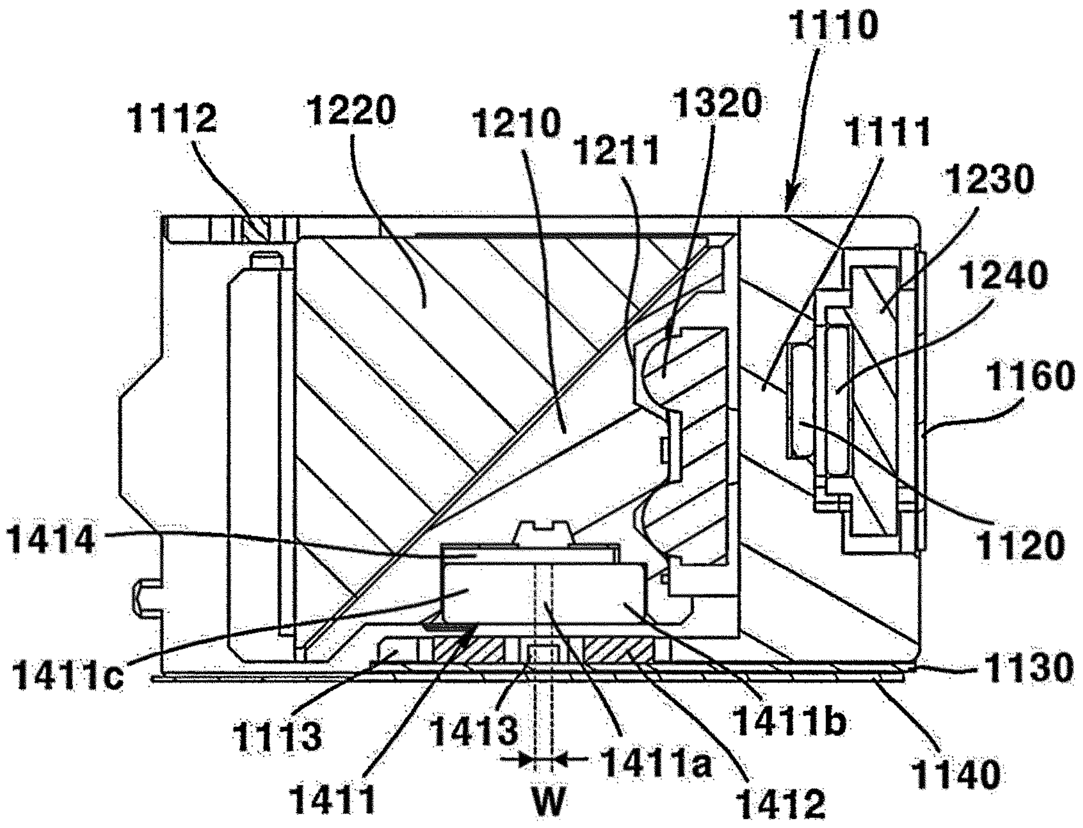
FIG. 16B is a cross-sectional view illustrating a holder and a magnet of the reflective member driving device according to the present embodiment.
Figure 16C:
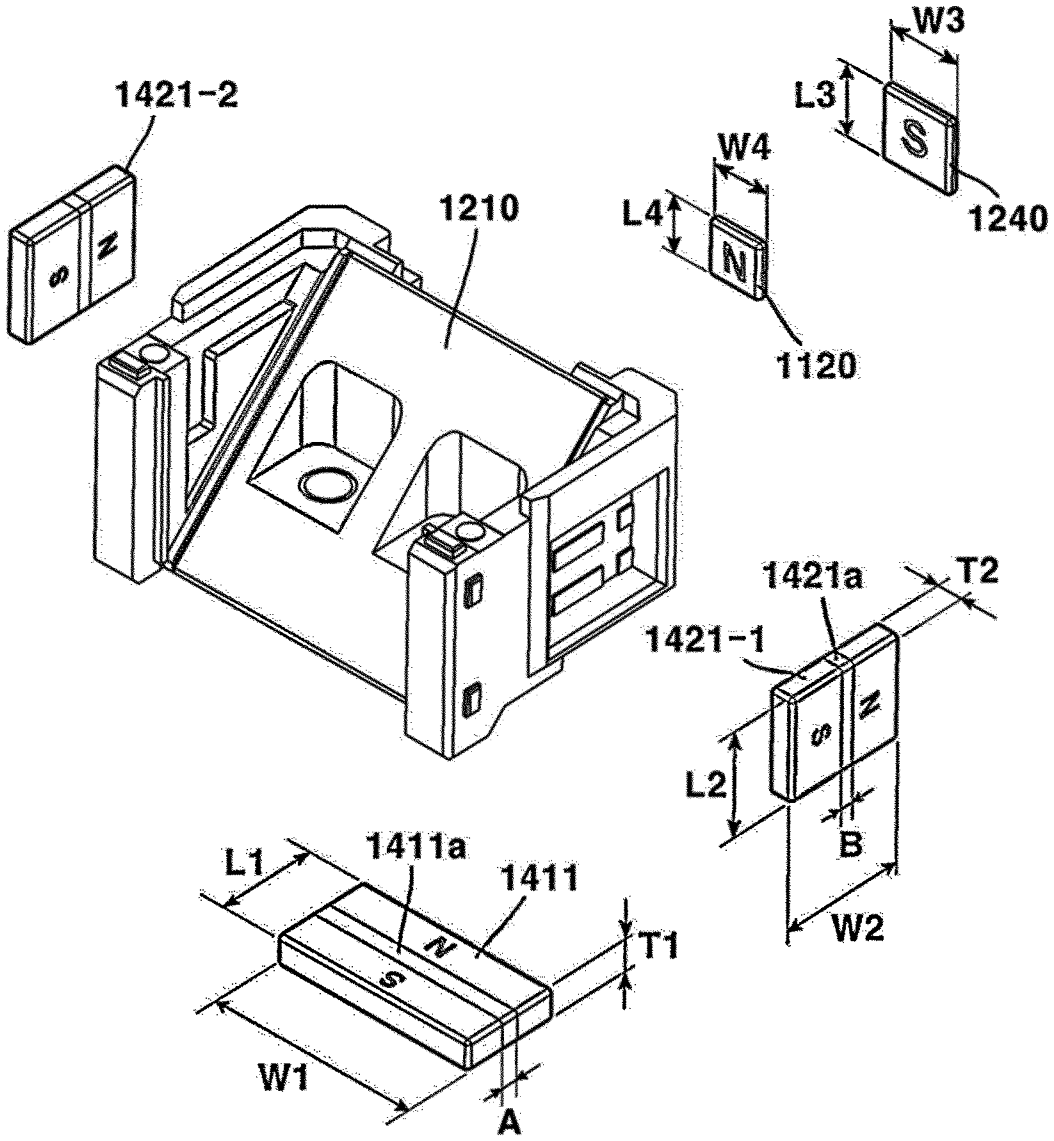
FIG. 16C is an exploded perspective view illustrating the holder and the magnet of the reflective member driving device according to the present embodiment.
Figure 16D:
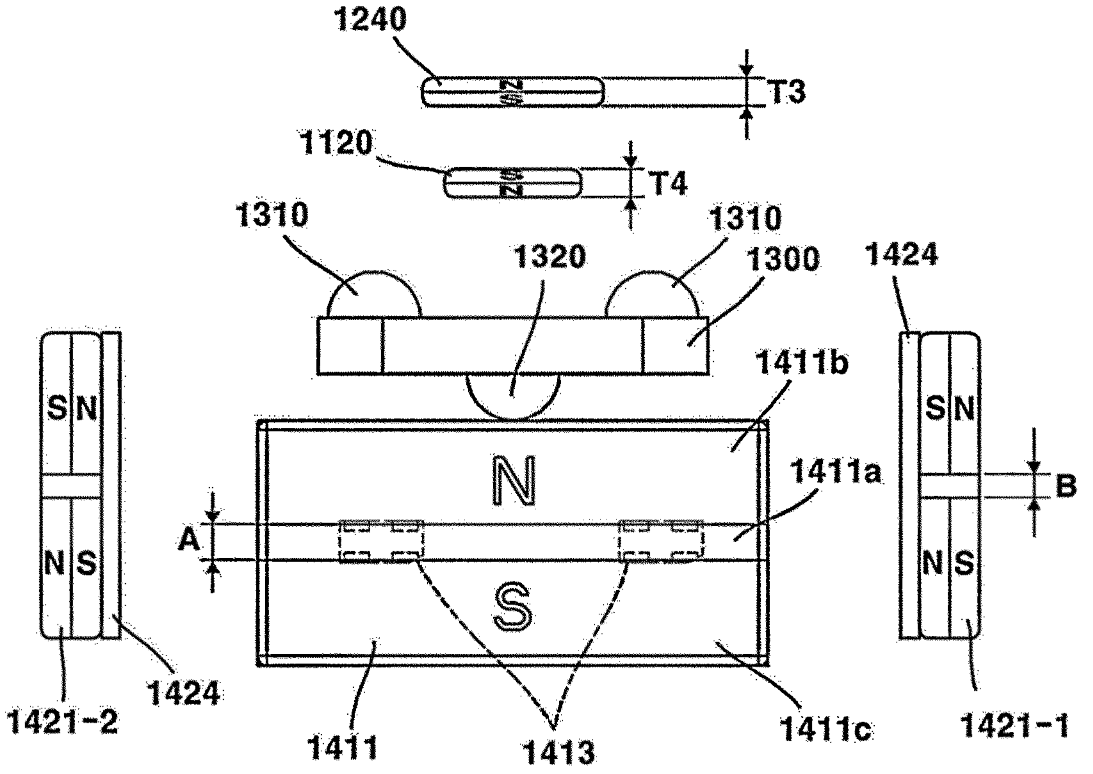
FIG. 16D is a plan view illustrating a moving plate, the magnet, and a sensor of the reflective member driving device according to the present embodiment.
Figure 16E:
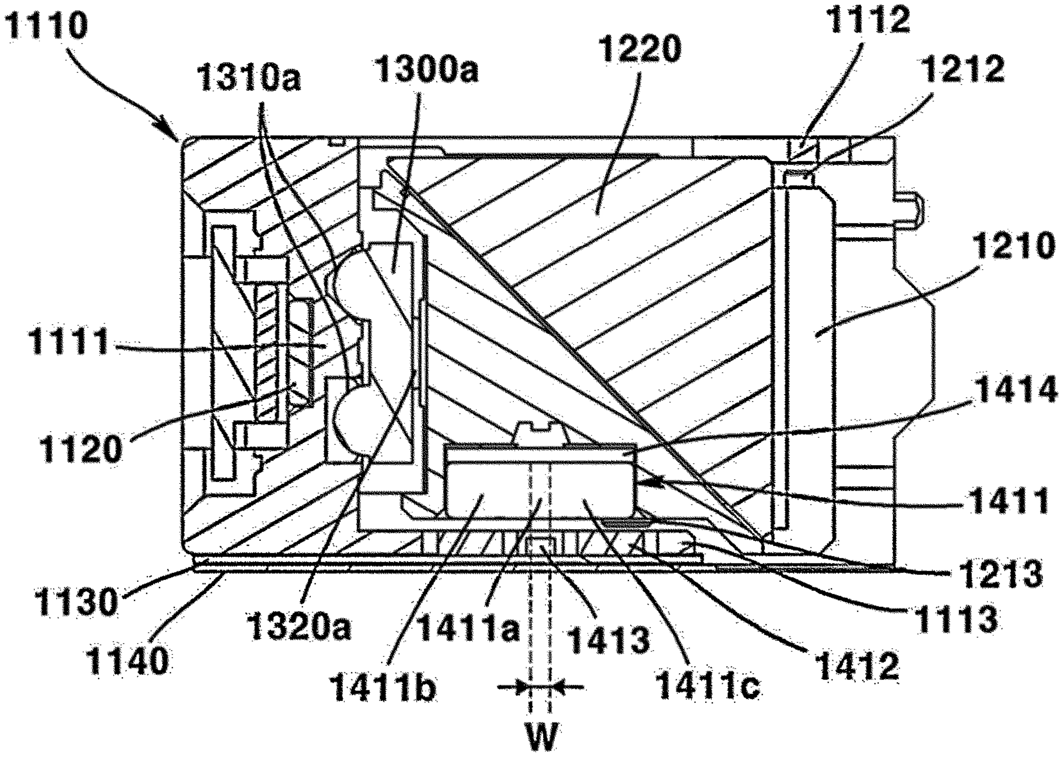
FIG. 16E is a cross-sectional view of a reflective member driving device according to a modified example.
Figure 16F:
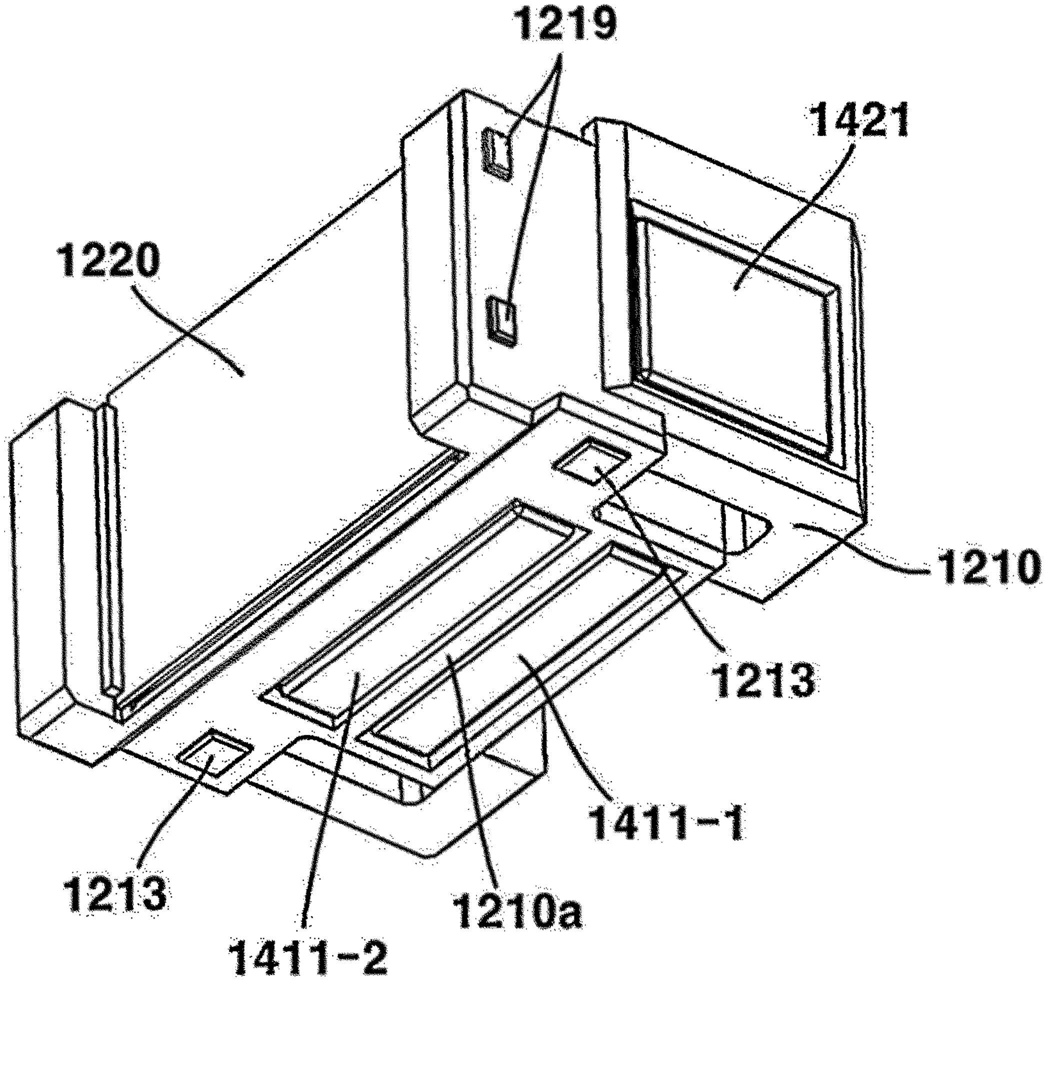
FIG. 16F is a bottom perspective view illustrating a holder and a magnet of a reflective member driving device according to another modified example.
Figure 16G:
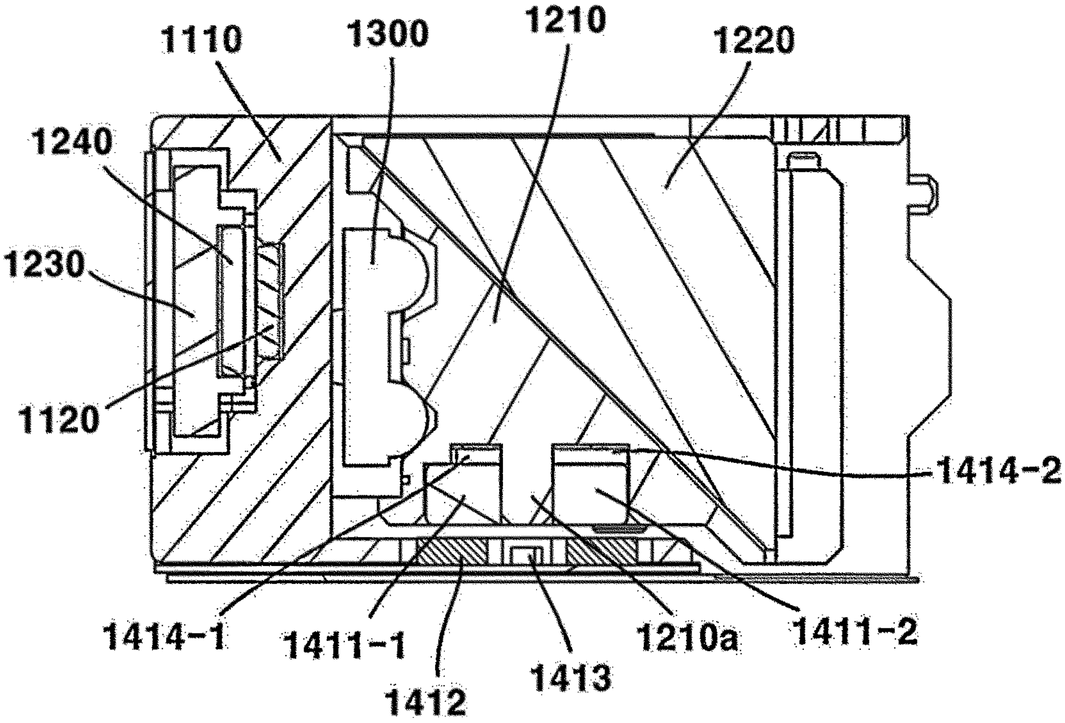
FIG. 16G is a cross-sectional view of the reflective member driving device according to another modified example.
Figure 17:
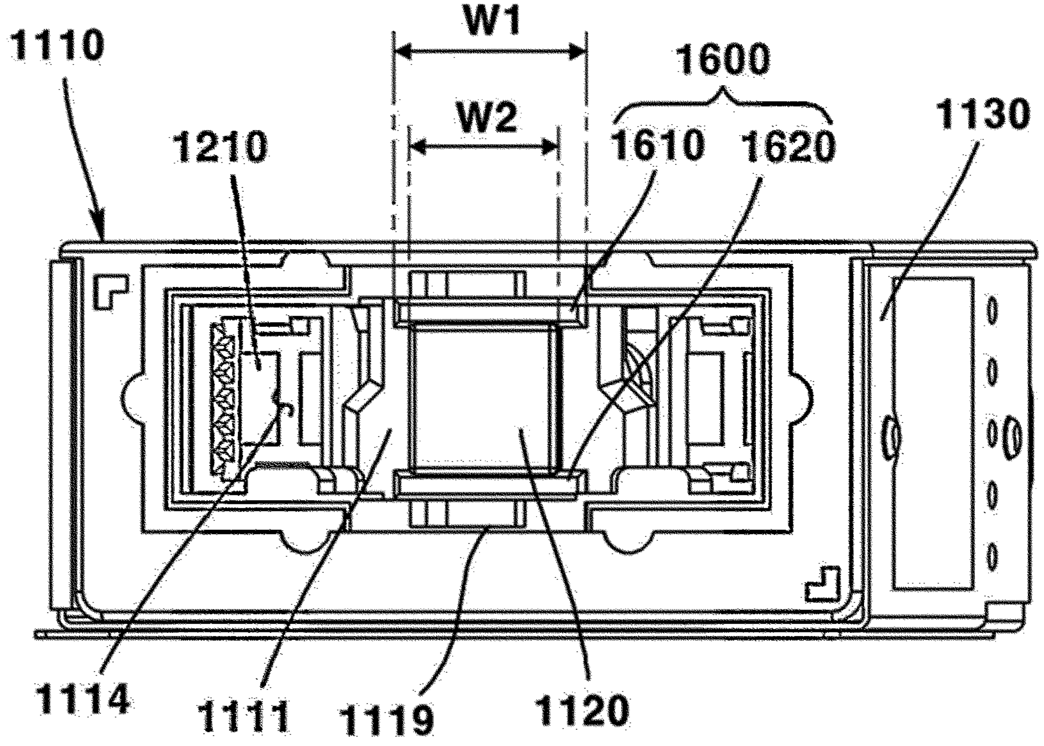
FIG. 17 is a perspective view of a state in which a mover rigid is omitted from the reflective member driving device according to the present embodiment.
Figure 18:
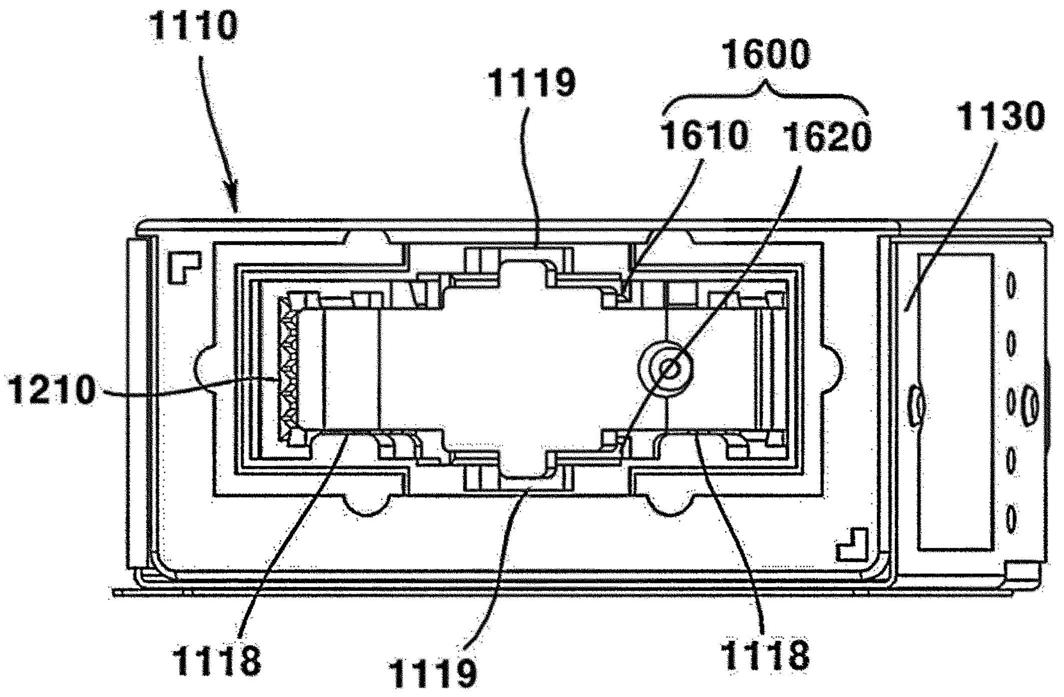
FIG. 18 is a perspective view of a state in which the mover rigid is coupled in FIG. 17.
Figure 19:
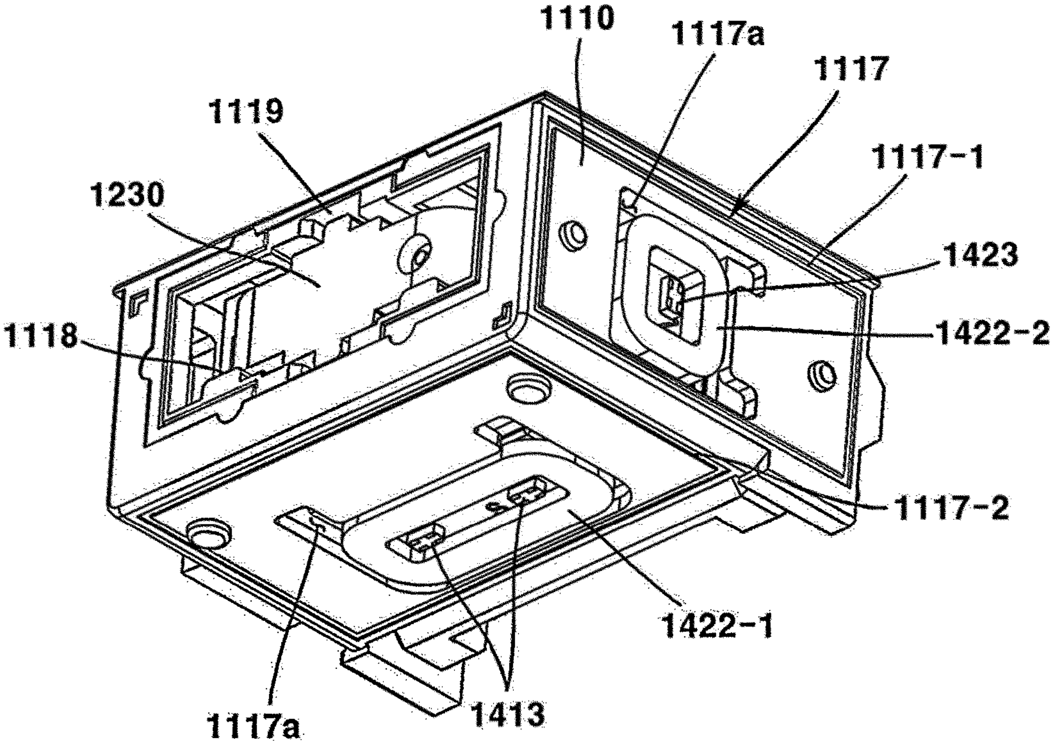
FIG. 19 is a bottom perspective view of a state in which a board is omitted from the reflective member driving device according to the present embodiment.
Figure 20:
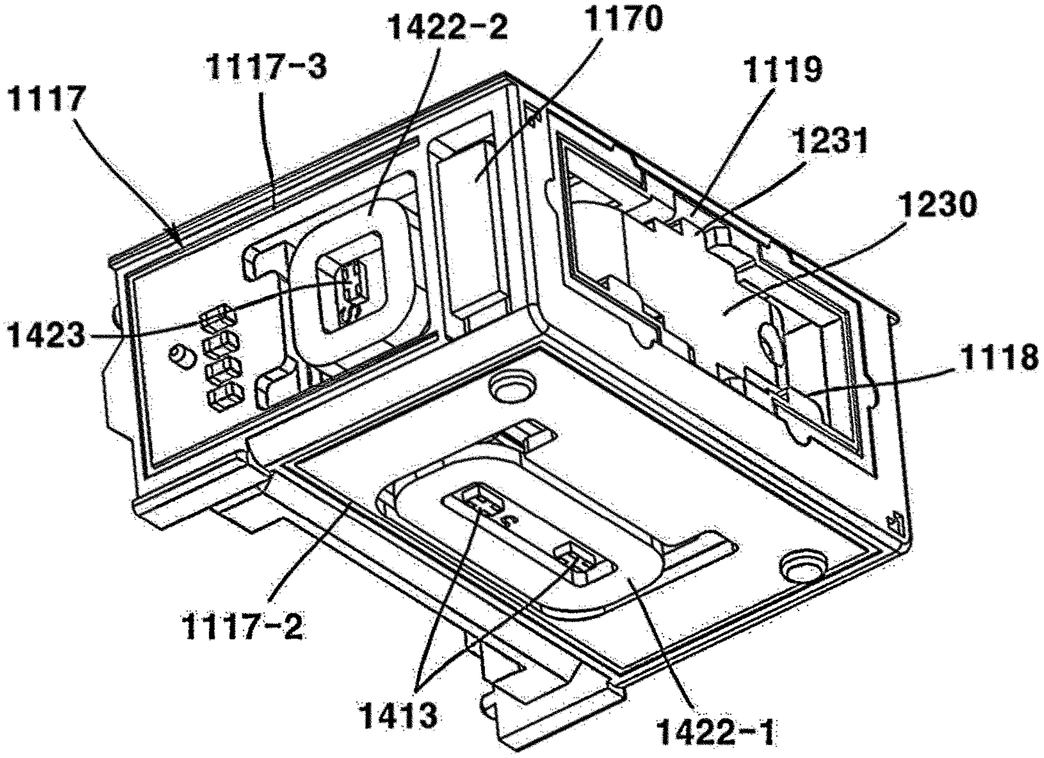
FIG. 20 is a bottom perspective view of the state in which the board is omitted from the reflective member driving device according to the present embodiment in a different direction from that of FIG. 19.
Figure 21:
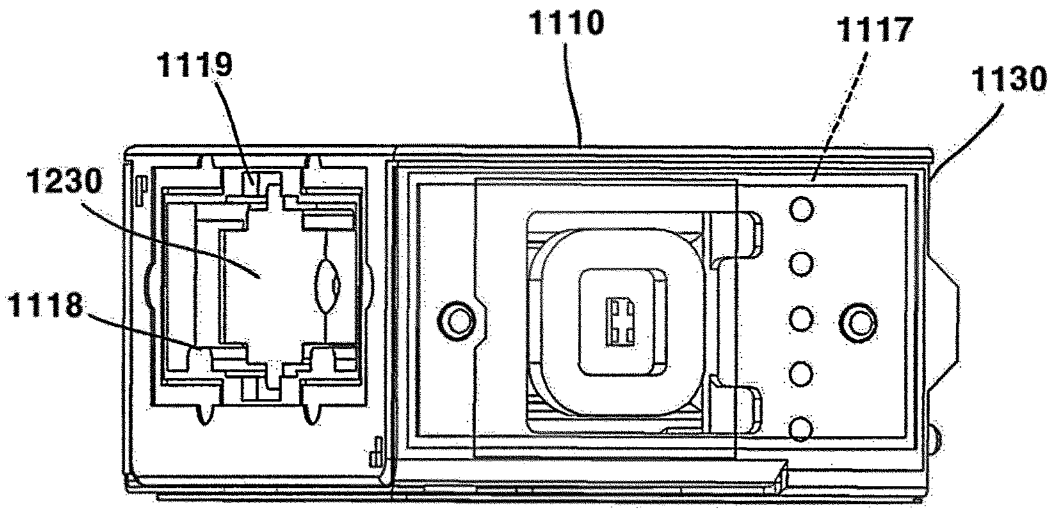
FIG. 21 is a partial projection view illustrating a state in which the board is projected onto the reflective member driving device according to the present embodiment.
Figure 22:
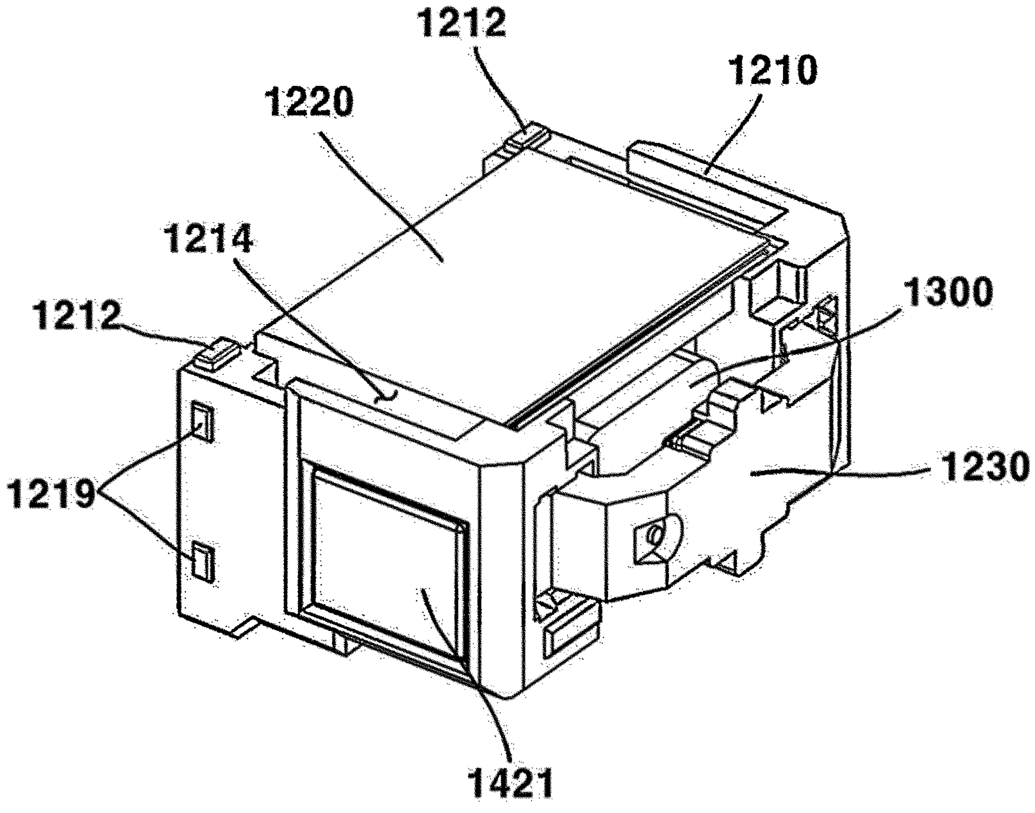
FIG. 22 is a perspective view illustrating a state in which the holder and the mover rigid of the reflective member driving device according to the present embodiment are coupled.
Figure 23:
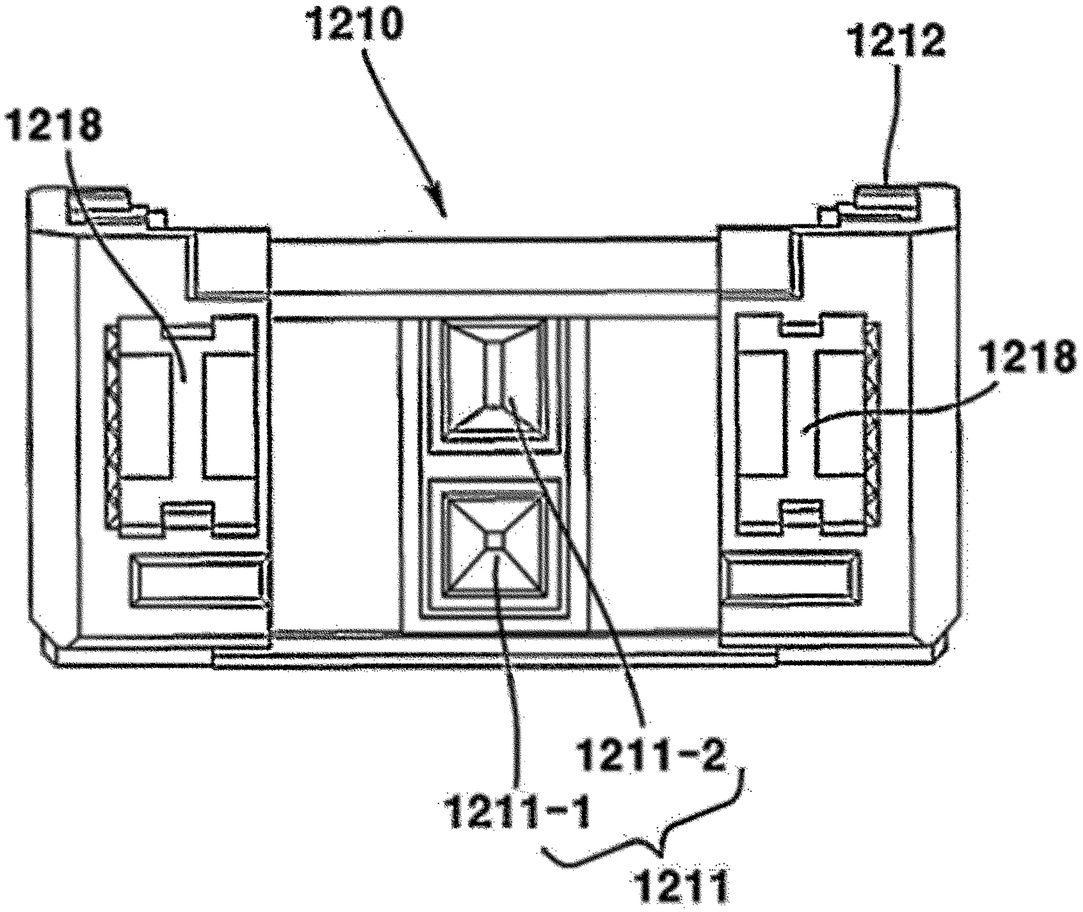
FIG. 23 is a front view illustrating the holder of the reflective member driving device according to the present embodiment.
Figure 24:
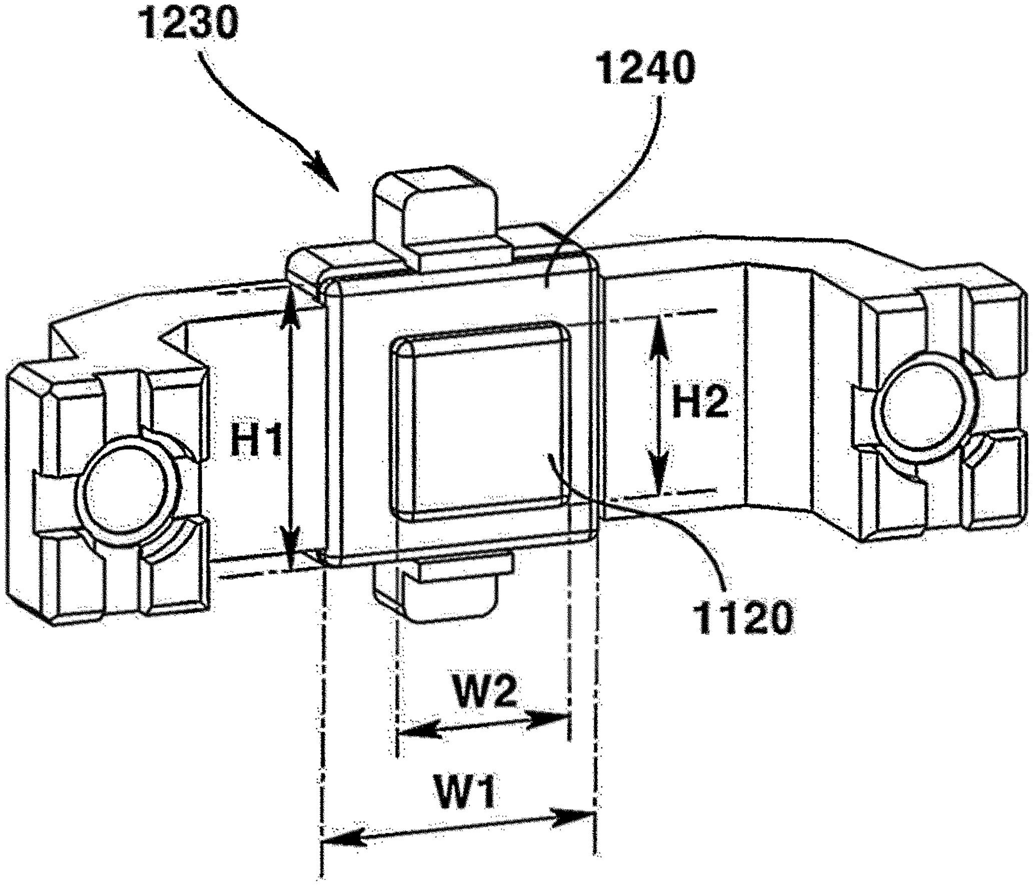
FIG. 24 is a perspective view illustrating the mover rigid, a first magnet, and a second magnet of the reflective member driving device according to the present embodiment.
Figure 25:
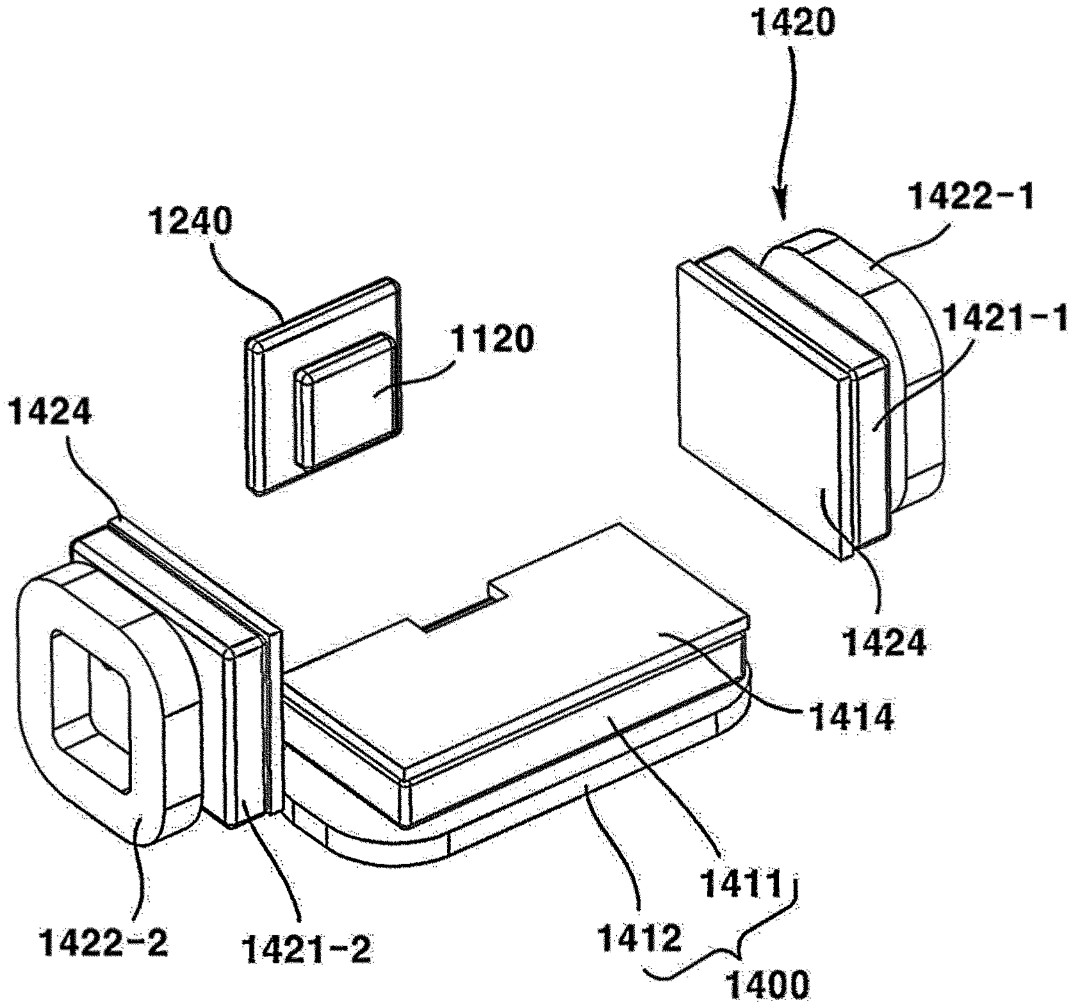
FIG. 25 is a perspective view illustrating the first magnet, the second magnet, and a driving unit of the reflective member driving device according to the present embodiment.
Figure 26:
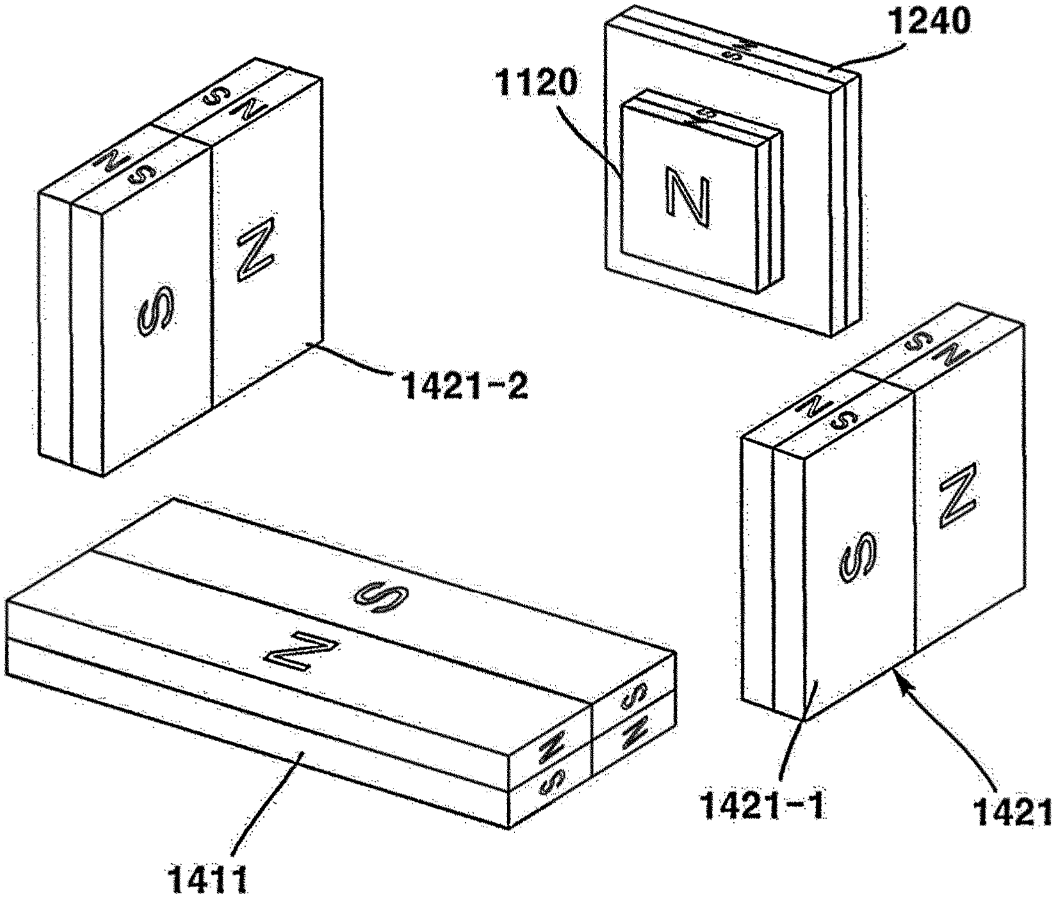
FIG. 26 is a perspective view illustrating the first magnet, the second magnet, and a driving magnet of the reflective member driving device according to the present embodiment.
Figure 27:
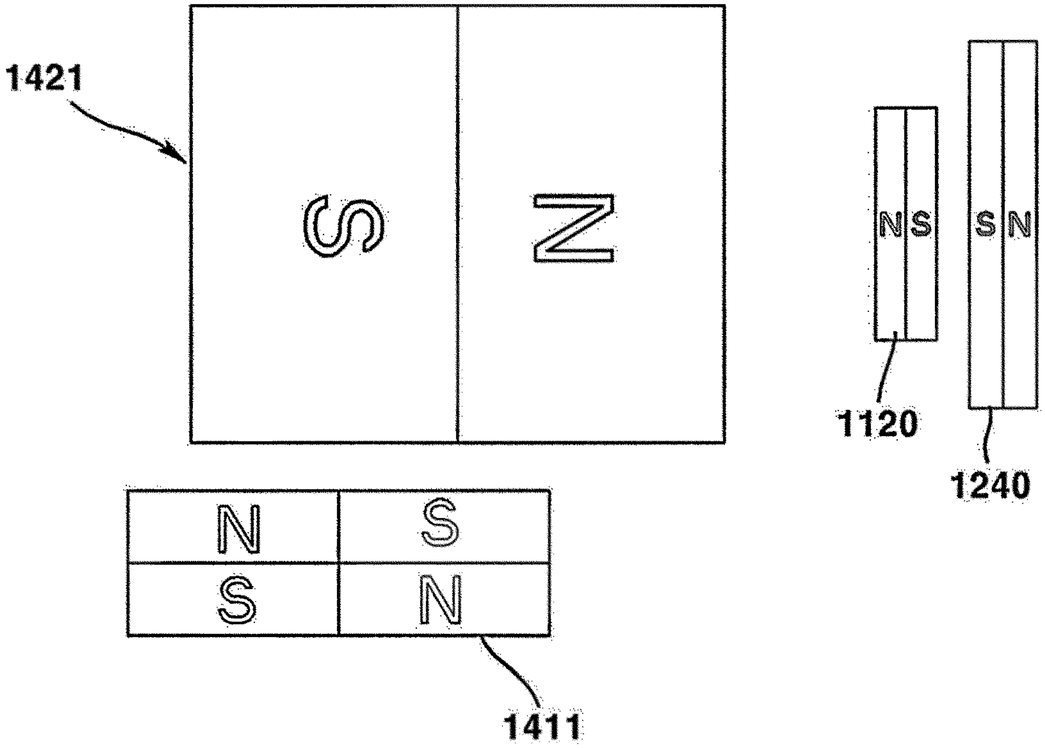
FIG. 27 is a side view illustrating the first magnet, the second magnet, and the driving magnet of the reflective member driving device according to the present embodiment.
Figure 28A:
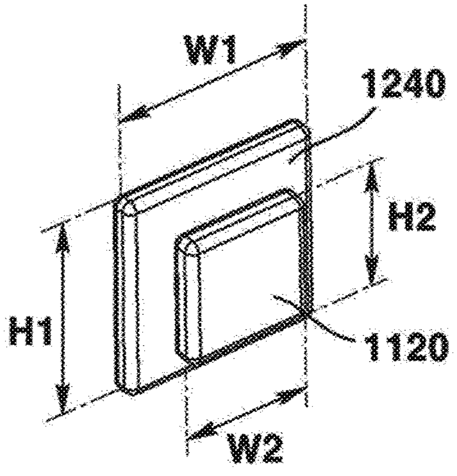
FIG. 28A is a perspective view and FIG. 28B is a rear side view illustrating the first magnet and the second magnet of the reflective member driving device according to the present embodiment.
Figure 28B:
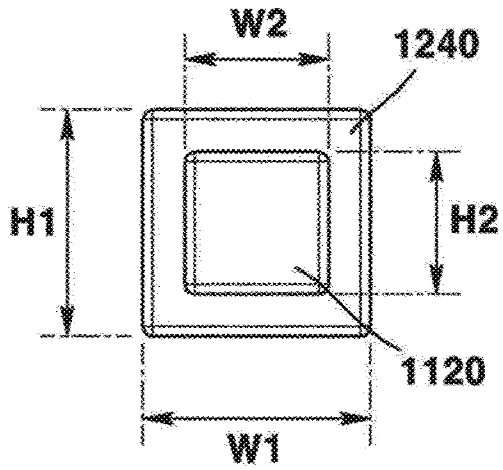
Figure 29:
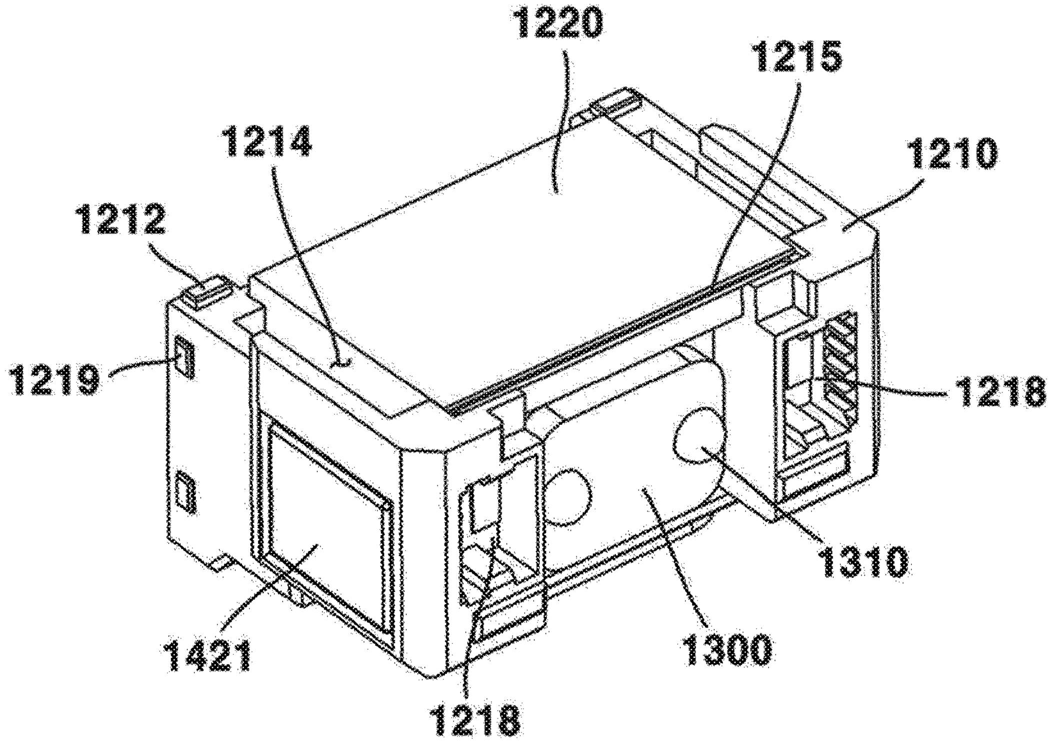
FIG. 29 is a perspective view illustrating a state in which the moving plate is disposed in the moving unit of the reflective member driving device according to the present embodiment.

FIG. 7 is a perspective view of a reflective member driving device according to the present embodiment, FIG. 8 is an exploded perspective view of the reflective member driving device according to the present embodiment, FIG. 9 is a bottom exploded perspective view of the reflective member driving device according to the present embodiment, FIGS. 10 and 11 are views for describing a moving plate-related structure of the reflective member driving device according to the present embodiment, FIG. 12 is a perspective view of a state in which a component, such as a moving unit of the reflective member driving device according to the present embodiment, is omitted, FIG. 13 is a perspective view of a state in which a component, such as a board, is omitted from the reflective member driving device according to the present embodiment, FIG. 14 is a perspective view of a state in which the moving unit is disposed on a fixed unit in the reflective member driving device according to the present embodiment, FIG. 15 is a perspective view of a cross section of the reflective member driving device according to the present embodiment, FIG. 16A is a cross-sectional view of the reflective member driving device according to the present embodiment, FIG. 16B is a perspective view illustrating a holder and a magnet of the reflective member driving device according to the present embodiment, FIG. 16C is a perspective view illustrating the holder and the magnet of the reflective member driving device according to the present embodiment, FIG. 16D is a perspective view illustrating a moving plate, a magnet, and a sensor of the reflective member driving device according to the present embodiment, FIG. 16E is a cross-sectional view of a reflective member driving device according to a modified example, FIG. 16F is a bottom perspective view illustrating a holder and a magnet of a reflective member driving device according to another modified example, FIG. 16G is a cross-sectional view of the reflective member driving device according to another modified example, FIG. 17 is a perspective view of a state in which a mover rigid is omitted from the reflective member driving device according to the present embodiment, FIG. 18 is a perspective view of a state in which the mover rigid is coupled in FIG. 17, FIG. 19 is a bottom perspective view of a state in which a board is omitted from the reflective member driving device according to the present embodiment, FIG. 20 is a bottom perspective view of the state in which the board is omitted from the reflective member driving device according to the present embodiment in a different direction from that of FIG. 19, FIG. 21 is a partial projection view illustrating a state in which the board is projected onto the reflective member driving device according to the present embodiment, FIG. 22 is a perspective view illustrating a state in which the holder and the mover rigid of the reflective member driving device according to the present embodiment are coupled, FIG. 23 is a front view illustrating the holder of the reflective member driving device according to the present embodiment, FIG. 24 is a perspective view illustrating the mover rigid, a first magnet, and a second magnet of the reflective member driving device according to the present embodiment, FIG. 25 is a perspective view illustrating the first magnet, the second magnet, and a driving unit of the reflective member driving device according to the present embodiment, FIG. 26 is a perspective view illustrating the first magnet, the second magnet, and a driving magnet of the reflective member driving device according to the present embodiment, FIG. 27 is a side view illustrating the first magnet, the second magnet, and the driving magnet of the reflective member driving device according to the present embodiment, FIG. 28A is a perspective view and FIG. 28B is a rear side view illustrating the first magnet and the second magnet of the reflective member driving device according to the present embodiment, and FIG. 29 is a perspective view illustrating a state in which the moving plate is disposed in the moving unit of the reflective member driving device according to the present embodiment.

A reflective member driving device 1000 may perform an optical image stabilization (OIS) function. The reflective member driving device 1000 may perform the OIS function. The reflective member driving device 1000 may move a reflective member 1220. The reflective member driving device 1000 may tilt the reflective member 1220. The reflective member driving device 1000 may tilt the reflective member 1220 about two axes. The reflective member driving device 1000 may tilt the reflective member 1220 about an x-axis and a y-axis. The x-axis and the y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may include a fixed unit 1100. The fixed unit 1100 may be a relatively fixed portion when a moving unit 1200 moves. The fixed unit 1100 may accommodate at least a portion of the moving unit 1200. The fixed unit 1100 may be disposed outside the moving unit 1200.

The reflective member driving device 1000 may include a housing 1110. The fixed unit 1100 may include the housing 1110. The housing 1110 may be disposed outside a holder 1210. The housing 1110 may accommodate at least a portion of the holder 1210. The housing 1110 may include an opening or hole in an upper plate and any one of side plates to secure an optical path. The housing 1110 may include the upper plate, a lower plate, and a plurality of side plates.

The housing 1110 may include a first part 1111. The first part 1111 may be formed on the side plate of the housing 1110. A moving plate 1300 may be disposed in the first part 1111. The first part 1111 may be disposed between the holder 1210 and a mover rigid 1230. The first part 1111 may be disposed between the mover rigid 1230 and the moving plate 1300. A second magnet 1120 may be disposed in the first part 1111. The moving plate 1300 may be disposed at one side of the first part 1111, and a second magnet 1120 may be disposed at the other side thereof. A portion of the housing 1110 may be disposed between the moving plate 1300 and the mover rigid 1230.

The housing 1110 may include a second part 1112. The second part 1112 may be disposed above the holder 1210. The second part 1112 may be in contact with the holder 1210 when the holder 1210 moves up. The second part 1112 may overlap the holder 1210 in a moving direction of the holder 1210. The second part 1112 may be the upper plate of the housing 1110.

The housing 1110 may include a third part 1113. The third part 1113 may be disposed under the holder 1210. The third part 1113 may be in contact with the holder 1210 when the holder 1210 moves down. The third part 1113 may overlap the holder 1210 in the moving direction. The third part 1113 may be the lower plate of the housing 1110.

The housing 1110 may include a hole 1114. The hole 1114 may be a mover rigid through hole. The hole 1114 may be formed in the side plate of the housing 1110. The hole 1114 may be formed in the first part 1111 of the housing 1110. The mover rigid 1230 may be disposed in the hole 1114. The mover rigid 1230 may be disposed to pass through the hole 1114. The hole 1114 may be formed to be greater than a moving space of the mover rigid 1230 to inhibit from interfering with the mover rigid 1230. The housing 1110 may include two holes 1114 into which the mover rigid 1230 is inserted.

The housing 1110 may include grooves 1115. The groove 1115 may be a moving plate first protrusion accommodating groove. The groove 1115 may include a first groove. A first protrusion 1310 of the moving plate 1300 may be disposed in the groove 1115. The groove 1115 may accommodate at least a portion of the moving plate 1300. The groove 1115 may restrict the movement of the first protrusion 1310 of the moving plate 1300 except for rotation thereof. The groove 1115 may include an inclined surface in contact with the first protrusion 1310 of the moving plate 1300. The inclined surface may include a plurality of inclined surfaces.

The housing 1110 may include a plurality of grooves 1115 in which a plurality of first protrusions 1310 are disposed. The plurality of grooves 1115 of the housing 1110 may include a first groove 1115-1 in four-point contact with one of the plurality of first protrusions 1310, and a second groove 1115-2 in two-point contact with the first protrusion 1310 of the other one.

The groove 1115 may include the first groove 1115-1. The first groove 1115-1 may be a four-point contact groove. The first groove 1115-1 may be in four-point contact with one of the two first protrusions 1310 of the moving plate 1300. Therefore, the first groove 1115-1 of the housing 1110 may restrict the movement in four top, bottom, left, and right directions except for the rotation of one of the first protrusions 1310 of the moving plate 1300.

The groove 1115 may include the second groove 1115-2. The second groove 1115-2 may be a two-point contact groove. The second groove 1115-2 may be in two-point contact with the remaining one of the two first protrusions 1310 of the moving plate 1300. Therefore, the second groove 1115-2 of the housing 1110 may restrict the movement of the remaining one of the first protrusions 1310 of the moving plate 1300 in two directions. For example, the second groove 1115-2 of the housing 1110 may restrict the movement of the first protrusion 1310 of the moving plate 1300 in a vertical direction and may not restrict the movement in a horizontal or vertical direction.

The housing 1110 may include a groove 1116 (or a protruding portion, hereinafter described as a groove, and the groove may be replaced with the protruding portion). The groove may be a buffer member accommodating groove. The groove 1116 may be formed in the first part 1111 of the housing 1110. At least a portion of a buffer member 1600 may be disposed in the groove 1116 of the housing 1110. The groove 1116 may accommodate at least a portion of the buffer member 1600. The groove 1116 may be formed in a shape corresponding to the buffer member 1600. At least a portion of the buffer member 1600 may protrude from the groove 1116 of the housing 1110.

The housing 1110 may include a groove 1117. The groove may be a bonder accommodating groove. The groove may be a bonder tank. The groove 1117 may be formed in a first surface of the housing 1110. In this case, a board 1130 may be coupled to the first surface of the housing 1110. In other words, the groove 1117 may be formed in a surface of the housing 1110 to which the board 1130 is coupled. The grooves 1117 may be formed in both side surfaces and a lower surface of the housing 1110. The groove 1117 may have a quadrangular ring shape. The groove 1117 may be formed in a "⊂" shape. In the present embodiment, the groove 1117 may be formed in a portion in which the board 1130 and the housing 1110 overlap each other, thereby inhibiting a phenomenon in which a bonder overflows to the outside of the board 1130.

The groove 1117 may include a first groove 1117-1 formed in a first outer surface of the housing 1110. The first groove 1117-1 may have a quadrangular ring shape. The groove 1117 may include a second groove 1117-2 formed in the lower surface of the housing 1110. The second groove 1117-2 may have a quadrangular ring shape. The groove 1117 may include a third groove 1117-3 formed in a second outer surface of the housing 1110 disposed opposite to the first outer surface thereof. The third groove 1117-3 may have a "⊂" shape. The first groove 1117-1 and the second groove 1117-2 may have a shape in which four straight grooves with four corners are connected. The third groove 1117-3 may have three straight grooves with two corners, and the third groove 1117-3 at a driver IC 117 side may have an open shape.

The reflective member driving device 1000 may include an adhesive. The adhesive may be a bonder. The adhesive may couple the board 1130 to the housing 1110. The adhesive may bond the board 1130 to the housing 1110. The adhesive may fix the board 1130 to the housing 1110. At least a portion of the adhesive may be disposed in the groove 1117 of the housing 1110.

The housing 1110 may include a hole 1117*a*. A second coil 1422 may be disposed in the hole 1117*a*. The hole 1117*a* may be disposed in the groove 1117 of the housing 1110. The groove 1117 may be formed to be greater than the hole 1117*a*. The groove 1117 may be disposed outside the hole 1117*a*.

The housing 1110 may include a protruding portion. The protruding portion may be coupled to a lens driving device 2000. The protruding portion may be formed on the side plate of the housing 1110. The protruding portion may be formed at a side of the housing 1110 facing the lens driving device 2000. The protruding portion may include a trapezoidal cross section. The protruding portion may be coupled to a housing 2110 of the lens driving device 2000. The protruding portion may be inserted into a first groove 2111 of the housing 2110 of the lens driving device 2000. The protruding portion may be coupled to the housing 2110 of the lens driving device 2000 using an adhesive.

The housing 1110 may include protrusions 1117 (the reference numeral will be omitted below). The protrusion may be coupled to the lens driving device 2000. The protrusion may be formed on the side plate of the housing 1110. The protrusion may be formed at the side of the housing 1110 facing the lens driving device 2000. The protrusion may include a circular cross section. The protrusion may be coupled to the housing 2110 of the lens driving device 2000. The protrusion may be inserted into a second groove 2112 of the housing 2110 of the lens driving device 2000. The protrusion may be coupled to the housing 2110 of the lens driving device 2000 using an adhesive.

The housing 1110 may include protrusions 1118. The protrusion 1118 may be a mover rigid contact protrusion. The protrusion 1118 may be formed on a second surface of the housing 1110. The protrusion 1118 may be in contact with the mover rigid 1230. The protrusion 1118 may be formed on an inner peripheral surface of the hole 1114 of the housing 1110 through which the mover rigid 1230 passes. The protrusion 1118 may be formed in contact with any one or more of a lower surface and an upper surface of the mover rigid 1230 when the mover rigid 1230 is moved. The protrusion 1118 can inhibit a phenomenon in which the mover rigid 1230 is separated by being excessively deviated from an original position thereof.

The protrusion 1118 may include a plurality of protrusions. The protrusion 1118 may include two protrusions. The two protrusions may be spaced from each other at the same interval from a lower second groove disposed among grooves 1119 of the housing 1110. When a body portion of the mover rigid 1230 moves down, the body portion of the mover rigid 1230 may be in contact with the two protrusions 1118 of the housing 1110.

The housing 1110 may include the grooves 1119. At least a portion of protruding portions 1231 may be disposed in the groove 1119. A portion of the protruding portion 1231 may be disposed in the groove 1119. The groove 1119 may be open to the outside of the housing 1110. The groove 1119 may be greater than the protruding portion 1231 of the mover rigid 1230. The groove 1119 may be spaced apart from the protruding portion 1231 of the mover rigid 1230. In an initial state in which power is not applied to a driving unit 1400, the groove 1119 may be spaced apart from the protruding portion 1231 of the mover rigid 1230. Even when the driving unit 1400 is driven by receiving power, the groove 1119 may be spaced apart from the protruding portion 1231 of the mover rigid 1230. The groove 1119 of the housing 1110 and the protruding portion 1231 of the mover rigid 1230 may be in contact with each other by an external impact. In other words, the groove 1119 of the housing 1110 and the protruding portion 1231 of the mover rigid 1230 may be not in contact with each other within a normal driving range of the mover rigid 1230 and may be in contact with each other in the case of being out of the normal driving range due to an impact. The groove 1119 of the housing 1110 and the protruding portion 1231 of the mover rigid 1230 may perform a stopper function in the event of an impact.

The groove 1119 may include a first groove portion and a second groove portion recessed from the first groove portion. The groove 1119 may be formed as a two-stage groove. The groove 1119 may have a dual-groove shape. A damper 1500 may be disposed in the second groove portion. A contact area between the damper 1500 and the housing 1110 may be increased by the second groove portion. The second groove portion can inhibit the flow of the damper 1500.

The groove 1119 may include a plurality of grooves. The groove 1119 may include a first groove in which at least a portion of a first protruding region of the mover rigid 1230 is disposed, and a second groove in which at least a portion of the second protruding region is disposed. The housing 1110 may include a first surface facing an upper surface of the body portion of the mover rigid 1230. The housing 1110 may include a second surface facing a lower surface of the body portion of the mover rigid 1230. The housing 1110 may include a first groove formed in the first surface of the housing 1110 and a second groove formed in the second surface of the housing 1110.

The reflective member driving device 1000 may include the second magnet 1120. The fixed unit 1100 may include the second magnet 1120. The second magnet 1120 may be disposed in the fixed unit 1100. The second magnet 1120 may be a second repulsive force magnet. The second magnet 1120 may be disposed in the housing 1110. The second magnet 1120 may be disposed in the first part 1111 of the housing 1110. The second magnet 1120 may be disposed at a side opposite to the moving plate 1300 with respect to the first part 1111 of the housing 1110. The second magnet 1120 may be disposed between the first magnet 1240 and the moving plate 1300. The second magnet 1120 may be disposed to face the first magnet 1240. The second magnet 1120 may generate a repulsive force with the first magnet 1240. The second magnet 1120 may be disposed to generate the repulsive force with the first magnet 1240. In other words, the second magnet 1120 may be disposed to allow the repulsive force to generate with the first magnet 1240. The second magnet 1120 and the first magnet 1240 may be disposed to have the same polarity facing each other. The second magnet 1120 may push the first magnet 1240.

At least a portion of the second magnet 1120 may be disposed between the first magnet 1240 and the moving plate 1300. The second magnet 1120 may be disposed between the first magnet 1240 and the moving plate 1300. A center of the second magnet 1120 may be disposed at the same height as a center of the first magnet 1240.

In the present embodiment, the driving unit 1400 may tilt the moving unit 1200 with respect to an x-axis and a y-axis of the moving plate 1300, which are perpendicular to each other. In this case, a horizontal axis passing through the center of the second magnet 1120 in a direction of the y-axis may be disposed to be misaligned with the x-axis of the moving plate 1300. The horizontal axis may be parallel to the x-axis.

The center of the second magnet 1120 in a direction passing the x-axis may not be eccentric with the y-axis. When viewed in a direction from the moving plate 1300 to the first magnet 1240, the center of the second magnet 1120 may be disposed to match with the y-axis. A center portion of the second magnet 1120 may be disposed at the same height as a center portion of the first magnet 1240. The center of the second magnet 1120 may be disposed at the same height as the center of the first magnet 1240. A center of gravity of the second magnet 1120 may be disposed at the same height as a center of gravity of the first magnet 1240.

The second magnet 1120 may include a second surface disposed opposite to a first surface of the second magnet 1120. The first magnet 1240 may include a first surface facing the second surface of the second magnet 1120. The first surface of the first magnet 1240 may have the same polarity as the second surface of the second magnet 1120.

The second magnet 1120 may be dispose not to overlap the first driving magnet 1411 in a direction in which the first surface of the first driving magnet 1411 faces. The second magnet 1120 may be dispose not to overlap the first driving magnet 1411 in a direction in which the first surface of the second magnet 1120 faces.

The reflective member driving device 1000 may include the board 1130. The fixed unit 1100 may include the board 1130. The board 1130 may be a flexible printed circuit board (FPCB). The board 1130 may be a flexible printed circuit board. The board 1130 may be disposed in the housing 1110. Coils 1412 and 1422 may be disposed on the board 1130. Sensors 1413 and 1423 may be disposed on the board 1130. The board 1130 may be electrically connected to a board 3700. A driver IC 1170 may be disposed on the board 1130. A gyro sensor 1150 may be disposed on the board 1130. The board 1130 may be disposed to surround the lower surface and both sides of the housing 1110. The board 1130 may include a shape that is bent twice.

The reflective member driving device 1000 may include stainless steel (SUS) 1140. The fixed unit 1100 may include the SUS 1140. The SUS 1140 may be disposed on the board 1130. The SUS 1140 may be disposed on an outer surface of the board 1130. The SUS 1140 may reinforce the strength of the board 1130.

The reflective member driving device 1000 may include the gyro sensor 1150. The fixed unit 1100 may include the gyro sensor 1150. The gyro sensor 1150 may detect the shaking of a camera device 10. The shaking detected by the gyro sensor 1150 may be canceled through the OIS function. The gyro sensor 1150 may be disposed on the board 1130. The gyro sensor 1150 may be disposed on the outer surface of the board 1130.

The reflective member driving device 1000 may include a plate 1160 (the reference numeral will be omitted below). The fixed unit 1100 may include the plate. The plate may be coupled to the housing 1110. The plate may cover the mover rigid 1230. The plate may cover the mover rigid 1230. The plate may be disposed to cover an open portion of the housing 1110. The plate may be disposed to close an open front of the housing 1110. The plate may be formed of a metal sheet. The housing 1110 may include a groove in which an adhesive for fixing the plate to the housing 1110 is disposed.

The reflective member driving device 1000 may include the driver IC 1170. The fixed unit 1100 may include the driver IC 1170. The driver IC 1170 may be disposed on the board 1130. The driver IC 1170 may be electrically connected to the first coil 1412 and the second coil 1422. The driver IC 1170 may supply a current to the first coil 1412 and the second coil 1422. The driver IC 1170 may control any one or more of a voltage and a current applied to each of the first coil 1412 and the second coil 1422. The driver IC 1170 may be electrically connected to a sensor or Hall sensors 1413 and 1423. The driver IC 1170 may perform feedback control of the voltages and the currents applied to the first coil 1412 and the second coil 1422 through the position of the reflective member 1220 detected by the Hall sensors 1413 and 1423.

The reflective member driving device 1000 may include the moving unit 1200. The moving unit 1200 may be a moving unit. The moving unit 1200 may be a movable part. The moving unit 1200 may be a mover. The moving unit 1200 may move with respect to the fixed unit 1100. The moving unit 1200 may be tilted with respect to the fixed unit 1100. The moving unit 1200 may be disposed in the fixed unit 1100. At least a portion of the moving unit 1200 may be spaced apart from the fixed unit 1100. The moving unit 1200 may be in contact with the fixed unit 1100 when moving. Alternatively, the moving unit 1200 may be in contact with the fixed unit 1100 in an initial state.

In the present embodiment, in an initial state in which no current is applied to the driving unit 1400, the moving unit 1200 may be in contact with the fixed unit 1100.

The reflective member driving device 1000 may include the holder 1210. The moving unit 1200 may include the holder 1210. The holder 1210 may be disposed in the housing 1110. The holder 1210 may move with respect to the housing 1110. The holder 1210 may be tilted with respect to the housing 1110. At least a portion of the holder 1210 may be spaced apart from the housing 1110. The holder 1210 may be in contact with the housing 1110. The holder 1210 may be in contact with the housing 1110 when moving. Alternatively, the holder 1210 may be in contact with the housing 1110 in the initial state.

In the present embodiment, the holder 1210 may be moved between the second part 1112 and the third part 1113 of the housing 1110 by a first driving unit 1410. In an initial state in which no current is applied to the first driving unit 1410, the holder 1210 may be in contact with the housing 1110. In the initial state, the holder 1210 may be in contact with an inner surface of the housing 1110 adjacent to an incident surface of the reflective member 1220. As the current is applied to the driving unit 1400, the holder 1210 may be spaced apart from the inner surface of the housing 1110 and tilted with respect to a first axis of the moving plate 1300.

The holder 1210 may include grooves 1211. The groove 1211 may be a moving plate second protrusion accommodating groove. A second protrusion 1320 of the moving plate 1300 may be disposed in the groove 1211. The groove 1211 may accommodate at least a portion of the moving plate 1300. The groove 1211 may restrict the movement of the second protrusion 1320 of the moving plate 1300 rather than rotation thereof. The groove 1211 may include an inclined surface in contact with the second protrusion 1320 of the moving plate 1300. The inclined surface may include a plurality of inclined surfaces.

The holder 1210 may include a plurality of grooves 1211 in which a plurality of second protrusions 1320 are disposed. The plurality of grooves 1211 of the holder 1210 may include a first groove 1211-1 in four-point contact with one of the plurality of second protrusions 1320, and a second groove 1211-2 in two-point contact with the second protrusion 1320 of the other one of the plurality of second protrusions 1320.

The groove 1211 may include the first groove 1211-1. The first groove 1211-1 may be a four-point contact groove. The first groove 1211-1 may be in contact with one of the two second protrusions 1320 of the moving plate 1300 at four points. Therefore, the first groove 1211-1 of the holder 1210 may restrict the movement in four top, bottom, left, and right directions except for the rotation of one of the second protrusions 1320 of the moving plate 1300.

The groove 1211 may include the second groove 1211-2. The second groove 1211-2 may be a two-point contact groove. The second groove 1211-2 may be a two-point contact groove. The second groove 1211-2 may be in two-point contact with the remaining one of the two second protrusions 1320 of the moving plate 1300. Therefore, the second groove 1211-2 of the holder 1210 may restrict the movement of the remaining one of the second protrusions 1320 of the moving plate 1300 in two directions. For example, the second groove 1211-2 of the holder 1210 may restrict the movement of the second protrusion 1320 of the moving plate 1300 in the vertical direction and may not restrict the movement in the horizontal direction. In another example, the second groove 1211-2 of the holder 1210 may restrict the movement of the second protrusion 1320 of the moving plate 1300 in the horizontal direction and may not restrict the movement in the vertical direction.

The holder 1210 may include first protrusions 1212. The first protrusion 1212 may be an upper stopper. The first protrusion 1212 may be formed on an upper surface of the holder 1210. The first protrusion 1212 may protrude from the upper surface of the holder 1210. The first protrusion 1212 may be in contact with the housing 1110 when the holder 1210 moves up. The first protrusion 1212 may be in contact with the second part 1112 of the housing 1110 when the holder 1210 moves up.

The holder 1210 may include second protrusions 1213. The second protrusion 1213 may be a lower stopper. The second protrusion 1213 may be formed on a lower surface of the holder 1210. The second protrusion 1213 may protrude from the lower surface of the holder 1210. The second protrusion 1213 may be in contact with the housing 1110 when the holder 1210 moves down. The second protrusion 1213 may be in contact with the third part 1113 of the housing 1110 when the holder 1210 moves down.

In the present embodiment, in the initial state, the first protrusion 1212 of the holder 1210 may be in contact with the second part 1112 of the housing 1110. When a current is applied to the first driving unit 1410 or by an impact, the second protrusion 1213 of the holder 1210 may be in contact with the third part 1113 of the housing 1110 by the current applied to the first driving unit 1410 or an impact.

The holder 1210 may include an adhesive accommodating groove 1214. The adhesive accommodating groove 1214 may accommodate the adhesive for fixing the reflective member 1220 to the holder 1210. The adhesive accommodating groove 1214 may be formed on a surface in contact with the reflective member 1220. An adhesive may be disposed in the adhesive accommodating groove 1214.

The holder 1210 may include grooves 1215. The groove 1215 may be a separation groove that provides a separation space with the reflective member 1220. The groove 1215 may be formed on a surface in contact with the reflective member 1220. A contact area between the reflective member 1220 and the holder 1210 may be reduced by the groove 1215.

The holder 1210 may include grooves 1216. The groove 1216 may be a weight reduction groove. The groove 1216 may be formed in a center portion of the holder 1210. A weight of the holder 1210 may be reduced by the groove 1216.

The holder 1210 may include a magnet accommodating groove 1217. Driving magnets 1411 and 1421 may be disposed in the magnet accommodating groove 1217. The magnet accommodating groove 1217 may be formed in a shape corresponding to the driving magnets 1411 and 1421. The magnet accommodating groove 1217 may be formed concavely on the lower surface of the holder 1210. The magnet accommodating groove 1217 may be formed on the lower surface and both side surfaces of the holder 1210. The magnet accommodating groove 1217 may include a plurality of magnet accommodating grooves. The magnet accommodating groove 1217 may include a first magnet accommodating groove for accommodating the first driving magnet 1411 and a yoke 1414. The magnet accommodating groove 1217 may include a second magnet accommodating groove for accommodating the second driving magnet 1421 and a yoke 1424. The driving magnets 1411 and 1421 may be disposed in the holder 1210.

The holder 1210 may include a mover rigid accommodating groove 1218. The mover rigid accommodating groove 1218 may be a mover rigid accommodating groove. A coupling portion 1232 of the mover rigid 1230 may be disposed in the mover rigid accommodating groove 1218. The mover rigid accommodating groove 1218 may be formed in a shape corresponding to the coupling portion 1232 of the mover rigid 1230. The mover rigid accommodating groove 1218 may include a groove in which an adhesive for fixing the coupling portion 1232 of the mover rigid 1230 to the holder 1210 is accommodated. The holder 1210 may include a plurality of protrusions formed in the mover rigid accommodating groove 1218. At least a portion of the coupling portion 1232 of the mover rigid 1230 may be inserted into the mover rigid accommodating groove 1218. The reflective member driving device 1000 may include an adhesive for fixing the mover rigid 1230 to the holder 1210. At least a portion of the adhesive may be disposed between the plurality of protrusions formed in the mover rigid accommodating groove 1218 of the holder 1210. Therefore, it is possible to increase a coupling strength between the mover rigid 1230 and the holder 1210.

The holder 1210 may include side stoppers 1219. The side stoppers 1219 may be formed on both side surfaces of the holder 1210. The side stopper 1219 may protrude from the side surface of the holder 1210. The side stopper 1219 may be in contact with the housing 1110 when the holder 1210 moves laterally. The side stopper 1219 may be in contact with the side plate of the housing 1110 when the holder 1210 moves laterally.

The reflective member driving device 1000 may include the reflective member 1220. The moving unit 1200 may include the reflective member 1220. The reflective member 1220 may be disposed in the holder 1210. The reflective member 1220 may be disposed in the holder 1210. The reflective member 1220 may be coupled to the holder 1210. The reflective member 1220 may be fixed to the holder 1210. The reflective member 1220 may be fixed to the holder 1210 using an adhesive. The reflective member 1220 may move integrally with the holder 1210. The reflective member 1220 may change an optical path. The reflective member 1220 may reflect light. The reflective member 1220 may include a prism. The reflective member 1220 may include a mirror. The reflective member 1220 may be formed in a triangular pillar shape. An angle between a path of light incident on the reflective member 1220 and a path of light emitted therefrom may be 90 degrees.

The reflective member driving device 1000 may include the mover rigid 1230. The moving unit 1200 may include the mover rigid 1230. The mover rigid 1230 may be coupled to the holder 1210. The mover rigid 1230 may be formed as a separate member from the holder 1210. The mover rigid 1230 may be coupled to the holder 1210 by passing through the hole 1114 of the housing 1110. The mover rigid 1230 may be coupled to the holder 1210 with the first part 1111 of the housing 1110 interposed therebetween. The mover rigid 1230 may be made of non-magnetic metal. The first magnet 1240 and the second magnet 1120 may be disposed between the mover rigid 1230 and the holder 1210. The first magnet 1240 and the second magnet 1120 may be disposed to have the same polarity facing each other to push each other. The first magnet 1240 fixed to the housing 1110 may push the second magnet 1120 outward. The mover rigid 1230 to which the second magnet 1120 is fixed may also be pressed outward by the repulsive force of the first magnet 1240. The holder 1210 to which the mover rigid 1230 is fixed may also be pressed outward. Therefore, the holder 1210 may press the moving plate 1300 with respect to the housing 1110. Therefore, the moving plate 1300 may be disposed without being removed between the holder 1210 and the housing 1110.

The mover rigid 1230 may include the protruding portions 1231. The protruding portion 1231 may extend from the body portion of the mover rigid 1230. The protruding portion 1231 may be coupled to the housing 1110 by a damper 1500. The protruding portion 1231 may be disposed in a central portion of the mover rigid 1230. The protruding portion 1231 may be formed in the central portion of the mover rigid 1230. The protruding portion 1231 may protrude from an upper surface of the body portion of the mover rigid 1230. The protruding portion 1231 may be in contact with the housing 1110 when the mover rigid 1230 moves.

The protruding portion 1231 may include a plurality of protruding portions. The protruding portion 1231 of the mover rigid 1230 may include a first protruding portion formed on the upper surface of the body portion of the mover rigid 1230. The protruding portion 1231 of the mover rigid 1230 may include a second protruding portion formed on a lower surface of the body portion of the mover rigid 1230. At least a portion of the first protruding portion of the mover rigid 1230 may be disposed in the first groove of the housing 1110. At least a portion of the second protruding portion of the mover rigid 1230 may be disposed in the second groove of the housing 1110. The protruding portion 1231 may include a first protruding region protruding to one side and a second protruding region protruding to the other side. Each of the first and second protruding regions may be referred to as a protruding portion.

The mover rigid 1230 may include the body portion. The body portion may be disposed at a side opposite to the moving plate 1300 with respect to the first part 1111 of the housing 1110. The mover rigid 1230 may include two leg portions or coupling portions 1232 protruding from both sides of the body portion. The following description will be made based on the coupling portion. The mover rigid 1230 may include two protrusions 1231 protruding upward and downward from the body portion.

The mover rigid 1230 may include the coupling portions 1232. The coupling portion 1232 may be the leg portion. The coupling portion 1232 may extend from the body portion of the mover rigid 1230. The coupling portion 1232 may pass through the hole 1114 of the housing 1110. The coupling portion 1232 may be coupled to the holder 1210. The coupling portion 1232 may be fixed to the holder 1210 using an adhesive. At least a portion of the coupling portion 1232 may be inserted into the mover rigid accommodating groove 1218 of the holder 1210.

The reflective member driving device 1000 may include the first magnet 1240. The moving unit 1200 may include the first magnet 1240. The first magnet 1240 may be disposed on the moving unit 1200. The first magnet 1240 may be a first repulsive force magnet. The first magnet 1240 may be disposed on the mover rigid 1230. The first magnet 1240 may be disposed on the body portion of the mover rigid 1230. The first magnet 1240 may be disposed to face the second magnet 1120. The first magnet 1240 may be disposed to generate the repulsive force with the second magnet 1120. The first magnet 1240 and the second magnet 1120 may be disposed to have the same polarity facing each other. The first magnet 1240 may push the second magnet 1120.

In the present embodiment, a center axis of the first magnet 1240 may be disposed eccentrically with a center axis of the moving plate 1300 with respect to a first optical axis. In this case, the first optical axis may be a z-axis. The first optical axis may be an axis perpendicular to a sensor surface of an image sensor 3400. The first optical axis may be optical axes of lens groups disposed adjacent to the image sensor 3400.

As illustrated in FIG. 16A, a horizontal center axis A of the first magnet 1240 and the second magnet 1120 may be disposed eccentrically to have a gap G with a horizontal center axis B of the moving plate 1300 in the vertical direction.

When viewed in a direction from the moving plate 1300 to the first magnet 1240, the center of the first magnet 1240 may be disposed eccentrically with the center of the moving plate 1300.

Based on a facing surface, the horizontal axis passing through the center axis of the first magnet 1240 may be eccentric in a direction of the horizontal axis passing through the center axis of the moving plate 1300 and a second optical axis perpendicular to the first optical axis. In this case, the horizontal axis may be the x-axis. The horizontal axis may be disposed in the horizontal direction. The second optical axis may be the y-axis. The second optical axis may be an axis parallel to the sensor surface of the image sensor 3400. The second optical axis may be disposed in the vertical direction. Based on the facing surface, the horizontal axis meeting or in contact with the center axis of the first magnet 1240 may be eccentric in the direction of the horizontal axis passing through the center axis of the moving plate 1300 and the second optical axis perpendicular to the first optical axis. The center of the first magnet 1240 may be disposed to be eccentric in the vertical direction with respect to the center of the moving plate 1300.

Based on the facing surface, the vertical axis passing through the center axis of the first magnet 1240 may not be eccentric in the directions of the vertical axis and the horizontal axis passing through the center axis of the moving plate 1300. In this case, the horizontal axis may be the x-axis. The horizontal axis may be disposed in the horizontal direction. The second optical axis may be the y-axis. The second optical axis may be an axis parallel to the sensor surface of the image sensor 3400. The second optical axis may be disposed in the vertical direction. The center of the first magnet 1240 may be disposed not to be eccentric in the horizontal direction with respect to the center of the moving plate 1300.

Based on the facing surface, a horizontal line passing through the center of the first magnet 1240 may be eccentric along the horizontal line passing through the center of the moving plate 1300 and in the vertical direction. Based on the facing surface, a vertical line passing through the center of the first magnet 1240 may not be eccentric along the vertical line passing through the center of the moving plate 1300 and in the horizontal direction.

The horizontal axis of the first magnet 1240 may be disposed at a higher level than the horizontal axis of the moving plate 1300. As a modified example, the horizontal axis of the first magnet 1240 may be disposed to be lower than the horizontal axis of the moving plate 1300.

The first magnet 1240 and the second magnet 1120 may be disposed between the mover rigid 1230 and the moving plate 1300.

A size of the first magnet 1240 may differ from a size of the second magnet 1120. The first magnet 1240 may be formed in a different size from the second magnet 1120. The size of the first magnet 1240 may be greater than the size of the second magnet 1120. The first magnet 1240 may be formed to be greater than the second magnet 1120.

An area of the first surface of the first magnet 1240 may be greater than an area of the second surface of the second magnet 1120 facing the first surface. The first surface and the second surface are arbitrarily called, and any one of two may be called the first surface, the other one may be called the second surface, and both may be called the first surface. The first magnet 1240 may include the first surface. The second magnet 1120 may include the first surface facing the second surface of the first magnet 1240. The area of the first surface of the first magnet 1240 may be greater than an area of the first surface of the second magnet 1120.

The first surface of the first magnet 1240 may include a first side. The first surface of the second magnet 1120 may include a first side disposed in a direction corresponding to the first side of the first magnet 1240. The first side of the second magnet 1120 may be in a range of 55% to 75% of the first side of the first magnet 1240. The first side of the second magnet 1120 may be in a range of 60% to 66% of the first side of the first magnet 1240. The first side of the second magnet 1120 may be in a range of 62% to 64% of the first side of the first magnet 1240. A height H1 of the first magnet 1240 may be greater than a height H2 of the second magnet 1120. A width W1 of the first magnet 1240 may be greater than a width W2 of the second magnet 1120.

An area of the first surface of the second magnet 1120 may be in a range of 30% to 50% of the area of the first surface of the first magnet 1240. The area of the first surface of the second magnet 1120 may be in a range of 35% to 45% of the area of the first surface of the first magnet 1240. The area of the first surface of the second magnet 1120 may be in a range of 38% to 42% of the area of the first surface of the first magnet 1240.

The first magnet 1240 and the second magnet 1120 may be formed to have the same thickness. A volume of the second magnet 1120 may be in a range of 30% to 50% of a volume of the first magnet 1240.

When viewed in a direction from the second magnet 1120 to the first magnet 1240, an edge region of the second magnet 1120 may be disposed in the first surface of the first magnet 1240. The edge region may be an edge region. The edge region may be an edge. The first magnet 1240 may be disposed so that all regions of the second magnet 1120 overlap the first magnet 1240 in a first direction in which the first magnet 1240 faces the second magnet 1120. The first magnet 1240 may be disposed so that all regions of the second magnet 1120 overlap the first magnet 1240 in the first direction in which the first magnet 1240 faces the second magnet 1120.

As a modified example, the size of the first magnet 1240 may be smaller than the size of the second magnet 1120. The second magnet 1120 may be formed to be greater than the first magnet 1240.

The central axes of the first magnet 1240 and the second magnet 1120 may match with each other. However, in actual products, a tolerance of 11% to ±2% may occur.

In the present embodiment, the second magnet 1120 may include the second surface facing the first surface of the first magnet 1240. In this case, the center axis of the first magnet 1240 may be disposed eccentrically with the center axis of the moving plate 1300 in a direction perpendicular to the first surface. The area of the first surface of the first magnet 1240 may be greater than an area of the second surface of the second magnet 1120.

In the present embodiment, in the initial state in which no current is applied to the driving unit 1400, the moving unit 1200 may be in contact with the fixed unit 1100. When viewed in a direction from the second magnet 1120 to the first magnet 1240, the edge of the first magnet 1240 may surround the second magnet 1120. When viewed in a direction from the second magnet 1120 to the first magnet 1240, the second magnet 1120 may be disposed inside the edge of the first magnet 1240.

The first magnet 1240 may include the first surface facing the second magnet 1120 and the second surface opposite to the first surface. The first surface of the first magnet 1240 may include a first side and a second side that is shorter than the first side. The first side of the first magnet 1240 may be formed in a range of 1 mm to 5 mm. The second side of the first magnet 1240 may be formed in a range of 0.8 mm to 4 mm. A thickness between the first surface and the second surface of the first magnet 1240 may be formed in a range of 0.1 mm to 0.5 mm.

In the present embodiment, a force (Fx) formed by the first driving unit 1410 may be within 7 mN. In addition, a force (Fy) formed by a second driving unit 1420 may be within 7 mN. Alternatively, the force (Fx) formed by the first driving unit 1410 may be within 3 mN. In addition, the force (Fy) formed by the second driving unit 1420 may be within 3 mN.

The first surface of the first magnet 1240 may be formed in a square shape. The first surface of the second magnet 1120 may be formed in a square shape. Alternatively, each of the first surface of the first magnet 1240 and the first surface of the second magnet 1120 may be formed in a rectangular shape. At least a portion of the first magnet 1240 may have a square cross section. At least a portion of the second magnet 1120 may have a square cross section. The first magnet 1240 may be formed to have a rounded edge. The second magnet 1120 may be formed to have a rounded edge.

As a modified example, the first magnet 1240 may have a circular cross section. The first magnet 1240 may be formed in a cylindrical shape. The second magnet 1120 may have a circular cross section. The second magnet 1120 may be formed in a cylindrical shape. The first magnet 1240 may be formed to have a rounded edge. The first magnet 1240 may be formed to have a curved edge. The first magnet 1240 may be formed to have an edge with a certain curvature. The first magnet 1240 may be formed to have a C-cut or R-cut edge. The second magnet 1120 may be formed to have a rounded edge. The second magnet 1120 may be formed to have a curved edge. The second magnet 1120 may be formed to have an edge with a certain curvature. The second magnet 1120 may be formed to have a C-cut or R-cut edge.

The reflective member driving device 1000 may include the moving plate 1300. The moving plate 1300 may be an inter-plate. The moving plate 1300 may be disposed between the housing 1110 (corresponding to the fixed unit) and the holder 1210. The moving plate 1300 may be disposed between the mover rigid 1230 and the holder 1210. The moving plate 1300 may be disposed between the first magnet 1240 and the holder 1210. The moving plate 1300 may be disposed between the fixed unit 1100 and the moving unit 1200. The moving plate 1300 may be disposed between the first surface of the second magnet 1120 and the holder 1210. The moving plate 1300 may guide the movement of the holder 1210 with respect to the housing 1110. The moving plate 1300 may provide a tilting center of the holder 1210. In other words, the holder 1210 may be tilted about the moving plate 1300. One side of the moving plate 1300 may be disposed in the holder 1210, and the other side thereof may be disposed in the housing 1110. The moving plate 1300 may be in contact with the holder 1210 and the housing 1110.

The moving plate 1300 may include a first surface facing the housing 1110 and a second surface facing the holder 1210. The first surface of the moving plate 1300 may include the plurality of first protrusions 1310 spaced apart from each other in the direction of the first axis. The second surface of the moving plate 1300 may include the plurality of second protrusions 1320 spaced apart from each other in the direction of a second axis.

The moving plate 1300 may include a plurality of first convex portions formed on one surface thereof, and a plurality of second convex portions formed on the other surface thereof. The first convex portion may be the first protrusion 1310. The second convex portion may be the second protrusion 1320. The x-axis may correspond to a straight line connecting two of the plurality of first convex portions. The x-axis may match with or be parallel to the straight line connecting the two of the plurality of first convex portions. The y-axis may correspond to a straight line connecting two of the plurality of second convex portions. The y-axis may match with or be parallel to the straight line connecting the two of the plurality of second convex portions. As a modified example, the first convex portion may be the second protrusion 1320, and the second convex portion may be the first protrusion 1310.

The moving plate 1300 may include the first protrusion 1310. The first protrusion 1310 may be disposed in the housing 1110. The first protrusion 1310 may be in contact with the housing 1110. The first protrusion 1310 may be disposed in the groove 1115 of the housing 1110. The first protrusion 1310 may provide a first axis tilting center to the holder 1210. The first protrusion 1310 may provide an x-axis tilting center to the holder 1210. The first protrusion 1310 may include two first protrusions. The two first protrusions may be spaced apart from each other in an x-axis direction. The two first protrusions may be disposed on the x-axis. The holder 1210 may be tilted about the first protrusion 1310 of the moving plate 1300 by the first driving unit 1410. The holder 1210 may be tilted vertically about the first protrusion 1310 of the moving plate 1300 by the first driving unit 1410.

The first axis of the moving plate 1300 may be defined by the first protrusion 1310 of the moving plate 1300 and the groove 1115 of the housing 1110. In the present embodiment, the first protrusion 1310 of the moving plate 1300 may be disposed at the housing 1110 side rather than the holder 1210 side so that a rotation center of the tilting about the first axis may further move away. Therefore, it is possible to increase the accuracy of a Hall value at which a first axis tilting movement amount is detected. It is possible to secure a mechanical stroke for x-axis tilting driving.

The moving plate 1300 may include the second protrusions 1320. The second protrusion 1320 may be disposed in the holder 1210. The second protrusion 1320 may be in contact with the holder 1210. The second protrusion 1320 may be disposed in the groove 1211 of the holder 1210. The second protrusion 1320 may provide a second axis tilting center to the holder 1210. The second protrusion 1320 may provide a y-axis tilting center to the holder 1210. The second protrusion 1320 may include two second protrusions. The two second protrusions may be spaced apart from each other in a y-axis direction. The two second protrusions may be disposed on the y-axis. The holder 1210 may be tilted about the second protrusion 1320 of the moving plate 1300 by the second driving unit 1420. The holder 1210 may be tilted horizontally about the second protrusion 1320 of the moving plate 1300 by the second driving unit 1420.

As a modified example, the first protrusion 1310 of the moving plate 1300 may provide the y-axis tilting center to the holder 1210, and the second protrusion 1320 of the moving plate 1300 may provide the x-axis tilting center.

The reflective member driving device 1000 may be coated with grease. The grease may be disposed between the moving plate 1300 and the housing 1110. The grease may be made of a different material from the damper 1500. The grease may be spaced apart from the damper 1500. The grease may be distinguished from the damper 1500. Grease coating may be performed in a different shape from the damper 1500. A different position from the damper 1500 may be coated with the grease.

The reflective member driving device 1000 may include the driving unit 1400. The driving unit 1400 may move the moving unit 1200 with respect to the fixed unit 1100. The driving unit 1400 may tilt the moving unit 1200 with respect to the fixed unit 1100. The driving unit 1400 may tilt the holder 1210. The driving unit 1400 may tilt the moving unit 1200 with respect to the x-axis and the y-axis of the moving plate 1300, which are perpendicular to each other. The driving unit 1400 may include coils and magnets. The driving unit 1400 may move the moving unit 1200 through electromagnetic interaction. As a modified example, the driving unit 1400 may include a shape memory alloy (SMA).

The driving unit 1400 may include the first driving unit 1410 and the second driving unit 1420. The first driving unit 1410 may include the first driving magnet 1411 and the first coil 1412. The second driving unit 1420 may include the second driving coil 1421 and the second coil 1422. The first driving magnet 1411 and the first coil 1412 may tilt the holder 1210 about the first axis. The second driving magnet 1421 and the second coil 1422 may tilt the holder 1210 about the second axis perpendicular to the first axis. Any one of the first driving magnet 1411 and the second driving magnet 1421 may be referred to as a third magnet, and the other one may be referred to as a fourth magnet.

The driving magnets 1411 and 1421 may be disposed in the holder 1210. The coils 1412 and 1422 may be disposed on the board 1130. The coils 1412 and 1422 may be disposed at positions corresponding to the driving magnets 1411 and 1421.

Alternatively, the reflective member driving device 1000 may include a driving magnet. The driving magnet may be disposed in the holder 1210. The driving magnet may be disposed on an outer surface of the holder 1210. The driving magnet may be fixed to the holder 1210. The driving magnet may be fixed to the holder 1210 using an adhesive. The driving magnet may face the coil. The driving magnet may be disposed to face the coil. The driving magnet may be disposed at a position corresponding to the coil. The driving magnet may interact electromagnetically with the coil. The driving magnet may be a 4-pole magnetized magnet. In other words, each driving magnet may include two N poles and two S poles.

The driving magnet may include a plurality of magnets. The driving magnet may include the first driving magnet 1411 for tilting the reflective member 1220 about the first axis. The driving magnet may include the second driving magnet for tilting the reflective member 1220 about the second axis perpendicular to the first axis.

The reflective member driving device 1000 may include a coil. The coil may interact electromagnetically with the driving magnet. The coil may be disposed on the board 1130. The coil may be disposed in the housing 1110.

The driving unit 1400 may include the first driving unit 1410. The first driving unit 1410 may tilt the moving unit 1200 about the first axis with respect to the fixed unit 1100. The first driving unit 1410 may tilt the holder 1210 based on the first axis of the moving plate 1300. The first driving unit 1410 may tilt the moving unit 1200 about the x-axis with respect to the fixed unit 1100. The first driving unit 1410 may include coils and magnets. The first driving unit 1410 may move the moving unit 1200 through electromagnetic interaction. As a modified example, the first driving unit 1410 may include a shape memory alloy (SMA). The first driving magnet 1411 and the first coil 1412 may rotate the holder 1210 about the first axis. The first driving magnet 1411 and the first coil 1412 may tilt the holder 1210 about the first axis.

The first driving unit 1410 may include the first driving magnet 1411. The first driving magnet 1411 may be disposed in the holder 1210. The first driving magnet 1411 may be disposed on the lower surface of the holder 1210. The first driving magnet 1411 may be fixed to the holder 1210. The first driving magnet 1411 may be fixed to the holder 1210 using an adhesive. The first driving magnet 1411 may be disposed between the holder 1210 and the lower surface of the housing 1110. The first driving magnet 1411 may be disposed between the holder 1210 and the lower plate of the housing 1110. The first driving magnet 1411 may move integrally with the holder 1210. The first driving magnet 1411 may tilt the holder 1210. The first driving magnet 1411 may tilt the holder 1210 with respect to the first axis. The first driving magnet 1411 may move integrally with the holder 1210. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may interact electromagnetically with the first coil 1412. At least a portion of the first driving magnet 1411 may be disposed in the groove 1217 of the holder 1210.

The first driving magnet 1411 may include the first surface in a direction facing the reflective member 1220. The second magnet 1120 may include the first surface in a direction facing the reflective member 1220. The first surface of the first driving magnet 1411 may include a first region closest to the second magnet 1120. A first region of the first driving magnet 1411 may have a different polarity from the first surface of the second magnet 1120. The first surface of the first driving magnet 1411 may include a second region having a different polarity from the first region. The first region of the first driving magnet 1411 may have an S pole, and the second region thereof may have an N pole. In this case, the first surface of the second magnet 1120 may have an N pole. As a modified example, the first region of the first driving magnet 1411 may have an N pole, and the second region thereof may have an S pole.

In the present embodiment, it is possible to minimize magnetic field interference through the magnet polarity arrangement of the first driving magnet 1411 and the second magnet 1120.

The first driving magnet 1411 may include a second surface opposite to the first surface of the first driving magnet 1411. The second surface of the first driving magnet 1411 may include a third region having a different polarity from the first region. The second surface of the first driving magnet 1411 may include a fourth region having a different polarity from the second region. The second surface of the first driving magnet 1411 may face the first coil 1412. The third region may have an N pole, and the fourth region may have an S pole. As a modified example, the third region may have an S pole, and the fourth region may have an N pole.

The first driving magnet 1411 may include a neutral portion disposed between the first region and the second region. The first driving magnet 1411 may include a neutral portion disposed between the third region and the fourth region. The neutral portion may be a portion of which a polarity is close to neutral. The neutral portion may be an air gap. Alternatively, as a modified example, the neutral portion may be disposed between the first region and the third region and between the second region and the fourth region.

A region of the first driving magnet 1411 closest to the first surface of the second magnet 1120 may have a polarity that generates an attractive force with the first surface of the second magnet 1120. The first surface of the second magnet 1120 and the first region of the first driving magnet 1411 closest to the first surface of the second magnet 1120 may generate an attractive force.

Each of the second magnet 1120 and the first driving magnet 1411 may include the first surface facing the center portion of the moving unit 1200. The first surface of the first driving magnet 1411 may include the first region and the second region with different polarities. The first surface of the second magnet 1120 may be disposed closer to the first driving magnet 1411 than the second driving magnet 1421. The first region of the first driving magnet 1411 may be disposed closer to the second magnet 1120 than the second region. The first region of the first driving magnet 1411 may have a different polarity from the first surface of the second magnet 1120.

Each of the second magnet 1120 and the first driving magnet 1411 may include the first surface facing the center portion of the holder 1210. The first surface of the first driving magnet 1411 and the first surface of the second magnet 1120 may include regions with different polarities.

As an additional example, the first driving magnet 1411 may include an air gap 1411*a*. In a direction of a third axis perpendicular to both the first axis and the second axis, a length of the air gap 1411*a* of the first driving magnet 1411 may be greater than a length of an air gap 1421*a* of the second driving magnet 1421. The second axis may be an optical axis of light incident on the reflective member 1220. The third axis may be the optical axis of light emitted from the reflective member 1220. The first axis may be the x-axis, the second axis may be the y-axis, and the third axis may be the z-axis (see FIG. 6). The air gap 1411*a* may be a neutral region. The air gap 1411*a* may be a neutral zone. The air gap 1411*a* may not have a polarity. The air gap 1411*a* may have a weaker polarity than other parts of the first driving magnet 1411. The air gap 1411*a* may be disposed in the x-axis direction in the first driving magnet 1411.

The first driving magnet 1411 may be formed of one magnet, and the second driving magnet 1421 may be formed of two magnets. A distance of the air gap 1411*a* of one magnet may be greater than a distance of the air gap 1421*a* of each of two magnets.

A length of the air gap 1411*a* of the first driving magnet 1411 in a direction of the third axis may be greater than a length of the first sensor 1413 in the corresponding direction. Alternatively, the length of the air gap 1411*a* of the first driving magnet 1411 in the direction of the third axis may be equal to the length of the first sensor 1413 in the corresponding direction. Alternatively, the length of the air gap 1411*a* of the first driving magnet 1411 in the direction of the third axis may be smaller than the length of the first sensor 1413 in the corresponding direction.

The first driving magnet 1411 may include the first surface facing the first coil 1412. The first surface of the first driving magnet 1411 may include a first magnet region and a second magnet region. The first magnet region and the second magnet region may be spaced apart from each other. A separation distance between the first magnet region and the second magnet region may be in a range of 1 to 1.5 times the length of the first sensor 1413 in the corresponding direction. The separation distance between the first magnet region and the second magnet region may be in a range of 1.2 to 1.3 times the length of the first sensor 1413 in the corresponding direction. The separation distance between the first magnet region and the second magnet region may be in a range of 1.1 to 1.4 times the length of the first sensor 1413 in the corresponding direction.

The first driving magnet 1411 may include a first part 1411*b* including an N pole and an S pole. The first driving magnet 1411 may include a second part 1411*c* including an N pole and an S pole. The air gap 1411*a* of the first driving magnet 1411 may be disposed between the first part 1411*b* and the second part 1411*c*. The first part 1411*b* may include a portion overlapping the first sensor 1413 in the second axis direction. The second part 1411*c* may include a portion overlapping the first sensor 1413 in the second axis direction.

A length of the air gap 1411*a* of the first driving magnet 1411 in the third axis direction may be smaller than a thickness of the second driving magnet 1421 in the first axis direction. The third axis may be the z-axis, and the first axis may be the x-axis. The length of the air gap 1411*a* of the first driving magnet 1411 in the z-axis direction may be smaller than a thickness of the first driving magnet 1421 in the y-axis direction.

The length of the air gap 1411*a* of the first driving magnet 1411 in the third axis direction may be greater than 0.3 mm and smaller than 0.7 mm. The length of the air gap 1411*a* of the first driving magnet 1411 in the third axis direction may be greater than 0.2 mm and smaller than 0.75 mm. The length of the air gap 1411*a* of the first driving magnet 1411 in the third axis direction may be in a range of 0.15 to 0.8 mm. The length of the air gap 1411*a* of the first driving magnet 1411 in the third axis direction may be in a range of 15% to 23% of the total length of the first driving magnet 1411 in the third axis direction. The length of the air gap 1411*a* of the first driving magnet 1411 in the third axis direction may be in a range of 10% to 28% of the total length of the first driving magnet 1411 in the third axis direction. The length of the air gap 1411*a* of the first driving magnet 1411 in the third axis direction may be in a range of 5% to 31% of the total length of the first driving magnet 1411 in the third axis direction.

When the length of the air gap 1411*a* of the first driving magnet 1411 is greater than the described upper limit, the magnetic force of the magnet may be weakened, and when it is smaller than the mentioned lower limit, the linearity of the Hall sensor may be degraded.

The length of the air gap 1411*a* of the first driving magnet 1411 in third axis direction may be greater than a length of the first magnet 1240 in the corresponding direction. The length of the air gap 1411*a* of the first driving magnet 1411 in the third axis direction may be greater than a length of the second magnet 1120 in the corresponding direction. The length of the air gap 1411*a* of the first driving magnet 1411 in the third axis direction may be smaller than a thickness T1 of the first driving magnet 1411. Alternatively, the length of the air gap 1411*a* of the first driving magnet 1411 in the third axis direction may be equal to the thickness T1 of the first driving magnet 1411. Alternatively, the length of the air gap 1411*a* of the first driving magnet 1411 in the third axis direction may be greater than the thickness T1 of the first driving magnet 1411.

When Hall characteristics are not linear, the actuator may be unstable. In other words, module defects may be caused. In particular, unlike a Y-axis driving portion, an X-axis driving portion (bottom portion) is formed with one magnet that is not symmetrical to have more non-linear characteristics as it moves away further from the Hall sensor. Meanwhile, a magnet for generating a repulsive force may further worsen the non-linear Hall characteristics of the X-axis driving. By selecting an appropriate air gap for the X-axis driving magnet, it is possible to secure linear characteristics of the Hall. In a bipolar magnetization structure including an air gap, an air gap in the neutral zone of the X-axis magnet may be in a range of 0.15 to 0.8 mm.

Referring to FIGS. 16C and 16D, the first driving magnet 1411 may have a first width W1 in the x-axis direction. The first width W1 of the first driving magnet 1411 may be in a range of 5.0 to 6.0 mm. The first width W1 of the first driving magnet 1411 may be in a range of 4.0 to 7.0 mm. The first driving magnet 1411 may have the first thickness T1 in the y-axis direction. The first thickness T1 of the first driving magnet 1411 may be in a range of 5.0 to 1.1 mm. The first thickness T1 of the first driving magnet 1411 may be in a range of 0.3 to 1.3 mm. The first driving magnet 1411 may have a first length L1 in the z-axis direction. The first length L1 of the first driving magnet 1411 may be in a range of 2.1 to 3.1 mm. The first length L1 of the first driving magnet 1411 may be in a range of 1.5 to 3.7 mm. The first driving magnet 1411 may be formed to have a larger volume than the second driving magnet 1421.

The second driving magnet 1421 may have a second thickness T2 in the x-axis direction. The second thickness T2 of the second driving magnet 1421 may be in a range of 0.5 to 0.8 mm. The second thickness T2 of the second driving magnet 1421 may be in a range of 0.3 to 1.0 mm. The second driving magnet 1421 may have a second length L2 in the y-axis direction. The second length L2 of the second driving magnet 1421 may be in a range of 2.25 to 3.25 mm. The second length L2 of the second driving magnet 1421 may be in a range of 1.5 to 4.0 mm. The second driving magnet 1421 may have a second width W2 in the z-axis direction. The second width W2 of the second driving magnet 1421 may be in a range of 3.0 to 3.6 mm. The second width W2 of the second driving magnet 1421 may be in a range of 2.0 to 4.6 mm.

The first magnet 1240 may have a third width W3 in the x-axis direction. The third width W3 of the first magnet 1240 may be in a range of 1.5 to 2.4 mm. The third width W3 of the first magnet 1240 may be in a range of 1.0 to 2.9 mm. The first magnet 1240 may have a third length L3 in the y-axis direction. The third length L3 of the first magnet 1240 may be in a range of 1.5 to 2.4 mm. The third length L3 of the first magnet 1240 may be in a range of 1.0 to 2.9 mm. The first magnet 1240 may have a third thickness T3 in the z-axis direction. The third thickness T3 of the first magnet 1240 may be in a range of 0.25 to 0.35 mm. The third thickness T3 of the first magnet 1240 may be in a range of 0.2 to 0.4 mm. The third width W3 and the third length L3 of the first magnet 1240 may be the same.

The second magnet 1120 may have a fourth width W4 in the x-axis direction. The fourth width W4 of the second magnet 1120 may be in a range of 1.02 to 1.92 mm. The fourth width W4 of the second magnet 1120 may be in a range of 0.52 to 2.42 mm. The second magnet 1120 may have a fourth length L4 in the y-axis direction. The fourth length L4 of the second magnet 1120 may be in a range of 1.02 to 1.92 mm. The fourth length L4 of the second magnet 1120 may be in a range of 0.52 to 2.42 mm. The second magnet 1120 may have a fourth thickness T4 in the z-axis direction. The fourth thickness T4 of the second magnet 1120 may be in a range of 0.27 to 0.37 mm. The fourth thickness T4 of the second magnet 1120 may be in a range of 0.22 to 0.42 mm. The fourth width W4 and the fourth length L4 of the second magnet 1120 may be the same. The fourth thickness T4 of the second magnet 1120 may be greater than the third thickness T3 of the first magnet 1240.

In a modified example illustrated in FIGS. 16F and 16E, the holder 1210 may include a protruding portion 1210*a* disposed between a first segment magnet 1411-1 and a second segment magnet 1411-2 of the first driving magnet 1411. Any one of the first segment magnet 1411-1 and the second segment magnet 1411-2 may be referred to as the first magnet, and the other one may be referred to as the second magnet. The first segment magnet 1411-1 may include an N pole and an S pole. The second segment magnet 1411-2 may include an N pole and an S pole. The first segment magnet 1411-1 and the second segment magnet 1411-2 may be completely separated by the holder 1210.

However, it can be understood that the holder 1210 includes two grooves spaced apart from each other, which are formed in the lower surface of the holder 1210, rather than the protruding portion 1210*a*. In other words, the holder 1210 may include a first groove and a second groove formed in the lower surface of the holder 1210. The first segment magnet 1411-1 may be disposed in the first groove, and the second segment magnet 1411-2 may be disposed in the second groove. A first segment yoke 1414-1 may be disposed in the first groove, and the second segment yoke 1414-2 may be disposed in the second groove. The first groove and the second groove may be spaced apart from each other, and thus a portion of the holder 1210 may be disposed between the first groove and the second groove. A portion of the holder 1210 may be disposed between the first segment magnet 1411-1 and the second segment magnet 1411-2.

As another modified example, a separate member from the holder 1210 may be disposed between the first segment magnet 1411-1 and the second segment magnet 1411-2. The reflective member driving device 1000 may include a spacer disposed between the first segment magnet 1411-1 and the second segment magnet 1411-2. The spacer may be formed as the separate member from the holder 1210. The spacer may include a structure for coupling the first segment magnet 1411-1 to the second segment magnet 1411-2. The spacer may include a coupling groove for coupling the first segment magnet 1411-1 and the second segment magnet 1411-2. The spacer may include a seating portion for coupling the first segment magnet 1411-1 and the second segment magnet 1411-2. The spacer may include an assembly guide surface for coupling the first segment magnet 1411-1 and the second segment magnet 1411-2. The spacer may include a guide portion for coupling the first segment magnet 1411-1 and the second segment magnet 1411-2. The spacer may be bonded to the first segment magnet 1411-1 and the second segment magnet 1411-2 using an adhesive.

The bipolar magnetization structure of one X-axis driving magnet including the air gap may be replaced with two unipolar magnets, and the air gap may be divided by the thickness of the holder 1210. In this case, it is possible to secure a degree of freedom in design of the X-axis coil and magnet. Meanwhile, two unipolar magnets may not necessarily be symmetrical. Alternatively, as a modified example, a product without an air gap may be designed by removing the thickness of the holder 1210. In this case, performance is reduced but can be improved through tuning, and the product can be made lighter/thinner/shorter/smaller.

The first driving unit 1410 may include the first coil 1412. The first coil 1412 may be disposed on the board 1130. The first coil 1412 may be disposed in the housing 1110. The first coil 1412 may be disposed on the board 1130 at a position corresponding to the first driving magnet 1411. The first coil 1412 may be disposed under the holder 1210. The first coil 1412 may interact with the first driving magnet 1411. When a current is applied to the first coil 1412, an electromagnetic field may be formed near the first coil 1412 to interact with the first driving magnet 1411. The first driving magnet 1411 and the first coil 1412 may tilt the holder 1210 with respect to the first axis. In this case, the first axis may be the x-axis.

In the present embodiment, a first direction driving current may be applied to the first coil 1412 to drive the first coil 1412. In this case, a second direction driving current, which is opposite to the first direction driving current, may not be used to drive the first coil 1412. In other words, only a current in any one direction of a reverse or forward current may be supplied to the first coil 1412.

The reflective member driving device 1000 may include a Hall sensor 1413. The Hall sensor 1413 may detect the first driving magnet 1411. The Hall sensor 1413 may be a first sensor. The first sensor 1413 may be disposed in the first coil 1412. The first sensor 1413 may be disposed on the fixed unit 1100. The first sensor 1413 may be disposed in the housing 1110. The first sensor 1413 may be disposed on the board 1130. The first sensor 1413 may detect the first driving magnet 1411. The Hall sensor 1413 may detect a magnetic force of the first driving magnet 1411. The Hall sensor 1413 may detect a position of the holder 1210. The Hall sensor 1413 may detect a position of the reflective member 1220. The Hall sensor 1413 may detect the amount of tilting about the x-axis of the holder 1210. The first sensor 1413 may detect a tilting about the first axis of the reflective member 1220.

The first sensor 1413 may be disposed at a position corresponding to the air gap 1411*a* of the first driving magnet 1411. The first sensor 1413 may be disposed to overlap the air gap 1411*a* of the first driving magnet 1411 in the y-axis direction. The first sensor 1413 may include two first sensors. The two first sensors 1413 may be spaced apart from each other in the x-axis direction.

The reflective member driving device 1000 may include the yoke 1414. The yoke 1414 may be disposed between the first driving magnet 1411 and the holder 1210. The yoke 1414 may be formed in a shape corresponding to the first driving magnet 1411. The yoke 1414 may increase an interaction force between the first driving magnet 1411 and the first coil 1412.

The driving unit 1400 may include the second driving unit 1420. The second driving unit 1420 may tilt the moving unit 1200 about the second axis with respect to the fixed unit 1100. The second driving unit 1420 may tilt the holder 1210 with respect to the second axis perpendicular to the first axis of the moving plate 1300. The second driving unit 1420 may tilt the moving unit 1200 about the y-axis with respect to the fixed unit 1100. The second driving unit 1420 may include coils and magnets. The second driving unit 1420 may move the moving unit 1200 through electromagnetic interaction. As a modified example, the second driving unit 1420 may include a SMA. The second driving magnet 1421 and the second coil 1422 may rotate the holder 1210 about the second axis perpendicular to the first axis. The second driving magnet 1421 and the second coil 1422 may tilt the holder 1210 about the second axis perpendicular to the first axis.

The second driving unit 1420 may include the second driving magnet 1421. The second driving magnet 1421 may be disposed in the holder 1210. The second driving magnet 1421 may be disposed on each of both side surfaces of the holder 1210. The second driving magnet 1421 may be fixed to the holder 1210. The second driving magnet 1421 may be fixed to the holder 1210 using an adhesive. The second driving magnet 1421 may be disposed between the holder 1210 and the side surface of the housing 1110. The second driving magnet 1421 may be disposed between the holder 1210 and the side plate of the housing 1110. The second driving magnet 1421 may move integrally with the holder 1210. The second driving magnet 1421 may tilt the holder 1210. The second driving magnet 1421 may tilt the holder 1210 with respect to the second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may interact electromagnetically with the second coil 1422.

The second driving magnet 1421 may include a neutral portion without a polarity. The neutral portion may be an air gap. The neutral portion may be disposed between an N pole and an S pole. The neutral portion may be disposed between the first part corresponding to the front of the second driving magnet 1421 and the second part corresponding to the rear thereof. Alternatively, the neutral portion may be disposed between an inner portion and an outer portion of the second driving magnet 1421.

The second driving magnet 1421 may include a first sub-magnet 1421-1. The first sub-magnet 1421-1 may be disposed at one side of the holder 1210. The first sub-magnet 1421-1 may be disposed on a first side surface of the holder 1210. The first sub-magnet 1421-1 may be disposed to face a first sub-coil 1422-1. The first sub-magnet 1421-1 may face the first sub-coil 1422-1. The first sub-magnet 1421-1 may be disposed at a position corresponding to the first sub-coil 1422-1. The first sub-magnet 1421-1 may interact with the first sub-coil 1422-1. The first sub-magnet 1421-1 may interact electromagnetically with the first sub-coil 1422-1.

The second driving magnet 1421 may include a second sub-magnet 1421-2. The second sub-magnet 1421-2 may be disposed at the other side of the holder 1210. The second sub-magnet 1421-2 may be disposed on a second side surface opposite to the first side surface of the holder 1210. The second sub-magnet 1421-2 may be disposed at a side opposite to the first sub-magnet 1421-1. The second sub-magnet 1421-2 may be formed in the same size and shape as the first sub-magnet 1421-1. The second sub-magnet 1421-2 may be disposed to face the second sub-coil 1422-2. The second sub-magnet 1421-2 may face the second sub-coil 1422-2. The second sub-magnet 1421-2 may be disposed at a position corresponding to the second sub-coil 1422-2. The second sub-magnet 1421-2 may interact with the second sub-coil 1422-2. The second sub-magnet 1421-2 may interact electromagnetically with the second sub-coil 1422-2.

The second driving magnet 1421 may include the air gap 1421*a*. The air gap 1421*a* of the second driving magnet 1421 may be smaller than the air gap 1411*a* of the first driving magnet 1411. A volume of the air gap 1421*a* of the second driving magnet 1421 may be smaller than a volume of the air gap 1411*a* of the first driving magnet 1411. A size of the air gap 1421*a* of the second driving magnet 1421 in the x-axis direction may be smaller than a size of the air gap 1411*a* of the first driving magnet 1411 in the x-axis direction. A size of the air gap 1421*a* of the second driving magnet 1421 in the y-axis direction may be greater than a size of the air gap 1411*a* of the first driving magnet 1411 in the y-axis direction. A size of the air gap 1421*a* of the second driving magnet 1421 in the z-axis direction may be smaller than a size of the air gap 1411*a* of the first driving magnet 1411 in the z-axis direction.

The second driving unit 1420 may include the second coil 1422. The second coil 1422 may be disposed on the board 1130. The second coil 1422 may be disposed in the housing 1110. The second coil 1422 may be disposed on the second part of the board 1130. The second coil 1422 may be disposed at both sides of the holder 1210. When a current is applied to the second coil 1422, an electromagnetic field may be formed near the second coil 1422 to interact with the second driving magnet 1421. The second coil 1422 may include two sub-coils 1421-1 and 1421-2 disposed at a side opposite to the holder 1210. The two sub-coils 1421-1 and 1421-2 may be electrically connected. The second driving magnet 1421 and the second coil 1422 may tilt the holder 1210 with respect to the second axis perpendicular to the first axis. In this case, the second axis may be the y-axis. The first axis may be the x-axis, and the z-axis may be the optical axis of the image sensor 3400.

The second coil 1422 may include the first sub-coil 1422-1. The first sub-coil 1422-1 may be disposed on the board 1130. The first sub-coil 1422-1 may be disposed in the housing 1110. The first sub-coil 1422-1 may be disposed in the second part of the board 1130. The first sub-coil 1422-1 may be disposed at the side of the holder 1210. When a current is applied to the first sub-coil 1422-1, an electromagnetic field is formed near the first sub-coil 1422-1 to interact with the first sub-magnet 1421-1.

The second coil 1422 may include the second sub-coil 1422-2. The second sub-coil 1422-2 may be disposed on the board 1130. The second sub-coil 1422-2 may be disposed in the housing 1110. The second sub-coil 1422-2 may be disposed in the second part of the board 1130. The second sub-coil 1422-2 may be disposed at the side of the holder 1210. When a current is applied to the second sub-coil 1422-2, an electromagnetic field is formed near the second sub-coil 1422-2 to interact with the second sub-magnet 1421-2.

The second driving magnet 1421 may include the first sub-magnet 1421-1 disposed on the first side surface of the holder 1210, and the second sub-magnet 1421-2 disposed on the second side surface of the holder 1210. The second coil 1422 may include the first sub-coil 1422-1 disposed on the board and disposed at a position corresponding to the first sub-magnet 1421-1, and the second sub-coil 1422-2 disposed on the board and disposed at a position corresponding to the second sub-magnet 1421-2.

The reflective member driving device 1000 may include a Hall sensor 1423. In this case, the Hall sensor may be used interchangeably with a second sensor 1423. The Hall sensor 1423 may detect the second driving magnet 1421. The Hall sensor 1423 may detect a magnetic force of the second driving magnet 1421. The Hall sensor 1423 may detect the position of the holder 1210. The Hall sensor 1423 may detect the position of the reflective member 1220. The Hall sensor 1423 may detect the amount of tilting about the y-axis of the holder 1210. Alternatively, the second sensor 1423 may detect a tilting about the second axis of the reflective member 1220. The second sensor 1423 may include a third sub-sensor 1423-1 for detecting the first sub-magnet 1421-1. The second sensor 1423 may include a fourth sub-sensor 1423-2 for detecting the second sub-magnet 1421-2.

The reflective member driving device 1000 may include the yoke 1424. The yoke 1424 may be disposed between the second driving magnet 1421 and the holder 1210. The yoke 1424 may be formed in a shape corresponding to the second driving magnet 1421. The yoke 1424 may increase an interaction force between the second driving magnet 1421 and the second coil 1422.

The reflective member driving device 1000 may include the damper 1500. The damper 1500 may include an adhesive material. The damper 1500 may have viscosity. The damper 1500 may be disposed between the fixed unit 1100 and the moving unit 1200. The damper 1500 may be disposed between the mover rigid 1230 and the housing 1110. The damper 1500 may connect the mover rigid 1230 to the housing 1110. The damper 1500 may be coupled to the mover rigid 1230 and the housing 1110. The damper 1500 may be disposed on the mover rigid 1230. The damper 1500 may be coupled to the mover rigid 1230. The damper 1500 may be coupled to the mover rigid 1230. The mover rigid 1230 may be coupled to housing 1110. The housing 1110 and the mover rigid 1230 may be bonded by the damper 1500.

The damper 1500 may be disposed on at least any one of an upper portion and a lower portion of the first part 1111 of the housing 1110. The damper 1500 may connect the protruding portion 1231 of the mover rigid 1230 to the housing 1110. At least a portion of the damper 1500 may be disposed in the groove 1119 of the housing 1110 between the protruding portion 1231 of the mover rigid 1230 and the housing 1110. At least a portion of the damper 1500 may be disposed in the second groove portion recessed from the first groove portion of the housing 1110.

In the present embodiment, a gel-based bonder that functions as a damper may be applied between the housing 1110 and the mover rigid 1230. Therefore, it is possible to increase the responsiveness of the actuator by maintaining a gain value and securing a phase margin. In other words, it is possible to improve frequency response analyzer (FRA) characteristics. In particular, it is possible to improve the response characteristics of a tilting (pitch) about the x-axis. It is also possible to improve a tilting (yaw) about the y-axis.

The reflective member driving device 1000 may include the buffer member 1600. The buffer member 1600 may be disposed in the housing 1110. The buffer member 1600 may be disposed in the first part 1111 of the housing 1110. As a modified example, the buffer member 1600 may be disposed on the mover rigid 1230. The buffer member 1600 may be an impact absorption member. The buffer member 1600 may be used for impact absorption. The buffer member 1600 may absorb or reduce impacts occurring between the mover rigid 1230 and the housing 1110. The buffer member 1600 may be elastic. The buffer member 1600 may include any one or more of rubber and silicone. The buffer member 1600 may include an impact absorbing stopper made of rubber or silicone. The buffer member 1600 may protrude more than the first part 1111 of the housing 1110. Therefore, when the mover rigid 1230 moves, the mover rigid 1230 first comes into contact with the buffer member 1600 to absorb impacts.

The buffer member 1600 may not come into contact with the mover rigid 1230 within a normal driving range of the mover rigid 1230. The mover rigid 1230 may not come into contact with the buffer member 1600 due to the repulsive force between the first magnet 1240 and the second magnet 1120 within the normal driving range. However, when an external force that overcomes the repulsive force between the first magnet 1240 and the second magnet 1120 acts, the mover rigid 1230 may come into contact with the buffer member 1600. As a modified example, the buffer member 1600 may come into contact with the mover rigid 1230 at an initial position or maximum driving stroke position.

In the first direction in which the first magnet 1240 faces the second magnet 1120, a distance between the mover rigid 1230 and the buffer member 1600 may be smaller than a distance between the first magnet 1240 and the second magnet 1120. In the direction perpendicular to the first surface of the first magnet 1240 facing the second magnet 1120, the distance between the mover rigid 1230 and the buffer member 1600 may be smaller than the distance between the first magnet 1240 and the second magnet 1120. Therefore, when the mover rigid 1230 moves in a direction toward the first part 1111 of the housing 1110, the mover rigid 1230 may come into contact with the buffer member 1600 before coming into contact with the second magnet 1120.

In the first direction, the distance between the mover rigid 1230 and the buffer member 1600 may be smaller than the distance between the mover rigid 1230 and the first part 1111 of the housing 1110. In this case, the first direction may be a direction in which the first magnet 1240 faces the second magnet 1120. When the mover rigid 1230 moves in the first direction, the mover rigid 1230 may come into contact with the buffer member 1600. When the mover rigid 1230 moves in the first direction, the mover rigid 1230 may come into contact with the buffer member 1600. When the mover rigid 1230 moves in the first direction, the mover rigid 1230 may come into contact with the buffer member 1600 disposed in the housing 1110 without being in direct contact with the housing 1110.

In the second direction opposite to the first direction, the buffer member 1600 may protrude more than the second magnet 1120. In this case, the second direction may be a direction in which the second magnet 1120 faces the first magnet 1240. In the second direction opposite to the first direction, the buffer member 1600 may protrude more than the first part 1111 of the housing 1110. Among the second magnet 1120, the first part 1111 of the housing 1110, and the buffer member 1600, which are components overlapping the mover rigid 1230 in the horizontal direction, the buffer member 1600 may the most protrude toward the mover rigid 1230. Therefore, when the mover rigid 1230 moves in the first direction, the mover rigid 1230 may come into contact with the buffer member 1600 rather than the housing 1110 and the second magnet 1120. The horizontal direction may include the first direction and the second direction.

The buffer member 1600 may be spaced apart from the second magnet 1120 in the third direction perpendicular to the first direction. In a fourth direction perpendicular to the first direction and the third direction, the width (see W1 in FIG. 17) of the buffer member 1600 may be greater than the width (see W2 in FIG. 17) of the second magnet 1120. In the third direction, the length of the buffer member 1600 may be smaller than the length of the second magnet 1120. In this case, the first direction may be a rearward direction, the second direction may be a forward direction, the third direction may be a vertical direction, and the fourth direction may be a horizontal direction. The first direction and the second direction may be parallel to the z-axis, the third direction may be parallel to the y-axis, and the fourth direction may be parallel to the x-axis.

The first magnet 1240 may overlap the buffer member 1600 in the first direction. Therefore, the first magnet 1240 may come into contact with the buffer member 1600. However, even in this case, it is possible to reduce the impact applied to the first magnet 1240 and the mover rigid 1230. As a modified example, the first magnet 1240 may not overlap the buffer member 1600 in the first direction.

The buffer member 1600 may be disposed between the mover rigid 1230 and the first part 1111 of the housing 1110. When the mover rigid 1230 moves, the buffer member 1600 may come into contact with the mover rigid 1230 and the first part 1111 of the housing 1110. The buffer member 1600 may be disposed in the first part 1111 of the housing 1110. In this case, when the mover rigid 1230 moves, the mover rigid 1230 may come into contact with the buffer member 1600. As a modified example, the buffer member 1600 may be disposed on the mover rigid 1230. In this case, when the mover rigid 1230 moves, the first part 1111 of the housing 1110 may come into contact with the buffer member 1600.

The buffer member 1600 may include a first buffer member 1610. The first buffer member 1610 may be disposed above the second magnet 1120. The first buffer member 1610 may come into contact with an upper end portion of the mover rigid 1230. The first buffer member 1610 may not overlap the moving plate 1300 in the first direction.

The buffer member 1600 may include a second buffer member 1620. The second buffer member 1620 may be disposed under the second magnet 1120. The second buffer member 1620 may come into contact with a lower end portion of the mover rigid 1230. The second buffer member 1620 may overlap the moving plate 1300 in the first direction.

The reflective member driving device 1000 may include an additional buffer member (not illustrated). The additional buffer member may be disposed at least above and under the mover rigid 1230. When the mover rigid 1230 moves in the third direction, the mover rigid 1230 may come into contact with the additional buffer member. The mover rigid 1230 may be disposed on an upper surface of the protrusion 1118 of the housing 1110. The mover rigid 1230 may be disposed in the groove 1119 of the housing 1110.

Figure 30:
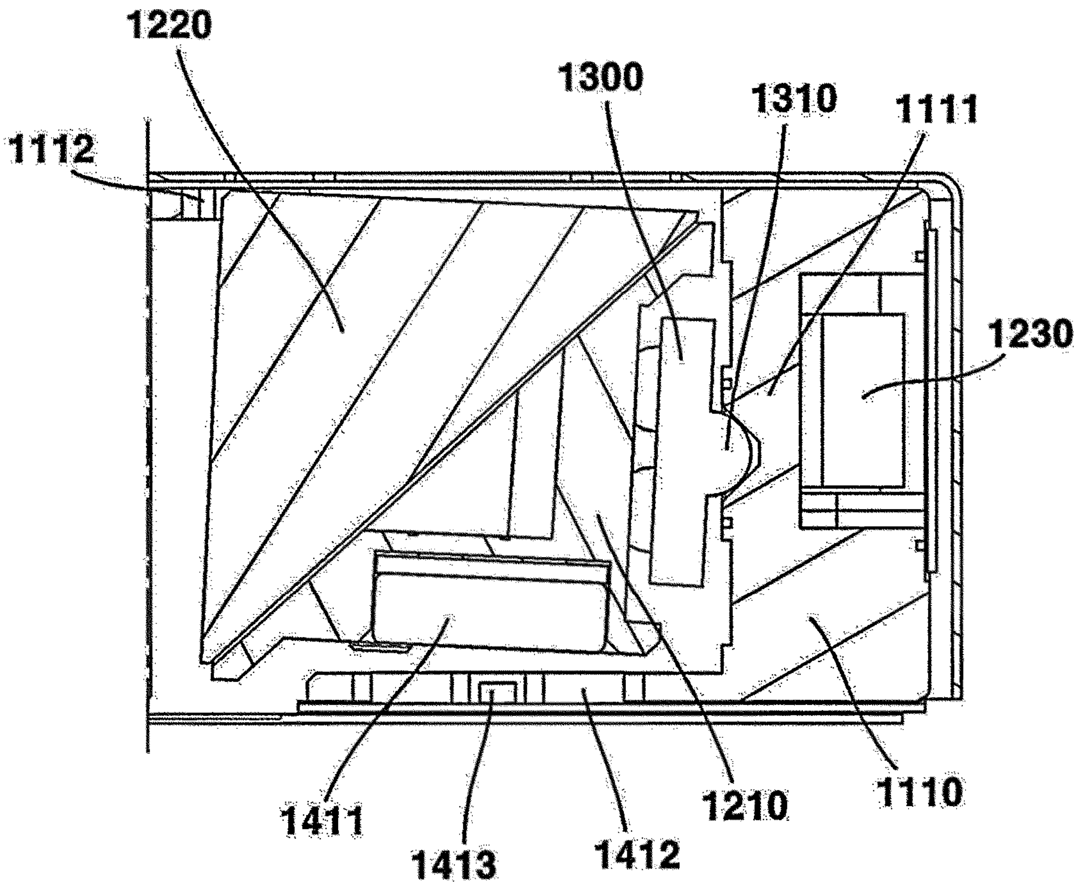
FIGS. 30 and 31 are views for describing a tilting about an x-axis of the reflective member driving device according to the present embodiment.
Figure 31:
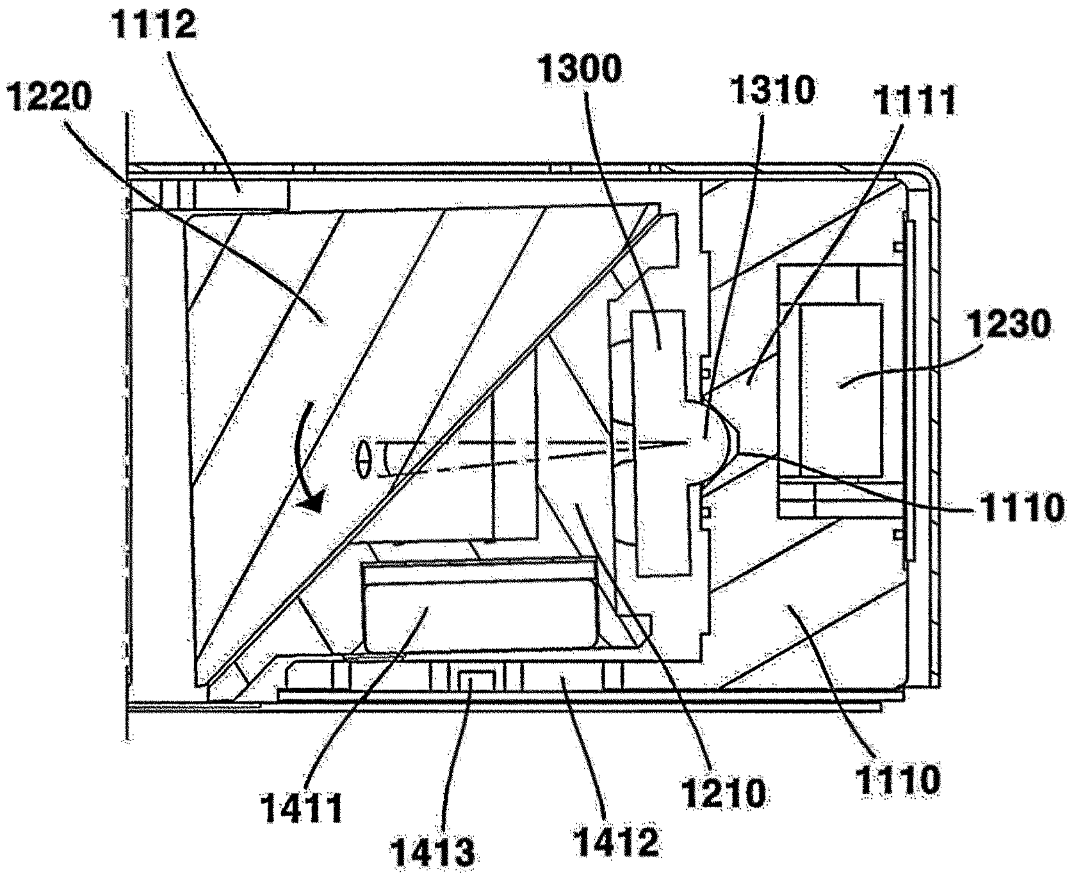

FIGS. 30 and 31 are views for describing a tilting about an x-axis of the reflective member driving device according to the present embodiment.

In the present embodiment, the holder 1210 may be disposed between the upper plate and the lower plate of the housing 1110 in the initial state in which a current is not supplied to the first driving unit 1410. In this case, the holder 1210 may be in state of coming into contact with the upper plate of the housing 1110 (see FIG. 30). Alternatively, the holder 1210 may be in a state of being spaced apart from both the upper plate and the lower plate of the housing 1110.

In this case, when a current in the first direction is applied to the first coil 1412, the holder 1210 may be tilted upward or downward about the first protrusion 1310 of the moving plate 1300 by electromagnetic interaction between the first coil 1412 and the first driving magnet 1411 (see an angle θ in FIG. 31).

Meanwhile, when a current in the second direction opposite to the first direction is applied to the first coil 1412, the holder 1210 may be tilted downward or upward about the first protrusion 1310 of the moving plate 1300 by electromagnetic interaction between the first coil 1412 and the first driving magnet 1411.

In other words, a current is selectively applied to the first coil 1412 in both directions so that the holder 1210 may be tilted vertically about the x-axis with respect to the housing 1110. At this time, since the reflective member 1220 is tilted together with the holder 1210, an optical path may be changed to cancel the shaking detected by the gyro sensor 1150.

In the present embodiment, only the current in the first direction may be used to control the first coil 1412, and the current in a direction opposite to the first direction may not be used. Therefore, it is possible to fundamentally inhibit a problem of removal of the moving plate 1300 that may occur when the current in the second direction is applied to the first coil 1412.

More specifically, as a comparative example, when centers of the first magnet 1240 and the second magnet 1120 are disposed at the same height as the first protrusion 1310 of the moving plate 1300, the moving unit 1200 may slip due to the electromagnetic force and the moving plate 1300 may be removed when the repulsive force between the first magnet 1240 and the second magnet 1120 and the electromagnetic force between the first coil 1412 and the first driving magnet 1411 are not uniform. When the electromagnetic force between the first coil 1412 and the first driving magnet 1411 is greater than the repulsive force between the first magnet 1240 and the second magnet 1120, the moving plate 1300 may be separated due to the occurrence of a phenomenon in which the mover rigid 1230 is moved as much as a gap between the first magnet 1240 and the second magnet 1120. This may cause a poor Hall calibration dynamic characteristic.

In the present embodiment, a center axis of the repulsive force and a center axis of the x-axis driving may be misaligned by a certain distance. Therefore, the reflective member 1220 may be mechanically shifted upward. In this case, the upward direction may be opposite to gravity.

In the present embodiment, code control rather than current control may be performed. In a pivot structure like the present embodiment, since it is difficult to identify an initial position in an open state due to sagging due to gravity, control by a closed method (method in which the moving unit 1200 comes into contact with the fixed unit 1100 in the initial state) may be required. In the present embodiment, it is possible to perform driving more precisely due to the control by the closed method. Furthermore, in the present embodiment, it is also possible to minimize noise generated when the moving unit 1200 moves around by the closed method.

Figure 32:
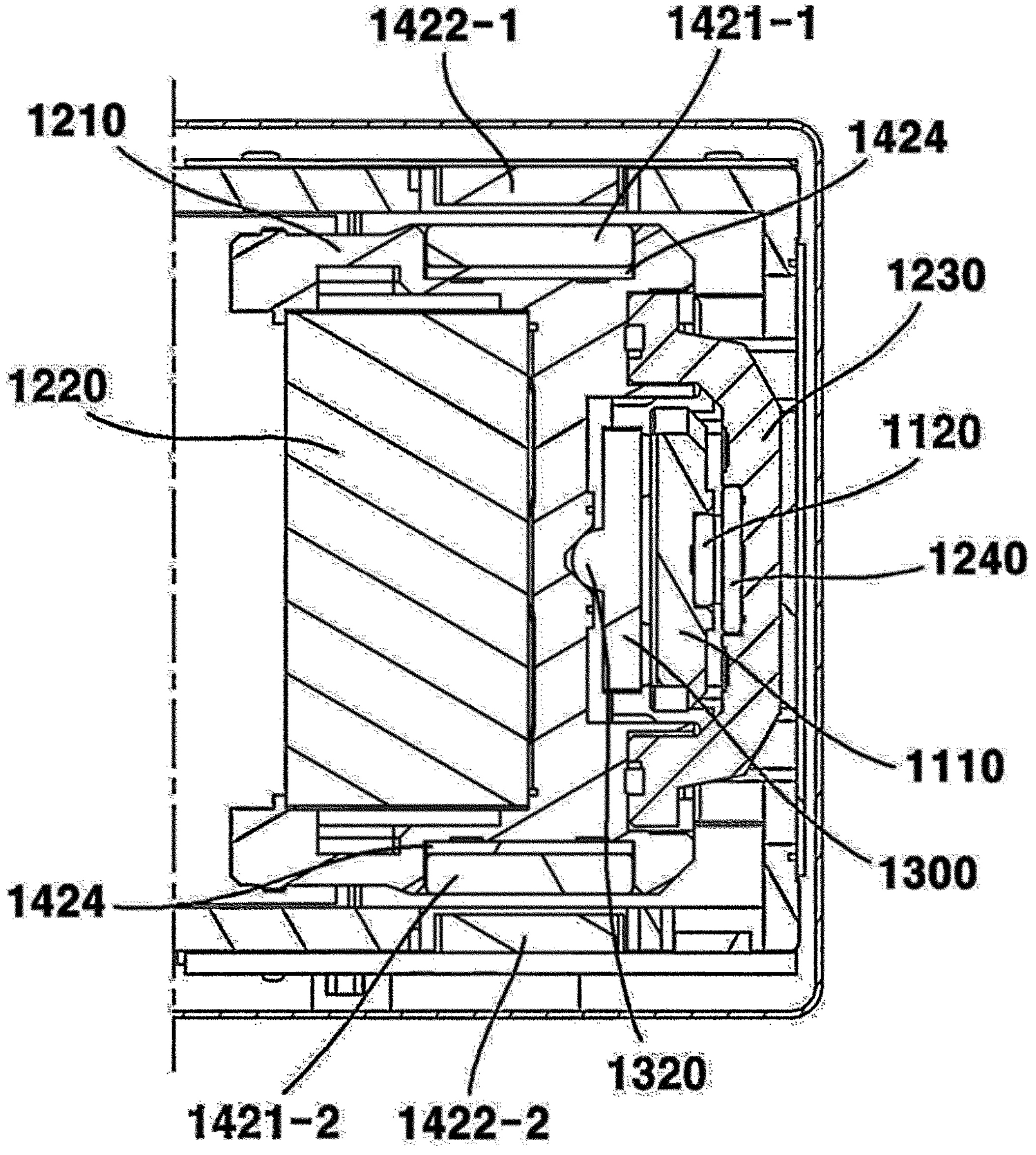
FIGS. 32 to 34 are views for describing a tilting about a y-axis of the reflective member driving device according to the present embodiment.
Figure 33:
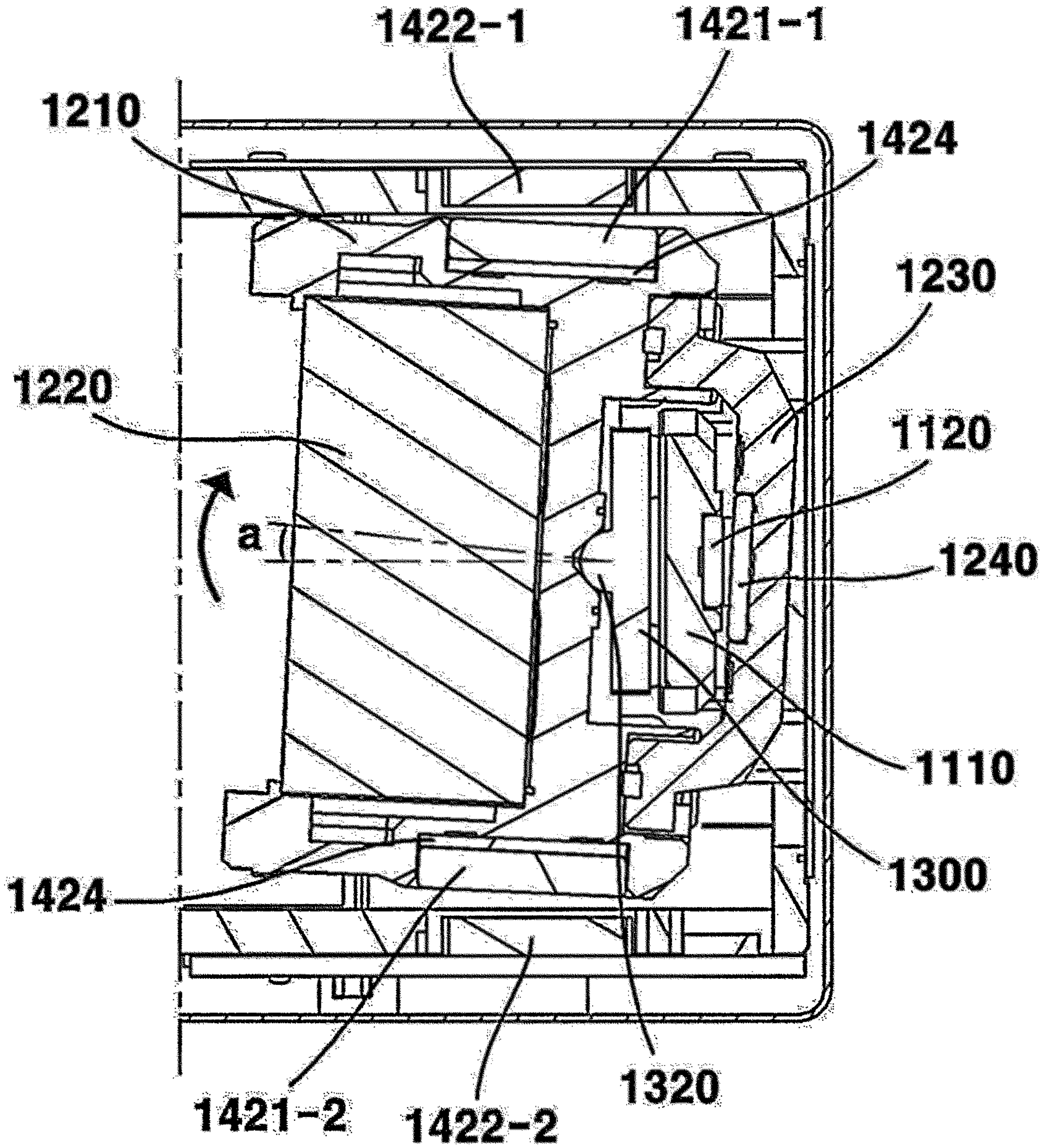
Figure 34:
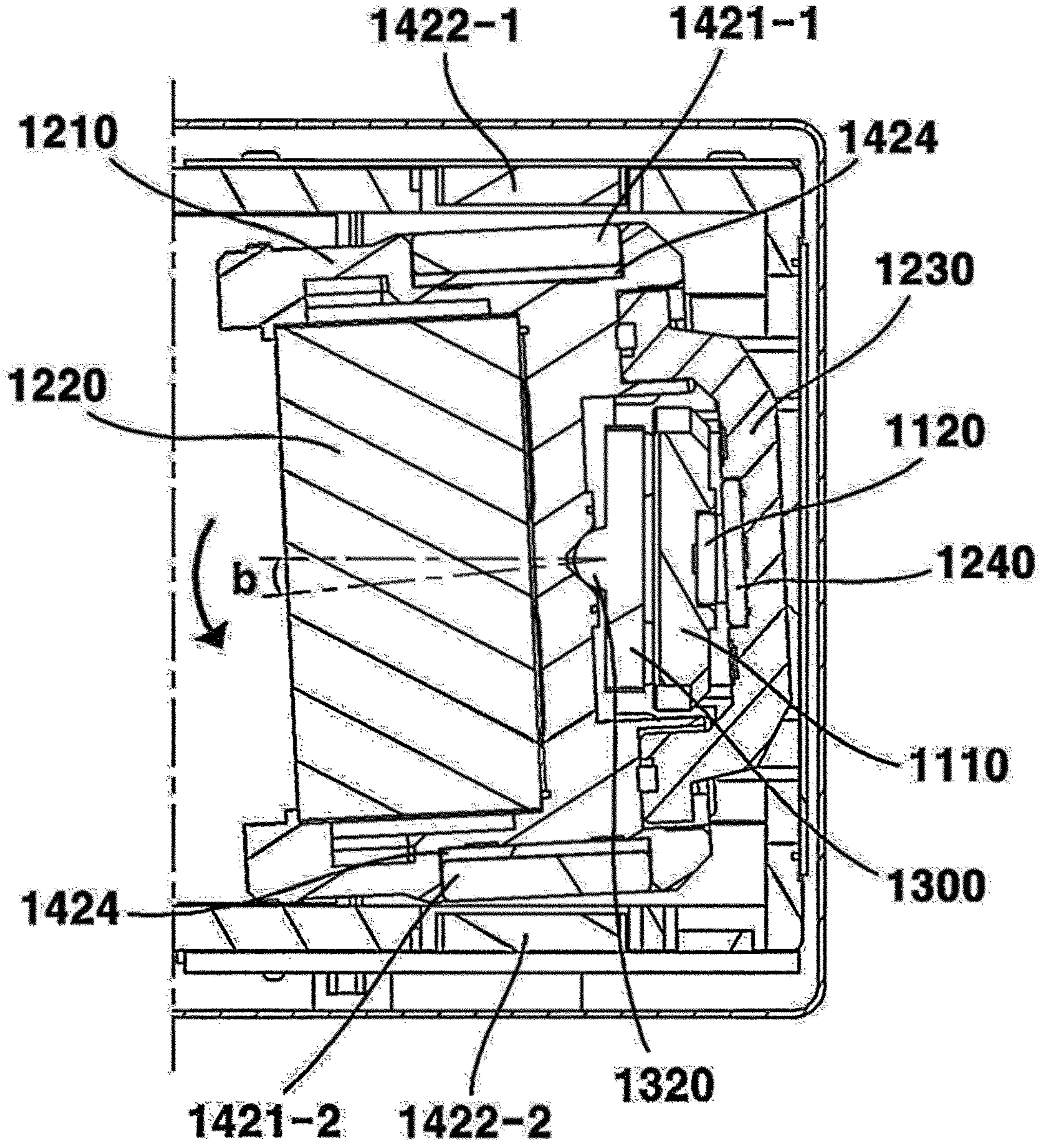

FIGS. 32 to 34 are views for describing a tilting about a y-axis of the reflective member driving device according to the present embodiment.

In the present embodiment, the holder 1210 may be disposed between both side plates of the housing 1110 in the initial state in which a current is not supplied to the second driving unit 1420. In this case, the holder 1210 may be in state of being spaced apart from both side plates of the housing 1110 (see FIG. 32).

In this case, when a current in the first direction is applied to the second coil 1422, the holder 1210 may be tilted to one side about the second protrusion 1320 of the moving plate 1300 by electromagnetic interaction between the second coil 1422 and the second driving magnet 1421 (see a in FIG. 33).

Meanwhile, when a current in the second direction opposite to the first direction is applied to the second coil 1422, the holder 1210 may be tilted to the other side about the second protrusion 1320 of the moving plate 1300 by electromagnetic interaction between the second coil 1422 and the second driving magnet 1421 (see b in FIG. 34).

In other words, a current is selectively applied to the second coil 1422 in both directions so that the holder 1210 may be tilted horizontally about the y-axis with respect to the housing 1110. At this time, since the reflective member 1220 is tilted together with the holder 1210, an optical path may be changed to cancel the shaking detected by the gyro sensor 1150. Therefore, in the present embodiment, it is possible to perform an OIS on the x-axis tilting and the y-axis tilting, that is, the two-axis tilting.

Hereinafter, a lens driving device according to the present embodiment will be described with reference to the drawings.

Figure 35:
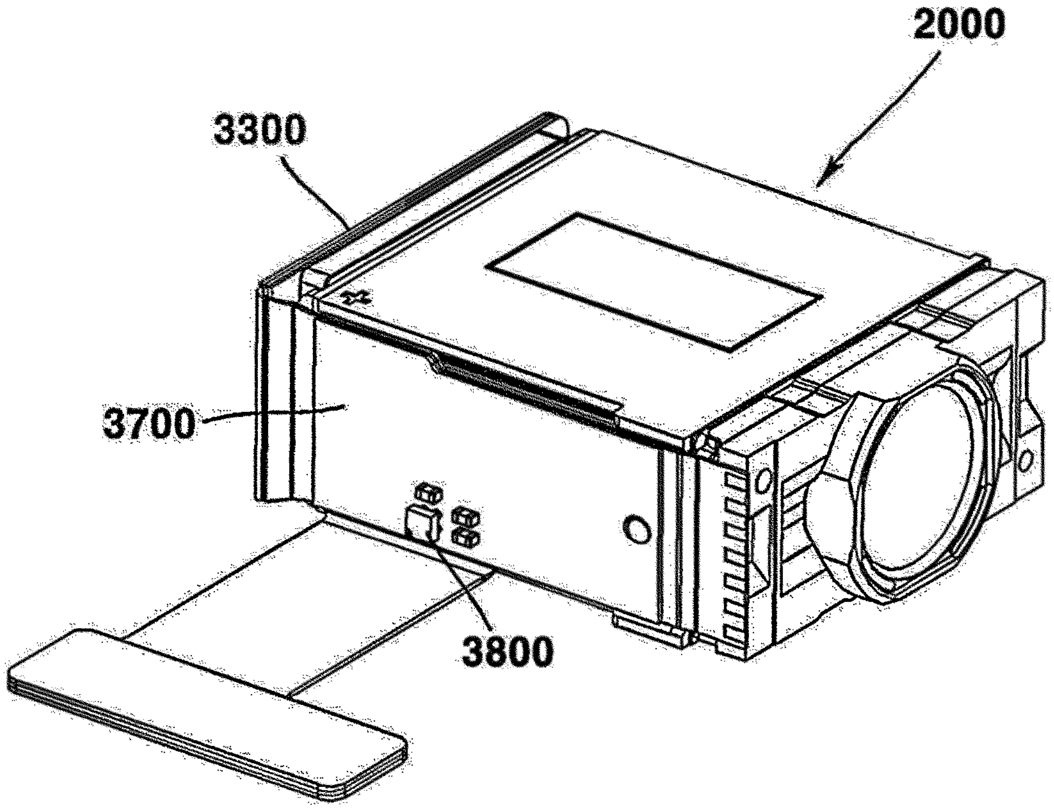
FIG. 35 is a perspective view of a lens driving device according to the present embodiment.
Figure 36:
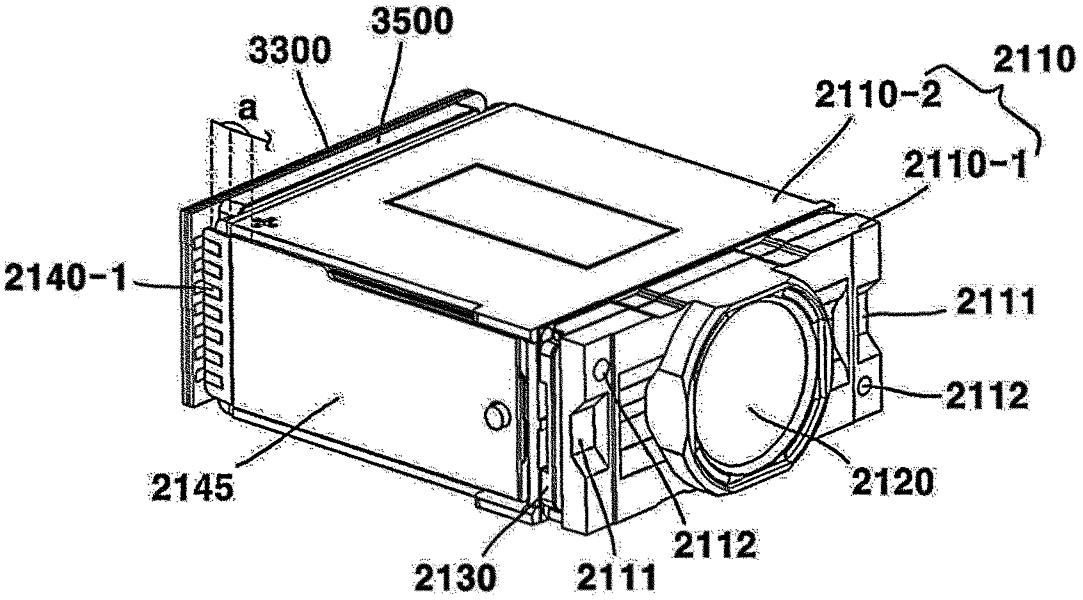
FIG. 36 is a perspective view of the lens driving device according to the present embodiment from which some components are omitted.
Figure 37:
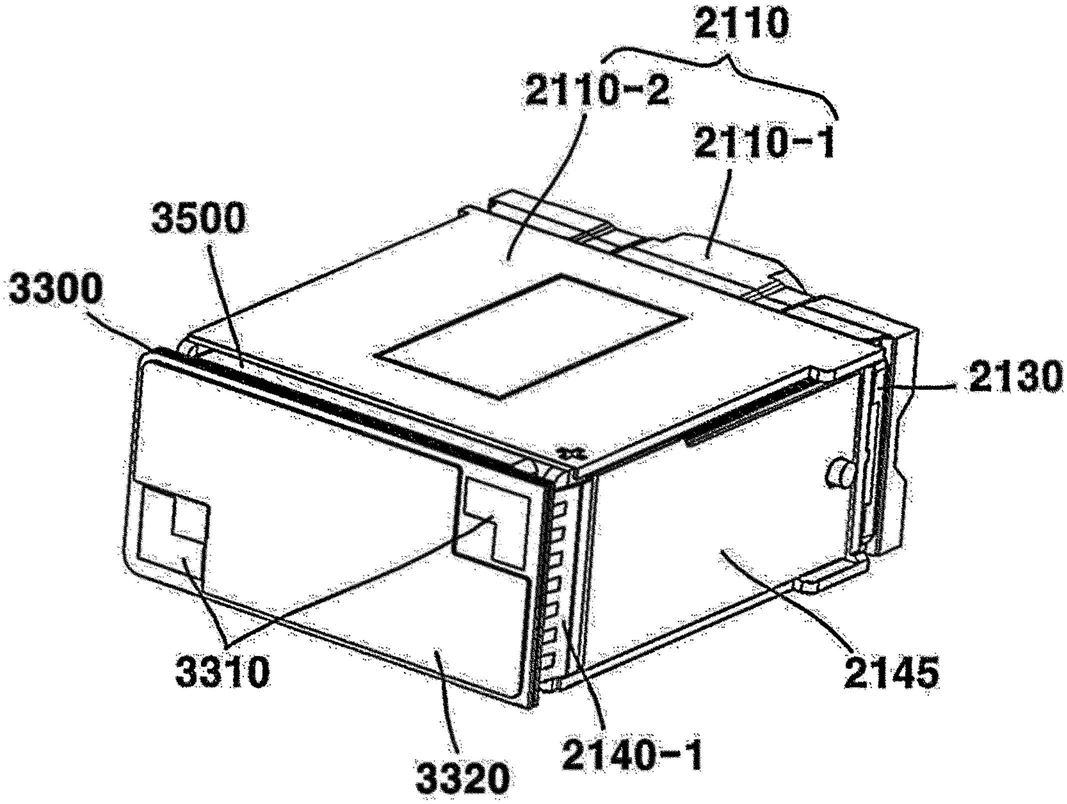
FIG. 37 is a perspective view of the lens driving device in the state illustrated in FIG. 36 in another direction.
Figure 38:
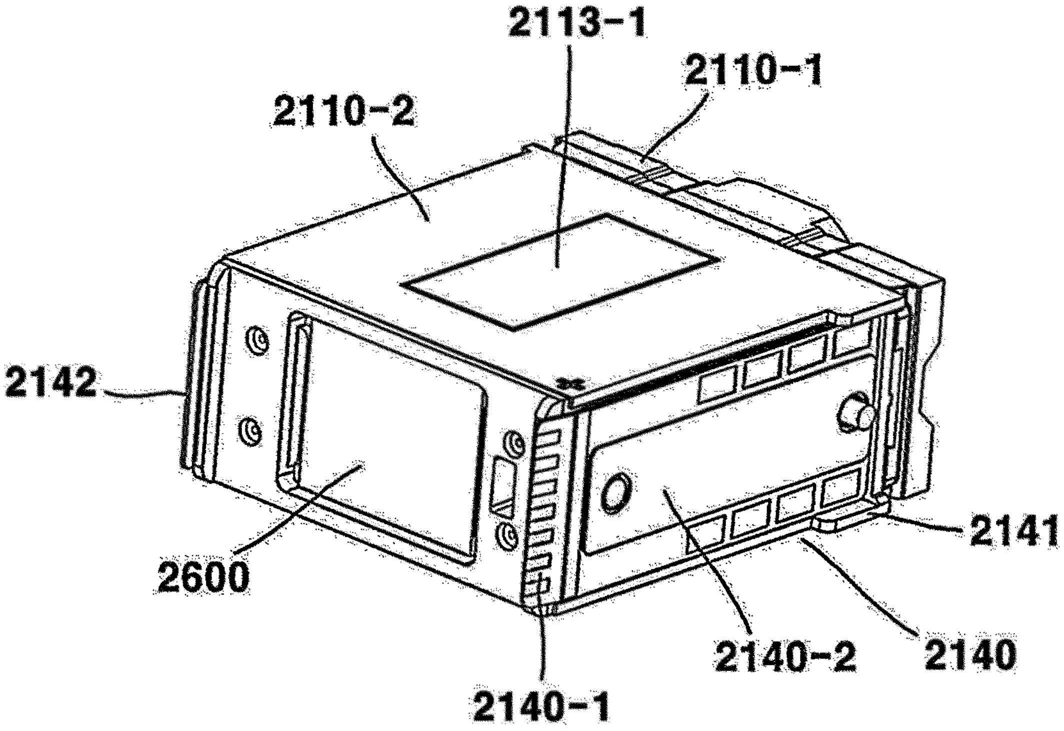
FIG. 38 is a perspective view of the lens driving device according to the present embodiment from which some components are omitted.
Figure 39:
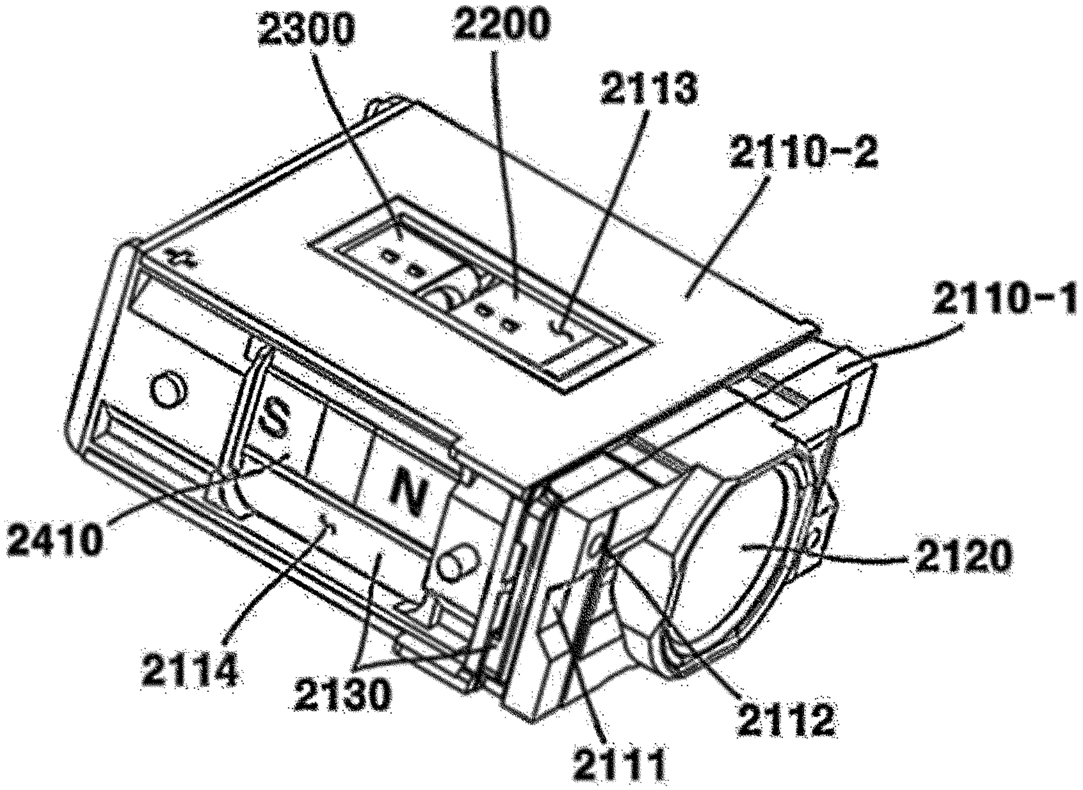
FIG. 39 is a perspective view of a state in which components, such as a board and a coil, are omitted from the lens driving device according to the present embodiment.
Figure 40:
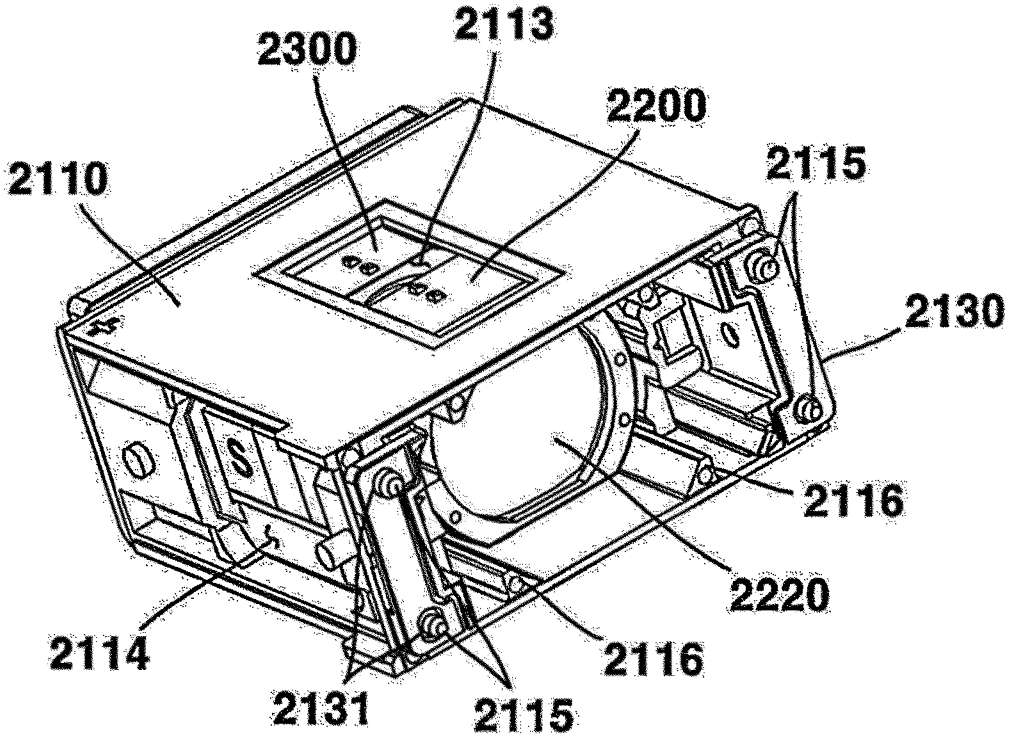
FIG. 40 is a perspective view of a state in which components related to a first lens are omitted from the lens driving device in the state illustrated in FIG. 39.
Figure 41:
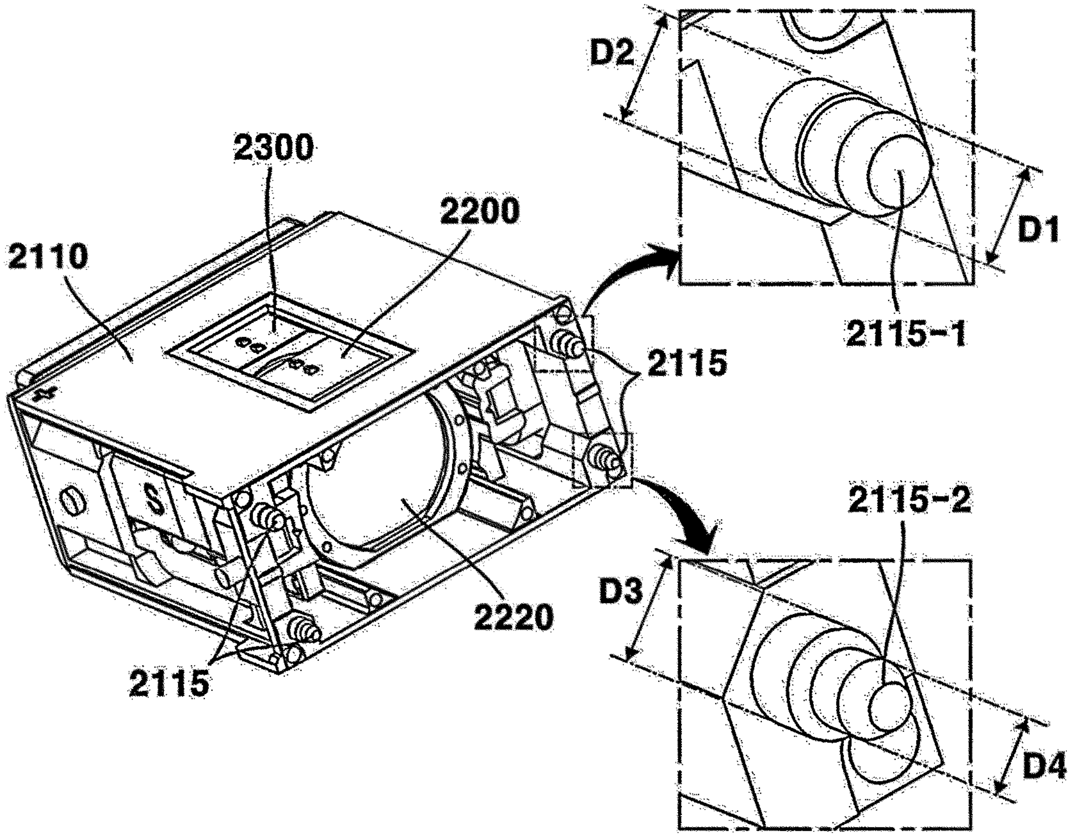
FIG. 41 is a perspective view and a partially enlarged view of some components of the lens driving device according to the present embodiment.
Figure 42:
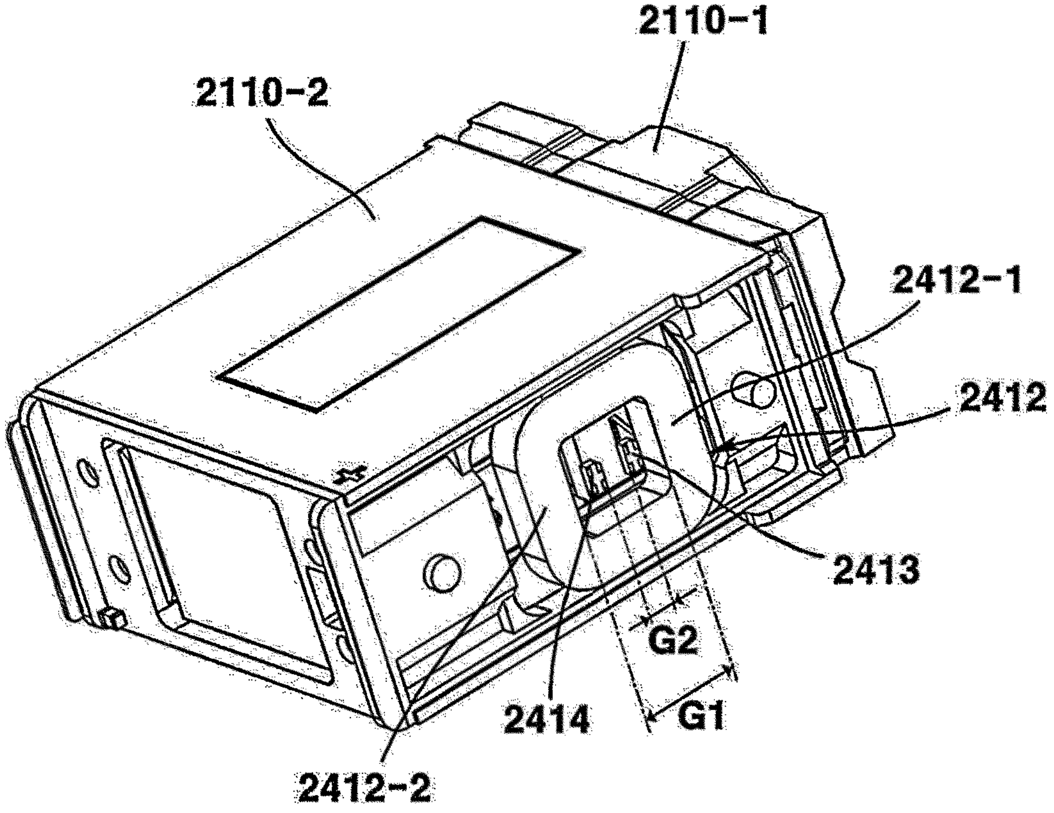
FIG. 42 is a view for describing an arrangement structure of the coil and a sensor of the lens driving device according to the present embodiment.
Figure 43:
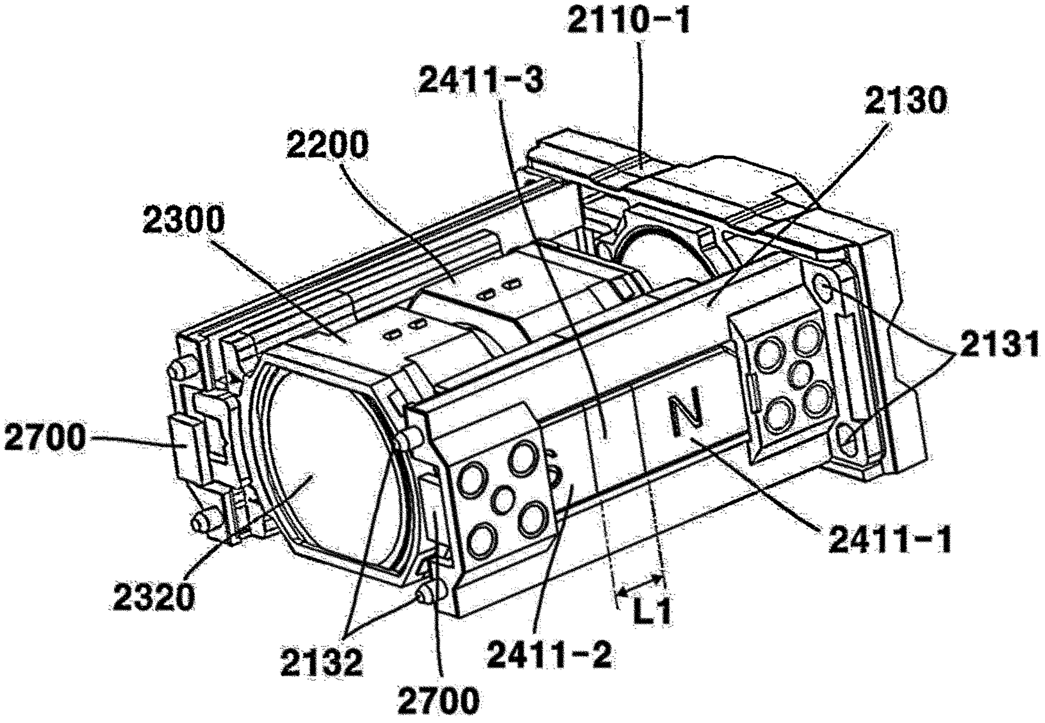
FIG. 43 is a perspective view of a state in which a second housing is omitted from the lens driving device in the state illustrated in FIG. 39.
Figure 44:
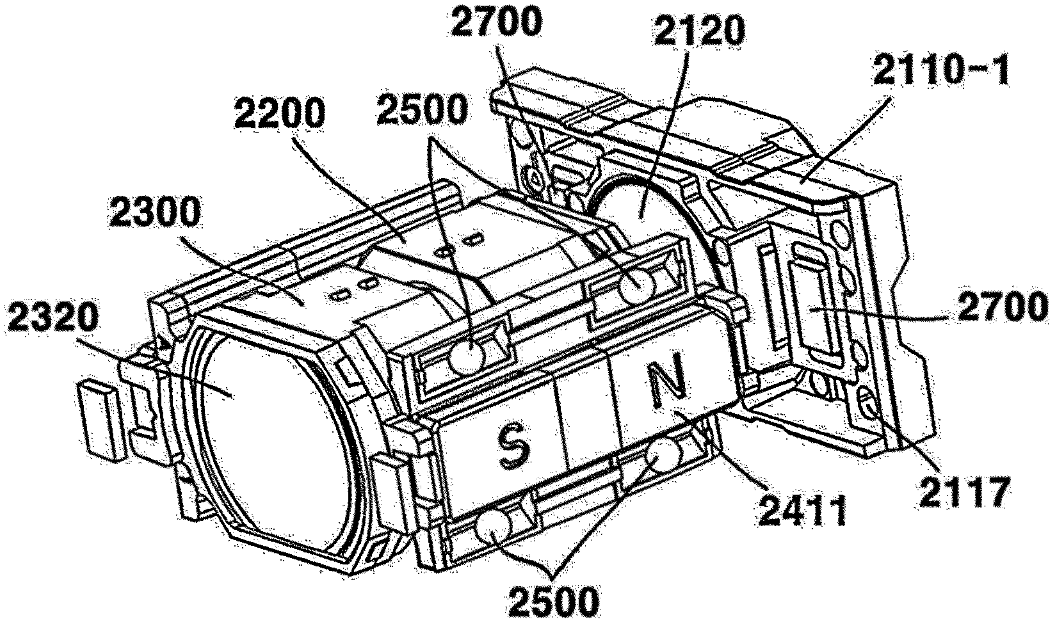
FIG. 44 is a perspective view of a state in which a guide rail is omitted from the lens driving device in the state illustrated in FIG. 43.
Figure 45:
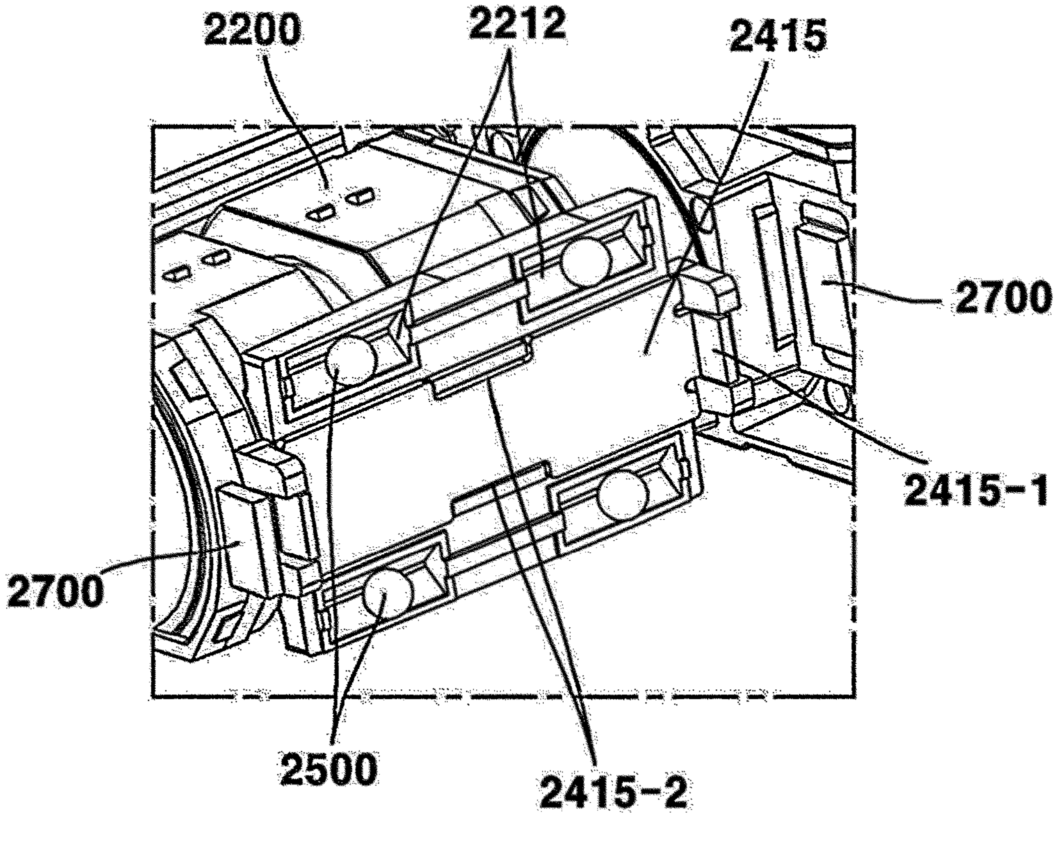
FIG. 45 is an enlarged view of some components of the lens driving device according to the present embodiment.
Figure 46:
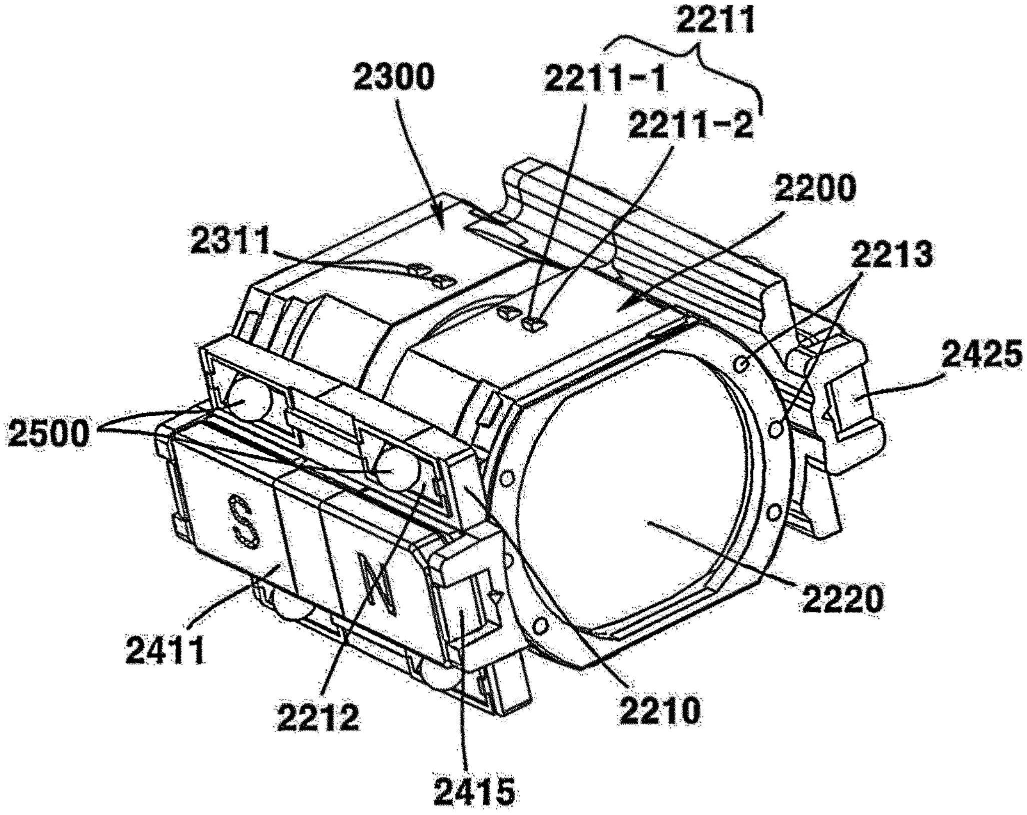
FIG. 46 is a perspective view of a first moving unit, a second moving unit, and related components of the lens driving device according to the present embodiment.
Figure 47:
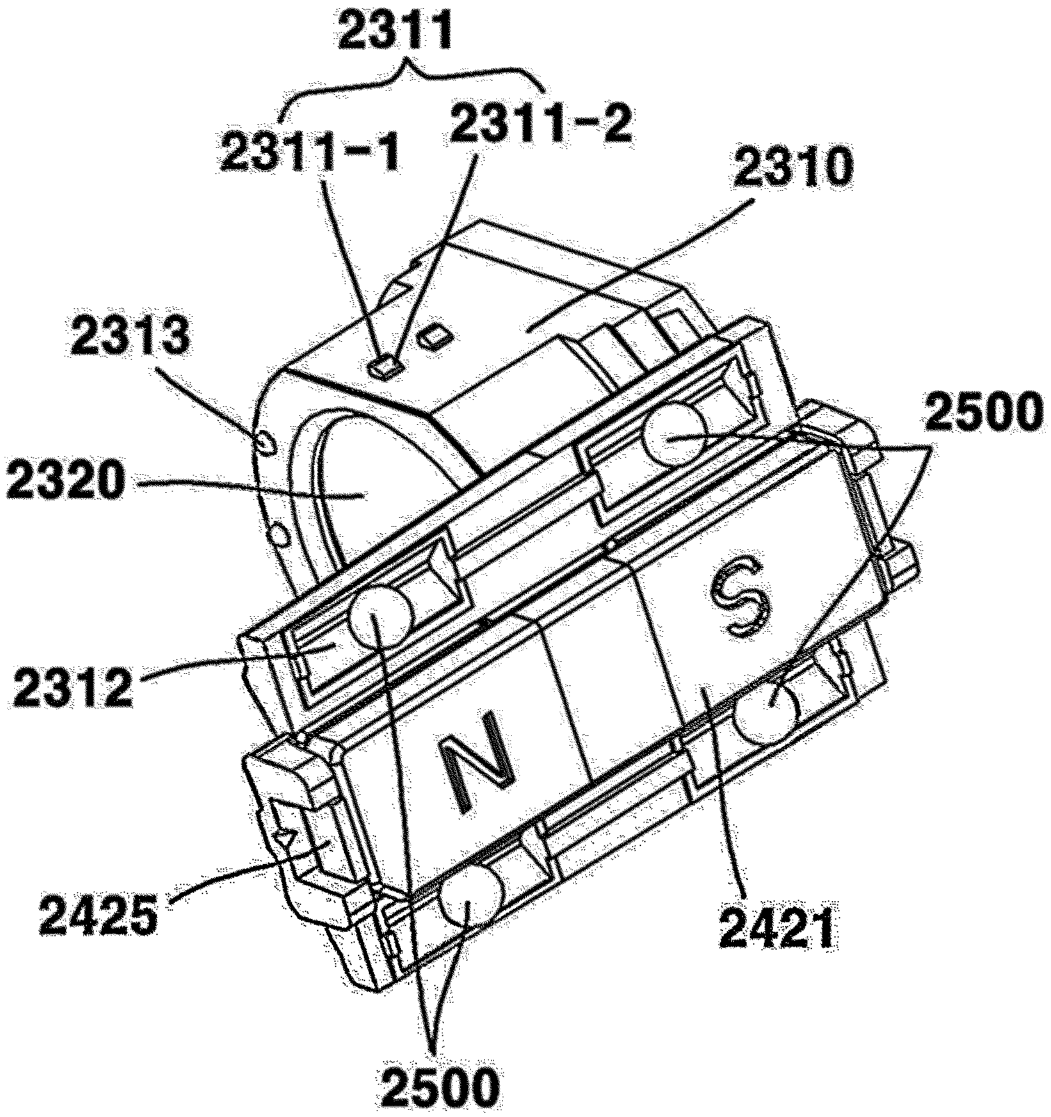
FIG. 47 is a perspective view of the second moving unit and the related components of the lens driving device according to the present embodiment.
Figure 48:
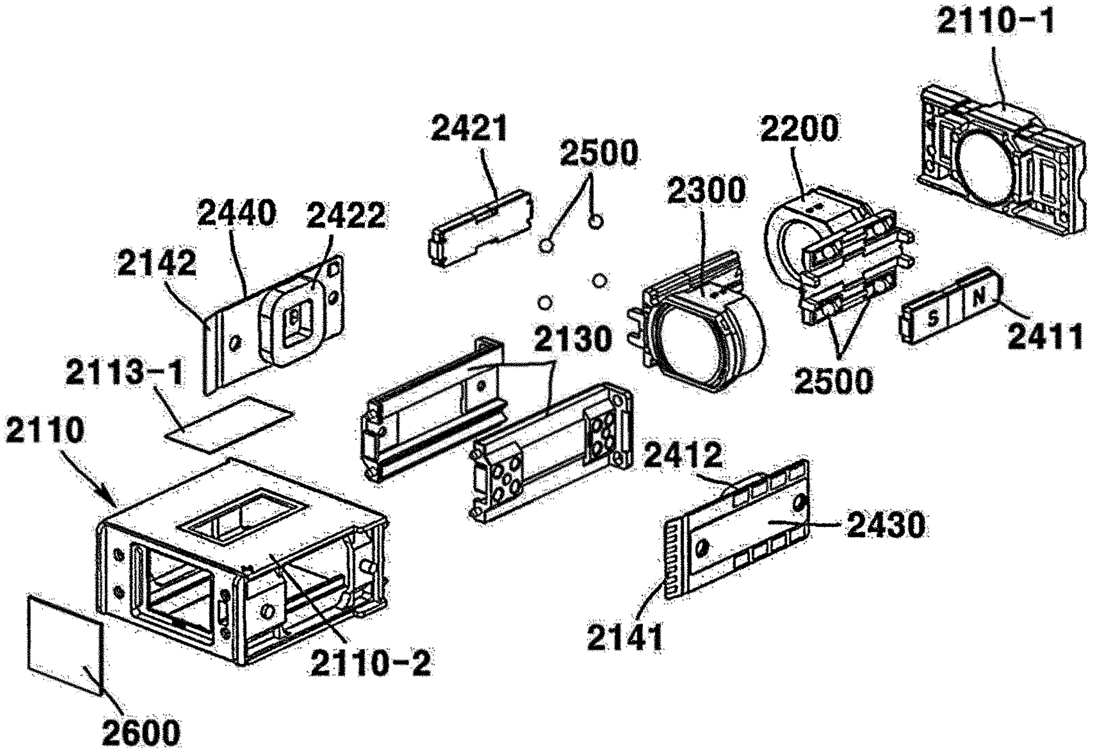
FIG. 48 is an exploded perspective view of the lens driving device according to the present embodiment.
Figure 49:
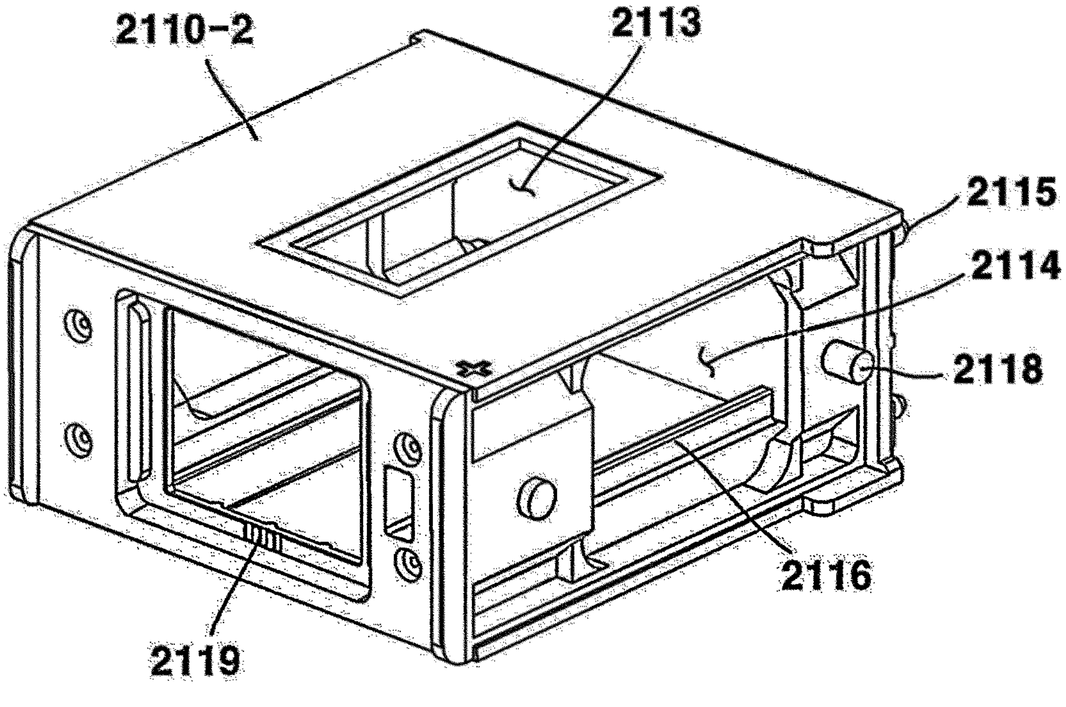
FIG. 49 is a perspective view of the second housing of the lens driving device according to the present embodiment.
Figure 50:
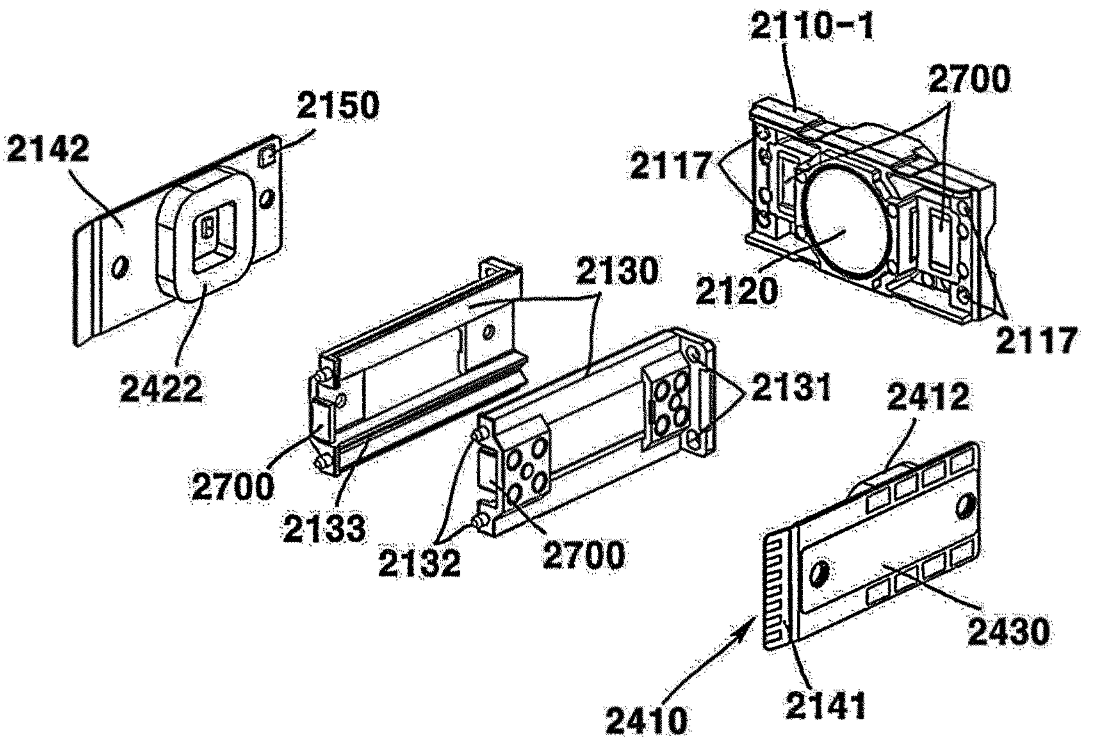
FIGS. 50 and 51 are exploded perspective views of some components of the lens driving device according to the present embodiment.
Figure 51:
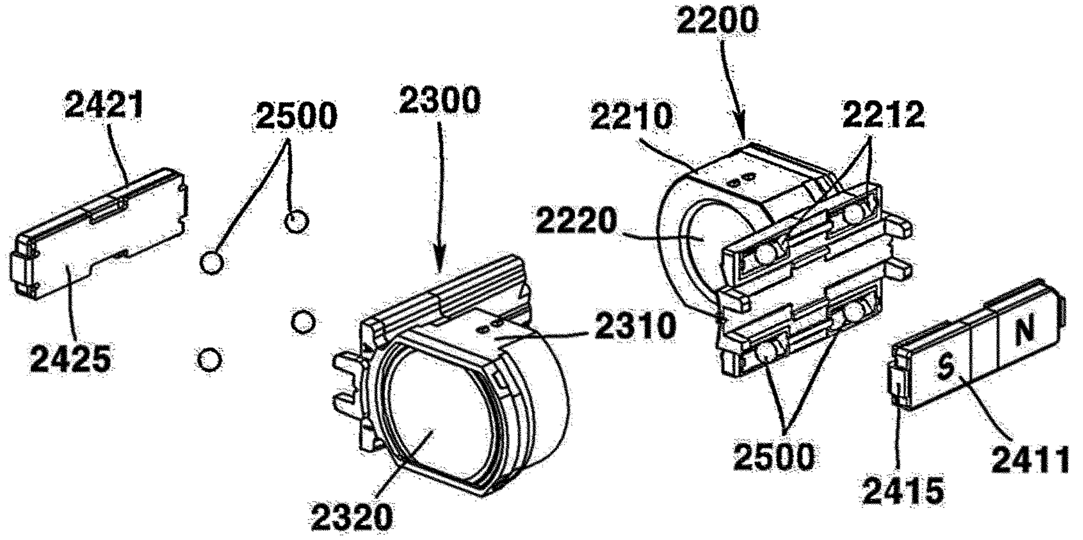
Figure 52:
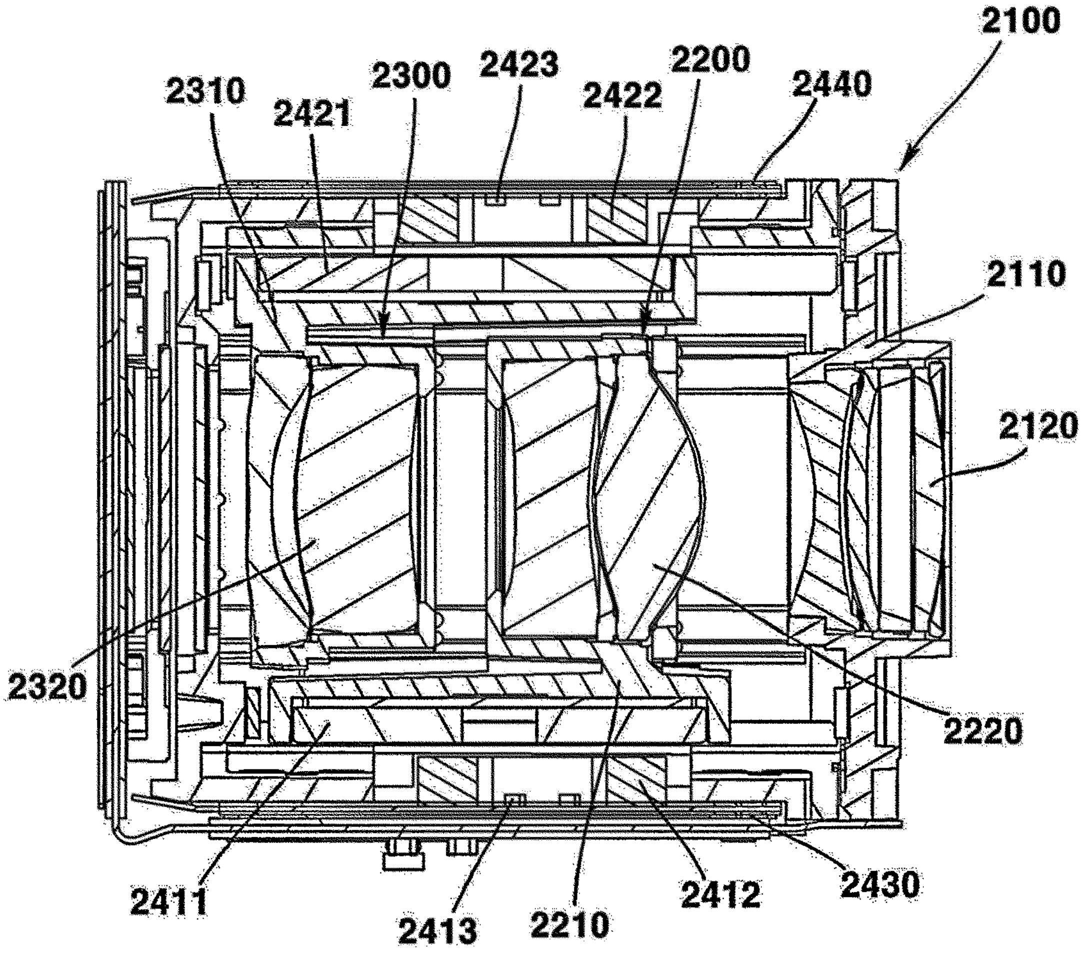
FIG. 52 is a cross-sectional view of the lens driving device according to the present embodiment.

FIG. 35 is a perspective view of a lens driving device according to the present embodiment, FIG. 36 is a perspective view of the lens driving device according to the present embodiment from which some components are omitted, FIG. 37 is a perspective view of the lens driving device in the state illustrated in FIG. 36 in another direction, FIG. 38 is a perspective view of the lens driving device according to the present embodiment from which some components are omitted, FIG. 39 is a perspective view of a state in which components, such as a board and a coil, are omitted from the lens driving device according to the present embodiment, FIG. 40 is a perspective view of a state in which components related to a first lens are omitted from the lens driving device in the state illustrated in FIG. 39, FIG. 41 is a perspective view and a partially enlarged view of some components of the lens driving device according to the present embodiment, FIG. 42 is a view for describing an arrangement structure of the coil and a sensor of the lens driving device according to the present embodiment, FIG. 43 is a perspective view of a state in which a second housing is omitted from the lens driving device in the state illustrated in FIG. 39, FIG. 44 is a perspective view of a state in which a guide rail is omitted from the lens driving device in the state illustrated in FIG. 43, FIG. 45 is an enlarged view of some components of the lens driving device according to the present embodiment, FIG. 46 is a perspective view of a first moving unit, a second moving unit, and related components of the lens driving device according to the present embodiment, FIG. 47 is a perspective view of the second moving unit and the related components of the lens driving device according to the present embodiment, FIG. 48 is an exploded perspective view of the lens driving device according to the present embodiment, FIG. 49 is a perspective view of the second housing of the lens driving device according to the present embodiment, FIGS. 50 and 51 are exploded perspective views of some components of the lens driving device according to the present embodiment, and FIG. 52 is a cross-sectional view of the lens driving device according to the present embodiment.

The lens driving device 2000 may perform a zooming function. The lens driving device 2000 may perform a continuous zooming function. The lens driving device 2000 may perform an auto focusing (AF) function. The lens driving device 2000 may move a lens. The lens driving device 2000 may move the lens along the optical axis. The lens driving device 2000 may move lenses, which are formed in a plurality of groups, for each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zooming actuator. The lens driving device 2000 may include a voice coil motor (VCM).

The lens driving device 2000 may include the lens. Alternatively, the lens may be described as one component of the camera device 10 rather than one component of the lens driving device 2000. The lens may be disposed in an optical path formed by the reflective member 1220 of the reflective member driving device 1000 and the image sensor 3400. The lens may include a plurality of lenses. The plurality of lenses may form a plurality of groups. The lenses may form three groups. The lenses may include first to third group lenses. The first group lens, the second group lens, and the third group lens may be sequentially disposed between the reflective member 1220 and the image sensor 3400. The first group lens may include a first lens 2120. The second group lens may include a second lens 2220. The third group lens may include a third lens 2320.

The lens driving device 2000 may include a fixed unit 2100. The fixed unit 2100 may be a relatively fixed unit when a first moving unit 2200 and a second moving unit 2300 move.

The lens driving device 2000 may include a housing 2110. The fixed unit 2100 may include the housing 2110. The housing 2110 may be disposed outside a first holder 2210 and a second holder 2310. The housing 2110 may accommodate at least portions of the first holder 2210 and the second holder 2310. The housing 2110 may include a front plate, a rear plate, and a plurality of connecting plates. In this case, the front plate may be referred to as an upper plate, the rear plate may be referred to as a lower plate, and the connecting plate may be referred to as a side plate.

The housing 2110 may include a first housing 2110-1. The first housing 2110-1 may form the front plate of the housing 2110. The first housing 2110-1 may be coupled to the first lens 2120. The first housing 2110-1 may be a cover. The first housing 2110-1 may be coupled to the reflective member driving device 1000. The first lens 2120 may be fixed to the first housing 2110-1.

The housing 2110 may include a second housing 2110-2. The second housing 2110-2 may form the rear plate and the connecting plate of the housing 2110. The second housing 2110-2 may be open forward. The first housing 2110-1 may be coupled to the front of the second housing 2110-2. A portion of a guide rail 2130 may be disposed between the first housing 2110-1 and the second housing 2110-2.

The housing 2110 may include the first grooves 2111. The first groove 2111 may be coupled to the protruding portion of the housing 1110 of the reflective member driving device 1000. The first groove 2111 may be formed in a shape corresponding to the protruding portion of the reflective member driving device 1000. An adhesive for coupling the reflective member driving device 1000 to the lens driving device 2000 may be disposed in the first groove 2111.

The housing 2110 may include the second groove 2112. The second groove 2112 may be coupled to the protrusion of the housing 1110 of the reflective member driving device 1000. The protrusion of the reflective member driving device 1000 may be inserted into the second groove 2112. The second groove 2112 may be formed in a shape corresponding to the protrusion of the reflective member driving device 1000. An adhesive for coupling the reflective member driving device 1000 to the lens driving device 2000 may be disposed in the second groove 2112.

The housing 2110 may include a first hole 2113. A protrusion 2211 of the first holder 2210 and a protrusion 2311 of the second holder 2310 may be exposed through the first hole 2113. The first hole 2113 may be formed in the connecting plate of the housing 2110. In a test stage during manufacturing, it is possible to check whether the lens driving device 2000 is operated normally by checking the protrusion 2211 of the first holder 2210 and the protrusion 2311 of the second holder 2310 exposed through the first hole 2113.

The housing 2110 may include a plate 2113-1. The plate 2113-1 may cover the first hole 2113. The plate 2113-1 may be disposed above the first hole 2113 to close the first hole 2113.

The housing 2110 may include a second hole 2114. The second hole 2114 may be a coil accommodating hole in which a first coil 2412 and a second coil 2422 are disposed. The first coil 2412 and the second coil 2422 may be disposed in the second hole 2114. The second hole 2114 may be formed to be greater than the first coil 2412 and the second coil 2422.

The housing 2110 may include protrusions 2115. The protrusion 2115 may be formed in the second housing 2110-2. The protrusion 2115 may be formed as a two-stage protrusion. The protrusion 2115 may be coupled to the guide rail 2130. The protrusion 2115 may be coupled to the first housing 2110-1. The guide rail 2130 may be coupled to a portion of the protrusion 2115 with a large diameter, and the first housing 2110-1 may be coupled to a portion of the protrusion 2115 with a small diameter.

The protrusion 2115 may include a first protrusion 2115-1. The first protrusion 2115-1 may include a first part having a first diameter D2, and a second part protruding from the first part and having a second diameter D1. The protrusion 2115 may include a second protrusion 2115-2. The second protrusion 2115-2 may include a third part having a third diameter D3, and a fourth part protruding from the third part and having a fourth diameter D4. In this case, the fourth diameter D4 may be smaller than the second diameter D1. Therefore, the first protrusion 2115-1 may be more tightly coupled to the first housing 2110-1 than the second protrusion 2115-2 is.

The housing 2110 may include a guide protrusion 2116. The guide protrusion 2116 may be formed on an inner surface of the housing 2110. The guide protrusion 2116 may be formed in a shape corresponding to the shapes of at least portions of the first holder 2210 and the second holder 2310. Therefore, the guide protrusion 2116 may guide the movement of the first holder 2210 and the second holder 2310 in the optical axis direction. In this case, the optical axis direction may be the z-axis direction perpendicular to the x-axis and the y-axis. The guide protrusion 2116 may be disposed in the optical axis direction. The guide protrusion 2116 may extend in the optical axis direction.

The housing 2110 may include grooves 2117. The groove 2117 may be formed in the first housing 2110-1. The groove 2117 of the first housing 2110-1 may be coupled to the protrusion 2115 of the second housing 2110-2.

The housing 2110 may include protrusions 2118. The protrusion 2118 may be coupled to a board 2140. The protrusion 2118 may be inserted into a groove of the board 2140. The protrusion 2118 may be formed in a corresponding size and shape to fit into the groove of the board 2140.

The housing 2110 may include a vent hole 2119. The vent hole 2119 may be formed in the rear plate of the housing 2110. The vent hole 2119 may form a gap between the housing 2110 and a dummy glass 2600. Air may flow through the gap between the housing 2110 and the dummy glass 2600. A gas generated in a curing process of the adhesive may be discharged through the vent hole 2119.

The lens driving device 2000 may include the first lens 2120. Alternatively, the first lens 2120 may be described as one component of the camera device 10 rather than one component of the lens driving device 2000. The fixed unit 2100 may include the first lens 2120. The first lens 2120 may be disposed on the optical axis. The first lens 2120 may be disposed between the reflective member 1220 and the image sensor 3400. The first lens 2120 may be disposed between the reflective member 1220 and the second lens 2220. The first lens 2120 may be disposed in the first housing 2110-1. The first lens 2120 may be fixed to the first housing 2110-1. The first lens 2120 may maintain a fixed state even when the second lens 2220 and the third lens 2320 move.

The first lens 2120 may be the first group lens. The first lens 2120 may include a plurality of lenses. The first lens 2120 may include three lenses.

The lens driving device 2000 may include the guide rail 2130. The fixed unit 2100 may include the guide rail 2130. The guide rail 2130 may be coupled between the first housing 2110-1 and the second housing 2110-2. The guide rail 2130 may guide the movement of the first holder 2210 and the second holder 2310. The guide rail 2130 may guide the first holder 2210 and the second holder 2310 to move in the optical axis direction. The guide rail 2130 may include a rail disposed in the optical axis direction. The guide rail 2130 may include a rail extending in the optical axis direction. The guide rail 2130 may include a rail formed so that a ball 2500 rolls.

The lens driving device 2000 may include the board 2140. The fixed unit 2100 may include the board 2140. The board 2140 may be disposed on each of both side surfaces of the housing 2110. The board 2140 may be a flexible printed circuit board (FPCB). The first coil 2412 and the second coil 2422 may be disposed on the board 2140.

The board 2140 may include a first region 2140-1. The first region 2140-1 may be formed at an end of the board 2140. A terminal may be disposed in the first region 2140-1. The board 2140 may include a second region 2140-2. The first region 2140-1 of the board 2140 may be bent inward with respect to the second region 2140-2. Therefore, it is possible to minimize a size of a PCB 3300 while securing a soldering arrangement region for connecting the terminal of the board 2140 to the PCB 3300. The first region 2140-1 may form an obtuse angle with the second region 2140-2.

The board 2140 may include a first board 2141. The first board 2141 may be disposed at one side of the housing 2110. The first coil 2412 may be disposed on the first board 2141.

First and second Hall sensors 2413 and 2414 may be disposed on the first board 2141.

The board 2140 may include a second board 2142. The second board 2142 may be disposed at the other side of the housing 2110. The second board 2142 may be disposed at a side opposite to the first board 2141. The second coil 2422 may be disposed on the second board 2142. Third and fourth Hall sensors 2423 and 2424 may be disposed on the second board 2142.

The lens driving device 2000 may include a SUS 2145. The SUS 2145 may be disposed on the board 2140. The SUS 2145 may reinforce the strength of the board 2140. The SUS 2145 may emit heat generated from the board 2140.

The lens driving device 2000 may include an electrically erasable programmable read-only memory (EEPROM) 2150. The EEPROM 2150 may be electrically connected to the first coil 2412 and the second coil 2422. The EEPROM 2150 may be used to control the current applied to the first coil 2412 and the second coil 2422 before connecting the lens driving device 2000 to a driver IC 3900 in the manufacturing stage. In other words, the EEPROM 2150 may be used to test whether the lens driving device 2000 is operated normally. The EEPROM 2150 may be disposed on an inner surface of the board 2140.

The lens driving device 2000 may include a first moving unit 2200. The first moving unit 2200 may move with respect to the fixed unit 2100. At least a portion of the first moving unit 2200 may be disposed between the fixed unit 2100 and the second moving unit 2300. The first moving unit 2200 may move between the fixed unit 2100 and the second moving unit 2300.

The lens driving device 2000 may include the first holder 2210. The first moving unit 2200 may include the first holder 2210. The first holder 2210 may be disposed in the housing 2110. The first holder 2210 may move with respect to the housing 2110. At least a portion of the first holder 2210 may be spaced apart from the housing 2110. The first holder 2210 may come into contact with the housing 2110. The first holder 2210 may come into contact with the housing 2110 when moving. Alternatively, the first holder 2210 may come into contact with the housing 2110 in the initial state.

The first holder 2210 may include a protrusion 2211. The protrusion 2211 may be a test protrusion. The protrusion 2211 may be formed on an outer surface of the first holder 2210. The protrusion 2211 may protrude from the first holder 2210. The protrusion 2211 may be visible from the outside through the first hole 2113 of the housing 2110. The protrusion 2211 may be used at the time of testing whether the lens driving device 2000 is operated normally. The protrusion 2211 may include a flat surface 2211-1 and an inclined surface 2211-2.

The first holder 2210 may include a rail groove 2212. The ball 2500 may be disposed in the rail groove 2212. The ball 2500 may roll in the rail groove 2212. The rail groove 2212 and the ball 2500 may come into contact with each other at two points. The rail groove 2212 may be disposed in the optical axis direction. The rail groove 2212 may extend in the optical axis direction.

The rail groove 2212 may include a plurality of rail grooves. The rail groove 2212 may include four rail grooves. The rail groove 2212 may include first to fourth rail grooves. One or more balls 2500 may be disposed in each of the plurality of rail grooves 2212.

The first holder 2210 may include protrusions 2213. The protrusion 2213 may be formed on a surface of the first holder 2210 facing the first housing 2110-1. The protrusion 2213 may come into contact with the first housing 2110-1 when the first holder 2210 moves in a direction toward the first housing 2110-1. In this case, compared to a case in which the protrusion 2213 is omitted, it is possible to reduce a contact area between the first holder 2210 and the first housing 2110-1 when the protrusion 2213 is formed. Therefore, it is possible to minimize the impact and noise generated due to the contact between the first holder 2210 and the first housing 2110-1.

The lens driving device 2000 may include the second lens 2220. Alternatively, the second lens 2220 may be described as one component of the camera device 10 rather than one component of the lens driving device 2000. The first moving unit 2200 may include the second lens 2220. The second lens 2220 may be disposed on the optical axis. The second lens 2220 may be disposed between the reflective member 1220 and the image sensor 3400. The second lens 2220 may be disposed between the first lens 2120 and the third lens 2320. The second lens 2220 may be disposed in the first holder 2210. The second lens 2220 may be coupled to the first holder 2210. The second lens 2220 may be fixed to the first holder 2210. The second lens 2220 may move with respect the first lens 2120. The second lens 2220 may move independently from the third lens 2320.

The second lens 2220 may be the second group lens. The second lens 2220 may include a plurality of lenses. The second lens 2220 may include two lenses.

The lens driving device 2000 may include the second moving unit 2300. The second moving unit 2300 may move with respect to the fixed unit 2100. The second moving unit 2300 may move independently from the first moving unit 2200. The second moving unit 2300 may be disposed behind the first moving unit 2200. The second moving unit 2300 may move in a direction toward and moving away from the first moving unit 2200.

The lens driving device 2000 may include the second holder 2310. The second moving unit 2300 may include the second holder 2310. The second holder 2310 may be disposed in the housing 2110. The second holder 2310 may move with respect to the housing 2110. At least a portion of the second holder 2310 may be spaced apart from the housing 2110. The second holder 2310 may come into contact with the housing 2110. The second holder 2310 may come into contact with the housing 2110 when moving. Alternatively, the second holder 2310 may come into contact with the housing 2110 in the initial state. The second holder 2310 may come into contact with the first holder 2210. The second holder 2310 may be spaced apart from the first holder 2210. The second holder 2310 may come into contact with the first holder 2210 when moving. Alternatively, the second holder 2310 may come into contact with the first holder 2210 in the initial state.

The second holder 2310 may include the protrusion 2311. The protrusion 2311 may be a test protrusion. The protrusion 2311 may be formed on an outer surface of the second holder 2310. The protrusion 2311 may protrude from the second holder 2310. The protrusion 2311 may be visible from the outside through the first hole 2113 of the housing 2110. The protrusion 2311 may be used at the time of testing whether the lens driving device 2000 is operated normally. The protrusion 2311 may include a flat surface 2311-1 and an inclined surface 2311-2.

The second holder 2310 may include a rail groove 2312. The ball 2500 may be disposed in the rail groove 2312. The ball 2500 may roll in the rail groove 2312. The rail groove 2312 and the ball 2500 may come into contact with each other at two points. The rail groove 2312 may be disposed in the optical axis direction. The rail groove 2312 may extend in the optical axis direction.

The rail groove 2312 may include a plurality of rail grooves. The rail groove 2312 may include four rail grooves. The rail groove 2312 may include first to fourth rail grooves. One or more balls 2500 may be disposed in each of the plurality of rail grooves 2312.

The second holder 2310 may include a protrusion 2313. The protrusion 2313 may be formed on a surface of the second holder 2310 facing the first holder 2210. The protrusion 2313 may come into contact with the first holder 2210 when the second holder 2310 moves in a direction toward the first holder 2210. In this case, compared to a case in which the protrusion 2313 is omitted, it is possible to reduce a contact area between the second holder 2310 and the first holder 2210 when the protrusion 2313 is formed. Therefore, it is possible to minimize the impact and noise generated due to the contact between the second holder 2310 and the first holder 2210.

The lens driving device 2000 may include the third lens 2320. Alternatively, the third lens 2320 may be described as one component of the camera device 10 rather than one component of the lens driving device 2000. The second moving unit 2300 may include the third lens 2320. The third lens 2320 may be disposed on the optical axis. The third lens 2320 may be disposed between the reflective member 1220 and the image sensor 3400. The third lens 2320 may be disposed between the second lens 2220 and the image sensor 3400. The third lens 2320 may be disposed in the second holder 2310. The third lens 2320 may be coupled to the second holder 2310. The third lens 2320 may be fixed to the second holder 2310. The third lens 2320 may move with respect the first lens 2120. The third lens 2320 may move independently from the second lens 2220.

The third lens 2320 may be the third group lens. The third lens 2320 may include a plurality of lenses. The third lens 2320 may include two lenses.

The lens driving device 2000 may include a driving unit 2400. The driving unit 2400 may move at least some of the plurality of lenses. The driving unit 2400 may move the first moving unit 2200 and the second moving unit 2300 with respect to the fixed unit 2100. The driving unit 2400 may include coils and magnets. The driving unit 2400 may move the first moving unit 2200 and the second driving unit 2300 through electromagnetic interaction. In a modified example, the driving unit 2400 may include the SMA.

The driving unit 2400 may include a first driving unit 2410. The first driving unit 2410 may move the first moving unit 2200 with respect to the fixed unit 2100. The first driving unit 2410 may move the first moving unit 2200 with respect to the second driving unit 2300. The first driving unit 2410 may be used to drive the zooming function. Alternatively, the first driving unit 2410 may be used to drive the AF function.

The first driving unit 2410 may include a first driving magnet 2411. The first driving magnet 2411 may be disposed in the first holder 2210. The first driving magnet 2411 may be disposed on the side surface of the first holder 2210. The first driving magnet 2411 may be coupled to the first holder 2210. The first driving magnet 2411 may be fixed to the first holder 2210. The first driving magnet 2411 may be fixed to the first holder 2210 using an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412.

The first driving magnet 2411 may interact with the first coil 2412. The first driving magnet 2411 may interact electromagnetically with the first coil 2412.

The first driving magnet 2411 may include a first magnet unit 2411-1. The first magnet unit 2411-1 may have a first polarity. The first driving magnet 2411 may include a second magnet unit 2411-2. The second magnet unit 2411-2 may have a second polarity differing from the first polarity. In this case, the first polarity may be an N pole, and the second polarity may be an S pole. Conversely, the first polarity may be an S pole, and the second polarity may be an N pole.

The first driving magnet 2411 may include a neutral portion 2411-3. The neutral portion 2411-3 may be disposed between the first magnet unit 2411-1 and the second magnet unit 2411-2. The neutral portion 2411-3 may have a neutral polarity. The neutral portion 2411-3 may be a non-magnetized portion.

The first driving unit 2410 may include the first coil 2412. The first coil 2412 may be disposed on the board 2140. The first coil 2412 may be disposed on the first board 2141. The first coil 2412 may be disposed in the housing 2110. The first coil 2412 may be disposed outside the first holder 2210. When a current is applied to the first coil 2412, an electromagnetic field may be formed near the first coil 2412 to interact with the first driving magnet 2411.

As a modified example, the first coil 2412 may be disposed in the first holder 2210, and the first driving magnet 2411 may be disposed in the housing 2110.

The first coil 2412 may be formed in a ring shape. The first coil 2412 may be formed in a quadrangular ring or circular ring shape. Even when the first coil 2412 is formed in a quadrangular ring shape, a corner portion may be formed to be curved. The first coil 2412 may include a first part 2412-1 and a second part 2412-2 with a gap G1 interposed therebetween. The first and second Hall sensors 2413 and 2414 may be disposed in the gap G1 of the first coil 2412.

The lens driving device 2000 may include the Hall sensor. The Hall sensor may detect the first driving magnet 2411. The Hall sensor may include a plurality of Hall sensors. The Hall sensor may include the first Hall sensor 2413 and the second Hall sensor 2414. The first Hall sensor 2413 and the second Hall sensor 2414 may be spaced apart from each other. The first Hall sensor 2413 and the second Hall sensor 2414 may be spaced apart from each other so that a gap G2 is formed therebetween. The first Hall sensor 2413 and the second Hall sensor 2414 may detect the first driving magnet 2411. The first Hall sensor 2413 and the second Hall sensor 2414 may detect a magnetic force of the first driving magnet 2411. The first Hall sensor 2413 and the second Hall sensor 2414 may detect a position of the first holder 2210. The first Hall sensor 2413 and the second Hall sensor 2414 may detect a position of the second lens 2220.

The lens driving device 2000 may include a yoke 2415. The yoke 2415 may be disposed between the first driving magnet 2411 and the first holder 2210. The yoke 2415 may be formed in a shape corresponding to the first driving magnet 2411. The yoke 2415 may increase an interaction force between the first driving magnet 2411 and the first coil 2412.

The yoke 2415 may include an extending portion 2415-1. The extending portion 2415-1 may surround a front side surface and a rear side surface of the first driving magnet 2411. The yoke 2415 may include a groove 2415-2. The groove 2415-2 may be formed in a center portion of a body portion of the yoke 2415.

The driving unit 2400 may include the second driving unit 2420. The second driving unit 2420 may move the second moving unit 2300 with respect to the fixed unit 2100. The second driving unit 2420 may move the second moving unit 2300 with respect to the first moving unit 2200. The second driving unit 2420 may be used to drive the AF function. Alternatively, the second driving unit 2420 may be used to drive the zooming function.

The second driving unit 2420 may include a second driving magnet 2421. The second driving magnet 2421 may be disposed in the second holder 2310. The second driving magnet 2421 may be disposed on the side surface of the second holder 2310. The second driving magnet 2421 may be coupled to the second holder 2310. The second driving magnet 2421 may be fixed to the second holder 2310. The second driving magnet 2421 may be fixed to the second holder 2310 using an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may interact electromagnetically with the second coil 2422.

The second driving unit 2420 may include the second coil 2422. The second coil 2422 may be disposed on the board 2140. The second coil 2422 may be disposed on the second board 2142. The second coil 2422 may be disposed in the housing 2110. The second coil 2422 may be disposed outside the second holder 2310. When a current is applied to the second coil 2422, an electromagnetic field may be formed near the second coil 2422 to interact with the second driving magnet 2421.

As a modified example, the second coil 2422 may be disposed in the second holder 2310, and the second driving magnet 2421 may be disposed in the housing 2110.

The lens driving device 2000 may include the Hall sensor. The Hall sensor may detect the second driving magnet 2421. The Hall sensor may include a plurality of Hall sensors. The Hall sensor may include the third Hall sensor 2423 and the fourth Hall sensor 2424. The third Hall sensor 2423 and the fourth Hall sensor 2424 may be spaced apart from each other. The third Hall sensor 2423 and the fourth Hall sensor 2424 may be spaced apart from each other so that the gap G2 is formed therebetween. The third Hall sensor 2423 and the fourth Hall sensor 2424 may detect the second driving magnet 2421. The third Hall sensor 2423 and the fourth Hall sensor 2424 may detect a magnetic force of the second driving magnet 2421. The third Hall sensor 2423 and the fourth Hall sensor 2424 may detect a position of the second holder 2310. The third Hall sensor 2423 and the fourth Hall sensor 2424 may detect a position of the third lens 2320.

The lens driving device 2000 may include a yoke 2425. The yoke 2425 may be disposed between the second driving magnet 2421 and the second holder 2310. The yoke 2425 may be formed in a shape corresponding to the second driving magnet 2421. The yoke 2425 may increase an interaction force between the second driving magnet 2421 and the second coil 2422.

The lens driving device 2000 may include a first yoke 2430. The first yoke 2430 may be disposed to generate an attractive force between the first yoke 2430 and the first driving magnet 2411. The first yoke 2430 may be disposed in the housing 2110. The first yoke 2430 may be disposed on the board 2140. The first yoke 2430 may be disposed on the first board 2141. The first holder 2210 may press the ball 2500 toward the guide rail 2130 by the attractive force between the first driving magnet 2411 and the first yoke 2430. In other words, the ball 2500 may be maintained without being removed between the first holder 2210 and the guide rail 2130 by the attractive force between the first driving magnet 2411 and the first yoke 2430.

The lens driving device 2000 may include a second yoke 2440. The second yoke 2440 may be disposed to generate an attractive force between the second yoke 2440 and the second driving magnet 2421. The second yoke 2440 may be disposed in the housing 2110. The second yoke 2440 may be disposed on the board 2140. The second yoke 2440 may be disposed on the second board 2142. The second holder 2310 may press the ball 2500 toward the guide rail 2130 by the attractive force between the second driving magnet 2421 and the second yoke 2440. In other words, the ball 2500 may be maintained without being removed between the second holder 2310 and the guide rail 2130 by the attractive force between the second driving magnet 2421 and the second yoke 2440.

The lens driving device 2000 may include the ball 2500. The ball 2500 may guide the movement of the first holder 2210. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll in the rail groove 2212 of the first holder 2210 and along a rail 2133 of the guide rail 2130. The ball 2500 may move in the optical direction between the rail groove 2212 of the first holder 2210 and the rail 2133 of the guide rail 2130. The ball 2500 may roll in the rail groove 2312 of the second holder 2310 and along the rail 2133 of the guide rail 2130. The ball 2500 may move in the optical axis direction between the rail groove 2312 of the second holder 2310 and the rail 2133 of the guide rail 2130. The ball 2500 may include a plurality of balls. A total of 8 balls 2500, which is 4 balls in the first holder 2210 and 4 balls in the second holder 2310, may be provided.

The lens driving device 2000 may include the dummy glass 2600. The dummy glass 2600 may be disposed in the housing 2110. The dummy glass 2600 may close a rear opening of housing 2110. The dummy glass 2600 may be formed transparently to allow light to pass therethrough.

The lens driving device 2000 may include a poron 2700. The poron 2700 may be an impact absorbing member. The poron 2700 can minimize the impact and noise generated by the movement of the first holder 2210 and the second holder 2310. The poron 2700 may be disposed on a portion of the first holder 2210 colliding with the housing 2110. The poron 2700 may be disposed on a portion of the second holder 2310 colliding with the housing 2110.

Figure 53:
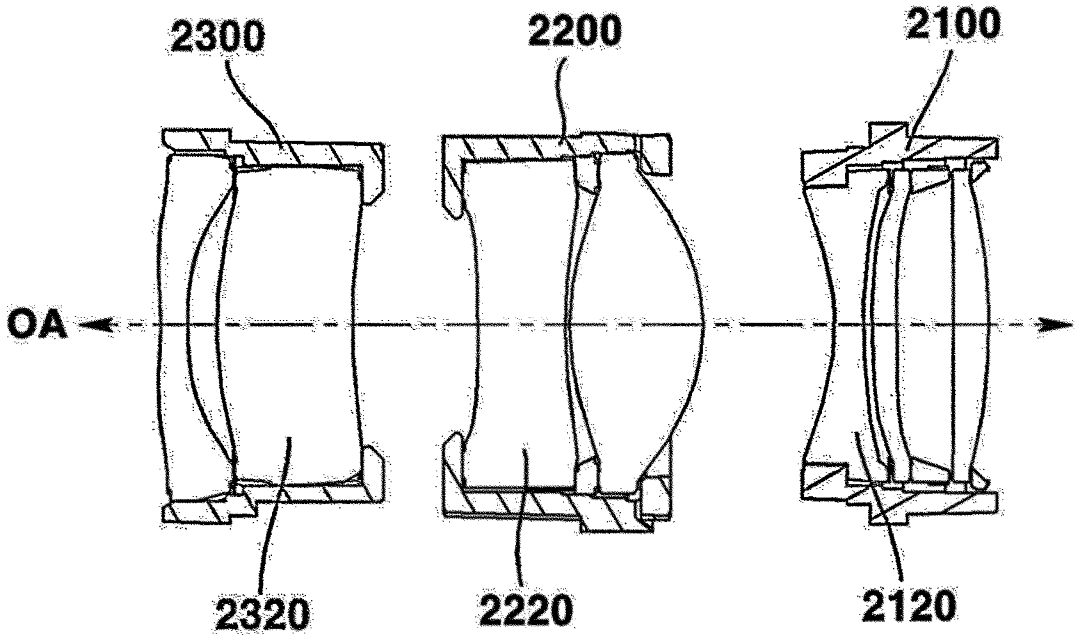
FIGS. 53 to 55 are views for describing the implementation of a zooming function and an auto focusing function of the lens driving device according to the present embodiment.
Figure 54:
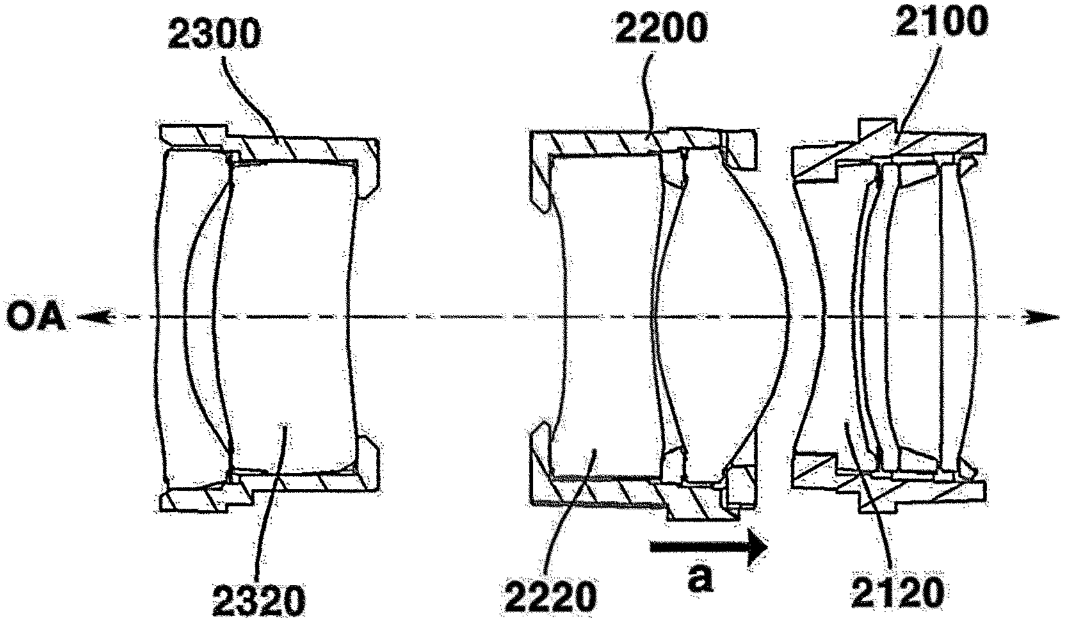
Figure 55:
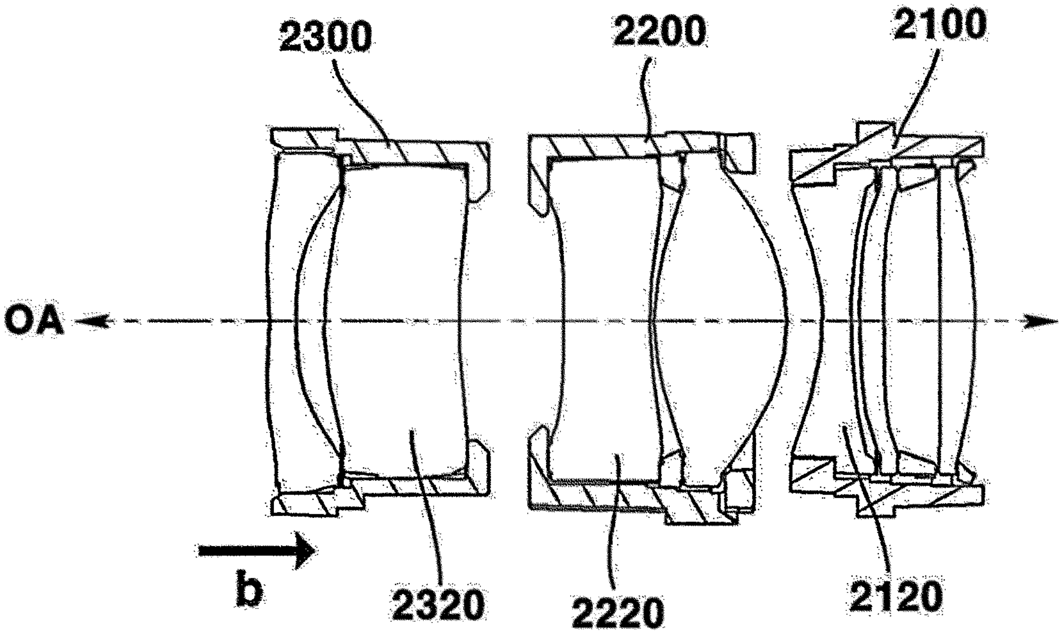

FIGS. 53 to 55 are views for describing the implementation of a zooming function and an auto focusing function of the lens driving device according to the present embodiment.

In the present embodiment, the first lens 2120, the second lens 2220, and the third lens 2320 may be disposed in a state of being aligned with an optical axis OA in the initial state in which the current is not supplied to the driving unit 2400.

In this case, when a current is applied to the first coil 2412, the second lens 2220 may move along the optical axis OA due to electromagnetic interaction between the first coil 2412 and the first driving magnet 2411 (see FIG. 54*a*). The zooming function may be performed as the second lens 2220 moves in a state in which the first lens 2120 is fixed. When a current in the first direction is applied to the first coil 2412, the second lens 2220 may move in a direction toward the first lens 2120. When a current in the second direction opposite to the first direction is applied to the first coil 2412, the second lens 2220 may move in a direction moving away from the first lens 2120.

Meanwhile, when a current is applied to the second coil 2422, the third lens 2320 may move along the optical axis OA due to electromagnetic interaction between the second coil 2422 and the second driving magnet 2421 (see FIG. 55*b*). The AF function may be performed by the relative movement of the third lens 2320 with respect to the first lens 2120 and the second lens 2220. When a current in the first direction is applied to the second coil 2422, the third lens 2320 may move in a direction toward the first lens 2120. When a current in the second direction opposite to the first direction is applied to the second coil 2422, the third lens 2320 may move in a direction moving away from the first lens 2120.

Hereinafter, a camera device according to the present embodiment will be described with reference to the drawings.

Figure 2:
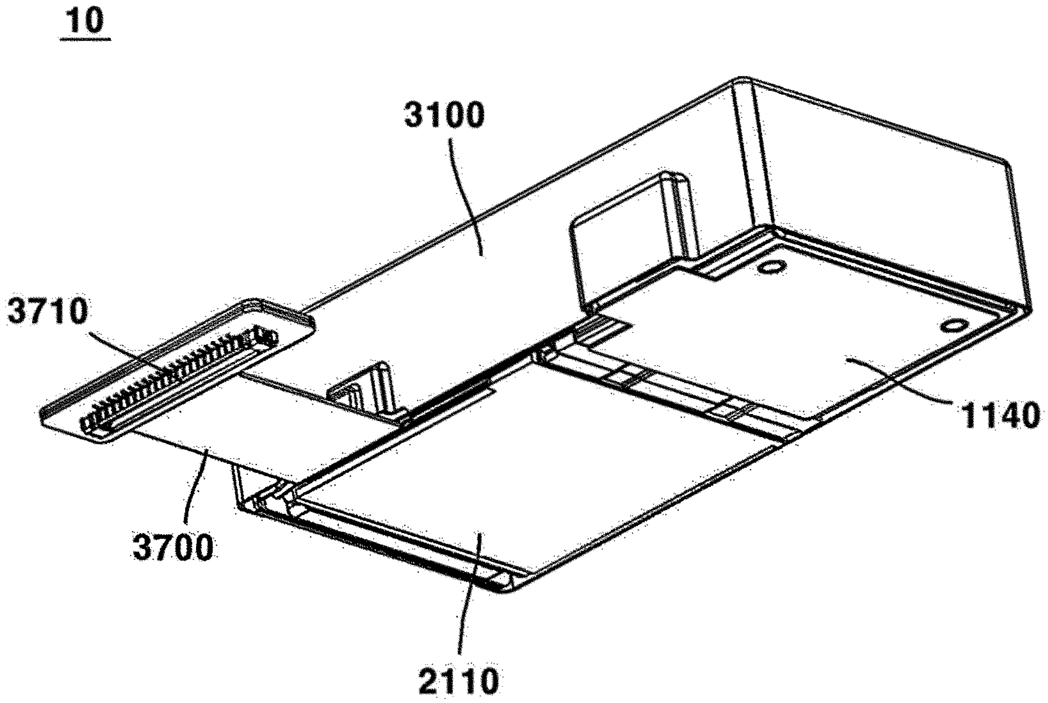
FIG. 2 is a bottom perspective view of the camera device according to the present embodiment.
Figure 3:
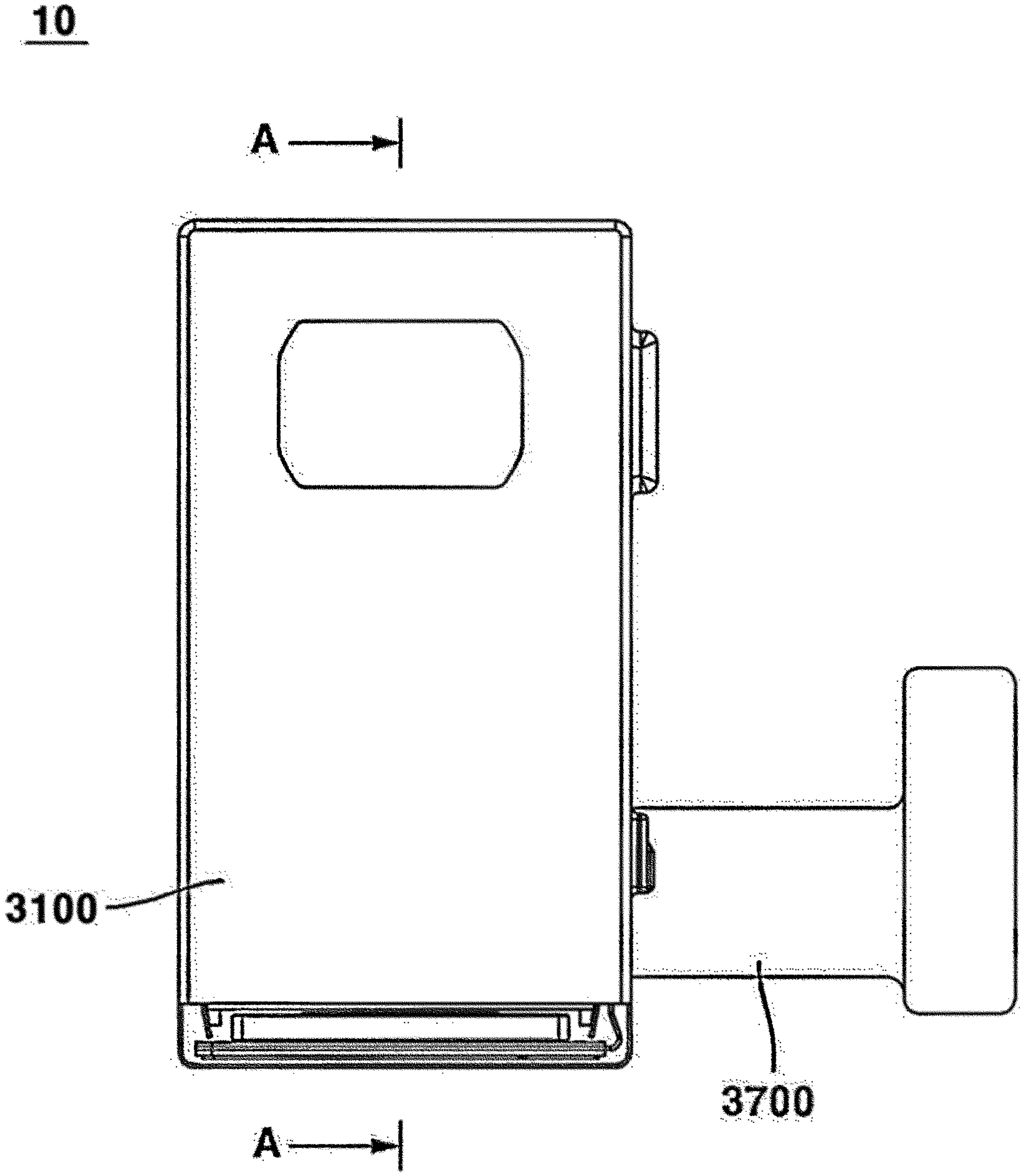
FIG. 3 is a plan view of the camera device according to the present embodiment.
Figure 4:
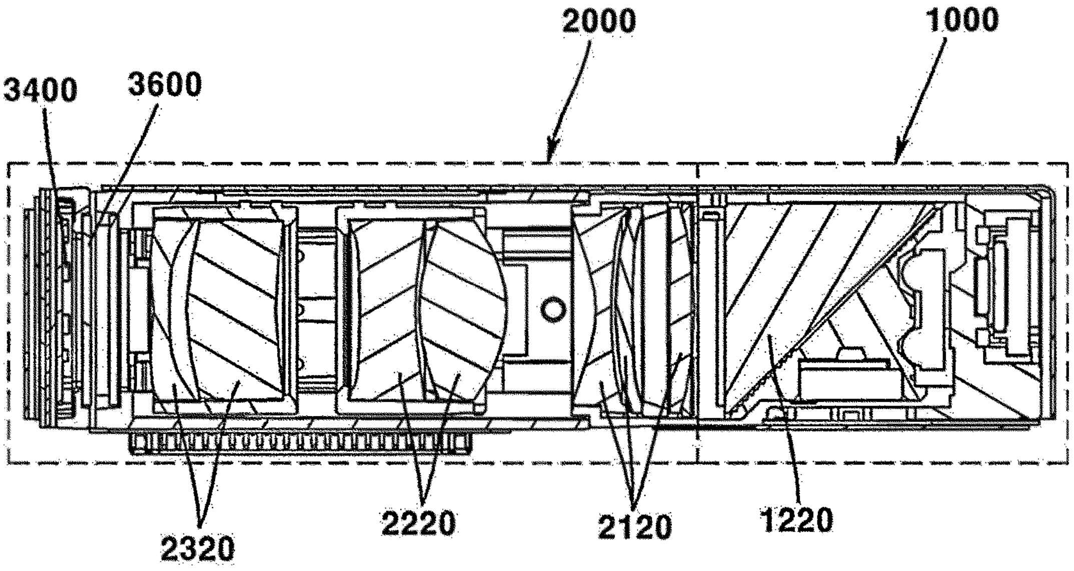
FIG. 4 is a cross-sectional view along line A-A in FIG. 3.
Figure 5:
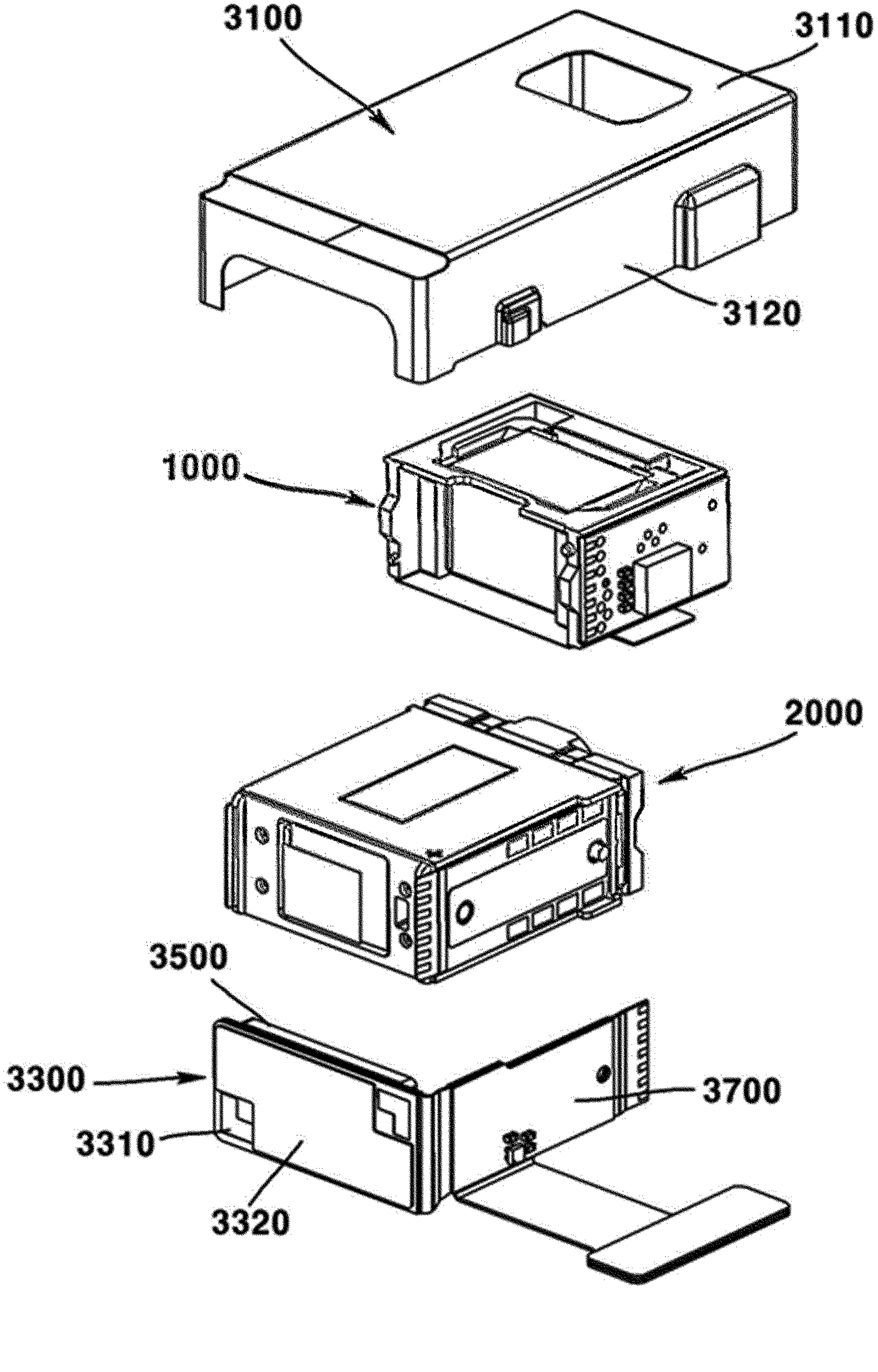
FIG. 5 is an exploded perspective view of the camera device according to the present embodiment.
Figure 6:
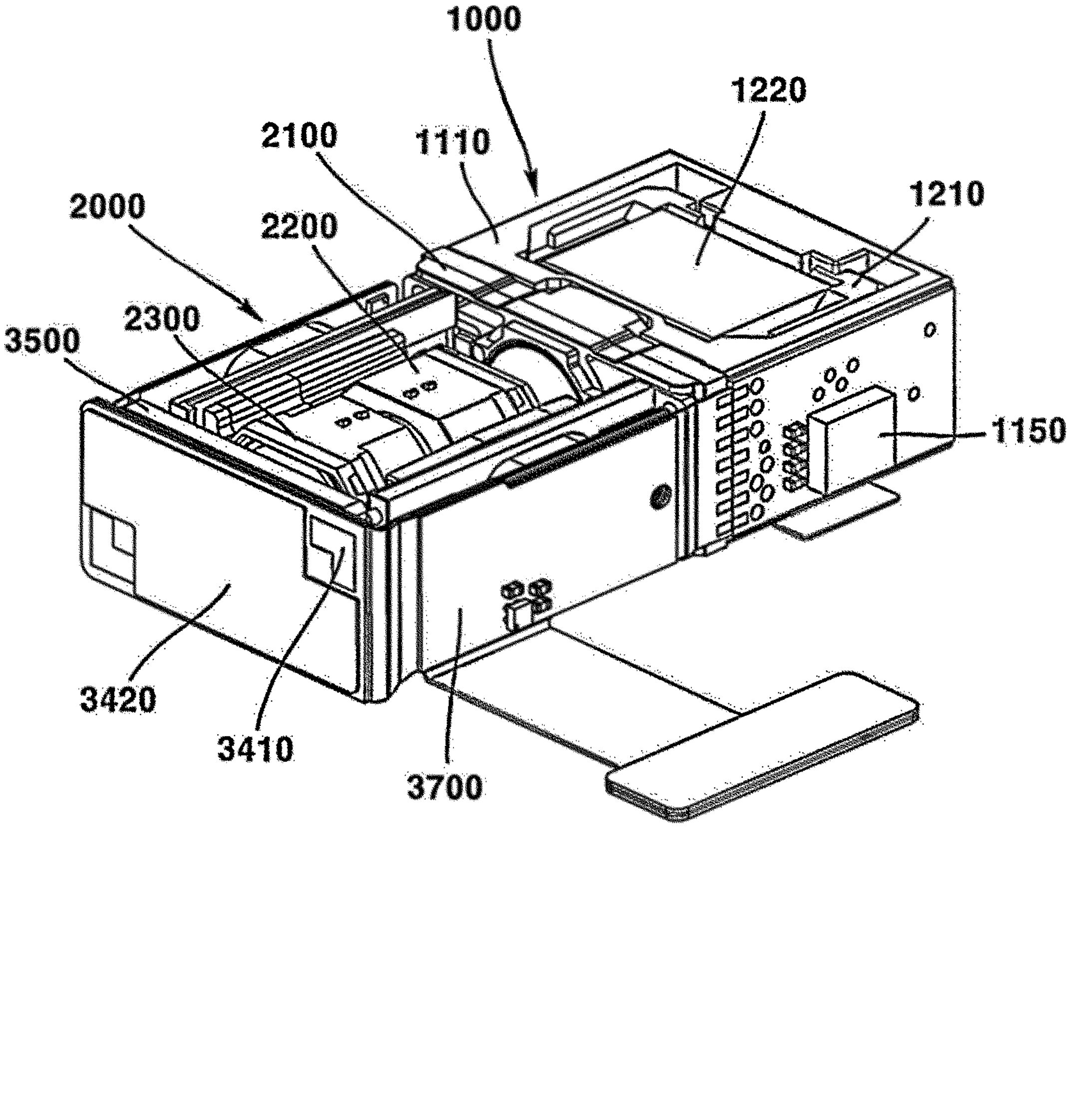
FIG. 6 is a perspective view of the camera device according to the present embodiment from which a cover member is omitted.
Figure 56:
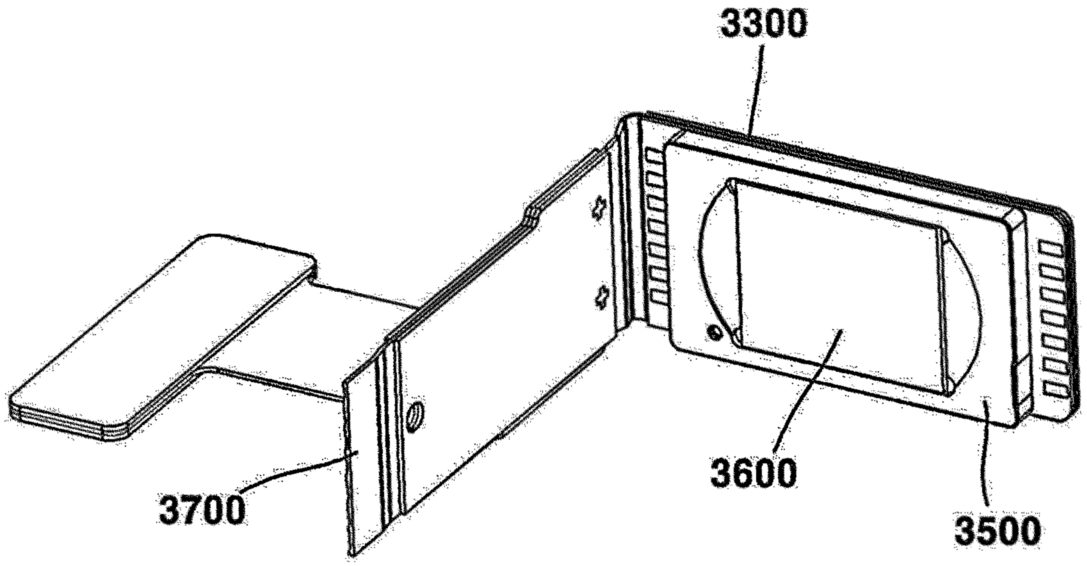
FIG. 56 is a perspective view of some components of the camera device according to the present embodiment.
Figure 57:
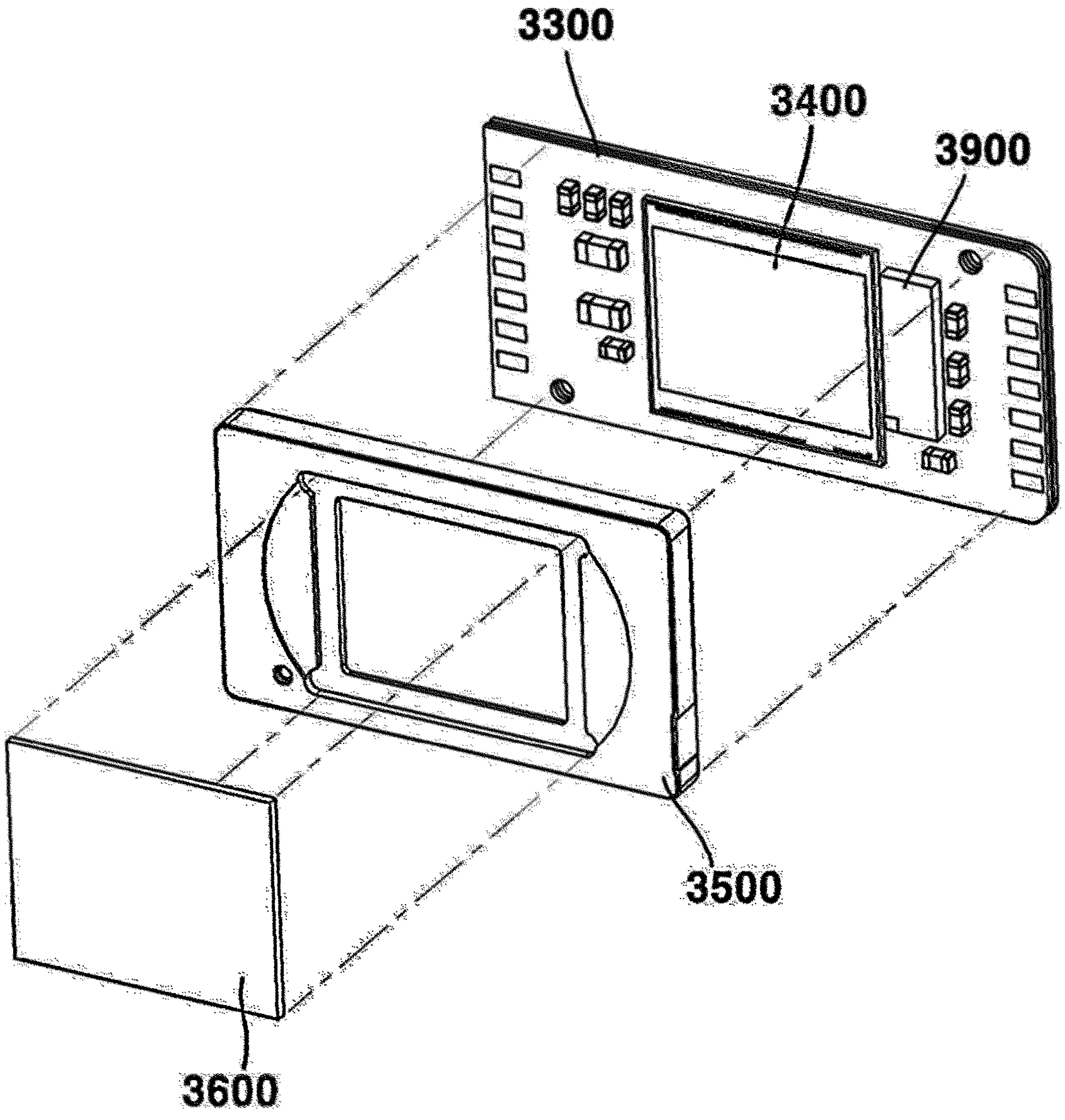
FIG. 57 is an exploded perspective view of an image sensor, a filter, and related components of the camera device according to the present embodiment.

FIG. 1 is a perspective view of a camera device according to the present embodiment, FIG. 2 is a bottom perspective view of the camera device according to the present embodiment, FIG. 3 is a plan view of the camera device according to the present embodiment, FIG. 4 is a cross-sectional view along line A-A in FIG. 3, FIG. 5 is an exploded perspective view of the camera device according to the present embodiment, FIG. 6 is a perspective view of the camera device according to the present embodiment from which a cover member is omitted, FIG. 56 is a perspective view of some components of the camera device according to the present embodiment, and FIG. 57 is an exploded perspective view of an image sensor, a filter, and related components of the camera device according to the present embodiment.

The camera device 10 may include a cover member 3100. The cover member 3100 may be a cover can or shield can. The cover member 3100 may be disposed to cover the reflective member driving device 1000 and the lens driving device 2000. The cover member 3100 may be disposed outside the reflective member driving device 1000 and the lens driving device 2000. The cover member 3100 may surround the reflective member driving device 1000 and the lens driving device 2000. The cover member 3100 may accommodate the reflective member driving device 1000 and the lens driving device 2000. The cover member 3100 may be made of a metal material. The cover member 3100 may block electromagnetic interference (EMI).

The cover member 3100 may include an upper plate 3110. The upper plate 3110 may include an opening or hole. Light may enter through the opening or hole of the upper plate 3110. The opening or hole of the upper plate 3110 may be formed at a position corresponding to the reflective member 1220.

The cover member 3100 may include a side plate 3120. The side plate 3120 may include a plurality of side plates. The side plate 3120 may include four side plates. The side plate 3120 may include first to fourth side plates. The side plate 3120 may include the first and second side plates disposed at opposite sides, and the third and fourth side plates disposed at opposite sides.

The camera device 10 may include the PCB 3300. The PCB 3300 may be a board or circuit board. A sensor base 3500 may be disposed on the PCB 3300. The PCB 3300 may be electrically connected to the reflective member driving device 1000 and the lens driving device 2000. The PCB 3300 may be equipped with various circuits, devices, control units, and the like in order to convert images formed on the image sensor 3400 into electrical signals and transmit the electrical signals to an external device.

The PCB 3300 may include a marking portion 3310. The marking portion 3310 may be disposed on a rear surface of the PCB 3300.

The camera device 10 may include a SUS 3320. The SUS 3320 may be disposed on the rear surface of the PCB 3300. The SUS 3320 may reinforce the strength of the PCB 3300. The SUS 3320 may emit heat generated from the PCB 3300.

The camera device 10 may include the image sensor 3400. The image sensor 3400 may be disposed on the PCB 3300. Light passing through the lens and a filter 3600 may enter the image sensor 3400 to form an image. The image sensor 3400 may be electrically connected to the PCB 3300. For example, the image sensor 3400 may be coupled to the PCB 3300 by a surface mounting technology (SMT). As another example, the image sensor 3400 may be coupled to the PCB 3300 using a flip chip technology. The image sensor 3400 may be disposed so that the optical axis of the lens and the optical axis of the image sensor match with each other. The optical axis of the image sensor 3400 and the optical axis of the lens may be aligned. The image sensor 3400 may convert light irradiated to an effective image region of the image sensor 3400 into an electrical signal. The image sensor 3400 may include any one or more of a charge coupled device (CCD), a metal oxide semiconductor (MOS), a CPD, and a CID.

The camera device 10 may include the sensor base 3500. The sensor base 3500 may be disposed on the PCB 3300. The filter 3600 may be disposed on the sensor base 3500. An opening may be formed in a portion of the sensor base 3500 on which the filter 3600 is disposed to allow light passing through the filter 3600 to enter the image sensor 3400.

The camera device 10 may include the filter 3600. The filter 3600 may function to block light in a specific frequency band from passing through the lens from entering the image sensor 3400. The filter 3600 may be disposed between the lens and the image sensor 3400. The filter 3600 may be disposed on the sensor base 3500. The filter 3600 may include an infrared filter. The infrared filter may block light in the infrared region from entering the image sensor 3400.

The camera device 10 may include the board 3700. The board 3700 may be connected to the PCB 3300. The board 3700 may extend from the PCB 3300. The board 3700 may include a terminal electrically connected to the reflective member driving device 1000. The board 3700 may include an extending portion extending to the outside.

The camera device 10 may include a connector 3710. The connector 3710 may be disposed on the board 3700. The connector 3710 may be disposed on a lower surface of the extending portion of the board 3700. The connector 3710 may be, for example, connected to a power supply of a smartphone.

The camera device 10 may include a temperature sensor 3800. The temperature sensor 3800 may detect temperatures. The temperature detected by the temperature sensor 3800 may be used for more accurate control of any one or more of the OIS function, the AF function, and the zooming function.

The camera device 10 may include the driver IC 3900. The driver IC 3900 may be electrically connected to the lens driving device 2000. The driver IC 3900 may be described as one component of the lens driving device 2000. The driver IC 3900 may be electrically connected to the first coil 2412 and the second coil 2422 of the lens driving device 2000. The driver IC 3900 may supply a current to the first coil 2412 and the second coil 2422 of the lens driving device 2000. The driver IC 3900 may control any one or more of a voltage or current applied to each of the first coil 2412 and the second coil 2422 of the lens driving device 2000. The driver IC 3900 may be electrically connected to the Hall sensors 2413, 2414, 2423, and 2424. The driver IC 3900 may perform feedback control on the voltages and the currents applied to the first coil 2412 and the second coil 2422 through positions of the second lens 2220 and the third lens 2320 detected by the Hall sensors 2413, 2413, 2423, and 2424.

Figure 58:
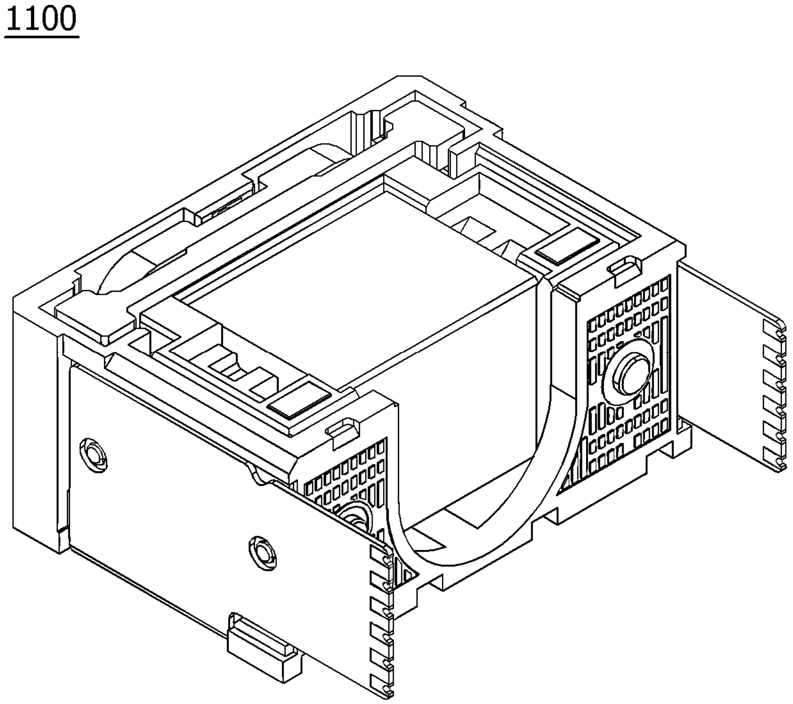
FIG. 58 is a perspective view of a first camera actuator according to the embodiment.
Figure 59:
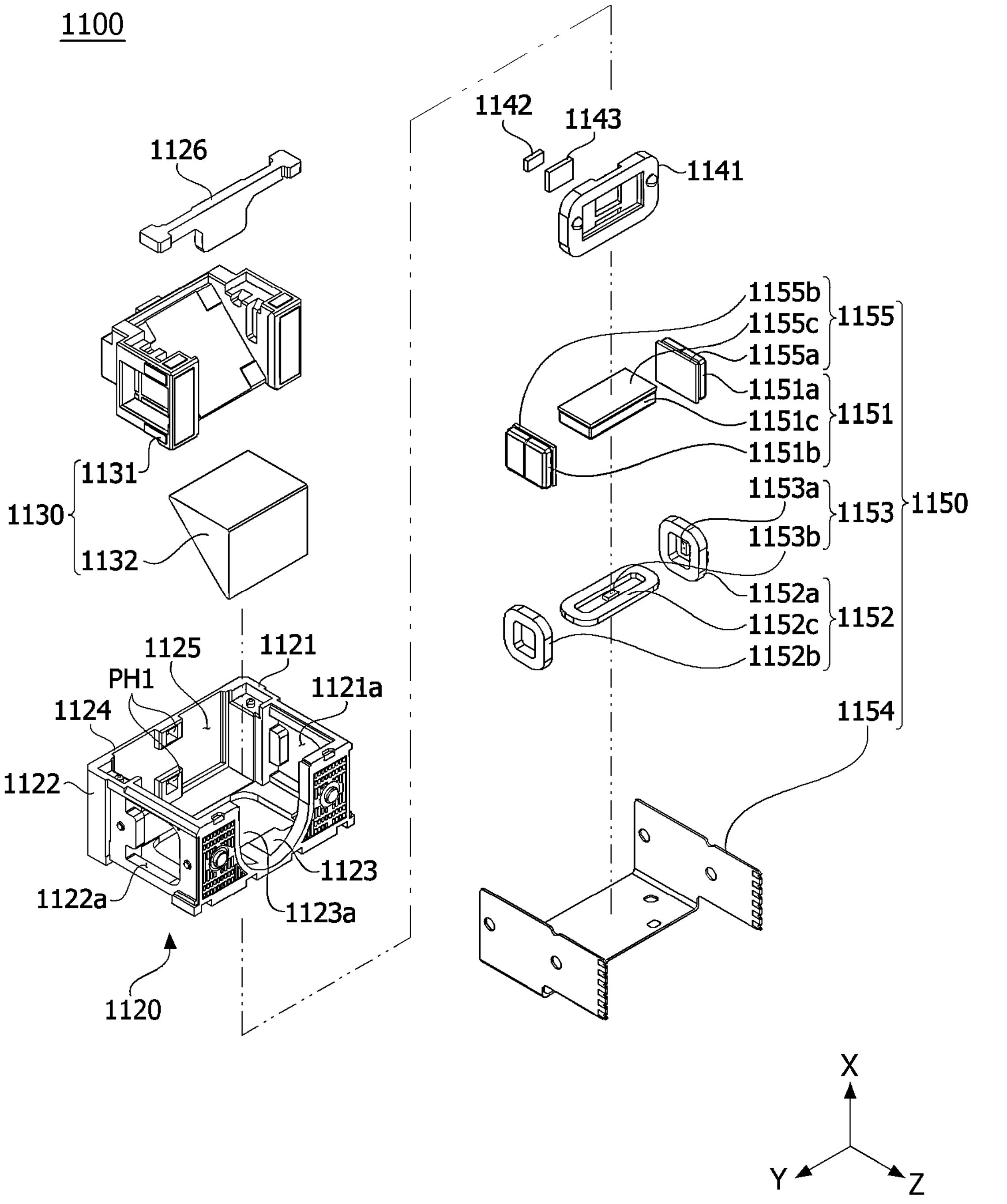
FIG. 59 is an exploded perspective view of the first camera actuator according to the embodiment.

FIG. 58 is an exploded perspective view of the first camera actuator according to the embodiment, and FIG. 59 is an exploded perspective view of the first camera actuator according to the embodiment.

Hereinafter, in FIGS. 58 to 72, a first camera actuator or a first actuator corresponds to the reflective member driving device in FIGS. 1 to 57. In addition, a second camera actuator or a second actuator corresponds to the lens driving device in FIGS. 1 to 57.

Referring to FIGS. 58 and 59, a first camera actuator 1100 according to an embodiment includes a first housing 1120, a mover 1130, a rotating unit 1140, a first driving unit 1150, and a first member 1126.

The first housing 1120 corresponds to the housing in FIGS. 1 to 57. In addition, the mover 1130 corresponds to the above-described holder. In addition, a tilting guide unit 1141 of the rotating unit 1140 corresponds to the moving plate. Furthermore, the first driving unit 1150 may be a component including a first driving unit and a second driving unit. In addition, the first member may be a fixed unit corresponding to a housing rigid.

The mover 1130 may include a holder 1131 and an optical member 1132 seated on the holder 1131. In addition, the rotating unit 1140 may include the tilting guide unit 1141 and a second magnetic part 1142 and a first magnetic part 1143 having different polarities to press the tilting guide unit 1141. In addition, the first driving unit 1150 includes a driving magnet 1151 (or a first driving magnet), a driving coil 1152 (or a first driving coil), a Hall sensor part 1153 (or a first Hall sensor unit), a first board part 1154, and a yoke part 1155.

First, the first camera actuator 1100 may include a shield can (not illustrated). The shield can (not illustrated) may be positioned at an outermost side of the first camera actuator 1100 and positioned to surround the rotating unit 1140 and the first driving unit 1150, which will be described below.

The shield can (not illustrated) can block or reduce electromagnetic waves generated from the outside. In other words, the shield can (not illustrated) can reduce the occurrence of malfunction in the rotating unit 1140 or the first driving unit 1150.

The first housing 1120 may be positioned inside the shield can (not illustrated). When there is no shield can, the first housing 1120 may be positioned at the outermost side of the first camera actuator. The first housing may be used interchangeably with the housing.

In addition, the first housing 1120 may be positioned inside a first board part 1154 to be described below. The first housing 1120 may be fastened by being fitted into or engaged with the shield can (not illustrated).

The first housing 1120 may include a first housing side portion 1121, a second housing side portion 1122, a third housing side portion 1123, and a fourth housing side portion 1124. A detailed description thereof will be made below.

The first member 1126 may be disposed in the first housing 1120. The first member 1126 may be coupled to the first housing 1120. Therefore, the first member 1126 may be a fixed member together with the first housing 1120.

The mover 1130 may include the holder 1131 and the optical member 1132 seated on the holder 1131.

The holder 1131 may be seated in an accommodating part 1125 of the first housing 1120. The holder 1131 may include a first holder outer surface to a fourth holder outer surface respectively corresponding to the first housing side portion 1121, the second housing side portion 1122, the third housing side portion 1123, and the first member 1126. For example, the first holder outer surface to the fourth holder outer surface may respectively correspond to or face inner surfaces of the first housing side portion 1121, the second housing side portion 1122, the third housing side portion 1123, and the first member 1126.

The optical member 1132 may be seated on the holder 1131. To this end, the holder 1131 may have a seating surface, and the seating surface may be formed by an accommodating groove. In an embodiment, the optical member 1132 may be formed of a mirror or a prism. Hereinafter, it is illustrated that the optical member 1132 is the prism, but may also be formed of a plurality of lenses as in the above-described embodiment. Alternatively, the optical member 1132 may be formed of the plurality of lenses and the prism or the mirror. In addition, the optical member 1132 may include a reflector disposed therein. However, the present invention is not limited thereto.

In addition, the optical member 1132 may reflect light reflected from the outside (e.g., an object) into the camera module. In other words, the optical member 1132 can resolve spatial limits of the first camera actuator and the second camera actuator by changing the path of the reflected light. Therefore, it should be understood that the camera module may provide a high range of magnification by extending the optical path while minimizing a thickness thereof.

The rotating unit 1140 includes the tilting guide unit 1141, and the second magnetic part 1142 and the first magnetic part 1143 having different polarities to press the tilting guide unit 1141.

The tilting guide unit 1141 may be coupled to the mover 1130 and the first housing 1120. Specifically, the tilting guide unit 1141 may be disposed between the first housing 1120 and the first member 1126. Therefore, the tilting guide unit 1141 may be coupled to the mover 1130 of the holder 1131 and the first housing 1120.

The tilting guide unit 1141, the first member 1126, and the holder 1131 may be sequentially disposed in the third direction (Z-axis direction). In addition, the second magnetic part 1142 and the first magnetic part 1143 may be seated in a second groove 1131Ph and a first groove 1126*h*, respectively. In the present embodiment, the first groove and the second groove may be present at various positions as will be described below. However, the second groove may be positioned in a mover protruding portion and move integrally with the holder, and the first groove may be positioned in the first member 1126 corresponding to the second groove.

In addition, the tilting guide unit 1141 may be disposed adjacent to the optical axis. Therefore, the actuator according to the embodiment may easily change the optical path according to the first-axis tilting and the second-axis tilting to be described below.

The tilting guide unit 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. A detailed description thereof will be made below.

In addition, as described above, the second magnetic part 1142 may be positioned in the mover 1130. In addition, the first magnetic part 1143 may be positioned in the first member 1126. When there are no first magnetic part 1143 and second magnetic part 1142, the position of the mover may be maintained by a spring, a pin guide, and a shape memory member as will be described below.

The second magnetic part 1142 and the first magnetic part 1143 may have the same polarity. For example, the second magnetic part 1142 may be a magnet having an N pole, and the first magnetic part 1143 may be a magnet having an N pole. Alternatively, the second magnetic part 1142 may be a magnet having an S pole, and the first magnetic part 1143 may be a magnet having an S pole.

For example, a first pole surface of the first magnetic part 1143 and a second pole surface of the second magnetic part 1142 facing the first pole surface may have the same polarity.

The second magnetic part 1142 and the first magnetic part 1143 may generate a repulsive force therebetween due to the above-described polarities. With this configuration, the above-described repulsive force may be applied to the first member 1126 or the first housing 1120 coupled to the second magnetic part 1142 or coupled to the holder 1131 and the first magnetic part 1143. At this time, the repulsive force applied to the holder 1131 may be transmitted to the tilting guide unit 1141 through which the mover protruding portion passes and which is seated in the second seating groove of the mover. Therefore, the tilting guide unit 1141 disposed between the first housing 1120 and the first member 1126 may be pressed by the repulsive force. In other words, the repulsive force may maintain the position of the tilting guide unit 1141 between the holder 1131 and the first housing 1120. With this configuration, the position between the mover 1130 and the first housing 1120 can be maintained even during an X-axis tilting or a Y-axis tilting. In addition, the tilting guide unit may be in close contact with the first member 1126 and the holder 1131 by the repulsive force between the first magnetic part 1143 and the second magnetic part 1142.

The first driving unit 1150 includes the driving magnet 1151, the driving coil 1152, the Hall sensor part 1153, the first board part 1154, and the yoke part 1155. A description thereof will be made below.

Figure 60A:
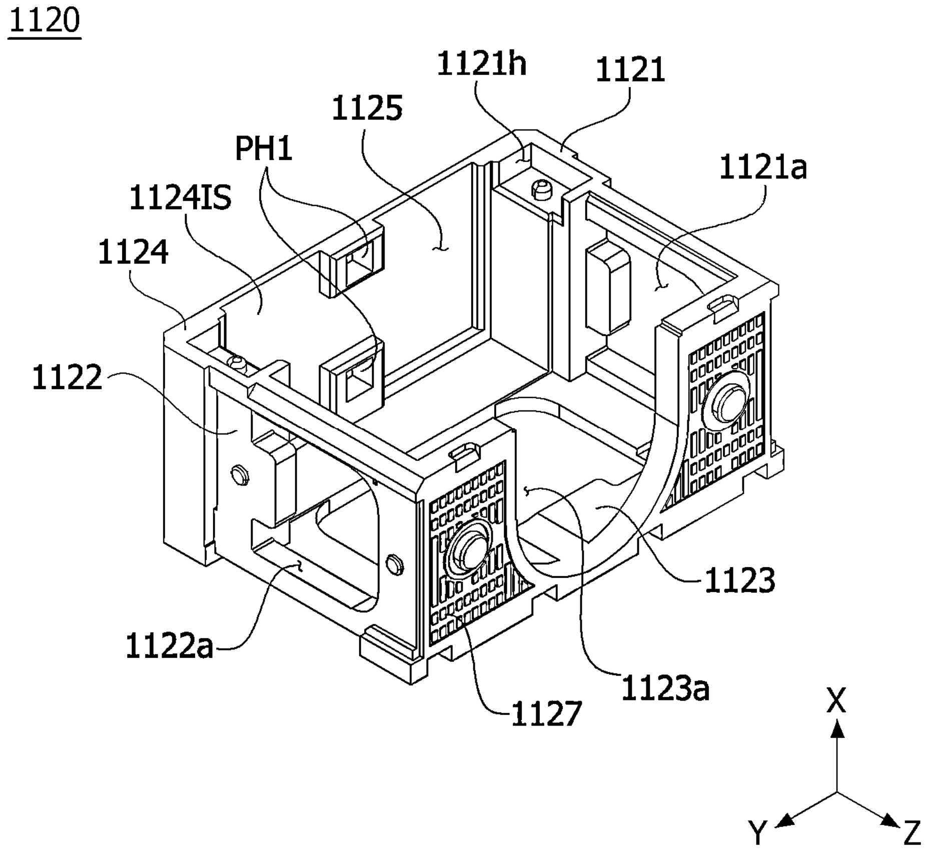
FIG. 60A is a perspective view of a first housing of the first camera actuator according to the embodiment.
Figure 60B:
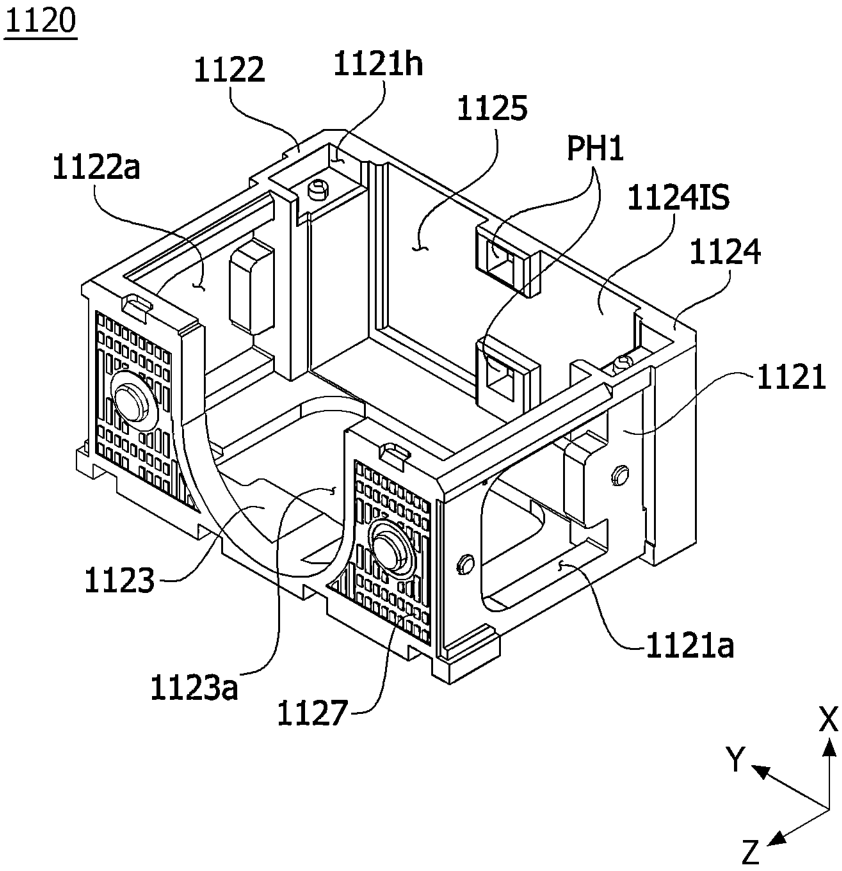
FIG. 60B is a perspective view of the first housing of the first camera actuator in a different direction from that of FIG. 60A.
Figure 60C:
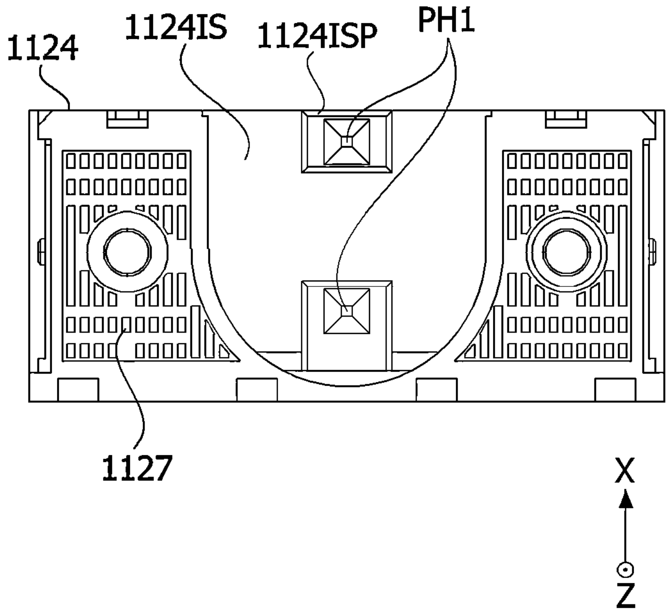
FIG. 60C is a side view of the first housing of the first camera actuator according to the embodiment.
Figure 60D:
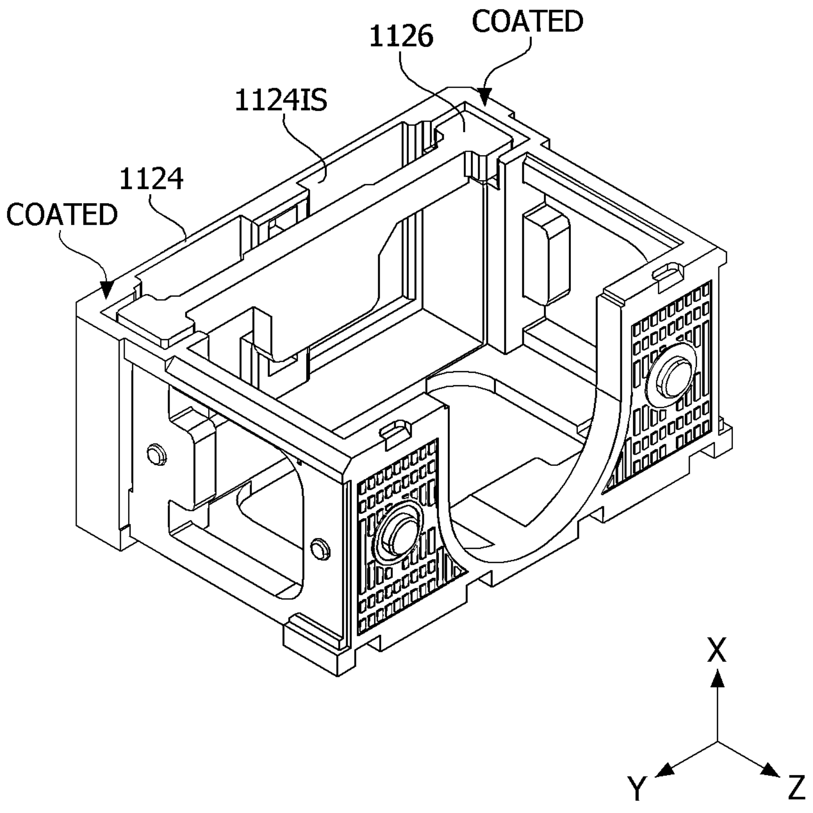
FIG. 60D is a perspective view of a state in which a first member is coupled to the first housing of the first camera actuator according to the embodiment.
Figure 60E:
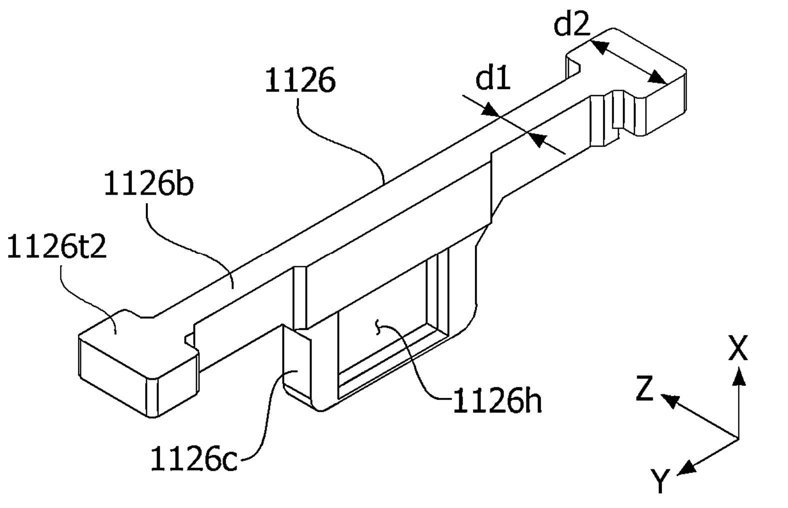
FIG. 60E is a perspective view illustrating the first member of the first camera actuator according to the embodiment.
Figure 60F:
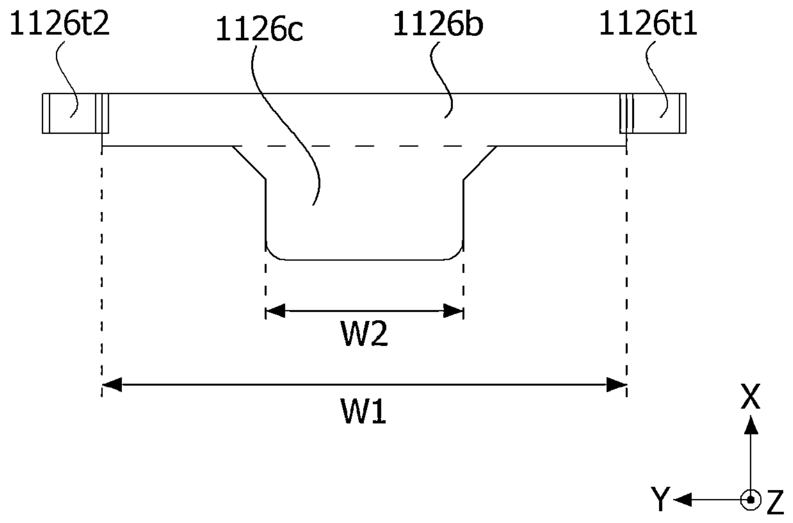
FIG. 60F is a view illustrating one side surface of the first member of the first camera actuator according to the embodiment.
Figure 60G:
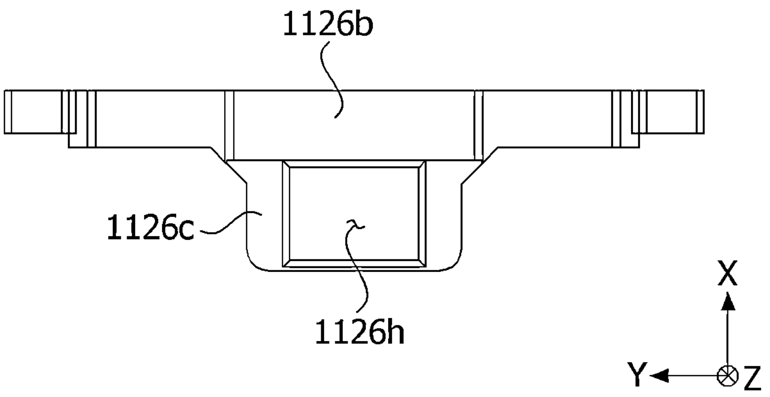
FIG. 60G is a view illustrating the other side surface of the first member of the first camera actuator according to the embodiment.

FIG. 60A is a perspective view of a first housing of the first camera actuator according to the embodiment, FIG. 60B is a perspective view of the first housing of the first camera actuator in a different direction from that of FIG. 60A, FIG. 60C is a side view of the first housing of the first camera actuator according to the embodiment, FIG. 60D is a perspective view of a state in which a first member is coupled to the first housing of the first camera actuator according to the embodiment, FIG. 60E is a perspective view illustrating the first member of the first camera actuator according to the embodiment, FIG. 60F is a view illustrating one side surface of the first member of the first camera actuator according to the embodiment, and FIG. 60G is a view illustrating the other side surface of the first member of the first camera actuator according to the embodiment.

Referring to FIGS. 60A to 60D, the first housing 1120 according to the embodiment may include the first housing side portion 1121 to the fourth housing side portion 1124. In addition, the first member 1126 may be integrally formed by being coupled to the first housing 1120. Therefore, the first member 1126 may be a component included in the first housing 1120. In other words, the first housing 1120 may be integrally formed by being coupled to the first member 1126. Alternatively, the first housing 1120 may include the first member 1126.

The first housing side portion 1121 and the second housing side portion 1122 may be disposed to face each other. In addition, the third housing side portion 1123 and the fourth housing side portion 1124 may be disposed to cross or perpendicular to each other.

In addition, the third housing side portion 1123 and the fourth housing side portion 1124 may be disposed between the first housing side portion 1121 and the second housing side portion 1122.

The third housing side portion 1123 and the fourth housing side portion 1124 may come into contact with the first housing side portion 1121 and the second housing side portion 1122. In addition, the third housing side portion 1123 may be a lower surface of the first housing 1120. In addition, the fourth housing side portion 1124 may be positioned on a front surface of the first housing 1120. In addition, the above-described contents may also be applied to a description of a direction in the same manner.

In addition, the first housing side portion 1121 may include a first housing hole 1121*a*. A first coil to be described below may be positioned in the first housing hole 1121*a*.

In addition, the second housing side portion 1122 may include a second housing hole 1122*a*. In addition, a second coil 1152*b* to be described below may be positioned in the second housing hole 1122*a*.

In addition, the first housing side portion 1121 and the second housing side portion 1122 may be side surfaces of the first housing 1120.

The first coil and the second coil may be coupled to a first board unit. In an embodiment, the first coil and the second coil may be electrically connected to the first board unit so that a current may flow therethrough. The current is an element of an electromagnetic force capable of tilting the second camera actuator with respect to the X-axis.

In addition, the third housing side portion 1123 may include a third housing hole 1123*a*.

A third coil to be described below may be positioned in the third housing hole 1123*a*. In addition, the third coil 1152*c* may be electrically connected to the first board part in contact with the first housing 1120, and the third coil 1152*c* and the first board part may be coupled. Therefore, the third coil may be electrically connected to the first board part to receive a current from the first board part. The current is an element of an electromagnetic force capable of tilting the second camera actuator with respect to the Y-axis.

The first member 1126 may be seated between the first housing side portion 1121 to the fourth housing side portion 1124. In addition, the first member 1126 may be positioned in the accommodating part 1125. In addition, the first member 1126 may be disposed to be spaced apart from the fourth housing side portion 1124 in the optical axis direction (Z-axis direction). Therefore, the first member 1126 may be positioned on the third housing side portion 1123. For example, the first member 1126 may be positioned at one side of the third housing side portion 1123. The fourth housing side portion 1124 and the first member 1126 may be sequentially positioned in the third direction.

The fourth housing side portion 1124 may be disposed between the first housing side portion 1121 and the second housing side portion 1122 and may come into contact with the first housing side portion 1121, the second housing side portion 1122, and the third housing side portion 1123.

In addition, the fourth housing side portion 1124 may include a first protrusion groove PH1. The protruding portion (e.g., the first protruding portion) of the tilting guide unit may be accommodated in the first protrusion groove PH1. Furthermore, a protrusion 1124ISP having the first protrusion groove PH1 may be positioned on an inner surface 1124IS of the fourth housing side portion 1124, and the protrusion may be seated in a first base groove of the tilting guide unit 1141 so that the tilting guide unit 1141 may be coupled to the inner surface of the fourth housing side portion 1124. Therefore, it is possible to increase the coupling strength between the first housing 1120 and the tilting guide unit, thereby improving the reliability of the first camera actuator.

In addition, the first housing 1120 may include the accommodating part 1125 formed by the first housing side portion 1121 to the fourth housing side portion 1124. At least some of the first member 1126, the mover 1130, the tilting guide unit 1141, the first and second magnetic parts 1143 and 1142, and the first driving unit may be positioned in the accommodating part 1125 as components.

In addition, the first housing 1120 may further include a fifth housing side portion 1127 facing the first member 1126. In addition, the fifth housing side portion 1127 may be disposed between the first housing side portion 1121 and the second housing side portion 1122 and may come into contact with the first housing side portion 1121, the second housing side portion 1122, and the third housing side portion 1123. In addition, the fifth housing side portion may include an opening region to provide a path along which the light reflected from the optical member 1132 moves. In addition, the fifth housing side portion 1127 may include protrusions, grooves, or the like to provide easy coupling with adjacent another camera actuator. With this configuration, it is possible to increase the coupling strength between the fifth housing side portion providing the optical path and at the same time, having the opening providing the optical path and other components, thereby suppressing the movement of the opening due to separation or the like and minimizing a change in optical path.

In addition, as described above, the first member 1126 may be a component coupled to the first housing 1120 and included in the first housing 1120. In other words, the first housing 1120 may include the first member 1126.

In addition, the first member 1126 may be disposed in the first housing 1120. Alternatively, the first member 1126 may be positioned in the first housing 1120.

In addition, the first member 1126 may be coupled to the first housing 1120. In an embodiment, the first member 1126 may be positioned between the first housing side portion 1121 and the second housing side portion 1122. In addition, the first member 1126 may be positioned between the fourth housing side portion 1124 and the fifth housing side portion 1127.

In addition, the first member 1126 may be positioned on the third housing side portion 1123 and may come into contact with the first housing side portion to the third housing side portion.

The first member 1126 may be seated in a member seating groove 1121*h* formed inside the first housing side portion 1121 and inside the second housing side portion 1122. At least a portion of the first member 1126 may be accommodated in the member seating groove 1121*h* and coupled to the first housing 1120 by a bonding member or the like. Alternatively, a weight of the first member 1126 is large so that the position of the first member 1126 may be maintained despite the repulsive force between the first magnetic part and the second magnetic part, which will be described below.

In addition, a first stopper may be positioned on an inner surface of the first housing side portion 1121. In addition, a second stopper may be positioned on an inner surface of the second housing side portion 1122.

The first stopper and the second stopper may be disposed symmetrically with respect to the first direction (X-axis direction). The first stopper and the second stopper may extend in the first direction (X-axis direction). With this configuration, the first member 1126 may not be separated from the member seating groove 1121*h*. In other words, the position of the first member 1126 may be maintained by the first stopper and the second stopper. In other words, the first stopper and the second stopper may maintain the position of the first member 1126 at one side of the first housing 1120.

Furthermore, the first stopper and the second stopper may remove error-causing factors such as vibration by fixing the position of the first member 1126 and fixing the position of the tilting guide unit between the first member 1126 and the mover. Therefore, the first camera actuator according to the embodiment can accurately perform the X-axis tilting and the Y-axis tilting. For example, the first stopper and the second stopper may be in the form of a protrusion.

Further referring to FIGS. 60E to 60G, the first member 1126 may also include the first magnetic part. For example, the first member 1126 may include the first groove 1126*h* in which the first magnetic part is accommodated. The first groove 1126*h* may be positioned in an outer surface of the first member 1126. Alternatively, the first groove 1126*h* may be positioned in the first member 1126.

The first member 1126 may include a member base 1126*b*, a member extending portion 1126*c*, a first stepped portion 1126*t*1, and a second stepped portion 1126*t*2.

The member base 1126*b* may extend in the second direction (Y-axis direction) and may be positioned on an upper portion of the accommodating part 1125.

The member extending portion 1126*c* may be a portion extending downward from the member base 1126*b*. The member extending portion 1126*c* may be positioned in the middle of the member base 1126*b*. Furthermore, the first groove 1126*h* may be positioned in the member extending portion 1126*c*. Therefore, the first magnetic part may be positioned on the member extending portion 1126*c*. Furthermore, at least a portion of the member extending portion 1126*c* may overlap the tilting guide unit 1141, the second magnetic part, or the mover protruding portion to be described below in the third direction (Z-axis direction). Furthermore, at least a portion of the member extending portion 1126*c* may overlap the second groove in the third direction (Z-axis direction). Furthermore, the member extending portion 1126*c* may be positioned adjacent to the tilting guide unit. In other words, the first magnetic part in the member extending portion 1126*c* may also be positioned adjacent to the tilting guide unit. Therefore, the protruding portion (e.g., the second protruding portion) of the tilting guide unit may be accommodated in the second accommodating groove of the mover (or the mover protruding portion), and the first member 1126 may be positioned adjacent to the tilting guide unit. In other words, the center of gravity of the mover may be closer to the tilting guide unit due to the magnetic part or the like. Therefore, the center of gravity of the mover 1130 is disposed close to the protruding portion, which is a reference axis of a tilting. Therefore, when the holder is tilted, it is possible to minimize a moment for moving the mover 1130 for a tilting. Therefore, it is possible to minimize the current consumption for driving the coil, thereby reducing the power consumption of the camera actuator.

Furthermore, the first stepped portion 1126*t*1 and the second stepped portion 1126*t*2 may be positioned at both end portions of the member base 1126*b*. The first stepped portion 1126*t*1 and the second stepped portion 1126*t*2 may extend in the optical axis direction at both end portions of the member base 11126*b*. Therefore, the member base 11126*b*, the first stepped portion 1126*t*1, and the second stepped portion 1126*t*2 may have an "I" shape.

Furthermore, a length d1 of the member base 1126*b* in the third direction may be smaller than a length d2 of each of the first stepped portion 1126*t*1 and the second stepped portion 1126*t*2 in the third direction (Z-axis direction). With this configuration, the first stepped portion 1126*t*1 and the second stepped portion 1126*t*2 may be accommodated in the member seating grooves 1121*h* on the first housing side portion and the second housing side portion, respectively. Therefore, the first housing 1120 may be coupled to the first member 1126. Furthermore, the first stepped portion 1126*t*1 and the second stepped portion 1126*t*2 may be coupled to the first housing by applying a bonding member or the like in the member seating groove 1121*h*.

In addition, a length of the member base 1126*b* in the second direction (Y-axis direction) may be greater than a length of the member extending portion 1126*c* in the second direction (Y-axis direction). Therefore, the member extending portion 1126*c* may be accommodated in the member accommodating groove to be described below.

In addition, the first groove 1126*h* may be positioned in the first member 1126. The first magnetic part may be seated in the first groove 1126*h*. In addition, the outer surface 1126S2 of the first member 1126 may face an inner surface of the member base. Furthermore, the second magnetic part and the first magnetic part in the first member 1126 may face each other and generate the above-described repulsive force. Therefore, since the position of the first member 1126 is fixed, the tilting guide unit may be pressed inward by the repulsive force or the tilting guide unit may be in close contact with the fourth housing side portion. Therefore, even when no current is applied to the coil, the mover may be spaced a predetermined distance from the third housing side portion and the fourth housing side portion in the first housing. In other words, a coupling strength between the mover, the housing, and the tilting guide unit may be maintained. Alternatively, the position of the mover may be maintained in the first housing.

In addition, when the first member 1126 is formed integrally with the first housing 1120, it is possible to increase the coupling strength between the first member 1126 and the first housing 1120, thereby improving the reliability of the camera actuator. In addition, when the first member 1126 is formed separately from the first housing 1120 (the present embodiment), it is possible to increase the ease of assembly and manufacture of the first member 1126 and the first housing 1120. Furthermore, upon the occurrence of defects, it is easy to separate and it is possible to reduce the amount of waste.

Figure 61:
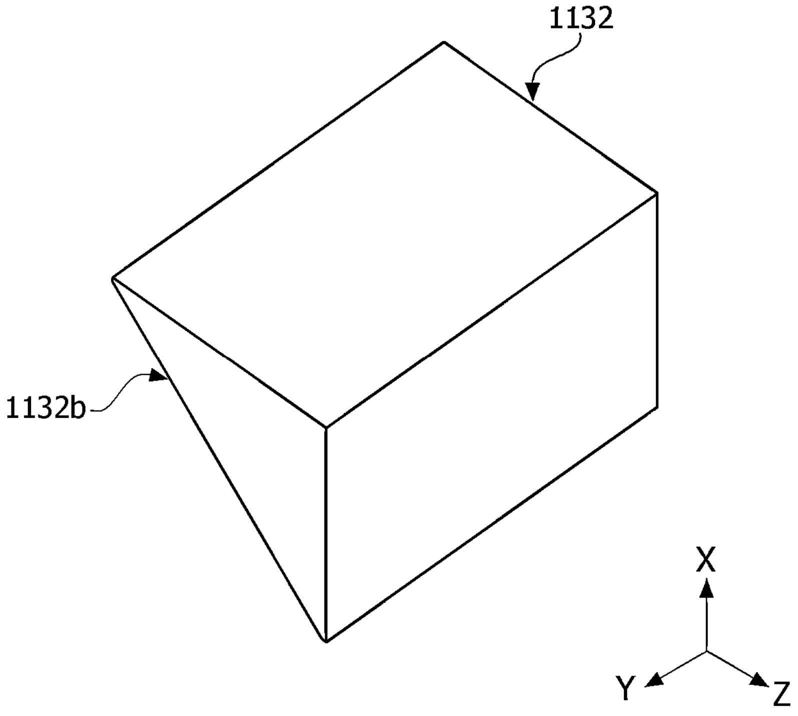
FIG. 61 is a perspective view illustrating an optical member of the first camera actuator according to the embodiment.

FIG. 61 is a perspective view illustrating an optical member of the first camera actuator according to the embodiment.

The optical member 1132 may be seated on the holder. The optical member 1132 may be a right angle prism as a reflector, but is not limited thereto. In other words, the optical member 1132 may be formed of various devices for changing the optical path through reflection or the like. For example, the optical member 1132 may include a prism or mirror.

In an embodiment, the optical member 1132 may have a protruding portion (not illustrated) formed on a portion of an outer surface thereof. The optical member 1132 may be easily coupled to the holder through the protruding portion (not illustrated). In addition, the holder may be coupled to the optical member 1132 with a groove or a protrusion.

In addition, a lower surface 1132*b* of the optical member 1132 may be seated on the seating surface of the holder. Therefore, the lower surface 1132*b* of the optical member 1132 may correspond to the seating surface of the holder. In an embodiment, the lower surface 1132*b* may be formed as an inclined surface like the seating surface of the holder. Therefore, it is possible to inhibit the optical member 1132 from being separated from the holder due to the movement of the prism according to the movement of the holder.

In addition, a groove may be formed in the lower surface 1132*b* of the optical member 1132, and a bonding member may be applied to the groove, and thus the optical member 1132 may be coupled to the holder. Alternatively, the holder may be coupled to the optical member 1132 by applying the bonding member to the groove or protrusion of the holder.

In addition, as described above, the optical member 1132 may have a structure in which the light reflected from the outside (e.g., an object) may be reflected into the camera module. As in the embodiment, the optical member 1132 may be formed of a single mirror or prism. In addition, the optical member 1132 can resolve the spatial limits of the first camera actuator and the second camera actuator by changing the path of the reflected light. Therefore, it should be understood that the camera module may provide a high range of magnification by extending the optical path while minimizing a thickness thereof. In addition, it should be understood that the camera module including the camera actuator according to the embodiment may provide a high range of magnification by extending the optical path while minimizing the thickness thereof.

Figure 62A:
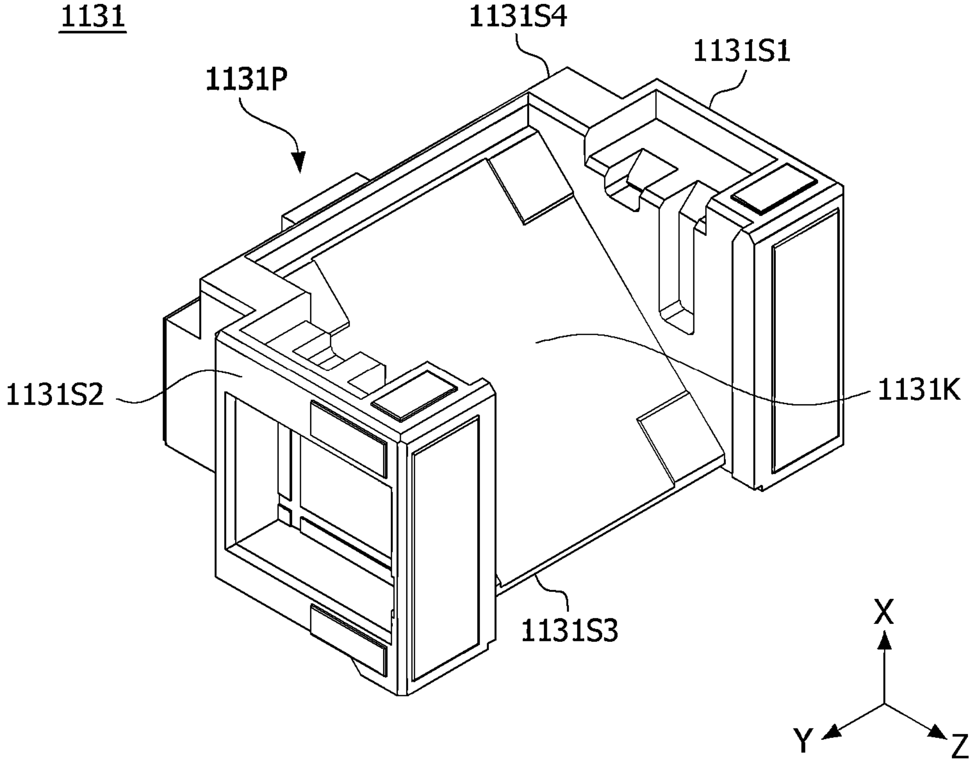
FIG. 62A is a perspective view of a holder of the first camera actuator according to the embodiment.
Figure 62B:
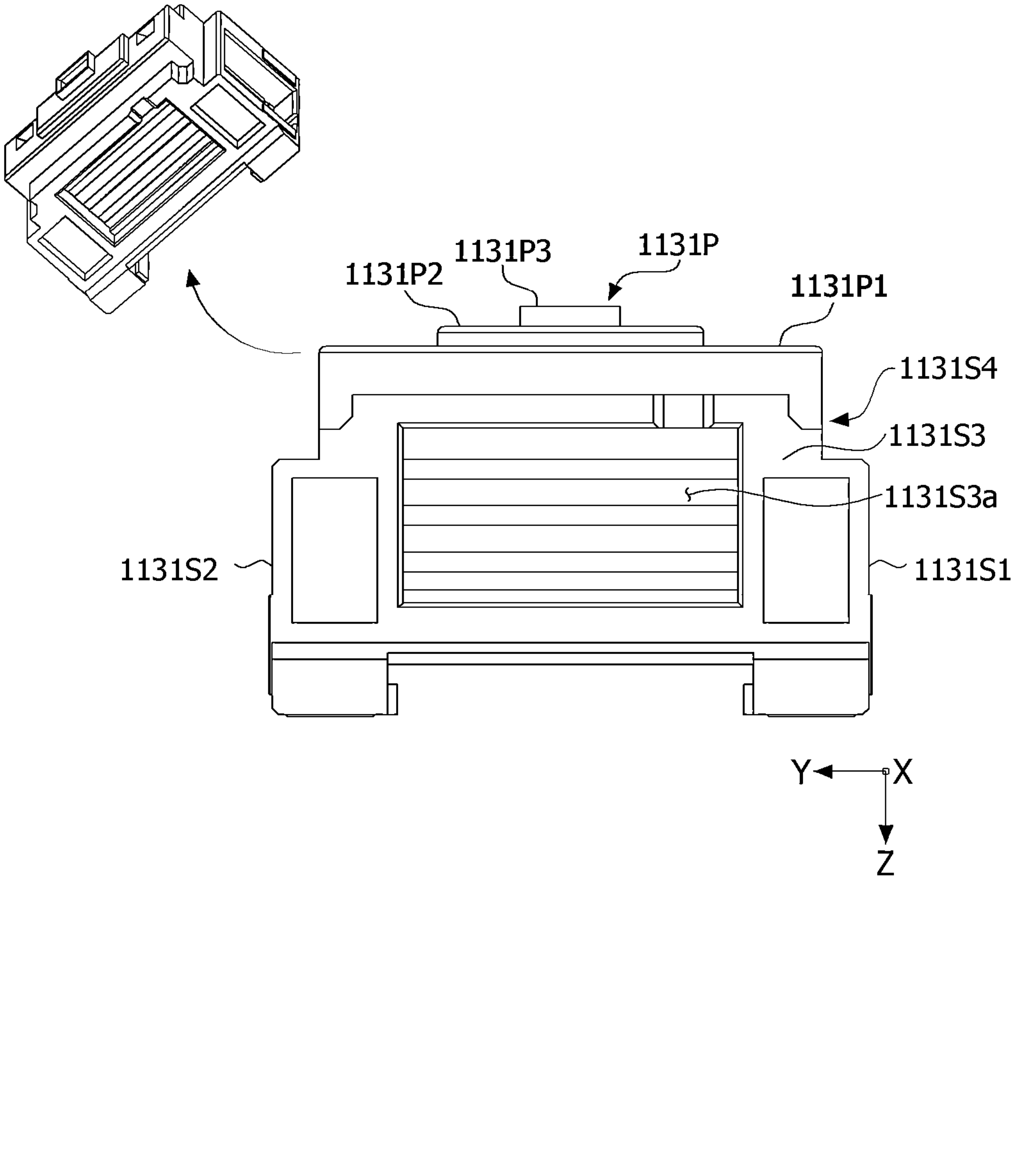
FIG. 62B is a bottom view of the holder of the first camera actuator according to the embodiment.
Figure 62C:
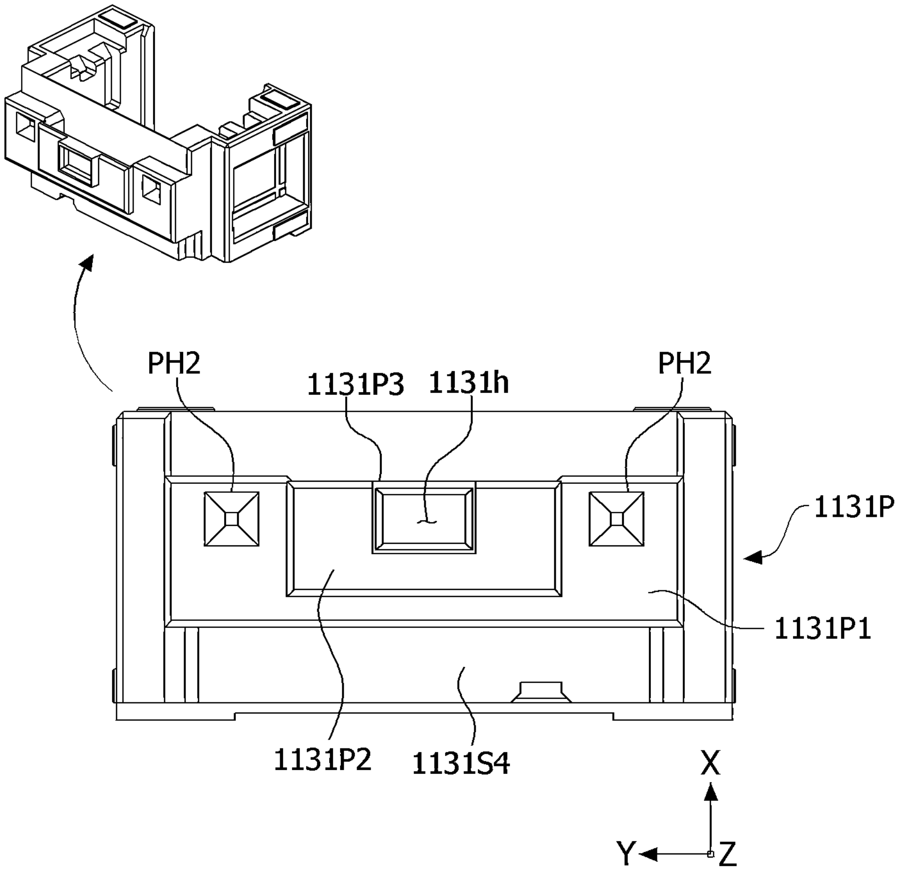
FIG. 62C is a front view of the holder of the first camera actuator according to the embodiment.
Figure 62D:
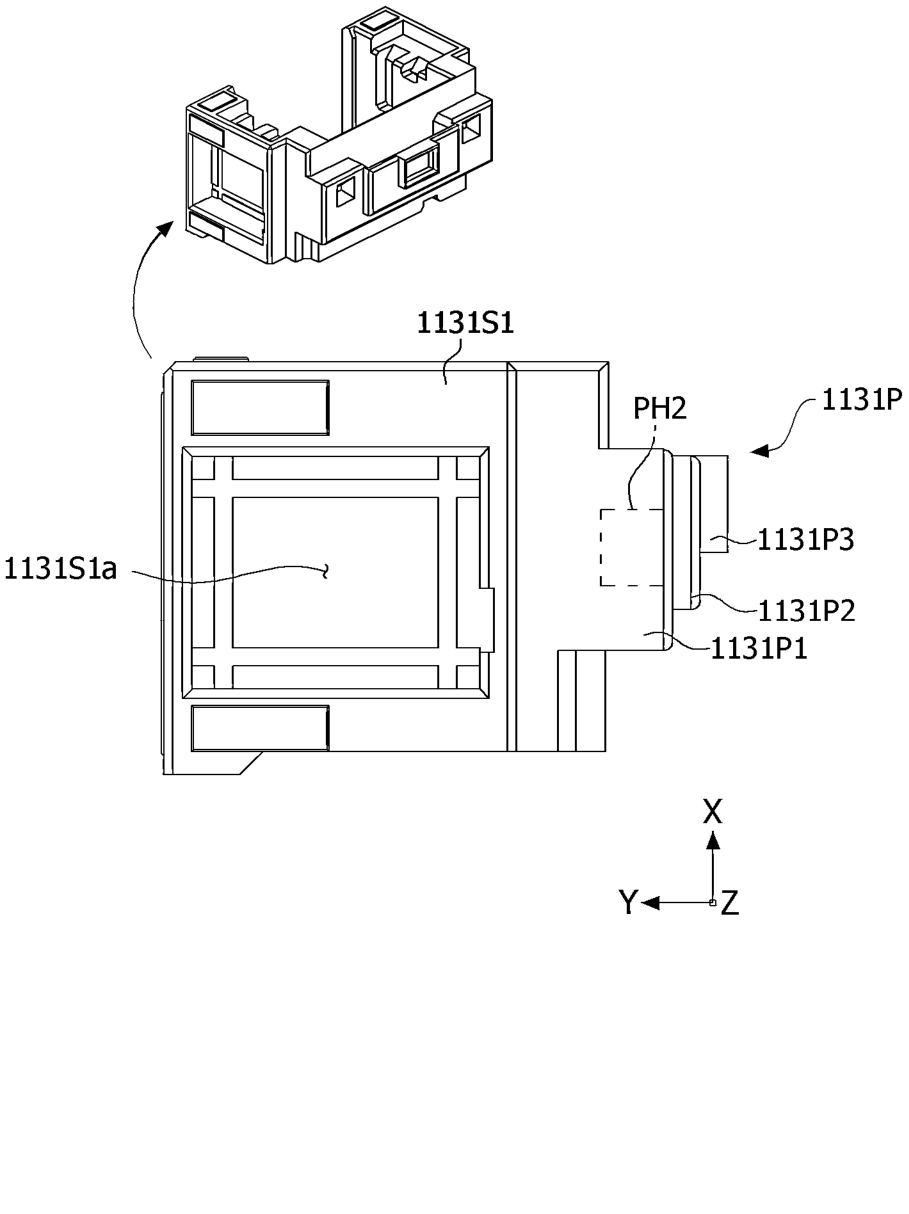
FIG. 62D is a side view of the holder of the first camera actuator according to the embodiment.
Figure 62E:
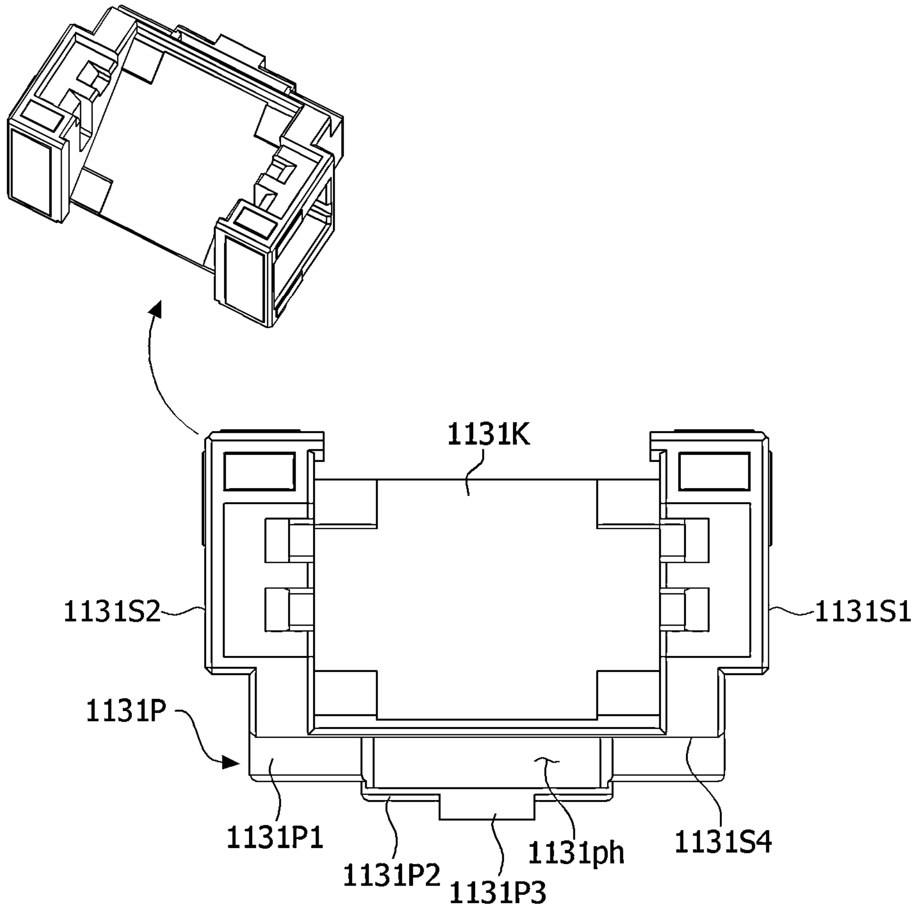
FIG. 62E is a top view of the holder of the first camera actuator according to the embodiment.

FIG. 62A is a perspective view of a holder of the first camera actuator according to the embodiment, FIG. 62B is a bottom view of the holder of the first camera actuator according to the embodiment, FIG. 62C is a front view of the holder of the first camera actuator according to the embodiment, FIG. 62D is a side view of the holder of the first camera actuator according to the embodiment, and FIG. 62E is a top view of the holder of the first camera actuator according to the embodiment.

Referring to FIGS. 62A to 62E, the holder 1131 may include a seating surface 1131*k* on which the optical member 1132 is seated. The seating surface 1131*k* may be an inclined surface. In addition, the holder 1131 may include a stepped portion on the seating surface 1131*k*. In addition, the stepped portion of the holder 1131 may be coupled to the protruding portion (not illustrated) of the optical member 1132.

The holder 1131 may include a plurality of outer surfaces. For example, the holder 1131 may include a first holder outer surface 1131S1, a second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be symmetrically disposed with the second holder outer surface 1131S2 with respect to the first direction (X-axis direction).

The first holder outer surface 1131S1 may be positioned to correspond to the first housing side portion. In other words, the first holder outer surface 1131S1 may be positioned to face the first housing side portion. In addition, the second holder outer surface 1131S2 may be positioned to correspond to the second housing side portion. In other words, the second holder outer surface 1131S2 may be positioned to face the second housing side portion.

In addition, the first holder outer surface 1131S1 may include a first seating groove 1131S1*a*. In addition, the second holder outer surface 1131S2 may include a second seating groove 1131S2*a*. The first seating groove 1131S1*a* and the second seating groove 1131S2*a* may be symmetrically disposed with respect to the first direction (X-axis direction).

In addition, the first seating groove 1131S1*a* and the second seating groove 1131S2*a* may be disposed to overlap each other in the second direction (Y-axis direction). In addition, the first magnet may be disposed in the first seating groove 1131S1*a*, and the second magnet may be disposed in the second seating groove 1131S2*a*. The first magnet and the second magnet may also be symmetrically disposed with respect to the first direction (X-axis direction). In the specification, it should be understood that the first magnet to the third magnet may be coupled to the housing through a yoke or a bonding member.

As described above, due to positions of the first and second seating grooves and the first and second magnets, an electromagnetic force generated by each magnet may be coaxially provided to the first holder outer surface S1131S1 and the second holder outer surface 1131S2. For example, a region (e.g., a portion having the strongest electromagnetic force) of the first holder outer surface S1131S1 to which the electromagnetic force is applied and a region (e.g., a portion having the strongest electromagnetic force) of the second holder outer surface S1131S2 to which the electromagnetic force is applied may be positioned on an axis parallel to the second direction (Y-axis direction). Therefore, the X-axis tilting may be accurately performed.

The third holder outer surface 1131S3 may come into contact with the first holder outer surface 1131S1 and the second holder outer surface 1131S2 and may be an outer surface extending from one sides of the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2. The third holder outer surface 1131S3 may be the lower surface of the holder 1131. In other words, the third holder outer surface 1131S3 may be positioned to face the third housing side portion.

In addition, the third holder outer surface 1131S3 may include a third seating groove 1131S3*a*. Athird magnet 1151*c* may be disposed in the third seating groove 1131S3*a*. The third holder outer surface 1131S3 may be positioned to face the third housing side portion 1123.

In addition, at least a portion of the third housing hole 1123*a* may overlap the third seating groove 1131S3*a* in the first direction (X-axis direction). Therefore, the third magnet in the third seating groove 1131S3*a* and the third coil in the third housing hole 1123*a* may be positioned to face each other. In addition, the third magnet and the third coil may generate an electromagnetic force so that the second camera actuator may tilt with respect to the Y-axis.

In addition, the X-axis tilting may be performed by a plurality of magnets (first and second magnets), while the Y-axis tilting may be performed by only the third magnet.

In an embodiment, the third seating groove 1131S3*a* may have a greater area than the first seating groove 1131S1*a* or the second seating groove **1131S2*a***. With this configuration, the Y-axis tilting may be performed by current control similar to that of the X-axis tilting.

The fourth holder outer surface 1131S4 may come into contact with the first holder outer surface 1131S1 and the second holder outer surface 1131S2 and may be an outer surface extending from the first holder outer surface 1131S1 and the second holder outer surface 1131S2 in the first direction (X-axis direction). In addition, the fourth holder outer surface 1131S4 may be positioned between the first holder outer surface 1131S1 and the second holder outer surface 1131S2. In other words, the fourth holder outer surface 1131S4 may include a mover protruding portion 1131P.

The mover protruding portion 1131P may pass through the tilting guide unit. For example, the mover protruding portion 1131P may pass through the first base groove and the second base groove of the tilting guide unit. In addition, the mover protruding portion 1131P may pass through at least a portion of the base of the tilting guide unit. Furthermore, the mover protruding portion 1131P may include a second protrusion groove PH2 in which the second protruding portion of the tilting guide unit is seated. Furthermore, the mover protruding portion 1131P may include a second groove in which the second magnetic part is seated. Therefore, the mover may allow the tilting guide unit to be in close contact with or pressed to the fourth housing side portion by the repulsive force between the first and second magnetic parts. In other words, the mover (or the holder) may apply a force to the tilting guide unit in the same direction as the repulsive force generated by the second magnetic part.

The second magnetic part may be disposed on the mover 1130. In the present embodiment, except for the description of the optical member, the mover may have the same meaning as the holder. For example, the mover protruding portion 1131P may extend or protrude toward the tilting guide unit on the fourth holder outer surface of the holder.

As described above, the mover protruding portion 1131P of the holder 1131 may pass through at least a portion of the tilting guide unit, and the second magnetic part may be disposed in the mover protruding portion 1131P.

In an embodiment, the mover protruding portion 1131P may include a first layer 1131P1, a second layer 1131P2, and a third layer 1131P3. The first layer 1131P1, the second layer 1131P2, and the third layer 1131P3 may be sequentially disposed away from the fourth holder outer surface 1131S4. In other words, the third layer 1131P3 may be closest to the tilting guide unit or the fourth housing side portion. In addition, the first layer 1131P1 may come into contact with the fourth holder outer surface 1131S4 and may be positioned under the fourth holder outer surface 1131S4.

Areas of the first layer 1131P1, the second layer 1131P2, and the third layer 1131P3 may be sequentially decreased.

In addition, the second protrusion groove PH2 may be disposed on the mover protruding portion 1131P. In particular, the second protrusion groove PH2 may be positioned in the first layer 1131P1. The second protrusion groove PH2 may be positioned in a region of the first layer 1131P1 not overlapping the second layer 1131P2 and the third layer 1131P3 in the third direction (Z-axis direction). Therefore, the second protrusion groove PH2 may be exposed, and the second protruding portion may be seated in the second protrusion groove PH2.

The second layer 1131P2 may be disposed on the first layer 1131P1. Furthermore, the mover protruding portion 1131P may include a member accommodating groove **1131*h* in which at least a portion of the first member is accommodated. In an embodiment, the member extending portion of the first member may be positioned in the member accommodating groove 1131*h*. Furthermore, the first magnetic part of the first member may be accommodated in the member accommodating groove 1131*h*. In addition, the first magnetic part may be disposed in the member accommodating groove 1131*h*. In this case, at least a portion of the first member and the first magnetic part may be disposed to be spaced apart from the member accommodating groove 1131*h***. In other words, a tilting may be performed by having a separation space. In other words, it is possible to secure a tilting space.

An opening direction of the member accommodating groove **1131*h* may be an upward direction. Therefore, foreign substances (e.g., generated due to a collision) in the member accommodating groove 1131*h*, which will be described below, may be present only in the member accommodating groove 1131*h*** without moving to the outside. Therefore, it is possible to improve the reliability of the first camera actuator.

In addition, at least a portion of the member accommodating groove **1131*h*** may overlap the first magnetic part and the second magnetic part in the third direction (Z-axis direction).

In addition, the first magnetic part may face an inner surface of the member accommodating groove **1131*h***.

Therefore, the second magnetic part, the first magnetic part, and the optical member seated on the holder may be disposed sequentially. Therefore, the repulsive force generated by the first magnetic part and the second magnetic part may press the tilting guide unit so that the mover accommodated in the second protruding portion of the tilting guide unit may be axially rotated in the accommodating portion of the housing.

The third layer 1131P3 may be disposed above the second layer 1131P2. The third layer 1131P3 may overlap the second layer 1131P2 and the first layer 1131P1 in the optical axis direction (Z-axis direction). In addition, the second layer 1131P2 may also overlap the first layer 1131P1 in the optical axis direction (Z-axis direction).

The member accommodating groove **1131*h* may be formed in one region of each of the first layer 1131P1 and the second layer 1131P2. In addition, the second groove 1131Ph that is open in a direction opposite to the third direction (Z-axis direction) may be positioned in the third layer 1131P3. For example, the second groove 1131Ph may be positioned on an outer surface of the third layer 1131P3. In addition, the second groove 1131Ph may be open toward the tilting guide unit. Therefore, the second magnetic part may be easily assembled into the second groove 1131**Ph.

Alternatively, the second groove 1131Ph may be positioned in the third layer 1131P3. With this configuration, it is possible to increase the repulsive force between the first magnetic part and the second magnetic part and easily protect the second magnetic part.

In addition, a maximum diameter of the second protrusion groove PH2 in the description of the first layer 1131P1 may correspond to a maximum diameter of the second protruding portion. This can be equally applied to the first protrusion groove and the first protruding portion. In other words, the maximum diameter of the second protrusion groove may correspond to the maximum diameter of the second protruding portion PR2. Therefore, the second protruding portion may come into contact with the second protrusion groove. With this configuration, a first-axis tilting can be easily performed based on the first protruding portion, a second-axis tilting can be easily performed based on the second protruding portion, and a tilting radius can be increased.

In addition, in an embodiment, the first protrusion groove and the second protrusion groove PH2 may be provided as a plurality of protrusion grooves. For example, any one of the first protrusion groove and the second protrusion groove PH2 may include a 1-1 protrusion groove and a 1-2 protrusion groove. Hereinafter, a case in which the first protrusion groove includes the 1-1 protrusion groove and the 1-2 protrusion groove will be described. In addition, the following description may also be applied to the second protrusion groove PH2 in the same manner. For example, the second protrusion groove PH2 may include a 2-1 protrusion groove and a 2-2 protrusion groove, in which the description of the 1-1 protrusion groove may be applied to the 2-1 protrusion groove, and the description of the 1-2 protrusion groove may be applied to the 2-2 protrusion groove.

The 1-1 protrusion groove and the 1-2 protrusion groove may be disposed side by side in the first direction (x-axis direction). The 1-1 protrusion groove and the 1-2 protrusion groove may have the same maximum area.

The number of inclined surfaces of each of the plurality of first protrusion grooves may be different. For example, the first protrusion groove may include a groove lower surface and an inclined surface. In this case, the number of inclined surfaces of each of the plurality of protrusion grooves may be different. In addition, the lower surfaces of the protrusion grooves may also have different areas. For example, the first protrusion groove and the second protrusion groove PH2 may come into contact with the protruding portions of the tilting guide unit through a plurality of contact points.

For example, the 1-1 protrusion groove may include a first groove lower surface and a first inclined surface. The 1-2 protrusion groove may include a second groove lower surface and a second inclined surface.

In this case, the first groove lower surface and the second groove lower surface may have different areas. The first groove lower surface may have a smaller area than the second groove lower surface.

In addition, the number of first inclined surfaces in contact with the first groove lower surface may differ from the number of second inclined surfaces. For example, the number of first inclined surfaces may be greater than the number of second inclined surfaces.

With this configuration, it is possible to easily compensate an assembly tolerance of the first protruding portion seated in the first protrusion groove. For example, since the number of first inclined surfaces is greater than the number of second inclined surfaces, the first protruding portion may come into contact with more inclined surfaces to more accurately maintain the position of the first protruding portion in the 1-1 protrusion groove.

In contrast, in the 1-2 protrusion groove, the number of inclined surfaces in contact with the first protruding portion may be smaller than that of the 1-1 protrusion groove, and thus the position of the first protruding portion may be easily adjusted.

In an embodiment, the second inclined surfaces may be disposed to be spaced apart from each other in the second direction (Y-axis direction). In addition, the second groove lower surface may extend in the first direction (X-axis direction) so that the first protruding portion may be easily moved in the first direction (X-axis direction) in a state of being in contact with the second inclined surface. In other words, the position of the first protruding portion in the 1-2 protrusion groove may be easily adjusted.

Figure 63A:
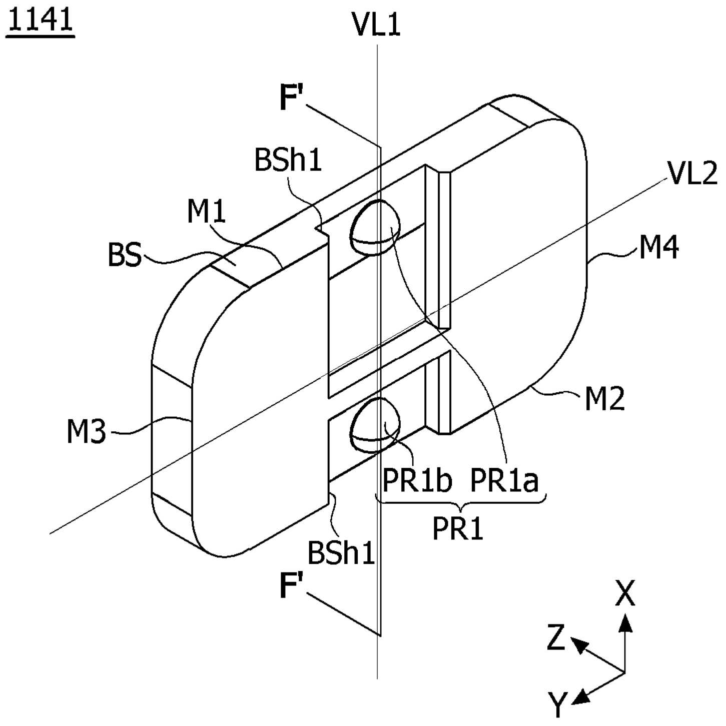
FIG. 63A is a perspective view of a tilting guide unit of the first camera actuator according to the embodiment.
Figure 63B:
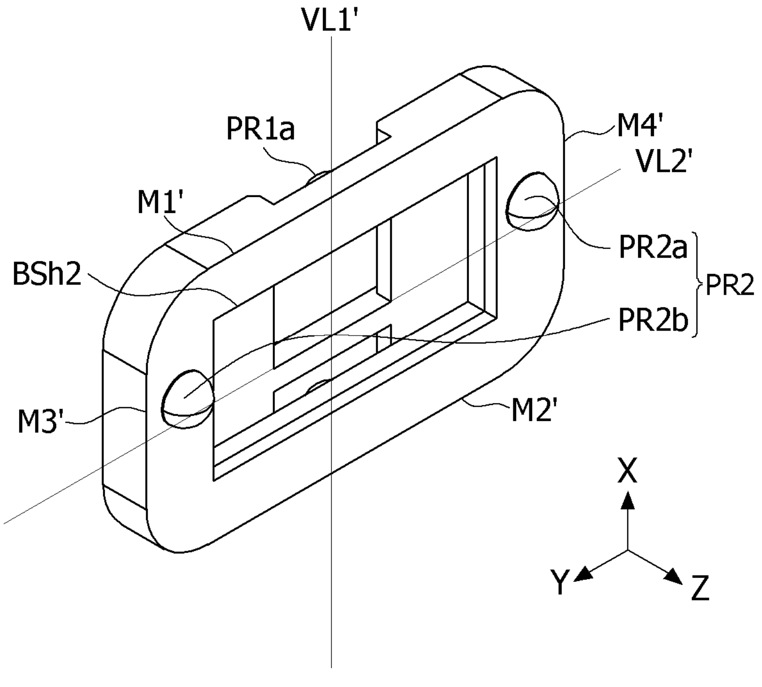
FIG. 63B is a perspective view of the tilting guide unit of the first camera actuator in a different direction from that of FIG. 63A.
Figure 63C:
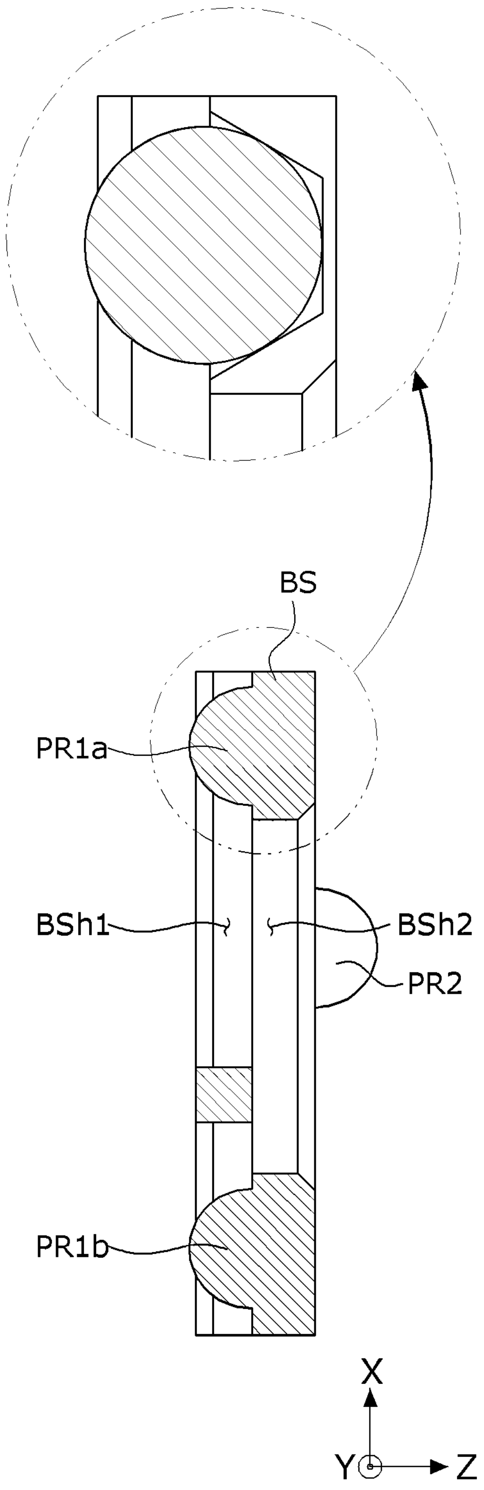
FIG. 63C is a cross-sectional view along line F-F' in FIG. 63A.

FIG. 63A is a perspective view of a tilting guide unit of the first camera actuator according to the embodiment, FIG. 63B is a perspective view of the tilting guide unit of the first camera actuator in a different direction from that of FIG. 63A, and FIG. 63C is a cross-sectional view along line F-F' in FIG. 63A.

The tilting guide unit 1141 according to the embodiment may include a base BS, the first protruding portion PR1 protruding from a first surface 1141*a* of the base BS, and the second protruding portion PR2 protruding from a second surface 1141*b* of the base BS. In addition, the first protruding portion and the second protruding portion may be formed on the second surface 1141*b* and the first surface 1141*a*, respectively according to the structure, but the present invention will be described below based on the drawings. In addition, it should be understood that the first protruding portion PR1 and the second protruding portion PR2 may be formed integrally with the base BS, and as illustrated in the drawings, the first protruding portion PR1 and the second protruding portion PR2 may have a ball or spherical shape.

First, the base BS may include the first surface 1141*a* and the second surface 1141*b* opposite to the first surface 1141*a*. In other words, the first surface 1141*a* may be spaced apart from the second surface 1141*b* in the third direction (Z-axis direction), and the first surface 1141*a* and the second surface 1141*b* may be outer surfaces opposite to each other or facing each other in the tilting guide unit 1141.

The tilting guide unit 1141 may include the first protruding portion PR1 extending to one side on the first surface 1141*a*. According to the embodiment, the first protruding portion PR1 may protrude toward the holder from the first surface 1141*a*. The first protruding portions PR1 may be provided as a plurality of first protruding portions and may include a 1-1 protrusion PR1a and a 1-2 protrusion PR1b. In addition, the first base groove BSh1 may be positioned in the first surface 1141*a*. Furthermore, a plurality of first base grooves BSh1 may be formed in the first direction (X-axis direction). Therefore, a stepped portion may be present between adjacent first base grooves BSh1. Therefore, the first base groove BSh1 may accommodate the protrusion positioned on the above-described inner surface of the fourth housing side portion. Furthermore, the first protruding portion PR1 may be accommodated in the first protrusion groove positioned in the protrusion of the fourth housing side portion. Therefore, it is possible to increase the coupling strength between the tilting guide unit 1141 and the first housing. Furthermore, for coupling, a bonding member is applied to the first protrusion groove so that the tilting guide unit 1141 may be easily coupled to the fourth housing side portion or the first housing.

The 1-1 protrusion PR1a and the 1-2 protrusion PR1b may be positioned side by side in the first direction (X-axis direction). In other words, the 1-1 protrusion PR1a and the 1-2 protrusion PR1b may overlap each other in the first direction (X-axis direction). In addition, in the embodiment, the 1-1 protrusion PR1a and the 1-2 protrusion PR1b may be bisected by a virtual line extending in the first direction (X-axis direction).

In addition, each of the 1-1 protrusion PR1a and the 1-2 protrusion PR1b may have a certain curvature and have, for example, a hemispherical shape. In addition, the 1-1 protrusion PR1a and the 1-2 protrusion PR1b may be in contact with the first groove of the housing at a point that is the farthest from the first surface 1141*a* of the base BS. However, the present invention is not limited thereto In addition, the first protruding portion PR1 may be positioned in the first base groove BSh1, and at least a portion of the first protruding portion PR1 may protrude more in a direction opposite to the third direction (Z-axis direction) than the first surface 1141*a*. In other words, a height of the first base groove BSh1 may be smaller than a height of the first protruding portion PR1 (third direction).

In addition, an align groove may be positioned in the first surface 1141*a*. The align groove may be disposed at one side of the first surface 1141*a* to provide an assembling position or assembling direction of the tilting guide unit 1141 in an assembling process.

In addition, the tilting guide unit 1141 may include the second protruding portion PR2 extending to one side on the second surface 1141*b*. According to the embodiment, the second protruding portion PR2 may protrude toward the housing from the second surface 1141*b*. In addition, the second protruding portion PR2 may be provided as a plurality of second protruding portion and may include a 2-1 protrusion PR2a and a 2-2 protrusion PR2b in the embodiment.

In addition, a second base groove BSh2 may be positioned in the second surface 1141*b*. A length of the second base groove BSh2 in the first direction may be smaller than a length between the 1-1 protrusion and the 1-2 protrusion in the first direction.

Furthermore, at least a portion of the second base groove BSh2 may overlap the first base groove BSh1 in the third direction. Therefore, the base BS may have a through hole in a region in which the first base groove BSh1 and the second base groove BSh2 overlap each other. The above-described mover protruding portion may be positioned in the through hole to pass through at least portion of the base BS. Therefore, the tilting guide unit and the first and second magnetic parts of the mover protruding portion are adjacent to each other so that the center of gravity may be adjacent to the rotational axes (first and second protruding portions). Therefore, when the holder is tilted, it is possible to minimize a moment for moving the mover for a tilting. Therefore, it is possible to minimize the current consumption for driving the coil, thereby reducing the power consumption of the camera actuator.

Furthermore, the first base groove BSh1 may be divided into two regions. Therefore, an upper region of the first base groove BSh1 may have a greater length in the first direction than a lower region thereof. For example, a ratio of the length of the upper region in the first direction to the length of the lower region in the first direction may be in a range of 1:0.15 to 1:0.3. More specifically, the ratio may be in a range of 1:0.17 to 1:0.28. More specifically, the ratio may be in a range of 1:0.19 to 1:0.27. With this configuration, it is possible to easily secure a space for the magnetic part (e.g., the second magnetic part) for the repulsion force.

The 2-1 protrusion PR2a and the 2-2 protrusion PR2b may be positioned side by side in the second direction (Y-axis direction). In other words, the 2-1 protrusion PR2a and the 2-2 protrusion PR2b may overlap each other in the second direction (Y-axis direction). In addition, in the embodiment, the 2-1 protrusion PR2a and the 2-2 protrusion PR2b may be bisected by a virtual line extending in the second direction (Y-axis direction).

Each of the 2-1 protrusion PR2a and the 2-2 protrusion PR2b may have a certain curvature and have, for example, a hemispherical shape. In addition, the 2-1 protrusion PR2a and the 2-2 protrusion PR2b may be disposed at points spaced apart from each other on the second surface 1141*b* of the base BS.

The 1-1 protrusion PR1a and the 1-2 protrusion PR1b may be positioned in a region between the 2-1 protrusion PR2a and the 2-2 protrusion PR2b in the second direction. According to the embodiment, the 1-1 protrusion PR1a and the 1-2 protrusion PR1b may be positioned at the center of a separation space between the 2-1 protrusion PR2a and the 2-2 protrusion PR2b in the second direction. With this configuration, the actuator according to the embodiment may have an angle of the X-axis tilting in the same range with respect to the X-axis. In other words, the tilting guide unit 1141 and the holder may equally provide a range (e.g., a positive/negative range) in which the X-axis tilting may be performed based on the 1-1 protrusion PR1a and the 1-2 protrusion PR1b with respect to the X-axis.

In addition, the 2-1 protrusion PR2a and the 2-2 protrusion PR2b may be positioned in a region between the 1-1 protrusion PR1a and the 1-2 protrusion PR1b in the first direction. According to the embodiment, the 2-1 protrusion PR2a and the 2-2 protrusion PR2b may be positioned at the center of a separation space between the 1-1 protrusion PR1a and the 1-2 protrusion PR1b in the first direction. With this configuration, the actuator according to the embodiment may have an angle of the Y-axis tilting in the same range with respect to the Y-axis. In other words, the tilting guide unit 1141 and the holder may equally provide a range (e.g., a positive/negative range) in which the Y-axis tilting may be performed based on the 2-1 protrusion PR2a and the 2-2 protrusion PR2b with respect to the Y-axis.

Specifically, the first surface 1141*a* may include a first outer line M1, a second outer line M2, a third outer line M3, and a fourth outer line M4. The first outer line M1 and the second outer line M2 may face each other, and the third outer line M3 and the fourth outer line M4 may face each other. In addition, the third outer line M3 and the fourth outer line M4 may be positioned between the first outer line M1 and the second outer line M2. In addition, the first outer line M1 and the second outer line M2 may be perpendicular to the first direction (X-axis direction), but the third outer line M3 and the fourth outer line M4 may be parallel to the first direction (X-axis direction).

In this case, the first protruding portion PR1 may be positioned on a first virtual line VL1. Here, the first virtual line VL1 is a line that bisects the first outer line M1 and the second outer line M2. Alternatively, the first and third virtual lines VL1 and VL1' are lines that bisect the base BS in the second direction (Y-axis direction). Therefore, the tilting guide unit 1141 may easily perform the X-axis tilting through the first protruding portion PR1. In addition, since the tilting guide unit 1141 performs the X-axis tilting with respect to the first virtual line VL1, a rotational force may be uniformly applied to the tilting guide unit 1141. Therefore, it is possible to precisely perform the X-axis tilting and improve the reliability of the device.

In addition, the 1-1 protrusion PR1a and the 1-2 protrusion PR1b may be symmetrically disposed with respect to the first virtual line VL1 and a second virtual line VL2. Alternatively, the 1-1 protrusion PR1a and the 1-2 protrusion PR1b may be symmetrically positioned based on a first central point. With this configuration, upon performing the X-axis tilting, a support force supported by the first protruding portion PR1 may be equally applied to upper and lower sides with respect to the second virtual line VL2. Therefore, it is possible to improve the reliability of the tilting guide unit. Here, the second virtual line VL2 is a line that bisects the third outer line M3 and the fourth outer line M4. Alternatively, the second and fourth virtual lines VL2 and VL2' are lines that bisect the base BS in the first direction (X-axis direction).

In addition, the first central point may be an intersection of the first virtual line VL1 and the second virtual line VL2. Alternatively, the first central point may be a point corresponding to the center of gravity according to the shape of the tilting guide unit 1141.

In addition, the second surface 1141*b* may include a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. In addition, the seventh outer line M3' and the eighth outer line M4' may be positioned between the fifth outer line M1' and the sixth outer line M2'. In addition, the fifth outer line M1' and the sixth outer line M2' may be perpendicular to the first direction (X-axis direction), but the seventh outer line M3' and the eighth outer line M4' may be parallel to the first direction (X-axis direction).

In addition, since the tilting guide unit 1141 performs the Y-axis tilting with respect to the fourth virtual line VL2', a rotational force may be uniformly applied to the tilting guide unit 1141. Therefore, it is possible to precisely perform the Y-axis tilting and improve the reliability of the device.

In addition, the 2-1 protrusion PR2a and the 2-2 protrusion PR2b may be symmetrically disposed on the fourth virtual line VL2' with respect to the third virtual line VL1'. Alternatively, the 2-1 protrusion PR2a and the 2-2 protrusion PR2b may be symmetrically positioned based on a second central point. With this configuration, upon performing the Y-axis tilting, a support force supported by the second protruding portion PR2 may be equally applied to upper and lower sides with respect to the fourth virtual line VL2'. Therefore, it is possible to improve the reliability of the tilting guide unit. Here, the third virtual line VL1' is a line that bisects the fifth outer line M1' and the sixth outer line M2'. In addition, the second central point may be an intersection of the third virtual line VL1' and the fourth virtual line VL2'. Alternatively, the first central point may be a point corresponding to the center of gravity according to the shape of the tilting guide unit 1141.

In addition, a distance between the 1-1 protrusion PR1a and the 1-2 protrusion PR1b in the first direction (X-axis direction) may be greater than a length of the second protruding portion PR2 in the first direction (X-axis direction). Therefore, when the X-axis tilting is performed based on the 1-1 protrusion PR1a and the 1-2 protrusion PR1b, it is possible to minimize resistance due to the second protruding portion PR2.

Correspondingly, a distance between the 2-1 protrusion PR2a and the 2-2 protrusion PR2b in the second direction (Y-axis direction) may be greater than a length of the first protruding portion PR1 in the second direction (Y-axis direction). Therefore, when the Y-axis tilting is performed based on the 2-1 protrusion PR2a and the 2-2 protrusion PR2b, it is possible to minimize resistance due to the first protruding portion PR1.

Figure 64:
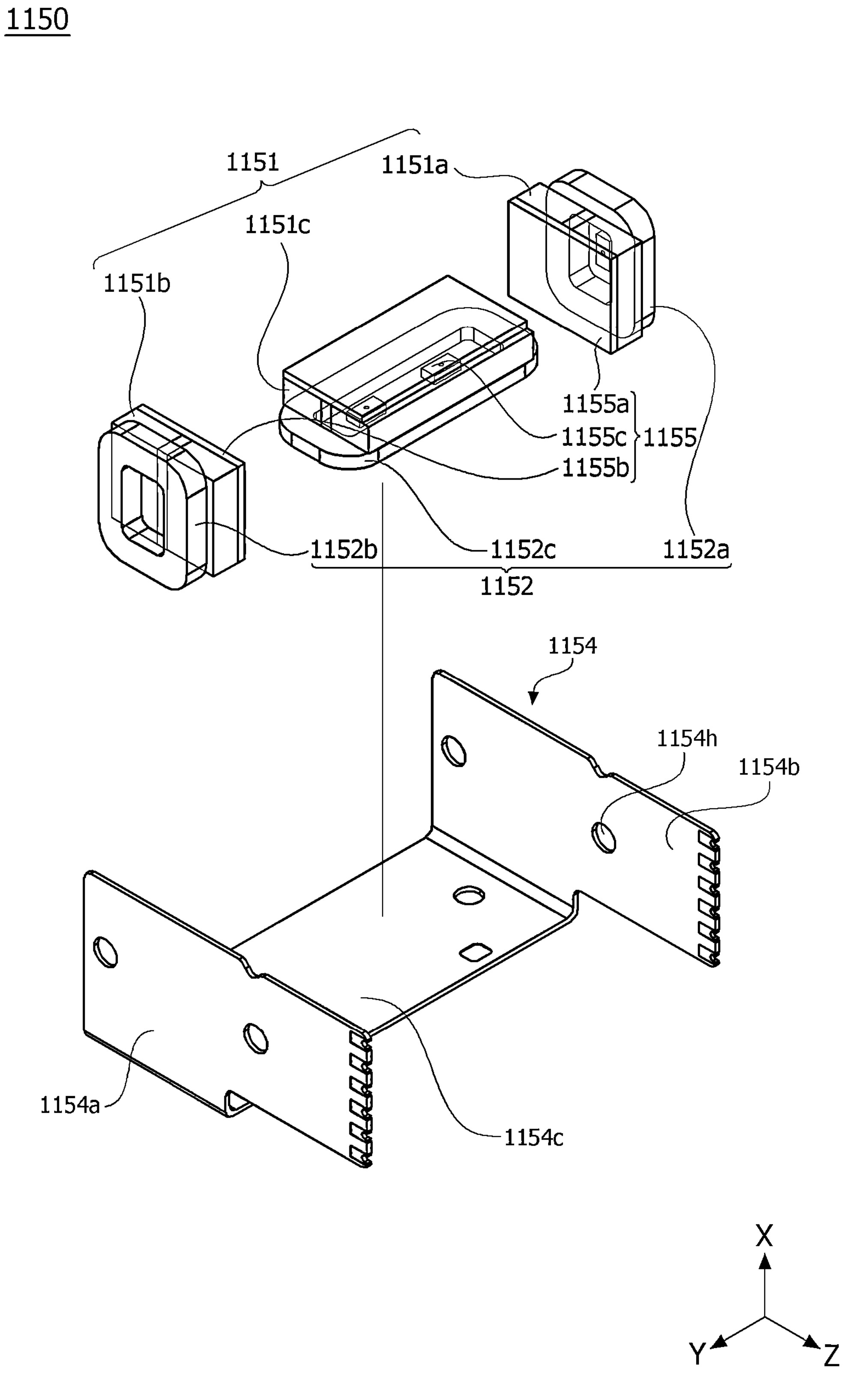
FIG. 64 is a view illustrating a first driving unit of the first camera actuator according to the embodiment.

FIG. 64 is a view illustrating a first driving unit of the first camera actuator according to the embodiment.

Referring to FIG. 64, the first driving unit 1150 includes the driving magnet 1151, the driving coil 1152, the Hall sensor part 1153, the first board part 1154, and the yoke part 1155.

In addition, as described above, the driving magnet 1151 may include the first magnet 1151*a*, the second magnet 1151*b*, and the third magnet 1151*c*, which provide a driving force generated by an electromagnetic force. The first magnet 1151*a*, the second magnet 1151*b*, and the third magnet 1151*c* may each be positioned on the outer surface of the holder 1131.

In addition, the driving coil 1152 may include a plurality of coils. In the embodiment, the driving coil 1152 may include the first coil 1152*a*, the second coil 1152*b*, and the third coil 1152*c*.

The first coil 1152*a* may be positioned to face the first magnet 1151*a*. Therefore, as described above, the first coil 1152*a* may be positioned in the first housing hole 1121*a* of the first housing side portion 1121. In addition, the second coil 1152*b* may be positioned to face the second magnet 1151*b*. Therefore, as described above, the second coil 1152*b* may be positioned in the second housing hole 1122*a* of the second housing side portion 1122.

The second camera actuator according to the embodiment may control the mover 1130 to rotate along the first axis (X-axis direction) or the second axis (Y-axis direction) by the electromagnetic force between the driving magnet 1151 and the driving coil 1152, thereby minimizing the occurrence of a decentering or tilting phenomenon and providing the best optical characteristics upon implementing an OIS.

In addition, according to the embodiment, it is possible to provide an ultra-slim and ultra-small camera actuator and the camera module including the same by implementing an OIS through the tilting guide unit 1141 of the rotating unit 1140 disposed between the first housing 1120 and the mover 1130 to resolve the size limit of the actuator.

The first board part 1154 may include a first board side portion 1154*a*, a second board side portion 1154*b*, and a third board side portion 1154*c*.

The first board side portion 1154*a* and the second board side portion 1154*b* may be disposed to face each other. In addition, the third board side portion 1154*c* may be positioned between the first board side portion 1154*a* and the second board side portion 1154*b*.

In addition, the first board side portion 1154*a* may be positioned between the first housing side portion and the shield can, and the second board side portion 1154*b* may be positioned between the second housing side portion and the shield can. In addition, the third board side portion 1154*c* may be positioned between the third housing side portion and the shield can and may be a lower surface of the first board part 1154.

The first board side portion 1154*a* may be coupled to and electrically connected to the first coil 1152*a*. In addition, the first board side portion 1154*a* may be coupled to and electrically connected to a first Hall sensor 1153*a*.

The second board side portion 1154*b* may be coupled to and electrically connected to the second coil 1152*b*. In addition, it should be understood that the second board side portion 1154*b* may be coupled to and electrically connected to the first Hall sensor.

The third board side portion 1154*c* may be coupled to and electrically connected to the third coil 1152*c*. In addition, the third board side portion 1154*c* may be coupled to and electrically connected to a second Hall sensor 1153*c*.

The yoke part 1155 may include a first yoke 1155*a*, a second yoke 1155*b*, and a third yoke 1155*c*. The first yoke 1155*a* may be positioned in the first seating groove and coupled to the first magnet 1151*a*. In addition, the second yoke 1155*b* may be positioned in the second seating groove and coupled to the second magnet 1151*b*. In addition, the third yoke 1155*c* may be positioned in the third seating groove and coupled to the third magnet 1151*c*. The first to third yokes 1155*a* to 1155*c* allow the first to third magnets

1151*a* to 1151*c* to be easily seated in the first to third seating grooves and coupled to the housing.

Furthermore, any one of the first magnet 1151*a* and the second magnet 1152*b* may be a dummy member. Therefore, it is possible to reduce the manufacturing cost.

Figure 65A:
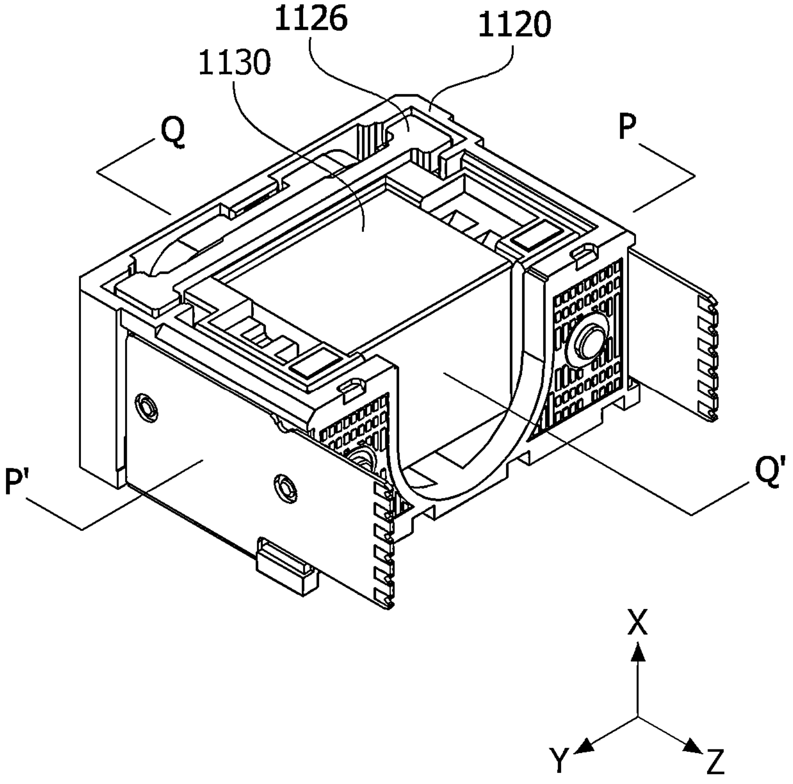
FIG. 65A is a perspective view of the first camera actuator according to the embodiment.
Figure 65B:
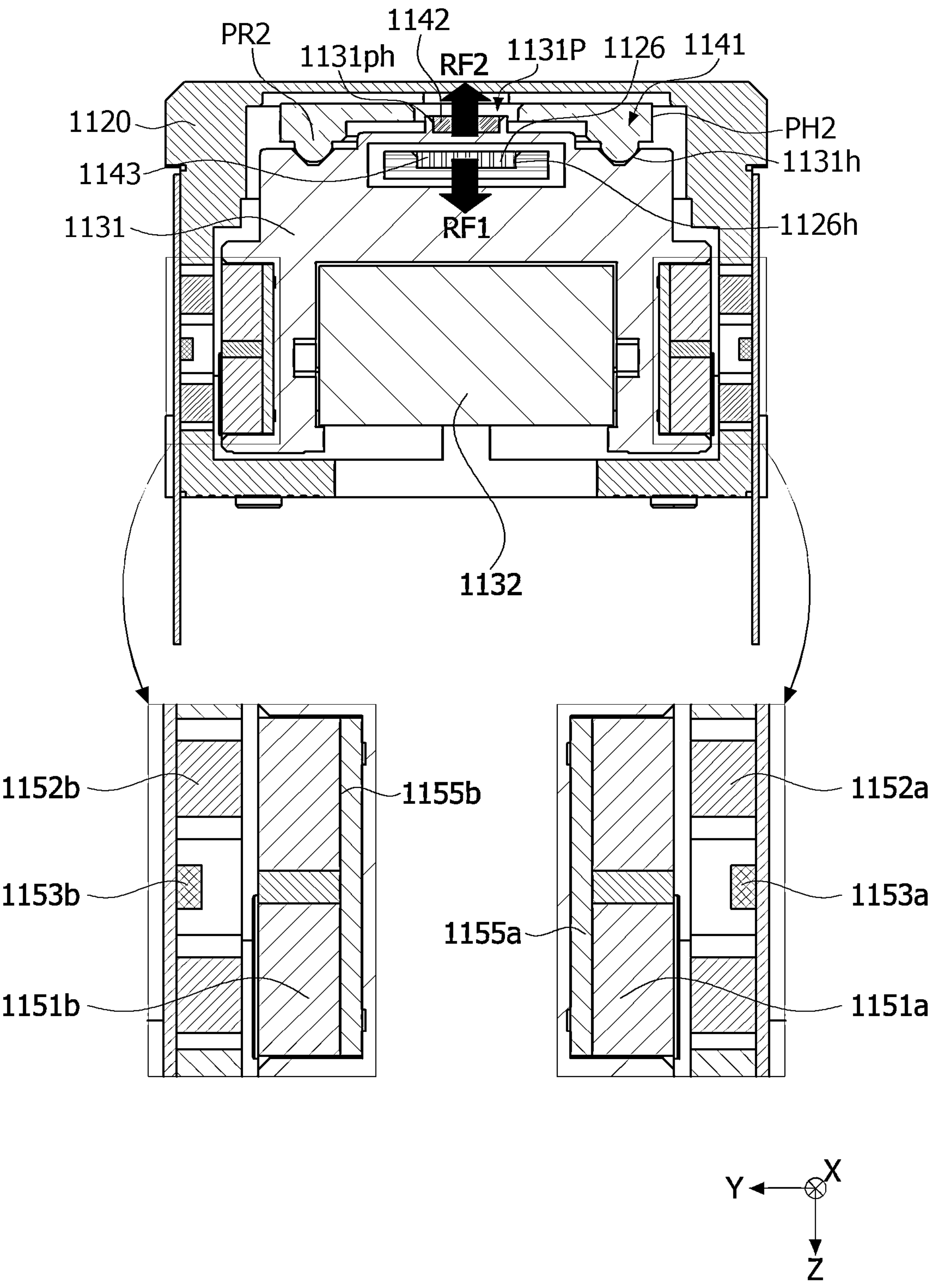
FIG. 65B is a cross-sectional view along line P-P' in FIG. 65A.
Figure 65C:
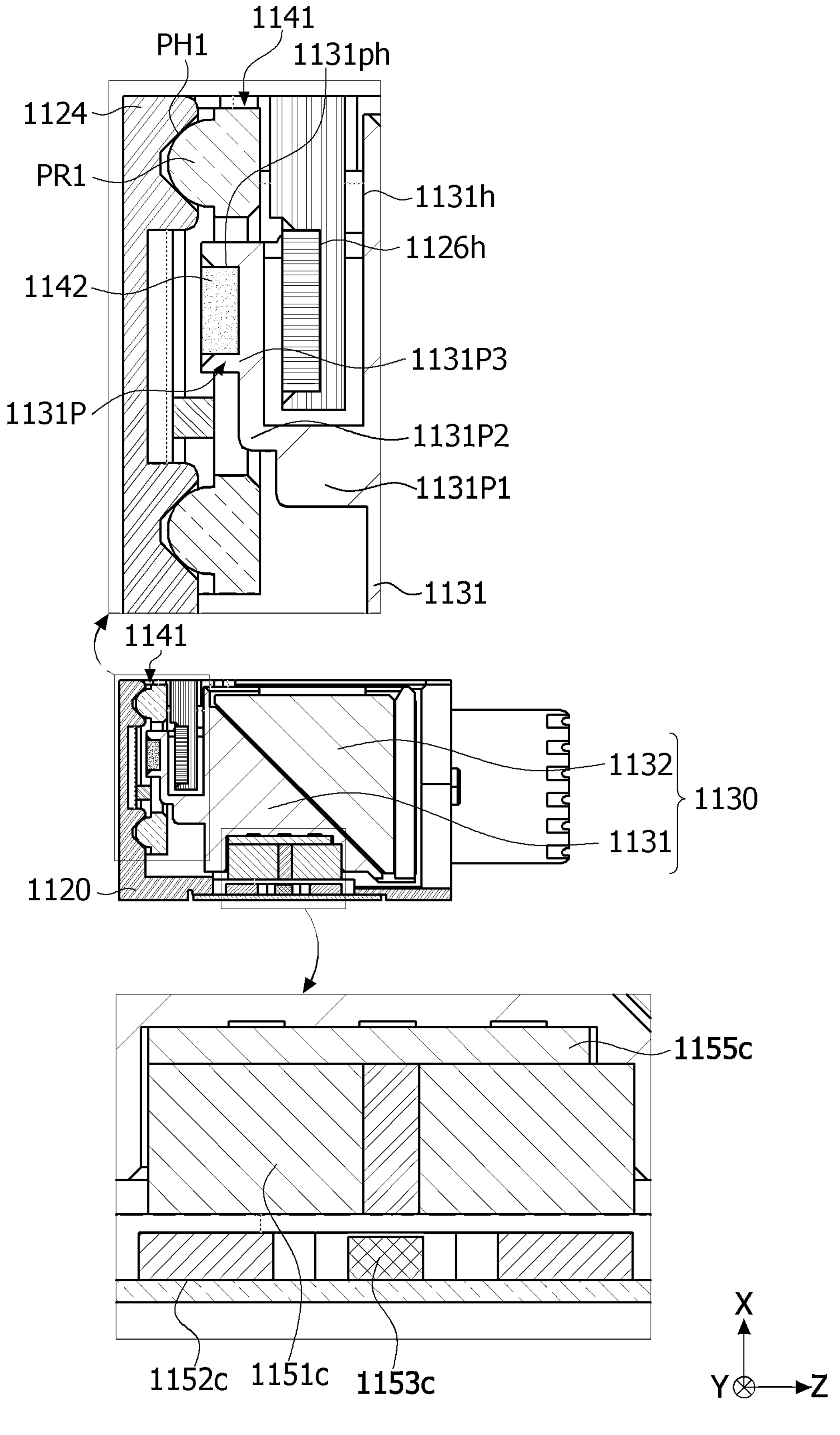
FIG. 65C is a cross-sectional view along line Q-Q' in FIG. 65A.
Figure 65D:
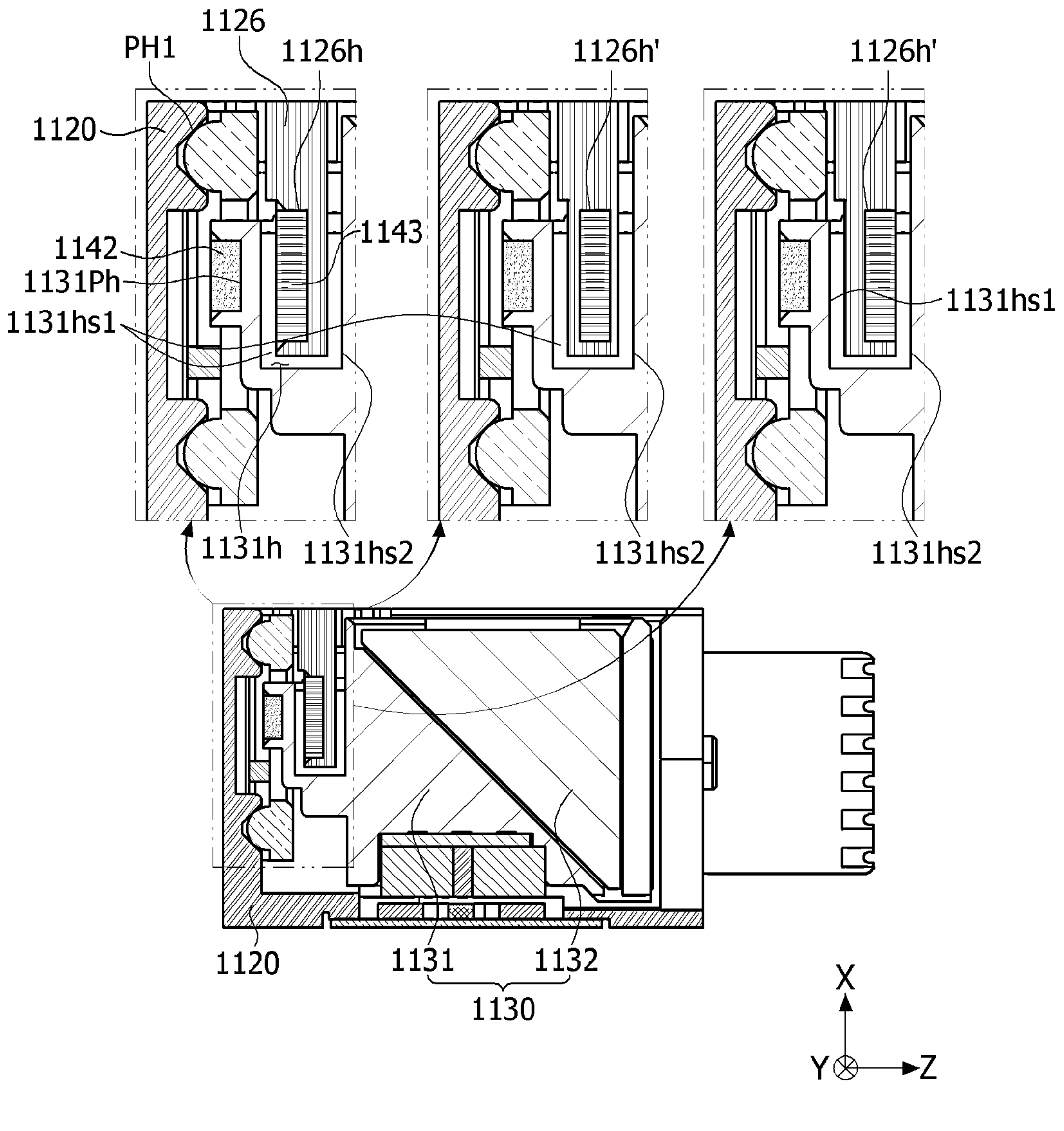
FIG. 65D is a view illustrating second magnetic parts and first members in FIG. 65C according to various embodiments.
Figure 65E:
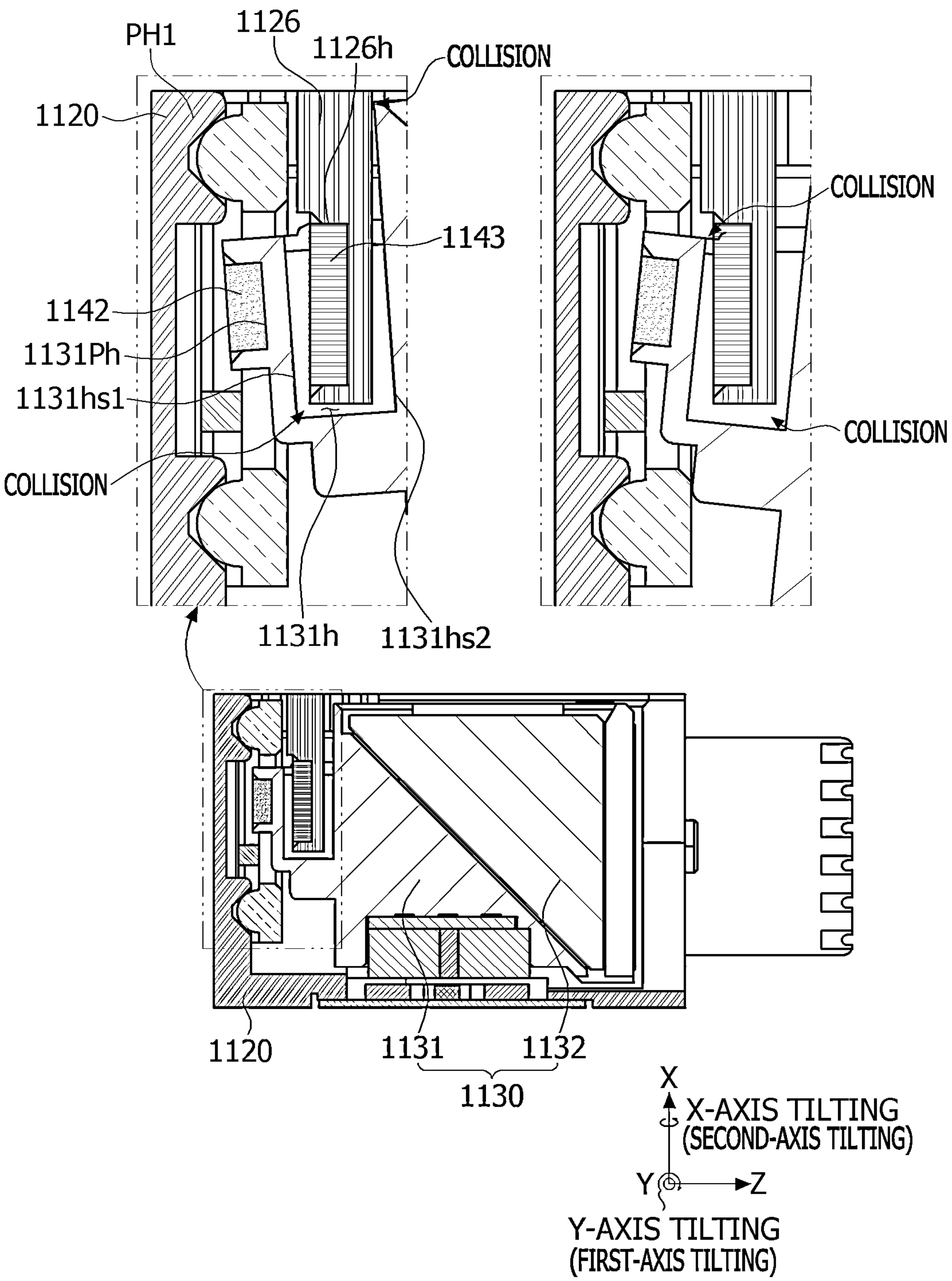
FIG. 65E is a view illustrating an example of a collision due to the rotation of a mover in FIG. 65C.

FIG. 65A is a perspective view of the first camera actuator according to the embodiment, FIG. 65B is a cross-sectional view along line P-P' in FIG. 65A, FIG. 65C is a cross-sectional view along line Q-Q' in FIG. 65A, FIG. 65D is a view illustrating second magnetic parts and first members in FIG. 65C according to various embodiments, and FIG. 65E is a view illustrating an example of a collision due to the rotation of a mover in FIG. 65C.

Referring to FIGS. 65A to 65C, the first coil 1152*a* may be positioned on the first housing side portion 1121, and the first magnet 1151*a* may be positioned on the first holder outer surface of the holder 1131. Therefore, the first coil 1152*a* and the first magnet 1151*a* may be positioned to face each other. At least a portion of the first magnet 1151*a* may overlap the first coil 1152*a* in the second direction (Y-axis direction).

In addition, the second coil 1152*b* may be positioned on the second housing side portion 1122, and the second magnet 1151*b* may be positioned on the second holder outer surface of the holder 1131. Therefore, the second coil 1152*b* and the second magnet 1151*b* may be positioned to face each other. At least a portion of the second magnet 1151*b* may overlap the second coil 1152*b* in the second direction (Y-axis direction).

In addition, the first coil 1152*a* and the second coil 1152*b* may overlap each other in the second direction (Y-axis direction), and the first magnet 1151*a* and the second magnet 1151*b* may overlap each other in the second direction (Y-axis direction).

With this configuration, the electromagnetic force applied to the outer surfaces of the holder (the first holder outer surface and the second holder outer surface) may be positioned on an axis parallel to the second direction (Y-axis direction) so that the X-axis tilting may be performed accurately and precisely.

In addition, the second protruding portion PR2 of the tilting guide unit 1141 may come into contact with the mover protruding portion 1131P. The second protruding portion PR2 may be seated in the second protrusion groove PH2 formed in the mover protruding portion 1131P. In addition, when the Y-axis tilting is performed, the second protruding portion PR2 may be a reference axis (or a rotational axis) of the tilting. Therefore, the mover 1130 may be moved in the second direction.

In addition, as described above, the first Hall sensor 1153*a* may be positioned outside to be electrically connected and coupled to the first board part 1154. However, the present invention is not limited to this position.

In addition, the third coil 1152*c* may be positioned on the third housing side portion 1123, and the third magnet 1151*c* may be positioned on the third holder outer surface of the holder 1131. At least portions of the third coil 1152*c* and the third magnet 1151*c* may overlap in the first direction (X-axis direction). Therefore, the strength of the electromagnetic force between the third coil 1152*c* and the third magnet 1151*c* may be easily controlled.

As described above, the tilting guide unit 1141 may be positioned on the fourth holder outer surface of the holder 1131.

In addition, the second magnetic part 1142 may be positioned in the second groove 1131*ph* of the third layer of the mover protruding portion 1131P. In this case, the second groove 1131*ph* and the member accommodating groove 1131*h* may be sequentially disposed in the third direction.

Furthermore, the first member 1126 positioned in the member accommodating groove 1131*h* may accommodate the first magnetic part 1143.

In addition, as described above, the first magnetic part 1143 may be disposed in the first groove 1126*h*, and the second magnetic part 1142 may be positioned to be spaced apart from the first magnetic part 1143.

Therefore, repulsive forces RF1 and RF2 generated from the first magnetic part 1143 and the second magnetic part 1142 of the first member 1126 may be transmitted to the tilting guide unit 1141, and the tilting guide unit 1141 may be pressed or may be in close contact with the housing (fourth housing side portion). Furthermore, since the first member 1126 is coupled to the first housing 1120 to have a fixed position, a distance between the first member 1126 and the fourth housing side portion may be kept constant. In contrast, the tilting guide unit 1141 may be in close contact with the fourth housing side portion by the repulsive force RF2. In addition, even when a current does not flow through the first coil to the third coil, the holder 1131 in which the mover protruding portion 1131P is formed may be in close contact with the fourth housing side portion to maintain the position thereof. Furthermore, the repulsive force caused by the first magnetic part 1143 and the second magnetic part 1142 may be positioned in the upper region of the holder 1131. In other words, when the holder 1131 is bisected in the first direction, the center of the repulsive force may be positioned in the upper region (having the member accommodating groove). In other words, the repulsive force may be biased to the upper region of the holder.

In addition, since the tilting guide unit 1141 may be disposed side by side with the first member 1126 in the third direction (Z-axis direction), at least a portion of the tilting guide unit 1141 may overlap the optical member 1132 in the first direction (X-axis direction). More specifically, in an embodiment, at least a portion of the first protruding portion PR1 may overlap the optical member 1132 in the first direction (X-axis direction).

In addition, in an embodiment, the first magnetic part 1143 may be disposed in the first member 1126 or the member accommodating groove 1131*h* and may at least partially overlap the first layer 1131P1 in the first direction (X-axis direction) or the third direction (Z-axis direction). In addition, at least a portion of the second magnetic part 1142 may overlap the tilting guide unit 1141 in the first direction (X-axis direction) or a vertical direction. Therefore, the center of gravity may be positioned adjacent to the tilting guide unit. In other words, in the camera actuator according to the embodiment, each protruding portion, which is the central axis of the tilting, may be positioned adjacent to the center of gravity of the mover. Therefore, the camera actuator according to the embodiment can minimize a moment value at which the holder is tilted and also minimize the consumption of the current applied to the coil unit or the like to tilt the holder, thereby minimizing power consumption and improving the reliability of the device.

In addition, the first magnetic part 1143 and the second magnetic part 1142 may have the same polarity for the above-described repulsive force.

Furthermore, the first magnetic part 1143 and the second magnetic part 1142 may have the same or different lengths in the first direction (X-axis direction) or the second direction (Y-axis direction). For example, the first magnetic part 1143 and the second magnetic part 1142 may have different lengths in the first direction (X-axis direction). In addition, the length of the first magnetic part 1143 in the first direction may be greater than the length of the second magnetic part 1142 in the first direction. Therefore, it is possible to reduce the positional deviation of the tilting guide unit 1141 by the second magnetic part 1142 overlapping the tilting guide unit 1141 in the first direction.

In addition, the second magnetic part 1142 and the first magnetic part 1143 may not overlap the third coil 1152*c* or the optical member 1132 in the first direction (X-axis direction). In other words, in the embodiment, the second magnetic part 1142 and the first magnetic part 1143 may be disposed to be spaced apart from the third coil 1152*c* or the optical member 1132 in the third direction (Z-axis direction). Therefore, it is possible to minimize the magnetic force transmitted from the second magnetic part 1142 and the first magnetic part 1143 to the third coil 1152*c*. Therefore, the camera actuator according to the embodiment may easily perform vertical driving (Y-axis tilting) and can minimize power consumption.

Furthermore, as described above, the second Hall sensor 1153*c* positioned inside the third coil 1152*c* may detect a change in magnetic flux, and thus perform position sensing between the third magnet 1151*c* and the second Hall sensor 1153*c*. In this case, an offset voltage of the second Hall sensor 1153*c* may be changed depending on the influence of the magnetic field generated from the second magnetic part 1142 and the first magnetic part 1143. Therefore, the first Hall sensors 1153*a* and 1153*b* may perform the position sensing of the first magnet and the second magnet.

The first camera actuator according to the embodiment may include the fourth housing side portion, the tilting guide unit, the second magnetic part 1142, the first magnetic part 1143 (first member 1126), and the holder 1131 (or the optical members 1132) disposed sequentially. However, since the second magnetic part is positioned in the mover protruding portion and the first magnetic part is positioned in the first member, the third layer of the mover protruding portion, the first layer, and the first layer (member protrusion groove) may be disposed sequentially.

In addition, in an embodiment, separation distances of the second magnetic part 1142 and the first magnetic part 1143 from the holder 1131 (or the optical member 1132) in the third direction may be greater than a separation distance from the tilting guide unit 1141. Therefore, the second Hall sensor 1153*c* under the holder 1131 may also be disposed to be spaced a predetermined distance from the second magnetic part 1142 and the first magnetic part 1143. Therefore, it is possible to minimize the influence of the magnetic field generated by the second magnetic part 1142 and the first magnetic part 1143 on the second Hall sensor 1153*c*, thereby inhibiting the Hall voltage from being concentrated to a positive or negative value and saturated. In other words, this configuration may allow a Hall electrode to have a range in which Hall calibration may be performed. Furthermore, a temperature also affects the electrode of the Hall sensor, and resolution power of a camera lens varies depending on the temperature, but in the embodiment, it is possible to inhibit the case in which the Hall voltage is concentrated to the positive or negative value to compensate the resolution power of the lens correspondingly, thereby easily inhibiting a degradation in the resolution power.

In addition, a circuit for compensating the offset with respect to the output (i.e., the Hall voltage) of the second Hall sensor 1153*c* may also be easily designed.

Referring to FIGS. 65D and 1, the first member 1126 according to the embodiment may come into contact with the inner surface of the member accommodating groove 1131*h* by the movement of the tilting guide unit 1141. For example, the inner surface of the member accommodating groove 1131*h* may include a first inner surface 1131*hs*1 and a second inner surface 1131*hs*2 that face each other in the third direction. The first inner surface 1131*hs*1 may be disposed closer to the tilting guide unit 1141 than the second inner surface 1131*hs*2 is. The inner surface of the member accommodating groove 1131*h* may include a third inner surface and a fourth inner surface that face each other in the second direction (Y-axis direction).

The first magnetic part 1143 may be disposed to face the inner surface of the member accommodating groove 1131*h*. For example, the first magnetic part 1143 may face the first inner surface 1131*hs*1. Therefore, the separation distance between the first magnetic part 1143 and the second magnetic part 1142 in the optical axis direction is small to generate an increased repulsive force. Furthermore, since the first magnetic part 1143 approaches the tilting guide unit, the center of gravity may be disposed closer to the rotational axis. In addition, the first magnetic part 1143 may face the second inner surface 1131*hs*2. Alternatively, the first magnetic part 1143 may be disposed in the first member 1126 not to be exposed.

Furthermore, as described above, the first member may come into contact with or collide with the inner surface of the member accommodating groove by the movement of the tilting guide unit. In addition, various foreign substances may be generated by a collision. At this time, the foreign substances may move in the first camera actuator and move to the optical member and the like. Furthermore, optical performance may be adversely affected when the foreign substances are positioned on the optical path. The member accommodating groove 1131*h* may surround at least a portion of the first member 1126. In particular, since the first member 1126 collides in the member accommodating groove 1131*h*, the foreign substances generated by the collision may be trapped in the member accommodating groove 1131*h*. Therefore, it is possible to improve the reliability and optical performance of the first camera actuator.

Figure 66A:
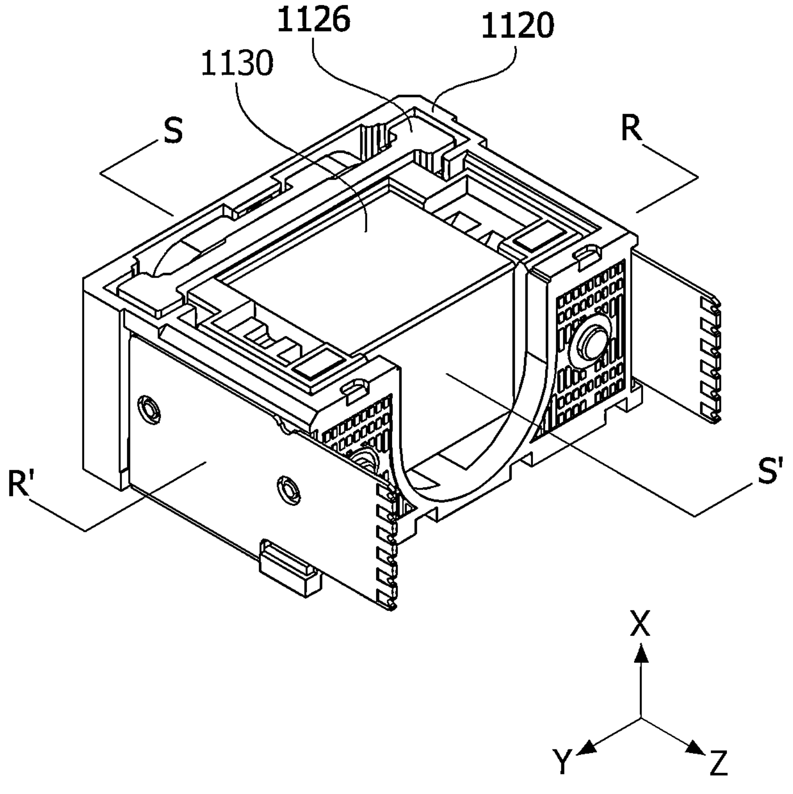
FIG. 66A is a perspective view of the first camera actuator according to the embodiment.
Figure 66B:
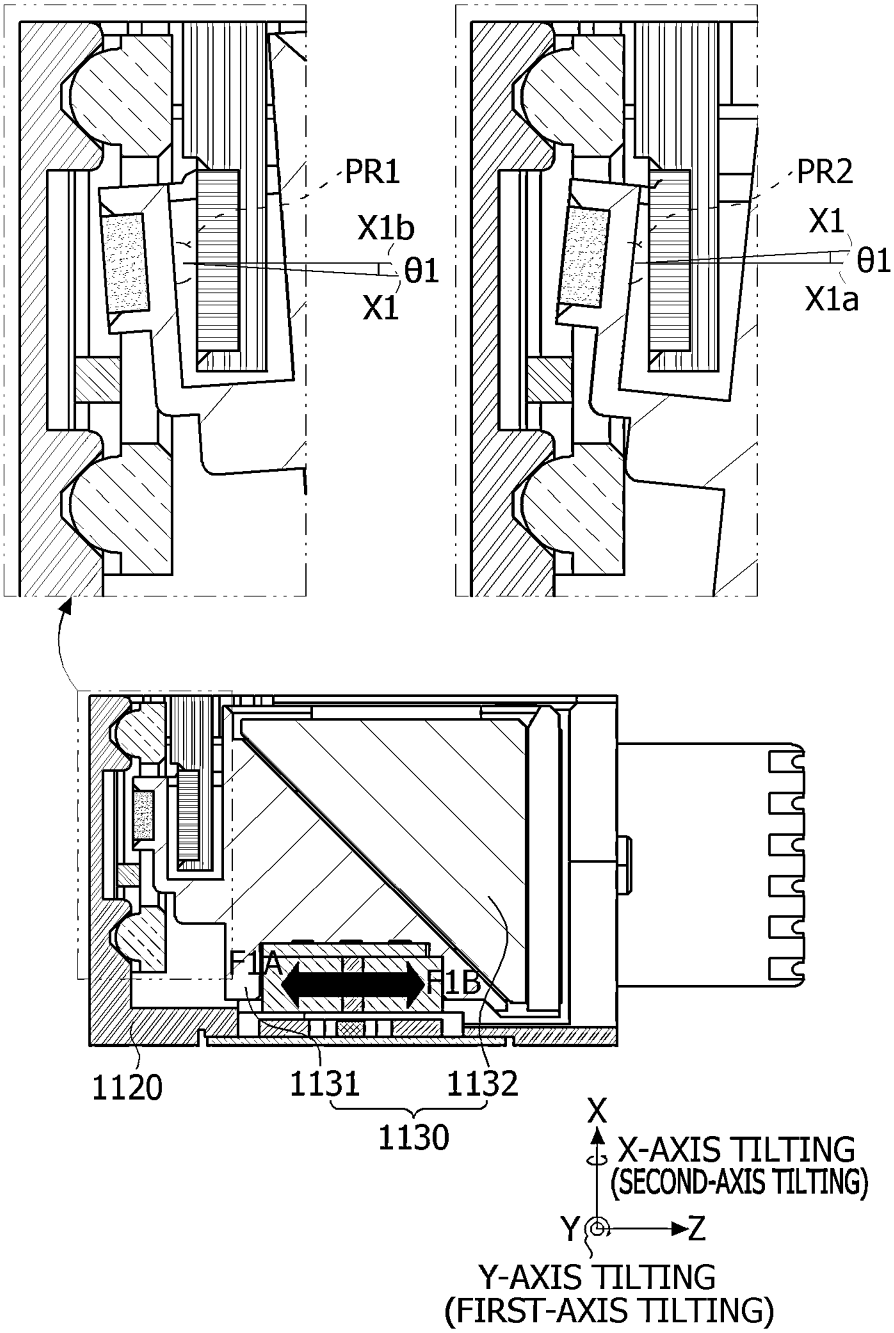
FIG. 66B is a cross-sectional view along line S-S' in FIG. 66A, which is an exemplary view of the movement of the first camera actuator.

FIG. 66A is a perspective view of the first camera actuator according to the embodiment, and FIG. 66B is a cross-sectional view along line S-S' in FIG. 66A, which is an exemplary view of the movement of the first camera actuator.

Referring to FIGS. 66A and 66B, the Y-axis tilting may be performed by the first camera actuator according to the embodiment. In other words, an OIS can be implemented by rotating the first camera actuator in the first direction (X-axis direction).

In an embodiment, the third magnet 1151*c* disposed under the holder 1131 may generate the electromagnetic force with the third coil 1152*c* to tilt or rotate the mover 1130 with respect to the second direction (Y-axis direction).

Specifically, the repulsive force between the second magnetic part 1142 and the first magnetic part 1143 may be transmitted to the first member 1126 and finally transmitted to the tilting guide unit 1141 disposed between the first member 1126 and the first housing 1120. Therefore, the tilting guide unit 1141 may be pressed by the mover 1130 and the first housing 1120 by the above-described repulsive force.

In addition, the second protruding portion PR2 may be supported by the first member 1126. In this case, in an embodiment, the tilting guide unit 1141 may rotate or tilt based on the second protruding portion PR2 protruding toward the first member 1126, which is the reference axis (or the rotational axis), that is, with respect to the second direction (Y-axis direction). In other words, the tilting guide unit 1141 may rotate or tilt based on the second protruding portion PR2 protruding toward the first member 1126 in the first direction (X-axis direction), which is the reference axis (or the rotational axis).

For example, an OIS can be implemented by rotating (X1→X1a) the mover 130 at a first angle 1 in the X-axis direction by first electromagnetic forces F1A and F1B between the third magnet 1151*c* disposed in the third seating groove and the third coil 1152*c* disposed on the third board side portion.

Conversely, an OIS can be implemented by rotating (X1→X1b) the mover 130 at the first angle θ1 in a direction opposite to the X-axis direction by the first electromagnetic forces F1A and F1B between the third magnet 1151*c* disposed in the third seating groove and the third coil 1152*c* disposed on the third board side portion.

The first angle θ1 may be in a range of 1° to ±3°. However, the present invention is not limited thereto. In addition, hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

For example, as illustrated, the electromagnetic forces F1A and F1B may be applied to the lower portion of the mover. Therefore, when the electromagnetic force F1A is applied to the lower portion of the mover, the mover moves down (corresponding to X1→X1a). In addition, when the electromagnetic force F1B is applied, the mover moves up (corresponding to X1→X1b).

Figure 67A:
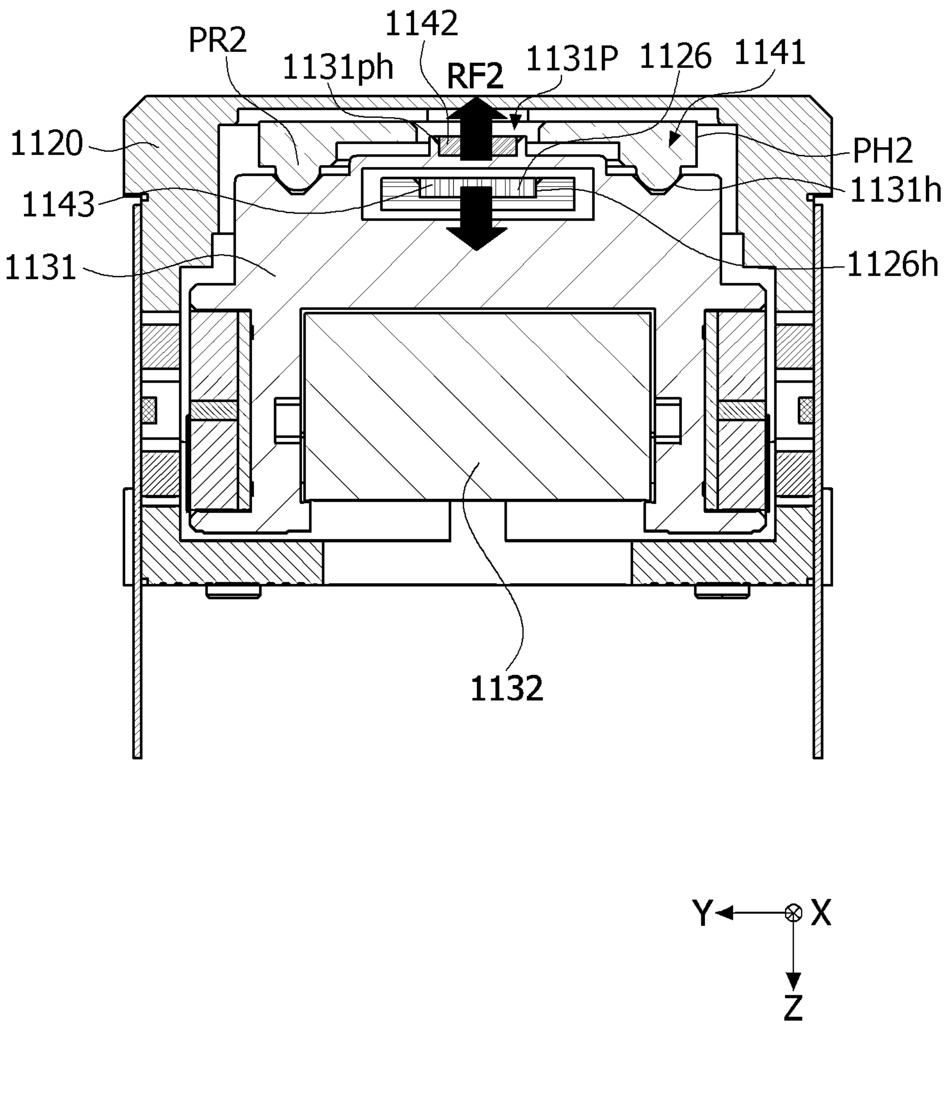
FIG. 67A is a cross-sectional view along line R-R' in FIG. 66A.
Figure 67B:
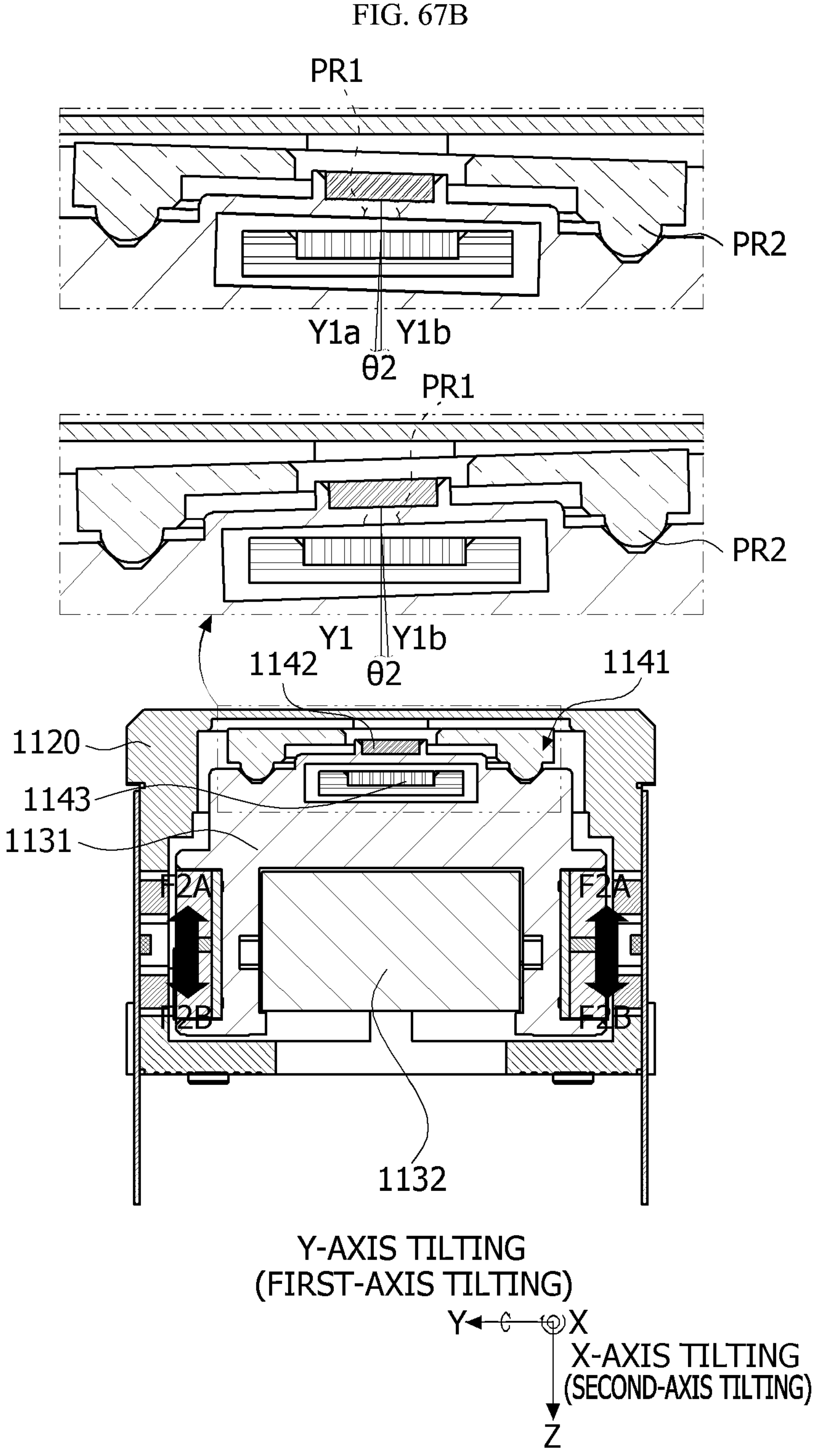
FIG. 67B is an exemplary view of the movement of the first camera actuator illustrated in FIG. 67A.

FIG. 67A is a cross-sectional view along line R-R' in FIG. 66A, and FIG. 67B is an exemplary view of the movement of the first camera actuator illustrated in FIG. 67A.

Referring to FIGS. 67A and 67B, an X-axis tilting may be performed. In other words, an OIS can be implemented by tilting or rotating the mover 1130 in the Y-axis direction.

In an embodiment, the first magnet 1151*a* and the second magnet 1151*b* disposed on the holder 1131 may generate the electromagnetic force with the first coil 1152*a* and the second coil 1152*b*, respectively, and tilt or rotate the tilting guide unit 1141 and the mover 1130 with respect to the first direction (X-axis direction).

Specifically, the repulsive force between the second magnetic part 1142 and the first magnetic part 1143 may be transmitted to the first member 1126 and the holder 1131 and finally transmitted to the tilting guide unit 1141 disposed between the holder 1131 and the first housing 1120. Therefore, the tilting guide unit 1141 may be pressed by the mover 1130 and the first housing 1120 by the above-described repulsive force.

In addition, the 1-1 protrusion PR1a and the 1-2 protrusion PR1b may be spaced apart from each other in the first direction (X-axis direction) and supported by the first protrusion groove PH1 formed in the fourth housing side portion of the first housing 1120. In addition, in an embodiment, the tilting guide unit 1141 may rotate or tilt based on the first protruding portion PR1 protruding toward the holder 1131 (e.g., in the third direction), which is the reference axis (or the rotational axis), that is, with respect to the first direction (X-axis direction).

For example, an OIS can be implemented by rotating (Y1→Y1a) the mover 130 at a second angle θ2 in the Y-axis direction by second electromagnetic forces F2A and F2B between the first and second magnets 1151*a* and 1151*b* disposed in the first seating groove and the first and second coils 1152*a* and 1152*b* disposed on the first and second board side portions. In addition, an OIS can be implemented by rotating (Y1→Y1b) the mover 130 at the second angle θ2 in the Y-axis direction by the second electromagnetic forces F2A and F2B between the first and second magnets 1151*a* and 1151*b* disposed in the first seating groove and the third and fourth coils 1152*a* and 1152*b* disposed on the first and second board side portions. The second angle θ2 may be in the range of ±1° to 3°. However, the present invention is not limited thereto.

In addition, as described above, the electromagnetic forces generated by the first and second magnets 1151*a* and 1151*b* and the first and second coils 1152*a* and 1152*b* may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may rotate with respect to the first direction. Alternatively, the mover 130 may be moved in the second direction. Therefore, the electromagnetic forces generated by the first and second magnets and the first and second coils may be opposite directions on the left side portion and the right side portion.

As described above, the second camera actuator according to the embodiment may control the mover 1130 to rotate in the first direction (X-axis direction) or the second direction (Y-axis direction) by the electromagnetic force between the driving magnet in the holder and the driving coil disposed in the first housing, thereby minimizing the occurrence of a decentering or tilting phenomenon and providing the best optical characteristics upon implementing the OIS. In addition, as described above, "Y-axis tilting" means rotation or tilting in the first direction (X-axis direction), and "X-axis tilting" means rotating or tilting in the second direction (Y-axis direction).

Figure 68:
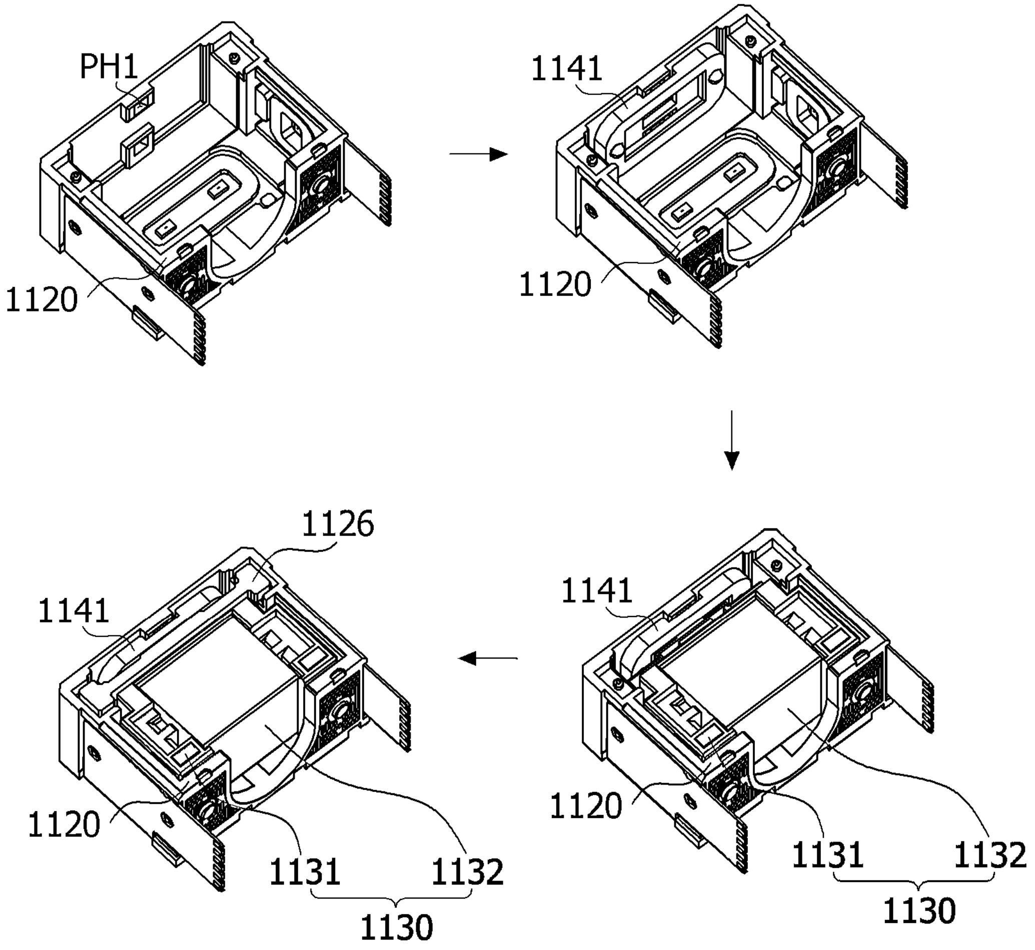
FIG. 68 is a view for describing an assembly order of the first camera actuator according to the embodiment.

FIG. 68 is a view for describing an assembly order of the first camera actuator according to the embodiment.

Referring to FIG. 68, a method of assembling the first camera actuator according to the embodiment may include coupling the first coil to the third coil and the first board part to the first housing, coupling the tilting guide unit 1141 to the first housing, coupling the mover 1130 to which a portion of the first driving unit is coupled to the tilting guide unit 1141 in the first housing 1120, and coupling the first member 1126 to the first housing 1120 by inserting the first member 1126 into the first housing 1120.

In an embodiment, inserting the tilting guide unit, which is coupled after the coupling of the first coil to the third coil and the first board part to the first housing, into the first housing 1120 may be performed. Therefore, it is possible to minimize the influence of tolerances, foreign substances, and the like generated by coupling the first coil to the third coil and the first board part to the first housing on the optical member or holder. Therefore, it is possible to increase the driving accuracy of the first camera actuator.

Furthermore, the tilting guide unit 1141 may be inserted into the first housing 1120, for example, in the third direction (Z-axis direction). In this case, a bonding member, a damper fluid, or the like may be applied to the first protrusion groove PH1, thereby increasing the coupling strength between the tilting guide unit 1141 and the first housing 1120.

In addition, the mover 1130 coupled to the first driving part (except for the first board part and the first coil) may be seated in the accommodating part of the first housing 1120. Therefore, the fourth housing side portion of the first housing 1120, the tilting guide unit 1141, and the optical member 1132 may be sequentially disposed in the third direction.

In addition, the first member 1126 may be coupled to the first housing 1120, and at least a portion of the first member 1126 may be accommodated in the member accommodating groove of the mover protruding portion. Therefore, the positions of the mover 1130 and the first housing 1120 may be maintained by the repulsive force between the first and second magnetic parts, and the tilting guide unit 1141 may be in close contact with the first housing. In this case, the first member 1126 may be fixed to the first housing through an adhesive member such as resin or fixed to the first housing by a weight when made of a metal material. In this case, a first material 11265 may be easily detachably attached to the first housing 1120. Therefore, after the first member 1126 is positioned in the first housing and the member accommodating groove and performance is checked, it may be determined whether the first camera actuator is defective or assembled. Therefore, even when the performance evaluation is "defective," the first member can be easily removed without destroying a component, and the component can be easily removed. In other words, the reuse and disassembly of components (as each component, for example, the mover, the tilting guide unit, and the first housing) may be easily performed.

Figure 69:
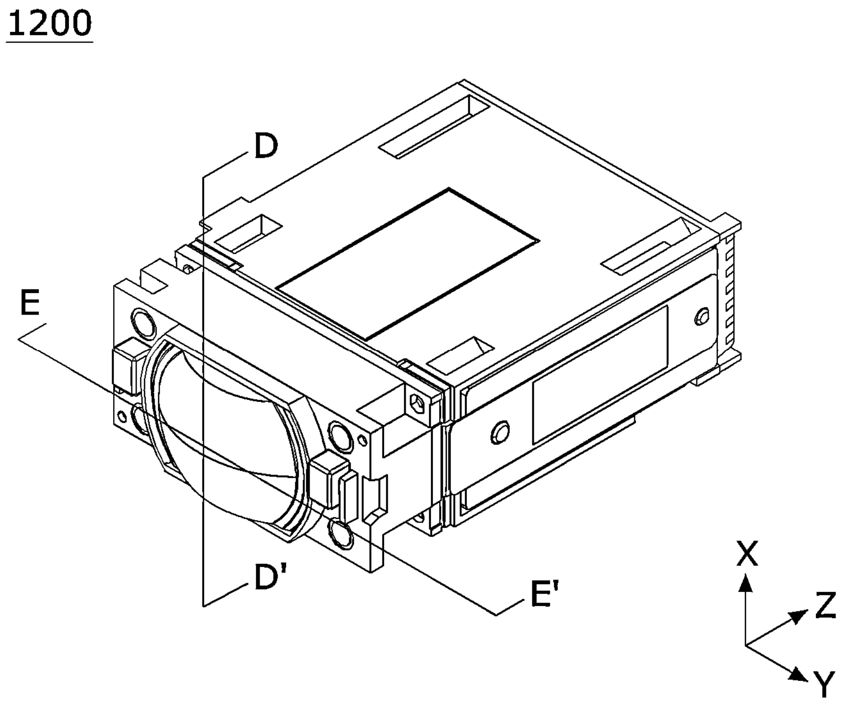
FIG. 69 is a perspective view of a second camera actuator according to the embodiment.
Figure 70:
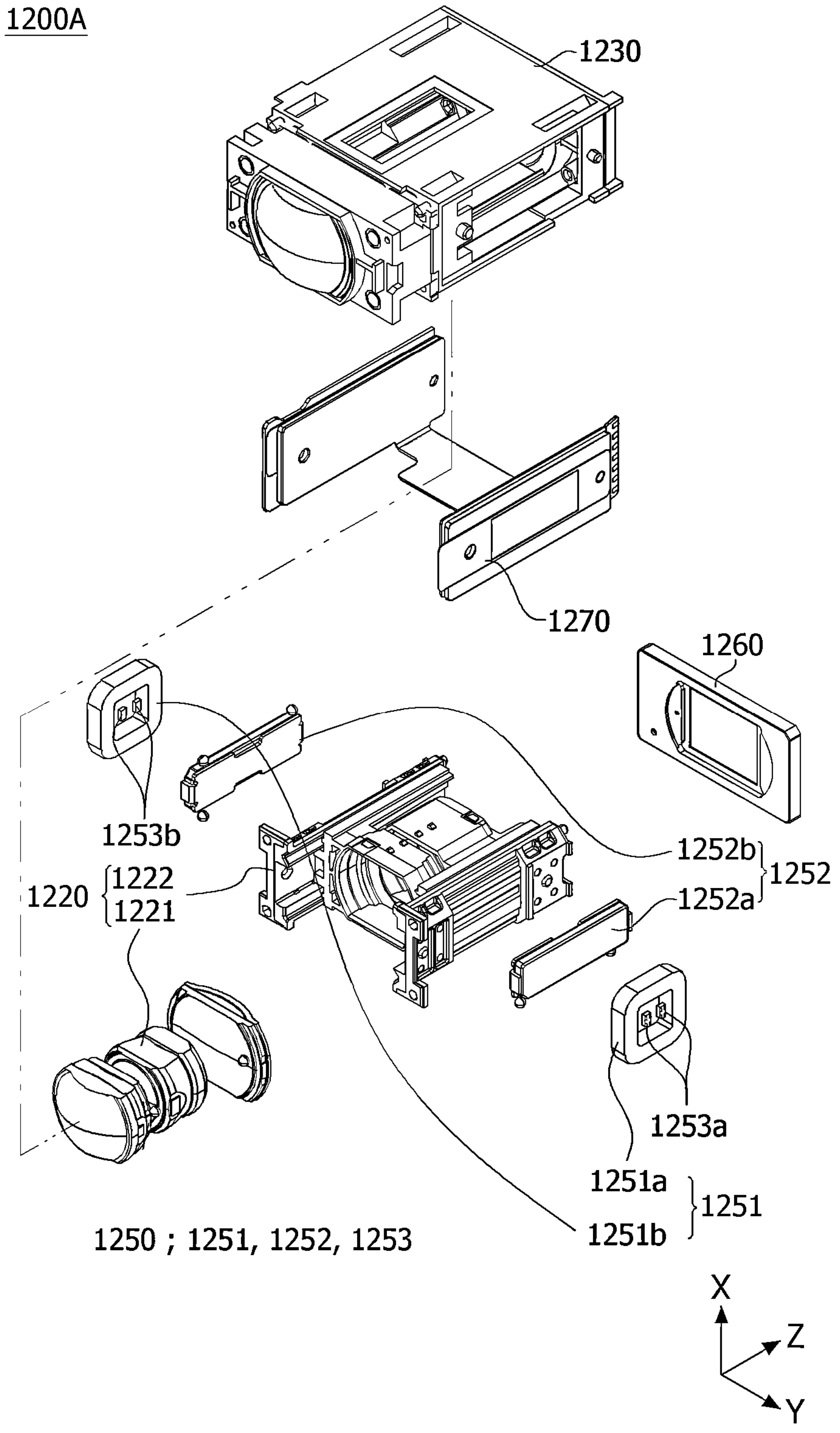
FIG. 70 is an exploded perspective view of the second camera actuator according to the embodiment.
Figure 71:
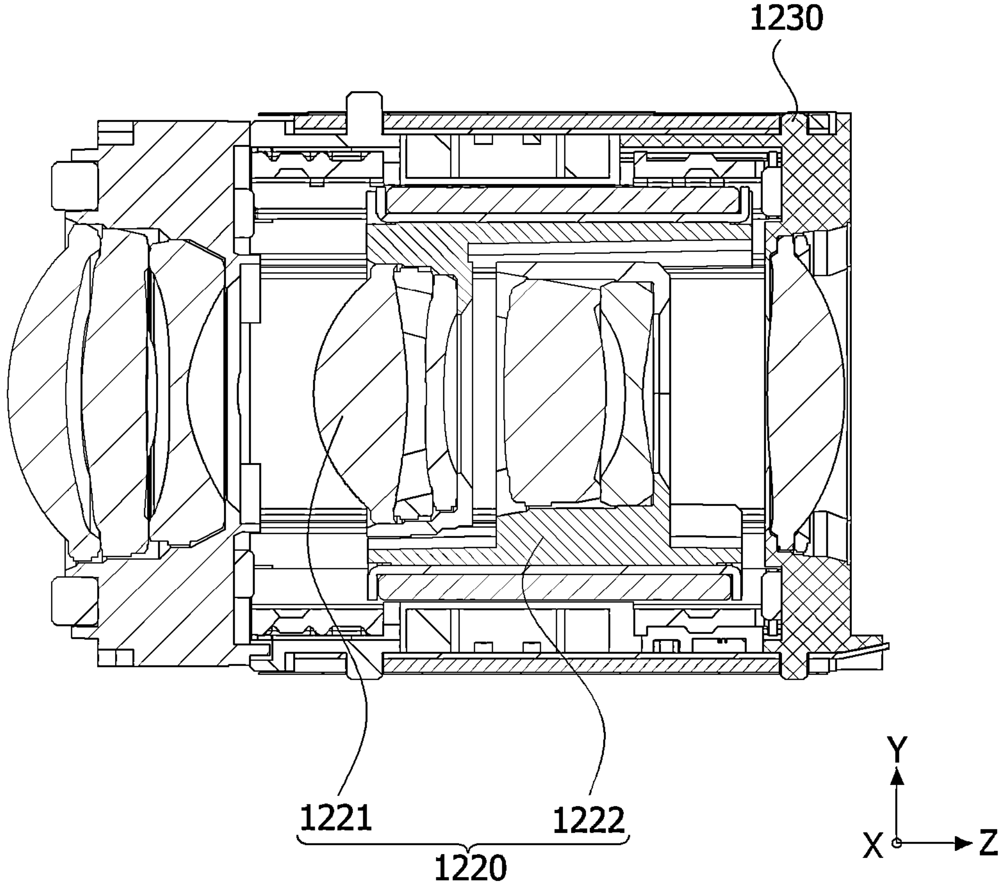
FIG. 71 is a cross-sectional view along line D-D' in FIG. 69.
Figure 72:
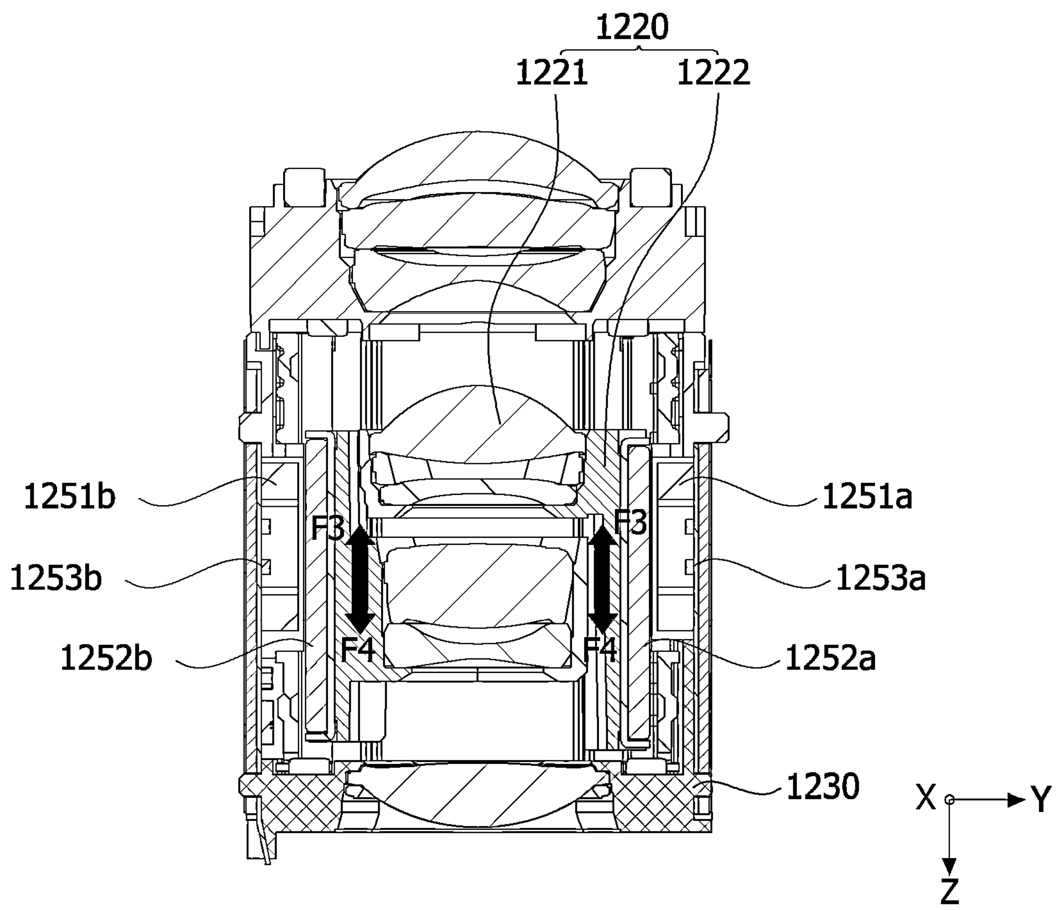
FIG. 72 is a cross-sectional view along line E-E' in FIG. 69.

FIG. 69 is a perspective view of a second camera actuator according to the embodiment, FIG. 70 is an exploded perspective view of the second camera actuator according to the embodiment, FIG. 71 is a cross-sectional view along line D-D' in FIG. 69, and FIG. 72 is a cross-sectional view along line E-E' in FIG. 69.

Referring to FIGS. 69 to 72, the second camera actuator 1200 according to the embodiment may include a lens unit 1220, a second housing 1230, a second driving unit 1250, a base unit (not illustrated), and a second board unit 1270. Furthermore, the second camera actuator 1200 may further include a second shield can (not illustrated), an elastic unit (not illustrated), and a bonding member (not illustrated). Furthermore, the second camera actuator 1200 according to the embodiment may further include an image sensor IS.

The second shield can (not illustrated) may be positioned in one region (e.g., an outermost side) of the second camera actuator 1200 and positioned to surround the components (the lens unit 1220, the second housing 1230, the second driving unit 1250, the base unit (not illustrated), the second board unit 1270, and the image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction). Therefore, the above-described AF function may be performed.

Specifically, the lens unit 1220 may include a lens assembly 1221 and a bobbin 1222.

The lens assembly 1221 may include at least one lens. In addition, although a plurality of lens assemblies 1221 may be formed, the following description will be made based on one lens assembly.

The lens assembly 1221 may be coupled to the bobbin 1222 and moved by an electromagnetic force generated from a fourth magnet 1252*a* and a second magnet 1252*b* coupled to the bobbin 1222 in the third direction (Z-axis direction).

The bobbin 1222 may include an opening region surrounding the lens assembly 1221. In addition, the bobbin 1222 may be coupled to the lens assembly 1221 by various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to elastic units (not illustrated) on an upper end and a rear end thereof. Therefore, the bobbin 1222 may be supported by the elastic units (not illustrated) while moving in the third direction (Z-axis direction). In other words, a position of the bobbin 1222 may be maintained in the third direction (Z-axis direction). The elastic unit (not illustrated) may be formed of a leaf spring.

The second housing 1230 may be disposed between the lens unit 1220 and the second shield can (not illustrated). In addition, the second housing 1230 may be disposed to surround the lens unit 1220.

The second housing 1230 may have a hole formed in a side portion thereof. A fourth coil 1251*a* and a fifth coil 1251*b* may be disposed in the hole. The hole may be positioned to correspond to the above-described groove of the bobbin 1222.

The fourth magnet 1252*a* may be positioned to face the fourth coil 1251*a*. In addition, the second magnet 1252*b* may be positioned to face the fifth coil 1251*b*.

The elastic unit (not illustrated) may include a first elastic member (not illustrated) and a second elastic member (not illustrated). The first elastic member (not illustrated) may be coupled to an upper surface of the bobbin 1222. The second elastic member (not illustrated) may be coupled to a lower surface of the bobbin 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the bobbin 1222.

The second driving unit 1250 may provide driving forces F3 and F4 for moving the lens unit 1220 in the third direction (Z-axis direction). The second driving unit 1250 may include a driving coil 1251 and a driving magnet 1252.

The lens unit 1220 may be moved by the electromagnetic force generated between the driving coil 1251 and the driving magnet 1252 in the third direction (Z-axis direction).

The driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The driving magnet 1252 may include the fourth magnet 1252*a* and the fifth magnet 1252*b*. The fourth magnet 1252*a* and the fifth magnet 1252*b* may be disposed in the above-described groove of the bobbin 1222 and positioned to correspond to the fourth coil 1251*a* and the fifth coil 1251*b*.

The base unit (not illustrated) may be positioned between the lens unit 1220 and the image sensor IS. A component such as a filter may be fixed to the base unit (not illustrated). In addition, the base unit (not illustrated) may be disposed to surround the image sensor IS. With this configuration, since the image sensor IS is free from foreign substances and the like, it is possible to improve the reliability of the device.

In addition, the second camera actuator may be a zooming actuator or an AF actuator. For example, the second camera actuator may support one lens or a plurality of lenses and perform an AF function or a zooming function by moving the lenses according to a predetermined control signal of a controller.

In addition, the second camera actuator may be a fixed zoom or a continuous zoom. For example, the second camera actuator may provide a movement of the lens assembly 1221.

In addition, the second camera actuator may be formed of a plurality of lens assemblies. For example, at least one of a first lens assembly, a second lens assembly (not illustrated), a third lens assembly (not illustrated), and a guide pin (not illustrated) may be disposed in the second camera actuator. The above-described contents may be applied thereto. Therefore, the second camera actuator may perform a high-magnification zooming function through the driving unit. For example, although the first lens assembly (not illustrated) and the second lens assembly (not illustrated) may be moving lenses that move through the driving unit and the guide pin (not illustrated) and the third lens assembly (not illustrated) may be a fixed lens, the present invention is not limited thereto. For example, the third lens assembly (not illustrated) may perform a function of a focator by which light forms an image at a specific position, and the first lens assembly (not illustrated) may perform a function of a variator for re-forming an image formed by the third lens assembly (not illustrated), which is the focator, at another position. Meanwhile, the first lens assembly (not illustrated) may be in a state in which a magnification change is large because a distance to a subject or an image distance is greatly changed, and the first lens assembly (not illustrated), which is the variator, may play an important role in a focal length or magnification change of the optical system. Meanwhile, imaging points of an image formed by the first lens assembly (not illustrated), which is the variator, may be slightly different depending on a position. Therefore, the second lens assembly (not illustrated) may perform a position compensation function for the image formed by the variator. For example, the second lens assembly (not illustrated) may perform a function of a compensator for accurately forming an image at an actual position of the image sensor using the imaging points of the image formed by the second lens assembly (not illustrated) that is the variator. Furthermore, only one of the plurality of lens assemblies may move in the optical axis direction.

The image sensor IS may be positioned inside or outside the second camera actuator. In an embodiment, as illustrated, the image sensor IS may be positioned inside the second camera actuator. The image sensor IS may receive light and convert the received light into an electrical signal. In addition, the image sensor IS may include a plurality of pixels in the form of an array. In addition, the image sensor IS may be positioned on the optical axis.

Hereinafter, an optical device according to the present embodiment will be described with reference to the drawings.

Figure 73:
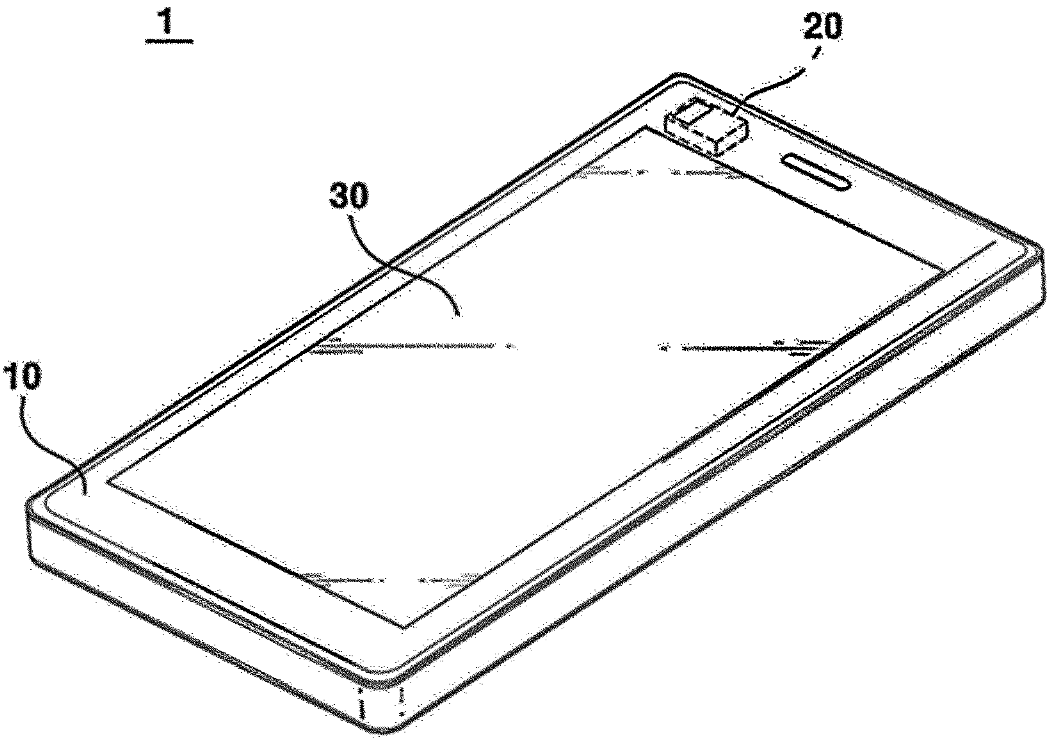
FIG. 73 is a perspective view of a front surface of an optical device according to the present embodiment.
Figure 74:
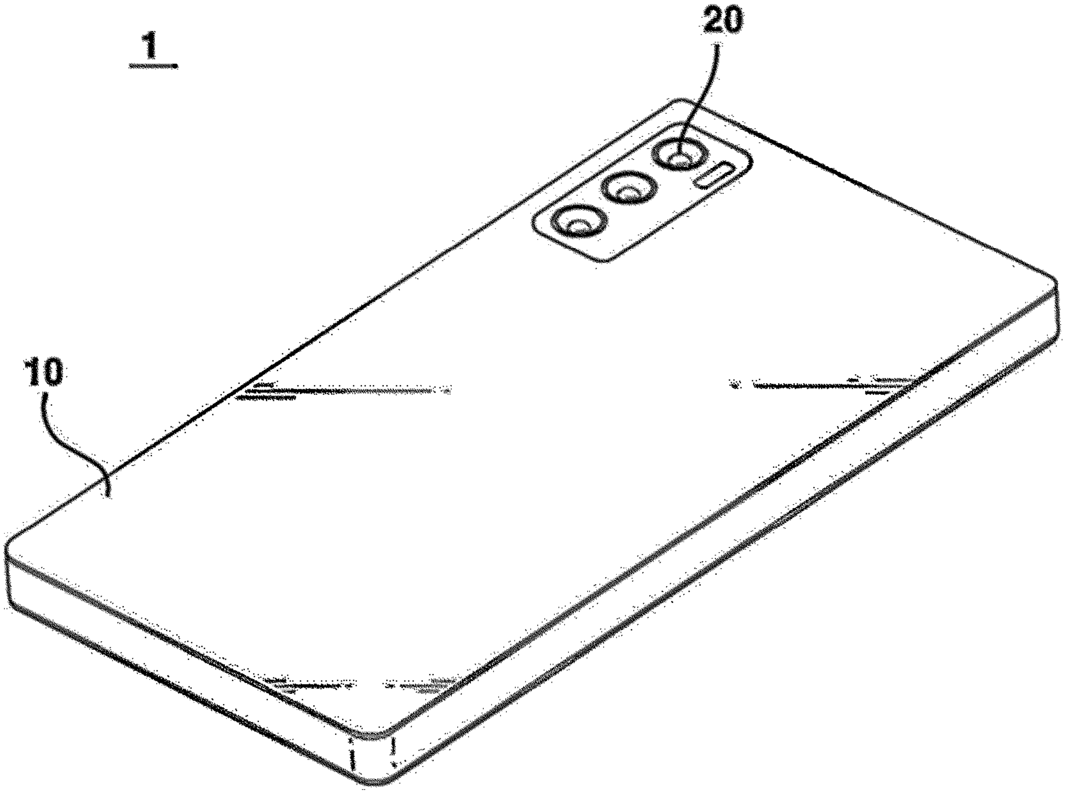
FIG. 74 is a perspective view of a rear surface of the optical device according to the present embodiment.

FIG. 73 is a perspective view of a front surface of an optical device according to the present embodiment, and FIG. 74 is a perspective view of a rear surface of the optical device according to the present embodiment.

An optical device 1 may include any one or more of cell phones, mobile phones, portable terminals, mobile terminals, smart phones, smart pads, portable smart devices, digital cameras, laptop computers, digital broadcasting terminals, and personal digital assistants (PDAs), portable multimedia players (PMPs), and navigation systems. The optical device 1 may include any device for capturing images or photos.

The optical device 1 may include a body 20. The optical device 1 may include the camera device 10. The camera device 10 may be disposed in the body 20. The camera device 10 may capture a subject. The optical device 1 may include a display 30. The display 30 may be disposed on the body 20. The display 30 may output any one or more of videos or images captured by the camera device 10. The display 30 may be disposed on a first side of the body 20. The camera device 10 may be disposed on any one or more of the first surface of the body 20 and a second surface opposite to the first surface.

The camera device 10 according to the present embodiment may be a folded camera module. The folded camera module may have a field of view of 15 to 40 degrees. The folded camera module may have a focal length of 18 to 20 mm or more. The folded camera module may be used as a rear camera of the optical device 1. A main camera with a field of view of 70 to 80 degrees may be disposed on the rear surface of the optical device 1. In this case, a folded camera may be disposed next to a main camera. In other words, the camera device 10 according to the present embodiment may be applied to any one or more of the plurality of rear cameras of the optical device 1. The camera device 10 according to the present embodiment may be applied to one camera among two, three, four or more rear cameras of the optical device 1.

Meanwhile, the camera device 10 according to the present embodiment may also be disposed on a front surface of the optical device 1. However, when the optical device 1 has only one front camera, a wide-angle camera may be applied. When the optical device 1 has two or more front cameras, one of them may be a tele-camera like the present embodiment. However, since the front tele-camera has a focal length that is not greater than that of the rear tele-camera, a normal camera module without a reflective member rather than the folded camera module may be applied.

Although embodiments of the present invention have been described above with reference to the accompanying drawings, those skilled in the art to which the present invention pertains will understand that the present invention can be carried out in other specific forms without changing the technical spirit or essential features thereof. Therefore, it should be understood that the above-described embodiments are illustrative and not restrictive in all respects.

The invention claimed is:

1. An actuator device comprising:
a housing;
a holder disposed in the housing;
a reflective member disposed on the holder;
a moving plate disposed between the housing and the holder;
a rigid mover coupled to the holder with a first part of the housing interposed therebetween;
a first magnet disposed on the rigid mover;
a second magnet disposed in the first part of the housing and configured to generate a repulsive force with the first magnet; and
a buffer member disposed on the first part of the housing,
wherein a distance between the rigid mover and the buffer member is smaller than a distance between the first magnet and the second magnet in a first direction in which the first magnet faces the second magnet.

2. The actuator device of claim 1, wherein the rigid mover comes into contact with the buffer member when the rigid mover moves in the first direction.

3. The actuator device of claim 1, wherein the distance between the rigid mover and the buffer member is smaller than a distance between the rigid mover and the first part of the housing in the first direction.

4. The actuator device of claim 1, wherein the buffer member protrudes more than the second magnet in a second direction opposite to the first direction.

5. The actuator device of claim 1, wherein the buffer member protrudes more than the first part of the housing in a second direction opposite to the first direction.

6. The actuator device of claim 1, wherein the buffer member is spaced apart from the second magnet in a third direction perpendicular to the first direction, and wherein a width of the buffer member is greater than a width of the second magnet in a fourth direction perpendicular to the first direction and the third direction.

7. The actuator device of claim 6, comprising an additional buffer member disposed in the housing, wherein the rigid mover comes into contact with the additional buffer member when the rigid mover moves in the third direction.

8. The actuator device of claim 1, wherein the housing includes a groove formed in the first part of the housing, and wherein at least a portion of the buffer member is disposed in the groove of the housing.

9. The actuator device of claim 1, wherein the first magnet overlaps the buffer member in the first direction.

10. The actuator device of claim 1, wherein the buffer member includes a first buffer member disposed above the second magnet and a second buffer member disposed under the second magnet.

11. The actuator device of claim 10, wherein the first buffer member does not overlap the moving plate in the first direction, and the second buffer member can overlap the moving plate in the first direction.

12. The actuator device of claim 1, wherein the buffer member is elastic.

13. The actuator device of claim 1, comprising:

a board disposed in the housing;

a driving magnet disposed in the holder;

a coil disposed on the board and disposed at a position corresponding to the driving magnet; and an adhesive coupling the board to the housing, wherein the housing includes a first surface to which the board is coupled, and a groove formed in the first surface, and wherein at least a portion of the adhesive is disposed in the groove of the housing.

14. The actuator device of claim 13, wherein the groove of the housing has a quadrangular ring shape.

15. The actuator device of claim 13, wherein the housing includes a hole in which the coil is disposed, the groove of the housing is formed to be larger than the hole of the housing, and the hole of the housing is disposed in the groove of the housing.

16. An actuator device comprising:

a housing;

a holder disposed in the housing;

a reflective member disposed on the holder;

a moving plate disposed between the housing and the holder;

a rigid mover coupled to the holder with a first part of the housing interposed therebetween;

a first magnet disposed on the rigid mover; and a buffer member disposed between the rigid mover and the first part of the housing, wherein the rigid mover comes into contact with the buffer member when the rigid mover moves, and wherein the actuator device includes a second magnet disposed in the first part of the housing and configured to generate a repulsive force with the first magnet.

17. The actuator device of claim 16, wherein the buffer member is disposed in contact with the first part of the housing.

18. An actuator device comprising:

a housing;

a holder disposed in the housing;

a reflective member disposed on the holder;

a moving plate disposed between the housing and the holder;

a rigid mover coupled to the holder with a first part of the housing interposed therebetween;

a buffer member disposed between the first part of the housing and the rigid mover;

a first magnet disposed on the rigid mover;

a second magnet disposed in the first part of the housing and configured to generate a repulsive force with the first magnet, wherein a distance between the rigid mover and the buffer member is smaller than a distance between the first magnet and the second magnet in a first direction in which the first magnet faces the second magnet.

* * * * *